US007739495B2

(12) United States Patent
Asano et al.

(10) Patent No.: US 7,739,495 B2
(45) Date of Patent: Jun. 15, 2010

(54) DATA TRANSMITTING SYSTEM AND METHOD, DRIVE UNIT, ACCESS METHOD, DATA RECORDING MEDIUM, RECORDING MEDIUM PRODUCING APPARATUS AND METHOD

(75) Inventors: Tomoyuki Asano, Kanagawa (JP);
Yoshitomo Osawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 524 days.

(21) Appl. No.: 11/797,600

(22) Filed: May 4, 2007

(65) Prior Publication Data
US 2008/0072040 A1 Mar. 20, 2008

Related U.S. Application Data

(62) Division of application No. 09/807,824, filed as application No. PCT/JP00/05543 on Aug. 18, 2000.

(30) Foreign Application Priority Data

Aug. 20, 1999 (JP) .................................. 11-234371
Dec. 21, 1999 (JP) .................................. 11-363266

(51) Int. Cl.
*H04L 29/06* (2006.01)
*H04L 9/32* (2006.01)
*G06F 7/04* (2006.01)
*G06F 17/30* (2006.01)
*G06F 15/16* (2006.01)
*G06F 15/173* (2006.01)

(52) U.S. Cl. ........................ 713/158; 713/169; 713/165; 713/175; 726/2; 726/3; 726/4; 726/5; 709/223; 709/224; 709/225; 709/226; 709/227; 709/228; 709/229

(58) Field of Classification Search ................. 713/158, 713/171
See application file for complete search history.

(56) References Cited

U.S. PATENT DOCUMENTS 5,400,319 A 3/1995 Fite et al.

(Continued)

FOREIGN PATENT DOCUMENTS

JP 63-184164 7/1988

(Continued)

OTHER PUBLICATIONS

Taro Yoshio, "Kogata Memory Card de Ongaku Chosakuken wo mamoru," Nikkei Electronics, Mar. 22, 1999 (Np. 738), pp. 49-53.

(Continued)

*Primary Examiner*—Shin-Hon Chen
(74) *Attorney, Agent, or Firm*—Finnegan, Henderson, Farabow, Garrett and Dunner, L.L.P.

(57) ABSTRACT

A security module is provided in a data recording medium, data to be written to the data recording medium is encrypted with an content key different from one data to another, and the content key is safely stored in the security module. Also, the security module makes a mutual authentication using the public-key encryption technology with a drive unit to check that the counterpart is an authorized (licensed) unit, and then gives the content key to the counterpart, thereby preventing data from being leaked to any illegal (unlicensed) unit. Thus, it is possible to prevent copyrighted data such as movie, music, etc. from being copied illegally (against the wish of the copyrighter of the data).

63 Claims, 94 Drawing Sheets

U.S. PATENT DOCUMENTS

| | | | |
|---|---|---|---|
| 5,699,431 | A | 12/1997 | Van Oorschot et al. |
| 5,805,699 | A | 9/1998 | Akiyama et al. |
| 5,944,794 | A | 8/1999 | Okamoto et al. |
| 5,949,877 | A * | 9/1999 | Traw et al. .............. 713/171 |
| 6,104,813 | A | 8/2000 | McRae |
| 6,263,313 | B1 | 7/2001 | Milsted et al. |
| 6,438,235 | B2 | 8/2002 | Sims, III |
| 6,611,812 | B2 | 8/2003 | Hurtado et al. |
| 6,779,044 | B1 | 8/2004 | Katoh |
| 6,782,476 | B1 | 8/2004 | Ishibashi |
| 6,834,333 | B2 | 12/2004 | Yoshino et al. |
| 6,850,914 | B1 | 2/2005 | Harada et al. |
| 6,937,553 | B1 | 8/2005 | Mitui et al. |
| 7,137,012 | B1 * | 11/2006 | Kamibayashi et al. ...... 713/193 |

FOREIGN PATENT DOCUMENTS

| | | |
|---|---|---|
| JP | 2-278489 | 11/1990 |
| JP | 5-75598 | 3/1993 |
| JP | 5-347617 | 12/1993 |
| JP | 6-161354 | 6/1994 |
| JP | 7-161172 | 6/1995 |
| JP | 07-319967 | 12/1995 |
| JP | 10-133953 | 5/1998 |
| JP | 10-187826 | 7/1998 |
| JP | 11-7412 | 1/1999 |
| JP | 11-120679 | 4/1999 |
| JP | 11-205305 | 7/1999 |
| JP | 10-25310 | 8/1999 |

OTHER PUBLICATIONS

Naoji Usuki, et al., "IEEE1394 Bus no Chosakuken Hogo Houshiki," Eizou Jouhou Media Gakkai Gijutsu Houkoku, vol. 22, No. 65, Nov. 1998, pp. 37-42 (CE' 98-14).

Katsuichi Hirose, et al. "Anzenna Ninshoutsuki Diffie-Hellman Kagi Kyouyuu Protocol to sono Kaigi Kagi Haifu eno Ouyou," Technical Research report, the Institute of Electronics, Information and Communication Engineers, vol. 97, No. 252, (1997), pp. 87-96 (ISEC 97-37).

Rueppel, et al., "Modern Key Agreement Techniques," Computer Communications, Jul. 1994, pp. 458-465.

Harn, et al., "ID-Based Cyrptographic Schemes for User Identification, Digital Signature, and Key Distribution," IEEE Journal on Selected Areas in Communications, vol. 11, No. 5, Jun. 1993, 757-760.

Digital Transmission Content Protection Specification, Revision 1.0, Apr. 12, 1999, vol. 1 (Informational Version).

Menezes, "Handbook of Aplied Cryptography," 1997, pp. 352-368, CRC Press, Boca Raton, FL.

* cited by examiner

| ENTITY ID |
|---|
| ENTITY TYPE |
| ENTITY PUBLIC KEY |
| DIGITAL SIGNATURE BY TC |

FIG.4

| VERSION NO. |
|---|
| ID OF UNIT OR MEDIUM TO BE REVOKED |
| . . . . . . |
| |
| DIGITAL SIGNATURE BY TC |

FIG.5

| VERSION NO. |
|---|
| ID OF UNIT OR MEDIUM TO BE REGISTERED |
| . . . . . . |
| |
| DIGITAL SIGNATURE BY TC |

FIG.23

| DIFFERENTIATION BETWEEN REVOCATION LIST AND REGISTRATION LIST |
|---|
| VERSION NO. |
| ID OF UNIT OR MEDIUM TO BE REVOKED ( REVOCATION LIST),<br>ID OF UNIT OR MEDIUM TO BE REGISTERED (REGISTRATION LIST) |
| . . . . |
|  |
| DIGITAL SIGNATURE BY TC |

FIG.38

DATA TRANSMITTING SYSTEM AND METHOD, DRIVE UNIT, ACCESS METHOD, DATA RECORDING MEDIUM, RECORDING MEDIUM PRODUCING APPARATUS AND METHOD

This is a division of application Ser. No. 09/807,824, filed Apr. 18, 2001, which is the U.S. National Stage of International Application No. PCT/JP00/05543, filed on Aug. 18, 2000, the contents of which are incorporated herein by reference. U.S. application Ser. No. 09/807,824 claims the right to priority based on Japanese Application Nos. 11-234371, filed on Aug. 20, 1999, and 11-363266, filed on Dec. 21, 1999.

TECHNICAL FIELD

The present invention relates to a data transmitting system and method, drive unit, access method, data recording medium, and a recording medium producing apparatus and method, which can safely transfer data.

BACKGROUND ART

Recently, the recorder and recording medium, which can digitally record data, have been popular. Since video data and music data can be recorded to and played back from the recorder and recording medium without quality degradation, such data can be copied over and over again. Since such a digitally copied data keeps the very quality that the original data has, it will sell in the market. Because of this fact, however, the copyrighter of the video data or music data is afraid that his or her data will be copied many times and put on the market. In this circumstance, the recorder and recording medium are required to incorporate a feature of preventing copyrighted data from being illegally copied as above.

For the copyright protection, a method called "Serial Copy Management System (SCMS)" is applied for the mini-disc (MD) (traded mark). In this system, SCMS data is transmitted along with music data. It indicates that the music data is a one allowed to freely be copied (will be referred to as "copy free"), a one allowed to be copied only once (will be referred to as "copy once allowed") or a one prohibited from being copied (will be referred to as "copy prohibited"). When a mini-disc (will be referred to as "MD" hereinafter) recorder receives music data from a digital interface, it will detect the SCMS data having been transmitted along with the music data. If the SCMS data is "copy prohibited", the MD recorder will not record the music data to the MD therein. If the SCMS data is "copy once allowed", the MD recorder will change the SCMS data to "copy prohibited" and record the SCMS data along with the received music data to the MD. If the SCMS data is "copy free", the MD recorder will record to the MD the SCMS data as it is along with the received music data.

Using the SCMS data as in the above, the MD system prevents copyrighted data from illegally being copied.

For prevention of copyrighted data from illegally being copied, another method is also available. It is called "content scramble system" and applied for the digital versatile disc (DVD) (trade mark). In this system, all copyrighted data in a disc are encrypted and only a licensed recorder is given an content key to decrypt the encrypted data for acquisition of meaningful data. For getting licensed, the recorder is designed to conform an operation prescription against illegal copying etc. Thus the DVD system prevents copyrighted data from illegally being copied.

In the method applied for the MD system, however, there may possibly be produced illegally a recorder which is not in conformity to the operation prescription that when the SCMS data is "copy once allowed", it should be changed to "copy prohibited" and recorded along with received data.

The method adopted in the DVD system is effective on a read-only memory (ROM) medium, but not on a random-access memory (RAM) medium to which the user can record data. That is, even if the user cannot decrypt data in a RAM medium, he or she can illegally copy all data in the RAM medium in consideration to a new RAM medium which can be played in a licensed (legal) recorder.

Thus, the Applicant of the present invention proposed a technique for prevention of illegal copying. This technique will briefly be described in the following. Namely, data intended for identification of individual recording media (will be referred to as "medium identification data" hereinafter) is recorded in each recording medium to allow only a licensed recorder to access the medium identification data as disclosed in the Applicant's Japanese Patent Application No. 10-25310 (Japanese Published Unexamined Patent Application No. 11-224461, issued on Aug. 17, 1999). More specifically, data in a recording medium is encrypted using both a key based on a secret acquired through licensing and a medium identification data such that the data will be meaningless even if any unlicensed recorder can read it. Further, with this technique, when a license is granted to a recorder, the operation of the recorder is prescribed not to make any illegally copying. Thus, with the above technique, the unlicensed recorder cannot access the data and the medium identification data for each medium takes a unique value, so that even if the unlicensed recorder copies all accessible data to a new medium for example, a licensed recorder will not be able to correctly read the data from the new medium, whereby illegal copying can be prevented.

With the above conventional technique, however, to assure that a recording medium to which data has been recorded by a recorder can be read by another recorder, an content key for encryption of data in the recording medium is to be generated based on a common secret key (maser key) for the entire system. That is, if the master key is fraudulently stolen through analysis of a legal or licensed recorder, all data recorded by any recorder included in the system will possibly be decrypted and thus the system as a whole will be destroyed.

DISCLOSURE OF THE INVENTION

Accordingly, the present invention has an object to overcome the above-mentioned drawbacks of the prior art by providing a data transmitting system and method, drive unit, access method, data recording medium and a data recording medium producing apparatus and method, adapted to safely keep a content key.

The present invention has another object to provide a data transmitting system and method, drive unit, access method, data recording medium, and a recording medium producing apparatus and method, adapted not to leak data to any illegal or unlicensed recorder or to supply data to only a legal or licensed recorder.

The present invention has a still another object to provide a data transmitting system and method, drive unit, access method, data recording medium, and a recording medium producing apparatus and method, adapted to prevent, if the secret of a legal recorder has been revealed or exposed to outside by a fraudulent analysis, new data from being supplied to that recorder.

The present invention has a yet another object to provide a data transmitting system and method, drive unit, access method, data recording medium, and a recording medium producing apparatus and method, adapted to prevent copyrighted data such as movie, music, etc. from being copied illegally (against the wish of the copyrighter of the data).

According to the present invention, the data recording medium is provided with a security module. Data to be recorded in the data recording medium is encrypted with a content key different from one data to another, and the content key is stored safely in the security module. The security module makes a mutual authentication with a recorder/player (will also be referred to as "unit" hereinafter where appropriate) by the use of a public-key encryption technology, and checks whether its counterpart (the recorder/player in this case) is a licensed unit before giving the content key to the counterpart. Thus, the security module will not leak the data to any illegal or unlicensed counterpart, namely, to other than the licensed unit. Further, if the secret of a legal unit has been revealed by a fraudulent analysis, a revocation list and/or registration list issued from a trustable center is effectively used to prevent new data from being given to that legal unit.

The above object can be attained by providing a data transmitting system including a data recording medium and a drive unit which accesses the data recording medium, the data recording medium including:

a security module which executes a mutual authentication protocol with the drive unit; and a recording medium proper; and the drive unit including:

a controller which executes the mutual authentication protocol when accessing the data recording medium; and an interface unit which accesses the recording medium proper of the data recording medium.

Also the above object can be attained by providing a data transmitting method for transferring data between a data recording medium having a recording medium proper and a drive unit which accesses the data recording medium, the method including steps of:

executing a mutual authentication protocol between a controller provided in the drive unit and a security module provided in the data recording medium; and accessing, by the drive unit, the recording medium proper of the data recording medium according to the result of the mutual authentication protocol execution.

Also the above object can be attained by providing a drive unit which accesses a data recording medium including a recording medium proper and a security module which executes a mutual authentication protocol with the drive unit, the drive unit including:

a controller which executes the mutual authentication protocol when accessing the data recording medium; and an interface unit which accesses the recording medium proper of the data recording medium.

The above object can be attained by providing a driving method for accessing a data recording medium including a recording medium proper and a security module which executes a mutual authentication protocol with a drive unit, the method including steps of:

executing the mutual authentication protocol when accessing the data recording medium; and accessing the recording medium proper of the data recording medium according to the result of the mutual authentication protocol execution.

In the above, the mutual authentication protocol is executed using the public-key encryption technology. The data recording medium includes the security module and a disc as the recording medium proper, and the drive unit further includes means for driving the disc as the recording medium proper of the data recording medium. The data recording medium includes the security module and a memory chip as the recording medium proper. The interface unit accesses the data recording medium directly or via the security module of the data recording medium.

Further, the data recording medium has self-identification data stored therein, and the drive unit further includes a storage unit having self-identification data stored therein. The security module of the data recording medium and controller of the drive unit exchange their own identification data between them, when executing the mutual authentication protocol, to check whether their counterpart's identification data is registered in an illegal unit revocation list, and will not go through subsequent processes after the execution of the mutual authentication protocol if the checking result shows that either or both of the data recording medium and drive unit is a unit having to be revoked.

The identification data of the data recording medium is stored in the security module, and the data recording medium has the above-mentioned list stored in the security module thereof. The data recording medium has the list stored in the recording medium proper thereof. The drive unit has or has not the list stored in the storage unit thereof.

The security module and drive unit execute a mutual authentication protocol corresponding to whether either or both of them holds the above list or not. More specifically, the controller of the drive unit judges whether or not the data recording medium has a security module having the list stored therein, and executes a mutual authentication protocol which is based on the judgment result. The security module of the data recording medium judges whether the drive unit has the list stored therein, and executes a mutual authentication protocol which is based on the judgment result.

The data recording medium has stored therein the list version number and the list itself, and the drive unit has the list version number and the list itself stored in the storage unit thereof. The security module of the data recording medium and controller of the drive unit exchange the version numbers of their own revocation lists between them when executing the mutual authentication protocol, and one of them whichever has a newer list will send the list to the other while the other having the older list updates the list with the received new list.

The data recording medium has the list version number stored therein and the list itself recorded in the recording medium proper thereof. The drive unit has the list version number and the list itself stored in the storage unit thereof. The security module of the data recording medium and controller of the drive unit exchange the version numbers of their own revocation lists between them when executing the mutual authentication protocol. When the list stored in the storage unit of the drive unit is a new one, the drive unit will write the list to the data recording medium. When the drive unit has an older list, it will read the list from the data recording medium, and update its own list with the list read from the data recording medium.

Both the drive unit and security module check, using their own new lists, whether or not their counterpart's identification data are registered in the lists, respectively.

The drive unit further includes a storage unit having self-identification data stored therein. The security module of the data recording medium will receive, when executing the mutual authentication protocol, the self-identification data from the drive unit, check whether or not the identification data of the drive unit is registered in the illegal unit revocation list, and will not go through subsequent processes after execution of the mutual authentication protocol if the checking result shows that the drive unit is a unit having to be revoked.

Also, the data recording medium has self-identification data stored therein. The controller of the drive unit will receive, when executing the mutual authentication protocol, the self-identification data from the security module, check whether or not the identification data of the security module is registered in the illegal unit revocation list, and will not go through subsequent processes after execution of the mutual authentication protocol if the checking result shows that the security module is a unit having to be revoked.

The illegal unit revocation list has registered therein identification data of units having to be revoked. That is, the units registered in this list are taken as having to be revoked. Alternately, the illegal unit revocation list has registered therein identification data of units having not to be revoked. In this case, the units not registered in this list are taken as having to be revoked. The illegal unit revocation list includes a revocation list having registered therein identification data of units having to be revoked, and a registration list having registered therein identification data of units having not to be revoked. That is, the units registered in the revocation list and/or those not registered in the registration list are taken as having to be revoked. Alternatively, the illegal unit revocation list includes a revocation list having registered therein identification data of units having to be revoked, and a registration list having registered therein identification data of units having not to be revoked, and either of the revocation and registration lists is selected to judge whether or not a unit in consideration is included in the units having to be revoked.

When executing the mutual authentication protocol, the drive unit and security module execute a key sharing protocol using the public-key encryption technology, encrypt a data encrypting content key with a shared key thus obtained, and send the encrypted content key from one of the drive unit and security module to the other. Alternatively, when executing the mutual authentication protocol, the drive unit and security module execute a key sharing protocol using the public-key encryption technology, encrypt data using a shared key thus obtained and send the encrypted data from one of the drive unit and security module to the other.

The drive unit is to write data to the recording medium proper via the interface unit. The drive unit and security module execute the key sharing protocol using the public-key encryption technology, the drive unit encrypts the data content key using the shared key obtained through the execution of the key sharing protocol and sends the encrypted data content key to the security module, while the security module decrypts the encrypted content key received from the drive unit by the use of the shared key obtained through the execution of the key sharing protocol, re-encrypts the decrypted content key with a save key stored therein and transmits the re-encrypted content key to the drive unit. The drive unit writes to the recording medium proper via the interface unit the data encrypted with the content key and the content key encrypted by the security module using the save key.

The drive unit is also to read data from the recording medium proper via the interface unit. The drive unit and security module execute the key sharing protocol using the public-key encryption technology, reads the encrypted content key from the recording medium proper and sends the read content key to the security module, while the security module decrypts the encrypted content key received from the drive unit by the use of the save key stored therein. The drive unit decrypts, using the shared key obtained through the execution of the key sharing protocol, the encrypted content key received from the security module, reads the content key-encrypted data from the recording medium proper and decrypts the read data.

As in the above, the drive unit is to write data to the recording medium proper via the interface unit, the interface unit accesses the recording medium proper via the security module of the data recording medium, the drive unit and security module execute the key sharing protocol using the public-key encryption technology, the drive unit sends to the security module the data encrypting content key encrypted with the shared key obtained through the execution of the key sharing protocol and data encrypted with the content key, and the security module decrypts the encrypted content key received from the drive unit by the use of the shared key obtained through the execution of the key sharing protocol, and writes to the recording medium proper the content key re-encrypted with the save key stored in the security module and data encrypted with the content key received from the drive unit.

The drive unit is to write data to the recording medium proper via the interface unit. The interface unit accesses the recording medium proper via the security module of the data recording medium, the drive unit and security module execute the key sharing protocol using the public-key encryption technology, the drive unit encrypts data with the shared key obtained through the execution of the key sharing protocol and sends the data thus encrypted to the security module, and the security module decrypts, with the shared key, the encrypted data received from the drive unit, encrypts the decrypted data and stores the encrypted data into the recording medium proper.

The drive unit is to read data from the recording medium proper via the interface unit. The interface unit accesses the recording medium proper via the security module of the data recording medium, the drive unit and security module execute the key sharing protocol using the public-key encryption technology, the security module reads from the recording medium proper the encrypted content key and data encrypted with the content key, decrypts the encrypted content key with the save key stored therein and sends to the drive unit the content key re-encrypted with the shared key obtained through the execution of the key sharing protocol and data encrypted with the content key read from the recording medium proper, and the drive unit decrypts, with the shared key obtained through the execution of the key sharing protocol, the encrypted content key received from the security module and decrypts the encrypted data with the content key.

The drive unit is to read data from the recording medium proper via the interface unit. The interface unit accesses the recording medium proper via the security module of the data recording medium, the drive unit and security module execute the key sharing protocol using the public-key encryption technology, the security module reads data encrypted and stored in the data recording medium, decrypts the encrypted data with the content key, re-encrypts the decrypted data with the shared key obtained through the execution of the key sharing protocol and sends the re-encrypted data to the drive unit, and the drive unit decrypts, with the shared key obtained through the execution of the key sharing protocol, the encrypted data received from the security module.

Also, the above object can be attained by providing a data recording medium having a data recording area, including, according to the present invention:

a security module having an interface function for interfacing with an external unit, a random number generating function, a data storing function, and a calculating function to provide a necessary calculation for mutual authentication protocol using the public-key encryption technology; and a recording medium proper having the data recording area.

Also the above object can be attained by providing an access method for accessing a data recording medium having a data recording area, the method including steps of:

connecting to an external unit;

generating a random number and sending it to the external unit;

making, using data received from the external unit and stored data, a necessary calculation for a protocol, for mutual authentication with the external unit, using the public-key encryption technology;

executing the mutual authentication mutual authentication protocol with the external unit; and accessing a recording medium proper, in which data is to be recorded, of the data recording medium according to the result of the mutual authentication protocol execution.

In the above, the security module further includes an interface function for access to the recording medium proper in which data is to be recorded.

Also the above object can be attained by providing a recording medium producing apparatus for producing a data recording medium, including a recording unit to record an illegal unit revocation list to the data recording medium which includes a recording medium proper in which data is to be recorded and a security module which executes a mutual authentication mutual authentication protocol with a drive unit which accesses the recording medium proper of the data recording medium.

Also the above object can be attained by providing a recording medium producing method for producing a data recording medium, including a step of:

recording an illegal unit revocation list to the data recording medium which includes a recording medium proper in which data is to be recorded and a security module which executes a mutual authentication mutual authentication protocol with a drive unit which accesses the recording medium proper of the data recording medium.

In the above, the recording medium producing apparatus further includes an assembling apparatus to assemble the data recording medium having the security module and recording medium proper.

The recording unit records the list into the security module. More specifically, the recording unit records the list version number and the list itself to the security module. The recoding unit records the list to the recording medium proper. The recording unit records the list version number to the security module and the list itself to the recording medium proper. Further particularly, the recording unit records in to the security module identification data of the data recording medium, private and public key certificates, which are to be used in the public-key encryption technology given in the data recording medium, and the version number of the list.

The recording unit further includes a storage means for storing the list which is to be recorded to the data recording medium, and an interface through which the list to be recorded to the data recording medium is acquired from outside.

The list is comprised of a revocation list having registered therein identification data of units having to be revoked and/or a registration list having registered therein identification data of units having not to be revoked.

BRIEF DESCRIPTION OF THE DRAWINGS

FIG. 4 explains a public key certificate.

FIG. 5 explains a revocation list.

FIG. 23 explains the registration list.

FIG. 38 explains the revocation list/registration list.

BEST MODE FOR CARRYING OUT THE INVENTION

These objects and other objects, features and advantages of the present invention will become more apparent from the following detailed description of the best modes for carrying out the present invention when taken in conjunction with the accompanying drawings.

First Embodiment of Media Type IM2 and Device Type Dev2

Figure 1:
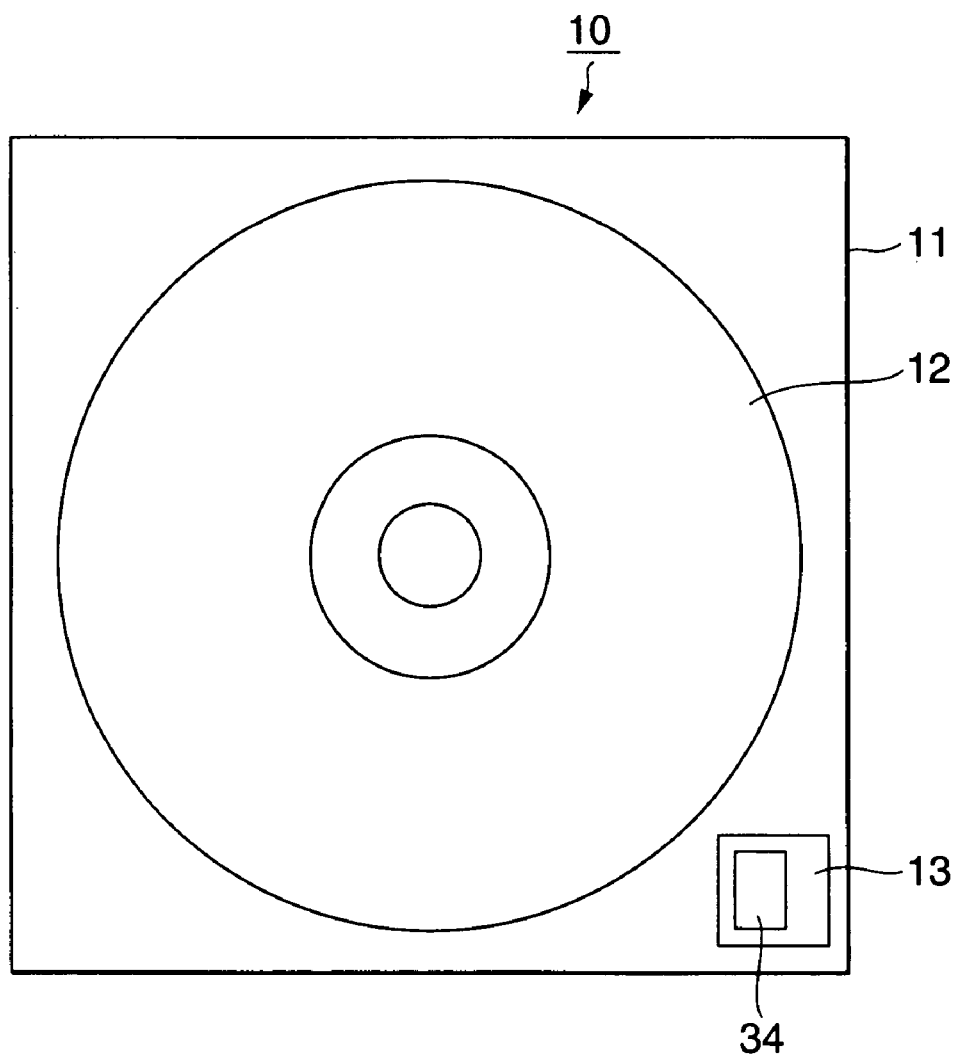
FIG. 1 shows the construction of an optical disc as the data recording medium according to the present invention, including a security module with a nonvolatile memory for storage of a list.

Referring now to FIG. 1, there is illustrated an example construction of an optical disc as an example of the data recording medium according to the first embodiment of the present invention. The optical disc as the data recording medium will be referred to as "optical disc medium" hereinafter.

Figure 2:
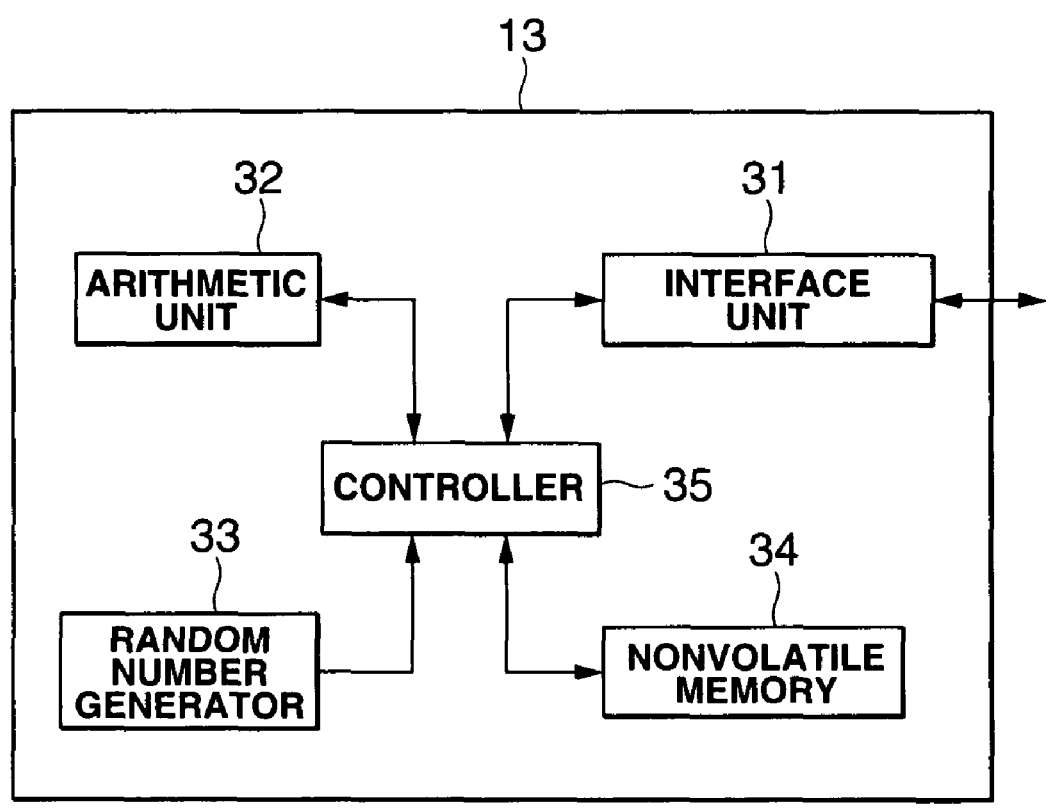
FIG. 2 is a block diagram of an example of the security module included in the optical disc as the data recording medium, the security module being provided with the nonvolatile memory for storage of the list.

As shown, the optical disc medium 10 includes a cartridge 11 in which an optical disc 12 to which data is recorded, and a security module 13 having a nonvolatile memory 34. FIG. 2 shows an example construction of the security module 13 having the nonvolatile memory 34 in the first embodiment.

As shown in FIG. 2, the security module 13 includes, in addition to the nonvolatile memory 34, an interface unit 31 of a contact or non-contact type for data transfer to and from units outside the security module 13, an arithmetic unit 32, a random number generator 33 and a controller 35 to control these components.

Figure 3:
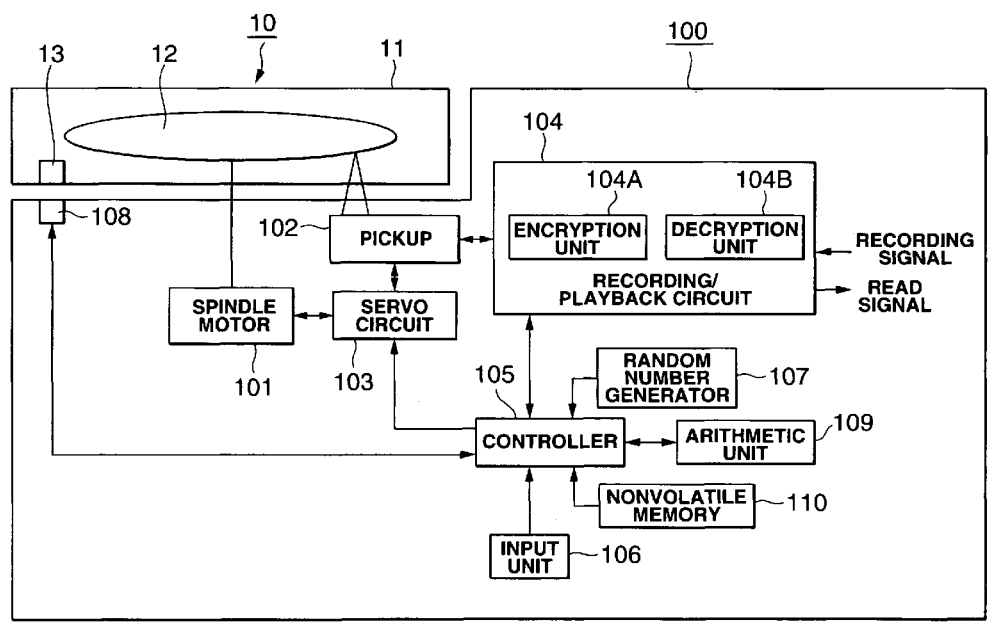
FIG. 3 is a block diagram of an optical disc recorder/player according to the present invention, provided with a nonvolatile module for storage of the list.

Referring now to FIG. 3, there is schematically illustrated an optical disc recorder/player 100 as the first embodiment of the present invention.

The optical disc recorder/player 100 is adapted to write or read data to or from the optical disc medium 10. As shown, it includes a spindle motor 101 to spin the optical disc 12 inside the cartridge 11, optical head 102, servo circuit 103, recording/playback circuit 104, controller to control these components, an input unit 106 connected to the controller 105, random number generator 107 to produce a random number, nonvolatile memory 110, and an interface unit 108.

The spindle motor 101 is driven under the control of the servo circuit 103 to spin the optical disc 12. The optical head 102 illuminates the recording surface of the optical disc 12 with a laser beam to write or read data to or from the optical disc 12. The servo circuit 103 drives the spindle motor 101 to spin the optical disc 12 at a predetermined speed (for example, constant linear velocity). Further, the servo circuit 103 controls tracking and focusing of the optical head 102 in relation to the optical disc 12 and also provides a sled servo control to move the optical head 102 radially of the optical disc 12.

The recording/playback circuit 104 includes an encryption unit 104A and decryption unit 104B, whose mode of operation is switched from one to another by the controller 105. More specifically, when the encryption unit 104A is supplied with an external recording signal, it will encrypt the recording signal and supply the encrypted signal to the optical head 102 which will write it to the optical disc 12. When in the reading mode, the decryption unit 104B decrypts data read by the optical head 102 from the optical disc 12 and delivers the data as a read signal to outside.

The input unit 106 is a button, switch, remote controller or the like. When the user makes an input operation with the input unit 106, the latter will provides a signal corresponding to the user's input operation. The controller 105 controls the entire system according to a stored predetermined program. The random number generator 107 is controlled by the controller 105 to generate a specified random number. The interface unit 108 is of a contact or non-contact type to transfer data to and from the security module 13 in the optical disc medium 10.

As shown, the optical disc recorder/player 100 according to the first embodiment of the present invention further includes an arithmetic unit 109 and nonvolatile memory 110.

In the first embodiment of the present invention, the security module 13 in the optical disc medium 10 is given an identification code (ID) for each medium, private key and public key of a public-key encryption system, corresponding to the ID, and a public key certificate from a trusted center (will be referred to simply as "center TC" hereinafter). The security module 13 has these data stored in the storage area of the nonvolatile memory 34 or any other nonvolatile memory. Similarly, the optical disc recorder/player 100 according to the first embodiment of the present invention is given an identification code (ID) for each unit, a private key and public key of a public-key encryption system, corresponding to the ID, and a public key certificate from the center TC. The optical disc recorder/player 100 has these data stored in the storage area of the nonvolatile memory 110 or any other nonvolatile memory. Especially, the private key is safely stored in the storage area of the nonvolatile memory 34 or 110 or any other nonvolatile memory so that it will not leak to outside.

The public key certificate given to the security module 13 of the optical disc medium 10 is data including the ID and public key of the optical disc medium 10 and digitally signed by the center TC. Similarly, the public key certificate given to the optical disc recorder/player 100 is data including the ID and public key of the optical disc recorder/player 100 and digitally signed by the center IC. Namely, the public key certificates are document data with which the center TC certifies that the individual optical disc medium and optical disc recorder/player are legal ones. Note that the digital signature technology allows to certify that a certain data has been prepared by a certain user. For example, the so-called "Elliptic Curve Digital Signature Algorithm (EC-DSA)" used in the Institute of Electrical and Electronics Engineers (IEEE) P1363 is well known as one of this technology.

As shown in FIG. 4, the public key certificate includes an entity ID, entity type, entity public key, and a digital signature made by the center TC. Note that the "entity" refers to the data recording medium or recorder/player according to the present invention. Also, each entity is given a public key and private key, of which the public key is stated in the public key certificate and the private key is confidentially kept by the entity.

The entity type is an identification code to differentiate between the physical structures of the recording media, namely, to tell whether or not the data recording medium or recorder/player is provided with a nonvolatile memory to store a revocation list (or a registration list which will be described later concerning a third embodiment) and the like.

According to this first embodiment, the nonvolatile memory 34 of the optical disc medium 10 and nonvolatile memory 110 of the optical disc recorder/player 100 have stored therein a common public key of the center TC to the whole system. The common public key is used to check the digital signature made by the center TC, included in the public key certificate.

Further, according to the first embodiment, each of the nonvolatile memory 34 of the security module 13 of the optical disc medium 10 and nonvolatile memory 110 of the optical disc recorder/player 100 has an area for storage of the revocation list shown in FIG. 5.

The revocation list contains a version number being a number increasing monotonously to indicate the version of the revocation list, a list of IDs of optical disc media or optical disc recorder/player units whose private keys have been revealed (namely, IDs of units (recorder/player units) or media to be revoked), and the digital signature made by the center TC. That is, generally, the revocation list is also called "illegal units list" or "black list", and lists up IDs of the media or units whose private keys have been revealed in the whole system consisting of the optical disc medium and optical disc recorder/player as in this embodiment. The center TC makes a digital signature to the revocation list. Therefore, when it is found in an entity (data recording medium or recorder/player) that the ID of an recording medium or unit as a communication counterpart of the entity is stated in the revocation list, the entity will determine that the communication counterpart is an illegal one and can inhibit the protocol from going through any further steps. Thereby, it is possible to revoke from this system the recording medium or unit whose private has been revealed or recording medium having been copied illegally or unit having been produced illegally, by the use of the revealed private key. Also, when the optical disc recorder/player 100 is shipped from factory, the latest revocation list is stored in the nonvolatile memory 110.

<Recording Procedure in the First Embodiment>

Next, the procedure for data recording to the optical disc medium 10 by the optical disc recorder/player 100 according to the first embodiment will be described below with reference to FIGS. 6 to 8.

As mentioned above, the optical disc recorder/player 100 according to the first embodiment has stored in the nonvolatile memory 110 thereof the ID given by the center TC, private key and public key of the public-key encryption system, public key certificate and the revocation list. Similarly, the security module 13 of the optical disc medium 10 according to the first embodiment has stored in the nonvolatile memory 34 thereof the ID given by the center TC, private key and public key of the public-key encryption system, public key certificate and the revocation list.

Figure 6:
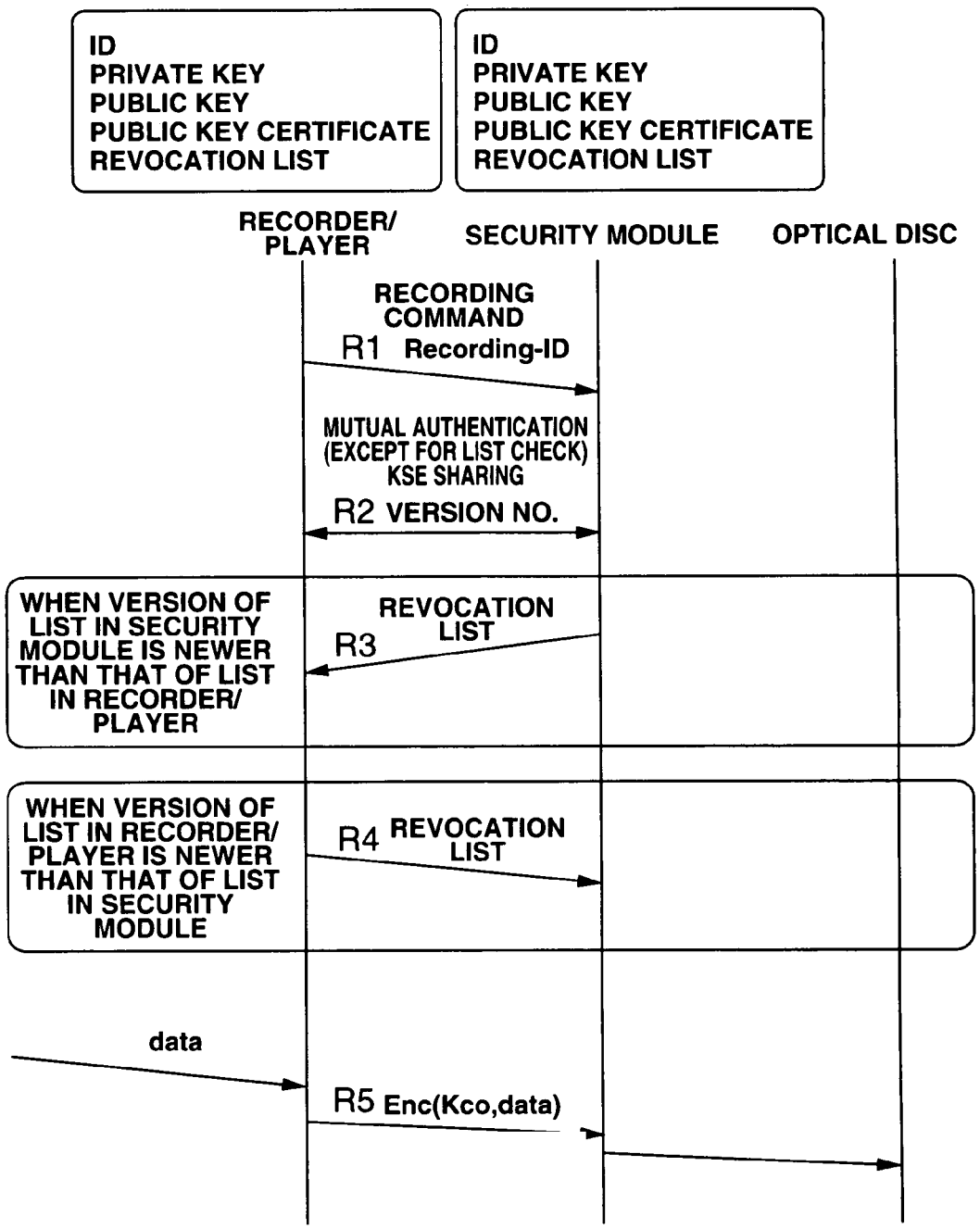
FIG. 6 shows a basic procedure for writing data to the optical disc as the data recording medium according to the present invention.

As shown in FIG. 6, first the optical disc recorder/player 100 goes to step R1 where it will send, to the security module 13 of the optical disc medium 10, a recording command (recording start command) indicating that data is going to be recorded, and a recording ID (Recording-ID) assigned at each recording to identify each recording.

Next, the optical disc recorder/player 100 and the security module 13 of the optical disc medium 10 go to step R2 where they will execute, by the use of the recording command as a trigger, mutual authentication and key sharing protocols using the public-key encryption technology.

The mutual authentication protocol using the public-key encryption technology is to check mutually with a counterpart that the counterpart has a pair (approved by the center TC) of the valid public key and private key. It can be prepared using the EC-DSA (Elliptic Curve Digital Signature Algorithm) under standardization by IEEE P1363 for example.

It should be noted that in the mutual authentication protocol using the public-key encryption technology, both the security module 13 of the optical disc medium 10 and optical disc recorder/player 100 have to generate a random number by means of their respective functions of random number generation (random number generator 33 of the security module 13 and random number generator 107 of the recorder/player 100), read their own private keys and public key certificates stored in the their own nonvolatile memories, and execute arithmetic operations based on the public-key encryption technology by means of their own operational functions (arithmetic units).

In addition to the mutual authentication protocol using the public-key encryption technology, there has also been known a mutual authentication protocol using the common-key encryption technology. The latter technology is based on an assumption that each of two parties going to execute the protocol has a common key. Since to adopt the mutual authentication protocol using the common-key encryption technology, there should be an inter-operability between the recording medium and recorder/player, all the security module 13 and optical disc recorder/player 100 should have a common key to the whole system. In this case, however, if one of the security modules or optical disc recorder/player units is attacked (analyzed) and has the key thereof revealed, the whole system will be influenced by the revelation.

On the contrary, in the mutual authentication protocol using the public-key encryption technology, the recorder/player units and security modules have unique keys, respectively, and the aforementioned revocation list can be used in this embodiment. Therefore, even if the key of one of the recorder/player units or recording medium is revealed, only the recorder/player or recording medium having the key thereof revealed can be revoked from the system, whereby the influence on the system can be minimized.

The key sharing protocol using the public-key encryption technology is to safely share secret data between two parties, and can be prepared using the so-called Elliptic Curve Diffie Hellman (EC-DH) under standardization by IEEE P1363.

As an example of the mutual authentication protocol and key sharing protocol using the public-key encryption technology, there is available the Full Authentication and Key Exchange (FAKE) protocol specified in the so-called Digital Transmission Content Protection (DTCP) standard (this standard itself is not opened to any unlicensed person but the white paper outlining the standard or information version of the standard is acquired from the Digital Transmission Licensing Administrator (DTLA) which is a licensing organization). This FAKE protocol is generally composed of the following steps:

At the first step of this protocol, one of the security module and optical disc recorder/player generates a random number by its random number generator, and sends it along with its own public key certificate to the other.

At the second step of the protocol, the one makes calculation based on the public-key encryption technology to check if the other's public key certificate is valid.

Next at the third step of the protocol, the one makes a calculation (first step) based on the public-key encryption technology for key sharing, and sends the data (result of operation) along with its own digital signature prepared by making calculation based on the public-key encryption technology to the other.

After that, at the fourth step of the protocol, the one makes calculation based on the public-key encryption technology, as to the data obtained at the third step and sent from the other, to check the other's digital signature, and makes calculation (second step) based on the public-key encryption technology for key sharing to calculate the value of the shared key.

In this protocol, the one checks, for the mutual authentication, that the other has a correct private key and public key and the other's ID is not listed in its own revocation list. That is, in case a key of a unit, which was valid when the unit was shipped, has been attacked (fraudulent analysis) by a so-called reverse engineering or the like and the ID of the unit whose key has thus been revealed is listed in the revocation list, no data will be passed to any unit (to which no data should be passed) listed in the revocation list.

Referring back to FIG. 6, further at step R2, the recorder/player and security module of the recording module exchange the version numbers of their own revocation lists between them.

Next, the recorder/player and security module of the recording medium go to steps R3 and R4 where they will check if the version of the revocation list any one of them owns is newer than that the other owns. When the one has a newer version of the revocation list than that of the revocation list the other owns, it will send its own revocation list to the other. On the other hand, one of the recorder/player and security module of the recording medium, which has the revocation list of a old version, requests the other to send the revocation list of the new version, checks that the revocation list is valid, and then updates its own revocation list to the new version of the revocation list received from the other. That is to say, step R3 is a flow of the revocation list when the version of the revocation list in the security module is newer than that in the recorder/player, and step R4 is a flow of the revocation list when the version of the revocation list in the recorder/player is newer than that in the security module.

It should be noted that the transfer of the revocation list at steps R3 and R4 may be done after the data recording at next step R5. That is, the revocation list transfer at step R3 or R4 may be done after completion of the data recording at step R5.

As the result of the above-mentioned mutual authentication protocol and key sharing protocol using the public-key encryption technology, the optical disc recorder/player 100 and security module 13 will safely share a key. This shared key will be referred to as "session key (Kse)" hereinafter.

Next, a content key (Kco) to encrypt data is determined by using one of the following content key determining methods (1) to (4):

Content Key Determining Method (1):

It is assumed that Kco=Kse. Namely, a session key Kse obtained with the mutual authentication protocol and key sharing protocol is taken as a content key Kco. At this time, the security module 13 safely stores the content key Kco into the nonvolatile memory 34 provided therein, or it sends to the optical disc recorder/player 100 a value Enc(Kst, Kco) derived from encryption of the content key Kco with a storage key (Kst) stored in advance therein and records it to the optical disc 12.

Content Key Determining Method (2):

It is assumed that the storage key Kst stored in advance in the security module 13 is the content key Kco. In this case, the security module 13 encrypts the storage key Kst with the session key Kse, sends it to the optical disc recorder/player

100, encrypts data with the storage key Kst (=Kco), and records it to the optical disc 12.

Content Key Determining Method (3):

The security module 13 generates a new content key Kco by means of the random number generator or the like. In this case, the security module 13 encrypts the content key Kco with the session key Kse and sends it to the optical disc recorder/player 100. The optical disc recorder/player 100 encrypts data with the content key Kco and records it to the optical disc 12. The security module 13 safely stores the content key Kco into the nonvolatile memory 34 provided therein, or it sends to the optical disc recorder/player 100 a value Enc(Kst, Kco) derived from encryption of the content key Kco with a storage key (Kst) stored in advance therein and records it to the optical disc 12.

Content Key Determining Method (4):

The optical disc recorder/player 100 generates a new content key Kco by means of the random number generator or the like, encrypts data with the content key Kco, and records it. In this case, the optical disc recorder/player 100 encrypts the content key Kco with the session key Kse, and sends it to the security module 13. The security module 13 safely stores the content key Kco into the nonvolatile memory 34 provided therein, or it sends to the optical disc recorder/player 100 a value Enc(Kst, Kco) derived from encryption of the content key Kco with a storage key (Kst) stored in advance therein and records it to the optical disc 12.

When a content key Kco is determined using any one of the above content key determining methods (1) to (4), the optical disc recorder/player 100 goes to step R5 where it will encrypt, with the content key Kco, data to be recorded into the optical disc 12, and then record the encrypted data Enc (kco, data) to the optical disc 12.

Also, when the content key Kco or encrypted content key Kco is recorded into the nonvolatile memory 34 of the security module 13, it is recorded along with a recording ID (Recording-ID) which is to be a search key or the encrypted content key Kco is recorded in one sector in the optical disc 12 to which the data is to be written so that a correspondence can be established between the data and content key Kco. Note that for management and transfer of the content key Kco and data encryption, a common key encryption algorithm should preferably be used from the standpoint of the processing speed.

The common key encryption algorithm is an encryption algorithm using the same content key in both encryption and decryption. As an example of this algorithm, the so-called Data Encryption Standard (DES) designated as one of the United States Standards in FIPS46-2 is available.

Among others, by the content key determining method (4), the optical disc recorder/player 100 can encrypt data in advance since the method allows the optical disc recorder/player 100 to determine a content key Kco.

In the first embodiment, data is recorded to the optical disc 12 by following the above procedure.

It should be noted that the expression "Enc(x, y)" means that taking "x" as a key, "y" is encrypted by a predetermined encryption function. This is also true in the following.

<Recording Procedure in the First Embodiment (Detail 1)>

Figure 7:
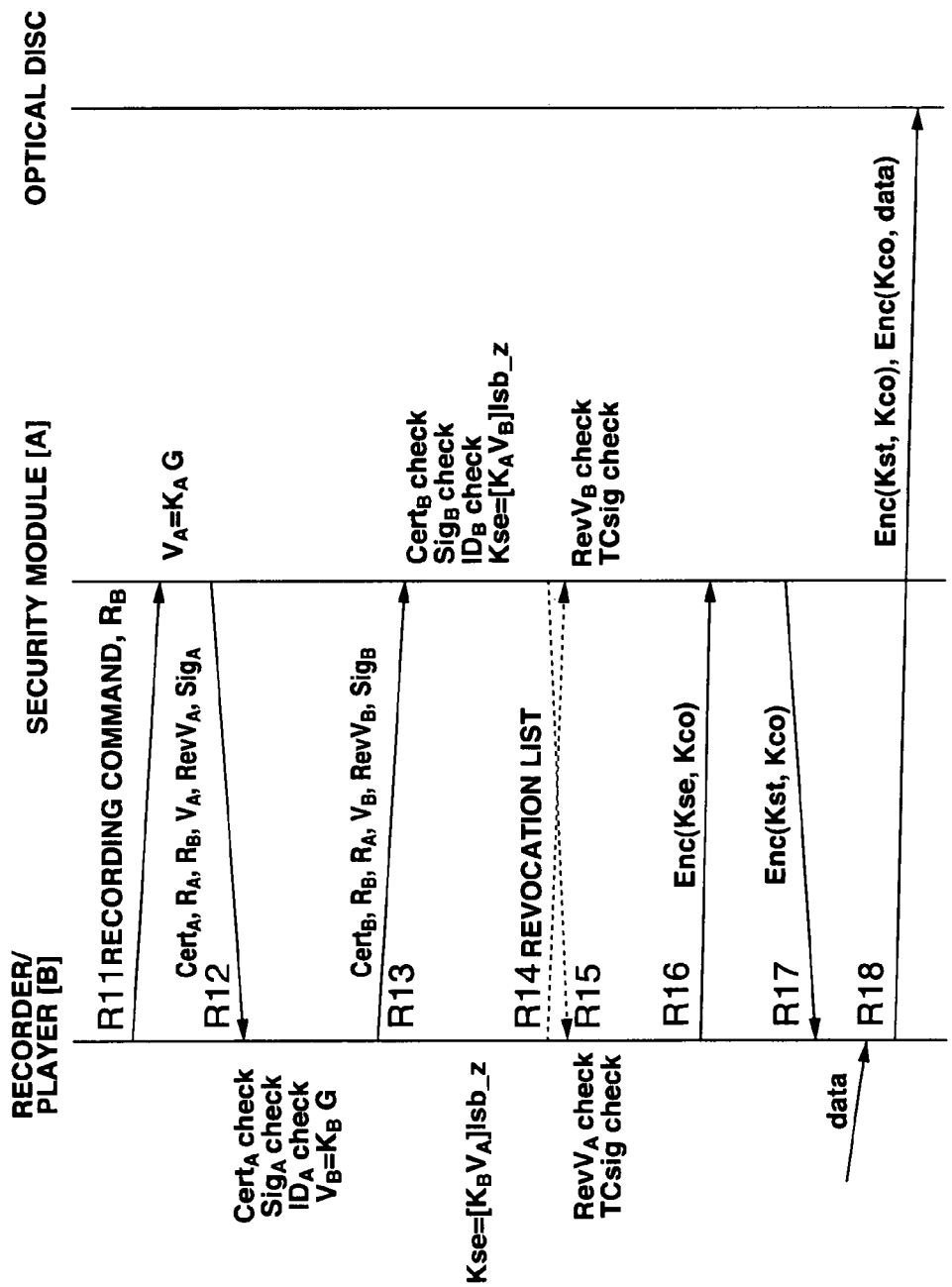
FIG. 7 shows in detail the procedure for writing data to the optical disc as the data recording medium according to the first embodiment of the present invention.

Referring now to FIG. 7, there is illustrated in detail a procedure followed by the optical disc recorder/player 100 according to the first embodiment shown in FIG. 6 to record data to the optical disc medium 10. Note that in FIG. 7, a letter "B" is suffixed to each data associated with the optical disc recorder/player 100 and a letter "A" is suffixed to each data associated with the security module 13 of the optical disc medium 10. As having previously been described with reference to FIG. 6, the optical disc recorder/player 100 and security module 13 store in their respective nonvolatile memories 110 and 34 an ID given by the center TC ($ID_A$ of the security module 13 and $ID_B$ of the optical disc recorder/player 100), private key of the public-key encryption system, public key, public key certificate and a revocation list.

As shown in FIG. 7, first at step R11, the optical disc recorder/player 100 generates a random number $R_B$ of 64 bits by means of the random number generator 107, and sends the random number $R_B$ along with a recording command (recording start command) to the security module 13.

Receiving the recording command and random number $R_B$, the security module 13 goes to step R12. At step R12, it generates a 64-bit random number $R_A$ by means of the random number generator 33 and also generates a secret predetermined value or random number $K_A$ ($0<K_A<r$) which will not be delivered to outside from the security module 13, and determines a value "phase 1 value" $V_A$ at the step 1 of the EC-DH algorithm using an arithmetic expression $V_A=K_A \cdot G$. Note that in the above, the arithmetic expression $V_A=K_A \cdot G$ is to calculate a value on an elliptic curve in the encryption technology using the so-called elliptic function, where G is a point on the elliptic curve and takes a value set commonly in the system. Also, in the above random number ($0<K_A<r$), the "r" is an order of the point G. Further, using the signature algorithm in the EC-DSA, the security module 13 makes a digital signature using a digital signature function Sign to a bit string $R_A\|R_B\|V_A\|RevV_A$ consisting of the random number $R_A$, random number $R_B$, value $V_A$ and a revocation list version number $RevV_A$ to acquire $Sig_A$=Sign($PriKey_A$, $R_A\|R_B\|V_A\|RevV_A$) where "$PriKey_A$ is a private key of the security module 13 and "||" means bit concatenation. The security module 13 appends a public key certificate $Cert_A$ to these $R_A$, $R_B$, $V_A$, $RevV_A$ and $Sig_A$, and sends them to the optical disc recorder/player 100. Note that when the security module 13 has or uses no revocation list, it will uses "0" for example as the version number.

Receiving $Cert_A$, $R_A$, $R_B$, $V_A$, $RevV_A$ and $Sig_A$ from the security module 13, the optical disc recorder/player 100 checks the public key certificate $Cert_A$, digital signature $Sig_A$ and $ID_A$ of the security module 13 using the certification algorithm in the EC-DSA.

That is, first the optical disc recorder/player 100 checks the public key certificate $Cert_A$ of the security module 13. For example, when the optical disc recorder/player 100 judges that the certificate cannot pass the check, it will regard the optical disc medium 10 with the security module 13 as an illegal one, and the protocol will be closed.

On the other hand, when the optical disc recorder/player 100 judges the public key certificate $Cert_A$ of the security module 13 to be valid, it acquires a public key $PubKey_A$ from the public key certificate $Cert_A$. Next, the optical disc recorder/player 100 judges that the random number $R_B$ returned from the security module 13 is equal to the random number $R_B$ the optical disc recorder/player 100 has generated at the step R11 and that the digital signature $Sig_A$ is correct, it goes to a next step. If not, the optical disc recorder/player 100 will judge that the optical disc medium 10 with the security module 13 is an illegal one, and the protocol will be closed.

As in the above, the optical disc recorder/player 100 judges that the random number $R_B$ returned from the security module 13 is equal to the one it has previously generated and that the digital signature $Sig_A$ is correct, it checks, using the revocation list stored in its own nonvolatile memory 110, that the $ID_A$ of the optical disc medium 10 with the security module 13 is not included in the revocation list. If the result of checking shows that the $ID_B$ of the optical disc medium with the security module 13 is included in the revocation list, the optical disc recorder/player 100 will judge that the optical disc medium 10 with the security module 13 is an illegal one, and the protocol will be closed.

On the other hand, when the optical disc recorder/player 100 judges that the $ID_A$ of the optical disc medium 10 with the security module 13 is not included in the revocation list and thus the optical disc medium 10 is legal, it goes to step R13 where it will generate a secret predetermined value or random number $K_B$ ($0<K_B<r$) which will not be delivered to outside from the optical disc recorder/player 100 and determine a value "phase 1 value" $V_B$ at the step 1 of the EC-DH algorithm using an arithmetic expression $V_B=K_B \cdot G$. Further, using the signature algorithm in the EC-DSA, the optical disc recorder/player 100 makes a digital signature using a digital signature function Sign to a bit string $R_B \| R_A \| V_B \| RevV_B$ consisting of the random number $R_B$, random number $R_A$, value $V_B$ and a version number $RevV_B$ of a revocation list owned by the optical disc recorder/player 100 to acquire $Sig_B$=Sign$(Prikey_B, R_B \| R_A \| V_B \| RevV_B)$ where $Prikey_B$" is a private key of the optical disc recorder/player 100. The optical disc recorder/player 100 appends a public key certificate $Cert_B$ to these $R_B$, $R_A$, $V_B$, $RevV_B$ and $Sig_B$, and sends them to the security module 13. Note that when the optical disc recorder/player 100 has or uses no revocation list, it will uses "0" for example as the version number.

Receiving $Cert_B$, $R_B$, $R_A$, $V_B$, $RevV_B$ and $Sig_B$ from the optical disc recorder/player 100, the security module 13 checks the public key certificate $Cert_B$, digital signature $Sig_B$ and $ID_B$ of the optical disc recorder/player 100 using the certification algorithm in the EC-DSA.

That is, first the security module 13 checks the public key certificate $Cert_B$ of the optical disc recorder/player 100. For example, when the security module 13 has judged that the certificate cannot pass the check, it regards the optical disc recorder/player 100 as an illegal one, and the protocol will be closed.

On the other hand, when the security module 13 judges the public key certificate $Cert_B$ of the optical disc recorder/player 100 to be valid, it acquires a public key $PubKey_B$ from the public key certificate $Cert_B$. Next, the security module 13 judges that the random number $R_A$ returned from the optical disc recorder/player 100 is equal to the random number $R_A$ the security module 13 has generated at the step R12 and that the digital signature $Sig_B$ is correct, it goes to a next step. If not, the security module 13 will judge that the optical disc recorder/player 100 is an illegal one, and the protocol will be closed.

As in the above, the security module 13 judges that the random number $R_A$ returned from the optical disc recorder/player 100 is equal to the one it has previously generated and that the digital signature $Sig_B$ is correct, it checks, using the revocation list stored in its own nonvolatile memory 34, that the $ID_B$ of the optical disc recorder/player 100 is not included in the revocation list. If the result of checking shows that the $ID_B$ of the optical disc recorder/player 100 is included in the revocation list, the security module 13 will judge that the optical disc recorder/player 100 is an illegal one, and the protocol will be closed.

On the other hand, when the security module 13 judges that the $ID_B$ of the optical disc recorder/player 100 is not included in the revocation list and thus the optical disc recorder/player 100 is legal, namely, that the security module 13 and optical disc recorder/player 100 are legal, the security module 13 will make a calculation of $K_A \cdot V_B$ while the optical disc recorder/player 100 will make a calculation of $K_B \cdot V_A$, and they will share as a session key Kse a low-order z bit in an x-ordinate obtained through the calculations.

Next, the security module 13 and optical disc recorder/player 100 mutually check the version numbers of the revocation lists their counterparts own respectively. When the version number of the revocation list one of them has is newer than that of the revocation list the other has, the one will go to step R14 or R15 to send its own revocation list of the newer version to the other. More specifically, the security module 13 checks whether the version number $RevV_A$ of its own revocation list is newer than the version number $RevV_B$ of the revocation list the optical disc recorder/player 100 has. When the version number $RevV_A$ is newer than $RevV_B$, the security module 13 will go to the step R15. At step R15, it will send its own revocation list to the optical disc recorder/player 100. On the other hand, the optical disc recorder/player 100 checks whether the version number $RevV_B$ of its own revocation list is newer than the version number $RevV_A$ of the revocation list the security module 13 owns. When $RevV_B$ is newer than $RevV_A$, the optical disc recorder/player 100 will go to step R14 where it sends its own revocation list to the security module 13.

As in the above, one of the security module 13 and optical disc recorder/player 100 to which the revocation list of the newer version number has been sent from the other will check the digital signature TCSig made by the center TC included in the revocation list. When the digital signature TCSig is correct, the one will update its own old revocation list using the revocation. On the contrary, when the digital signature TCSig is judged to be incorrect, the protocol will be closed.

Thereafter, the optical disc recorder/player 100 goes to step R16 where it determines a content key Kco intended for encryption of the content data to be recorded to the optical disc 12, and sends to the security module 13 a value Enc(Kse, Kco) obtained by encrypting the content key Kco with the session key Kse.

The security module 13 will go to step R17 where it decrypts the content key Kco by decrypting, with the session key Kse, the value Enc(Kse, Kco) sent from the optical disc recorder/player 100, and sends to the optical disc recorder/player 100 a value Enc(Kst, Kco) obtained by encrypting the content key Kco with its own storage key Kst.

Receiving the value Enc(Kst, Kco) from the security module 13, the optical disc recorder/player 100 will go to step R18 where it records to the optical disc 12 in the optical disc medium 10 content data Enc(Kco, data) encrypted with the content key Kco and also a value Enc(Kst, Kco) obtained by encrypting the content key Kco with the storage key Kst.

Note that the revocation list may be sent during transmission of the content data or after completion of the content data transmission.

<Recording Procedure in the First Embodiment (Detail 2)>

In the example shown in FIG. 7, the security module 13 and optical disc recorder/player 100 mutually check at steps R12 and R13 whether their own revocation lists include the IDs of their counterparts, and then check at steps R14 and R15 which one of the version numbers of their own revocation lists is newer or older than the other and update the revocation list with the older version number with that having the newer version number. As will be described below, however, it may be first checked whether the version number of the revocation list owned by one of the security module 13 and optical disc recorder/player 100 is newer or older than that of the revocation list the other owns, and then it may be checked if the ID of the counterpart is included in the revocation list with the newer version number. In this case, since the ID of the counterpart can be checked using the revocation list with the newer version number with no exception, it is possible to check more positively whether the counterpart is illegal. Note that since the revocation lists both the security module 13 and optical disc recorder/player 100 own respectively can have the same version number, the following description will be made with consideration given also to the case that the revocation lists have the same version number.

Figure 8:
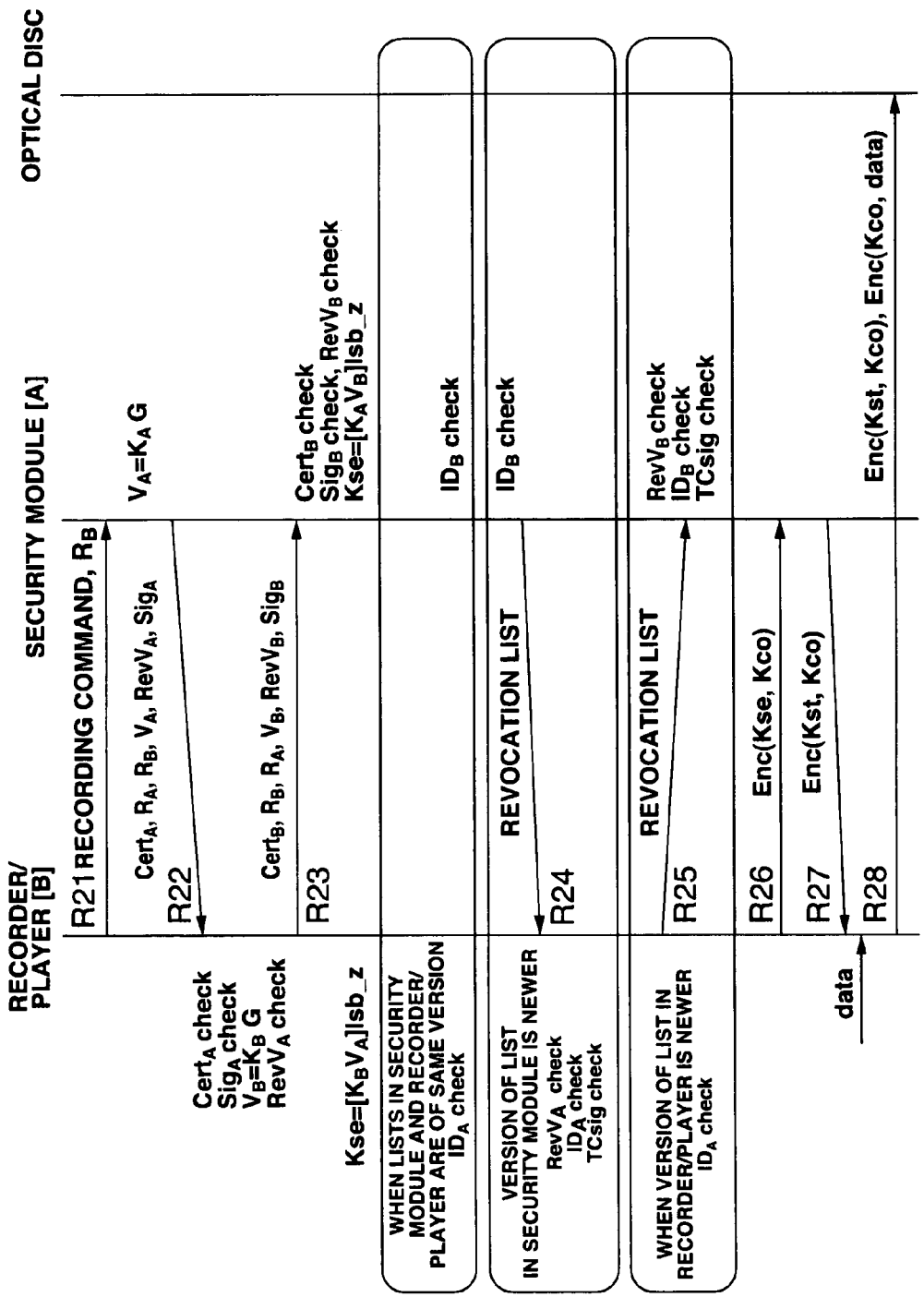
FIG. 8 shows another example of the procedure for writing data to the optical disc as the data recording medium according to the first embodiment of the present invention.

FIG. 8 show a data recording procedure in which it is first checked whether the version number of the revocation list owned by one of the security module 13 and optical disc recorder/player 100 is newer or older than that of the revocation list the other owns and then the ID of the counterpart is checked using the revocation list with the newer version number.

As shown in FIG. 8, first the optical disc recorder/player 100 goes to step R21 where it will generate a random number $R_B$ and send it along with a recording command to the security module 13, as at step R11 shown in FIG. 7.

Receiving the recording command and random number $R_B$, the security module 13 goes to step R22 where it will generate a random number $R_A$, as at step R12 in FIG. 7, and also generate the secret predetermined value or random number $K_A$ and make a calculation using an arithmetic expression $V_A = K_A \cdot G$. Also, the security module 13 makes a digital signature to a bit string $R_A \| R_B \| V_A \| RevV_A$ as in the above to acquire $S_{igA} = \text{Sign}(PriKey_A, R_A \| R_B \| V_A \| RevV_A)$, appends a public key certificate $Cert_A$ to these $R_A$, $R_B$, $V_A$, $RevV_A$ and $Sig_A$, and sends them to the optical disc recorder/player 100.

Receiving $Cert_A$, $R_A$, $R_B$, $V_A$, $RevV_A$ and $Sig_A$ from the security module 13, the optical disc recorder/player 100 checks the public key certificate $Cert_A$ and digital signature $Sig_A$ of the security module 13.

That is, first the optical disc recorder/player 100 checks the public key certificate $Cert_A$ of the security module 13. For example, when the optical disc recorder/player 100 determines that the certificate cannot pass the check, it will regard the optical disc medium 10 with the security module 13 as an illegal one, and the protocol will be closed.

On the other hand, when the optical disc recorder/player 100 judges the public key certificate $Cert_A$ of the security module 13 to be valid, it acquires a public key PubKeyA from the public key certificate $Cert_A$. Next, the optical disc recorder/player 100 judges that the random number $R_B$ returned from the security module 13 is equal to the random number $R_B$ the optical disc recorder/player 100 has generated at step R21 and that the digital signature $Sig_A$ is correct, it goes to a next step. If not, the optical disc recorder/player 100 will judge that the optical disc medium 10 with the security module 13 is an illegal one, and the protocol will be closed.

When the optical disc recorder/player 100 judges that the random number $R_B$ returned from the security module 13 is equal to the one it has previously generated and the digital signature $Sig_A$ is correct, as in the above, it goes to step R23 where it will generate $K_B$ ($0 < K_B < r$) and make a calculation of $V_B = K_B \cdot G$ as at step R13. Further, the optical disc recorder/player 100 makes a digital signature to a bit string $R_B \| R_A \| V_B \| RevV_B$ consisting of the random numbers $R_B$ and $R_A$, value $V_B$ and version number $RevV_B$ of the revocation list as in the above to acquire $Sig_B = \text{Sign}(Prikey_B, R_B \| R_A \| V_B \| RevV_B)$, appends a public key certificate $Cert_B$ to these $R_B$, $R_A$, $V_B$, $RevV_B$ and $Sig_B$, and sends them to the security module 13.

Receiving $Cert_B$, $R_B$, $R_A$, $V_B$, $RevV_B$, and $Sig_B$ from the optical disc recorder/player 100, the security module 13 checks the public key certificate $Cert_B$ and digital signature $Sig_B$ of the optical disc recorder/player 100.

That is, first the security module 13 checks the public key certificate $Cert_B$ of the optical disc recorder/player 100. For example, when the security module 13 judges that the certificate cannot pass the check, it regards the optical disc recorder/player 100 as an illegal one, and the protocol will be closed.

On the other hand, when the security module 13 judges the public key certificate $Cert_B$ of the optical disc recorder/player 100 as being valid, it acquires a public key $PubKey_B$ from the public key certificate $Cert_B$. Next, the security module 13 judges that the random number $R_A$ returned from the optical disc recorder/player 100 is equal to the random number $R_A$ the security module 13 has generated at step R22 and that the digital signature $Sig_B$ is correct, it goes to a next step. If not, the security module 13 will judge that the optical disc recorder/player 100 is an illegal one, and the protocol will be closed.

When the security module 13 and optical disc recorder/player 100 have mutually judged as in the above that both of them are legal, the security module 13 will make a calculation of $K_A \cdot V_B$ while the optical disc recorder/player 100 make a calculation of $K_B \cdot V_A$, and they will share as a session key Kse a low-order z bit in an x-ordinate obtained through the calculations.

Also, when the security module 13 and optical disc recorder/player 100 have mutually judged that both of them are legal, the security module 13 and optical disc recorder/player 100 will mutually check the version numbers of the revocation lists their counterparts own.

When the security module 13 and optical disc recorder/player 100 have determined that their own revocation lists have the same version number, they mutually check the IDs of their counterparts using their own revocation lists to see that the IDs are not included in the revocation lists. More specifically, the security module 13 checks that the $ID_B$ of the optical disc recorder/player 100 is not included in its own revocation list, while the optical disc recorder/player 100 checks that the $ID_A$ of the security module 13 is not included in its own revocation list. If the result of checking shows that neither of the IDs is included in the revocation lists, the security module 13 and optical disc recorder/player 100 will go to step R26 which will be described later. When the security module 13 has judged that the $ID_B$ of the optical disc recorder/player 100 is included in its own revocation list, it will judge the optical disc recorder/player 100 to be illegal, and the protocol will be closed. Similarly, when the optical disc recorder/player 100 has judged that the $ID_A$ of the security module 13 is included in its own revocation list, it will judge the security module 13 to be illegal, and the protocol will be closed.

On the other hand, when it is mutually judged by the security module 13 and optical disc recorder/player 100 that the version number of the revocation list one of them has is newer than that of the revocation list the other has, one of the security module 13 and optical disc recorder/player 100 which has the revocation list with the newer version number goes step R24 or R25 where it will send the revocation list to the other or its counterpart. The side receiving the revocation list having the newer version number will check the ID of its counterpart using the received revocation list. Namely, the security module 13 and optical disc recorder/player 100 mutually check the IDs of their counterparts using the revocation list of the newer version number.

More specifically, when the version of the revocation list the security module 13 owns is newer than that of the revocation list in the optical disc recorder 100, for example, the security module 13 will check the $ID_B$ of the optical disc recorder/player 100 using its own revocation list. When the checking result proves that the optical disc recorder/player 100 is not listed in the revocation list, the security module 13 goes to step R24 where it will send its own revocation list to the optical disc recorder/player 100. Receiving the revocation list, the optical disc recorder/player 100 checks if the version number $RevV_A$ of the received revocation list is the same as that of the revocation list it has already acquired and checks the $ID_A$ of the security module 13 using the new revocation list. If the checking result shows that the $ID_A$ of the security module 13 is not included in the revocation list, the optical disc recorder/player 100 will check the digital signature TCSig of the center TC included in the revocation list having the new version number received from the security module 13. When the digital signature TCSig is judged to be correct, the optical disc recorder/player 100 will update its own old revocation list with the revocation list having the new version number. On the other hand, if the digital signature TCSig is judged to be incorrect, the protocol will be closed.

Also, if the optical disc recorder/player 100 owns the revocation list having a newer version number than that of the revocation list the security module 13 owns, for example, it will check the $ID_A$ of the security module 13 using its own revocation list. When the checking result proves that the security module 13 is not listed in that revocation list, the optical disc recorder/player 100 goes to step R25 where it will send its own revocation list to the security module 13. Receiving the revocation list from the optical disc recorder/player 100, the security module 13 checks if the version number $RevV_B$ of the received revocation list is the same as that of the revocation list it has already acquired and also checks $ID_B$ of the optical disc recorder/player 100. If the result of checking shows that $ID_B$ of the optical disc recorder/player 100 is not listed in the revocation list, the security module 13 will check the digital signature TCSig made by the center TC included in the revocation list having the new version number, received from the optical disc recorder/player 100. When the digital signature TCSig is judged to be correct, the security module 13 will update its own old revocation list using the revocation list sent from the optical disc recorder/player 100. On the other hand, if the digital signature TCSig is judged to be incorrect, the protocol will be closed.

Thereafter, the optical disc recorder/player 100 goes to step R26 where it will determine a content key Kco intended to encrypt the content data to be recorded to the optical disc 12, an send to the security module 13 a value Enc(Kse, Kco) obtained by encrypting the content key Kco with the session key Kse.

The security module 13 goes to step R27 where it will decrypt, with the session key Kse, the value Enc(Kse, Kco) sent from the optical disc recorder/player 100, thereby decrypting the content key Kco, and send to the optical disc recorder/player 100 a value Enc(Kst, Kco) obtained by encrypting the content key Kco with its own storage key Kst.

Receiving the value Enc(Kst, Kco) from the security module 13, the optical disc recorder/player 100 goes to step R28 where it will record, to the optical disc 12 of the optical disc medium 10, a content data Enc(Kco, data) encrypted with the content key Kco and also the value Enc(Kst, Kco) obtained by encrypting the content key Kco with the storage key Kst.

<Playback Procedure in the First Embodiment>

Next, the procedure for reading data from the optical disc 12 by the optical disc recorder/player 100 according to the first embodiment, will be described below with reference to FIGS. 9 to 11.

Note that as having been described in the foregoing, the optical disc recorder/player 100 according to the present invention has stored in the nonvolatile memory 110 thereof an ID given from the center TC, private key and public key of the public-key encryption system, public key certificate and a revocation list. Similarly, the security module 13 in the optical disc medium 10 according to the present invention has stored in the nonvolatile memory 34 thereof an ID given from the center TC, private key and public key of the public-key encryption system, public key certificate and a revocation list. Also, it is assumed that the optical disc recorder/player 100 already knows a recording ID (Recording-ID) appended to data to be read.

Figure 9:
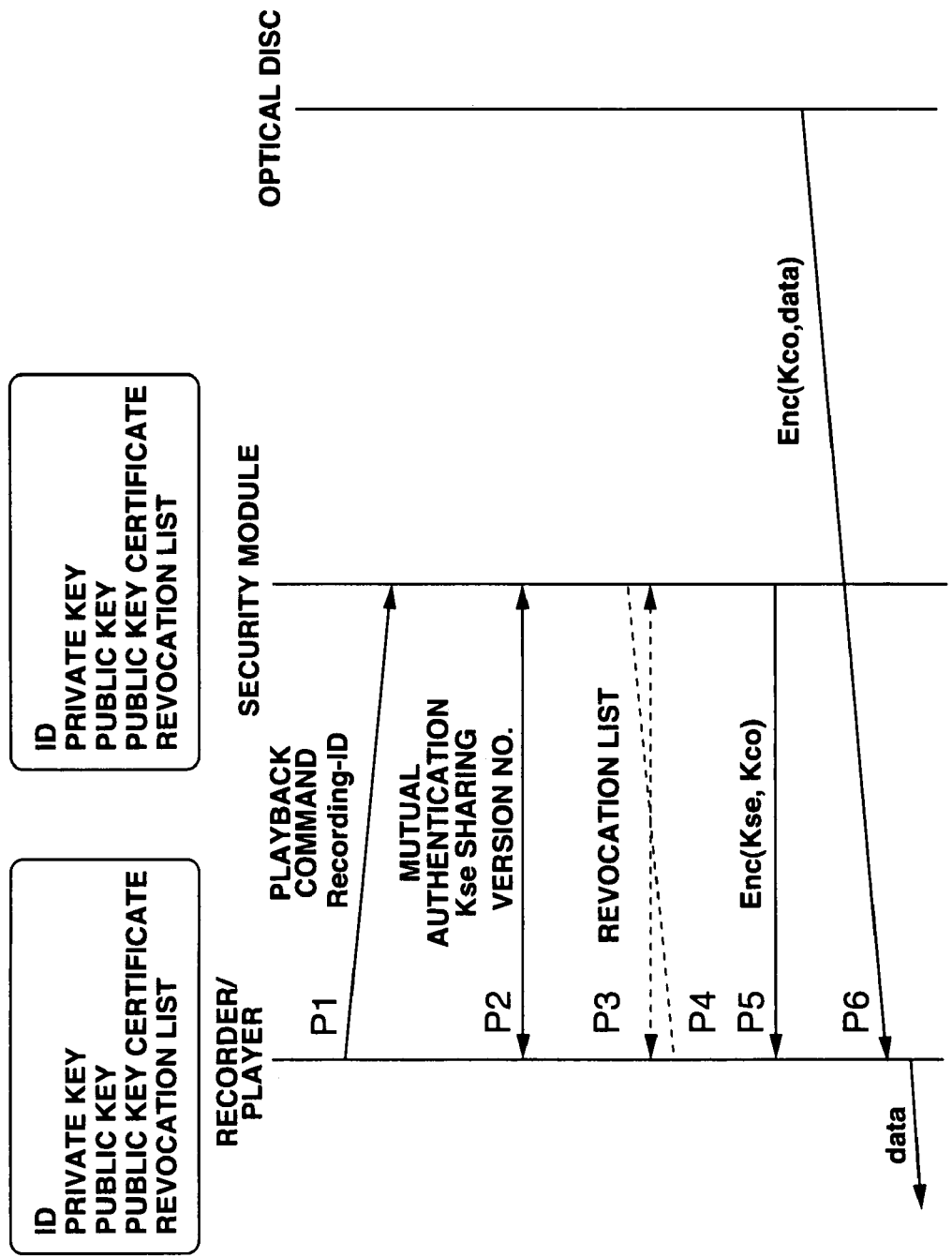
FIG. 9 shows a basic procedure for reading data from the optical disc as the data recording medium according to the first embodiment of the present invention.

First the optical disc recorder/player 100 goes to step P1 where it will send a playback command (playback start command) indicating that data is going to be read and the recording ID to the security module 13 in the optical disc medium 10 as shown in FIG. 9.

Next at step P2, the optical disc recorder/player 100 and security module 13 of the optical disc medium 10 execute, by the use of the playback command as a trigger, mutual authentication and key sharing protocols using the public-key encryption technology.

The key sharing protocol is similar to the protocol used in data recording, and allows the security module 13 and optical disc recorder/player 100 to mutually check that their counterparts have correct public key and private key and the IDs of their counterparts are included in the revocation lists their counterparts have respectively, share a session key Kse and to send the version numbers of their own revocation lists to their counterparts. When the result of the checking made at steps P3 and P4 shows that one of the security module 13 and optical disc recorder/player 100 has a revocation list whose version number is newer than that of the revocation list the other owns, the one sends the revocation list to the other and the other updates its own revocation list with the received revocation, as in the recording procedure having previously been described.

Next, the optical disc recorder/player 100 has to know a content key Kco with which data has been encrypted before reading the data from the optical disc 12.

The content key Kco is safely stored in the nonvolatile memory 34 of the security module 13 or recorded in the optical disc 12 as a value Enc(Kst, Kco) obtained by encrypting the content key Kco with a storage key Kst pre-stored in the security module 13.

In the former case, the security module 13 goes to step P5 where it will send to the optical disc recorder/player 100 a value obtained by encrypting, with a session key Kse, the content key Kco stored in the nonvolatile memory 34. The optical disc recorder/player 100 obtains the content key Kco by decrypting the value Enc(Kse, Kco) with the session key Kse.

On the other hand, in the latter case, first the optical disc recorder/player 100 reads from the optical disc 12 the value Enc(Kst, Kco) obtained by encrypting the content key Kco, and sends it to the security module 13. The security module 13 obtains the content key Kco by decrypting the value Enc(Kst, Kco) with the storage key Kst and encrypts the value Enc(Kse, Kco) encrypted with the session key Kse, and sends it to the optical disc recorder/player 100 at step P5. The optical disc recorder/player 100 obtains the content key Kco by decrypting the value Enc(Kse, Kco) with the session key Kse.

As in the above, the optical disc recorder/player 100 goes to step P5 where it will obtain the content key Kco with which the data has been encrypted.

Next at step P6, the optical disc recorder/player 100 reads from the optical disc 12 data Enc(Kco, data) encrypted with the content key Kco, and decrypts the data with the content key Kco already obtained to use the data.

The above is the basic procedure for reading data from the optical disc 12.

<Playback Procedure in the First Embodiment (Detail 1)>

Figure 10:
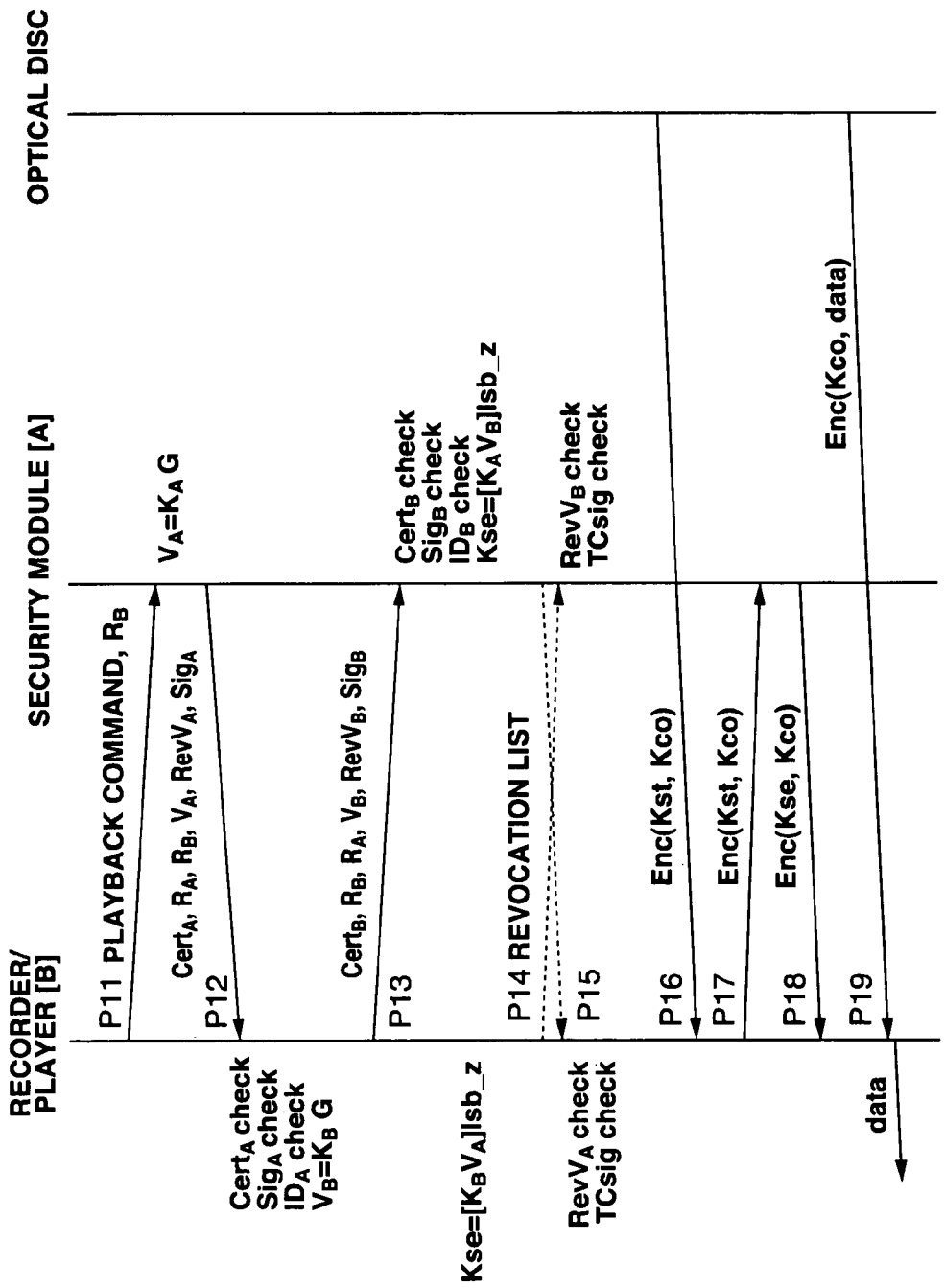
FIG. 10 shows in detail the procedure for reading data from the optical disc as the data recording medium according to the first embodiment of the present invention.

FIG. 10 explains the procedure in which the optical disc recorder/player 100 reads the encrypted data from the optical disc 12 in the optical disc medium 10. Note that in FIG. 10, a character "B" is suffixed to each information related to the optical disc recorder/player 100 while a character "A" is suffixed to each information related to the security module 13, as in the description having been made with reference to FIG. 7. Also, as having been described in the above with reference to FIG. 9, the optical disc recorder/player 100 and security module 13 has stored in their nonvolatile memories 110 and 34, respectively, an ID ($ID_A$ of the security module 13, $ID_B$ of the optical disc recorder/player 100) given from the center TC, private key and public key of the public-key encryption system, public key certificate and revocation list.

As shown in FIG. 10, first the optical disc recorder/player 100 goes to step P11 where it will generate a 64-bit random number $R_B$ by means of the random number generator 107 and send the random number $R_B$ along with the playback command (playback start command) to the security module 13.

Receiving the command and random number $R_B$, the security module 13 goes to step P12 where it will generate a 64-bit random number $R_A$ by means of the random number generator 33 as in the recording procedure and also a predetermined secret value or random number $K_A$ ($0<K_A<r$) similar to the aforementioned one, make a calculation of $V_A=K_A\cdot G$ in the first step (step 1) of the EC-DH algorithm, and obtain $Sig_A=Sign(PriKey_A, R_A\|R_B\|V_A\|RevV_A)$ by using the signature algorithm in the EC-DSA to make a digital signature to a bit string $R_A\|R_B\|V_A\|RevV_A$ including the random numbers $R_A$ and $R_B$, value $V_A$ and version number $RevV_A$ of a revocation list. The security module 13 appends the public key certificate $Cert_A$ to these $R_A$, $R_B$, $V_A$, $RevV_A$ and $Sig_A$, and sends them to the optical disc recorder/player 100.

Receiving $Cert_A$, $R_A$, $R_B$, $V_A$, $RevV_A$ and $Sig_A$ from the security module 13, the optical disc recorder/player 100 checks the public key certificate $Cert_A$ of the security module 13, digital signature $Sig_A$ and $ID_A$ using the certification algorithm in the EC-DSA as in the recording procedure. Namely, when the optical disc recorder/player 100 checks the public key certificate $Cert_A$ of the security module 13 and determines that the certificate cannot pass the check, it regards the optical disc medium 10 including the security module 13 as being an illegal medium and the protocol will be closed. On the other hand, when the optical disc recorder/player 100 judge that the certificate is valid, it acquires a public key PubKeyA from the public key certificate $Cert_A$.

Next, the optical disc recorder/player 100 judges that the random number $R_B$ returned from the security module 13 is equal to the random number $R_B$ having been generated at step P11 and the digital signature $Sig_A$ is correct, it will go to a next step. If not, it will judge that the optical disc medium 10 having the security module 13 is an illegal medium, and the protocol will be closed.

When the optical disc recorder/player 100 judges that the random number $R_B$ returned from the security module 13 is equal to the one previously generated and the digital signature $Sig_A$ is correct, it checks, using its own revocation list as in the recording procedure, that the $ID_A$ of the security module 13 is not included in the revocation list. If that the $ID_A$ is included in the revocation list, the optical disc recorder/player 100 judges that the optical disc medium 10 including the security module 13 is an illegal medium, and the protocol will be closed. On the other hand, when the optical disc recorder/player 100 determines that the $ID_A$ is not included in the revocation list, it goes to step P13 where it will generate a predetermined value or random number $K_B$ ($0<K_B<r$) as in the recording procedure, make a calculation of $V_B=K_B\cdot G$ in the first step (step 1) of the EC-DH algorithm, and make a digital signature to a bit string $R_B\|R_A\|V_B\|RevV_B$ consisting of the random numbers $R_B$ and $R_A$, value $V_B$ and version number $RevV_B$ using the signature algorithm in the EC-DSA to obtain $Sig_B=Sign(Prikey_B, R_B\|R_A\|V_B\|RevV_B)$. The optical disc recorder/player 100 appends a public key certificate $Cert_B$ to these $R_B$, $R_A$, $V_B$, $RevV_B$ and $Sig_B$, and sends them to the security module 13.

Receiving $Cert_B$, $R_B$, $R_A$, $V_B$, $RevV_B$ and $Sig_B$ from the optical disc recorder/player 100, the security module 13 checks the public key certificate $Cert_B$, digital signature $Sig_B$ and $ID_B$ of the optical disc recorder/player 100 using the certification algorithm in the EC-DSA. More specifically, the security module 13 first checks the public key certificate $Cert_B$. When the security module 13 judges that the public key certificate $Cert_B$ cannot pass the check, it will regard the optical disc recorder/player 100 as an illegal unit and the protocol will be closed. On the other hand, when the security module 13 judges that the public key certificate $Cert_B$ is valid, it acquires a public key $PubKey_B$ from the public key certificate $Cert_B$. Next, if the security module 13 judges that the random number $R_A$ returned from the optical disc recorder/player 100 is equal to the random number $R_A$ having been generated at step P12 and the digital signature $Sig_B$ is correct, it will go to a next step. If not, the security module 13 will judge that the optical disc recorder/player 100 is an illegal unit, and the protocol will be closed.

As mentioned above, the security module 13 judges that the random number $R_A$ returned from the optical disc recorder/player 100 is equal to the one previously generated and the digital signature $Sig_B$ is correct, it checks that the $ID_B$ of the optical disc recorder/player 100 is not included in its own revocation list. If the checking result is that the $ID_B$ of the optical disc recorder/player 100 is listed in the revocation list, the security module 13 will judge that the optical disc recorder/player 100 is an illegal unit, and the protocol will be closed.

If the checking result shows that the $ID_B$ of the optical disc recorder/player 100 is not listed in the revocation list and thus the optical disc recorder/player 100 is a legal unit, namely, if the security module 13 and optical disc recorder/player 100 mutually check that their counterparts are legal units, the security module 13 will make a calculation of $K_A\cdot V_B$ while the optical disc recorder/player 100 will make a calculation of $K_B\cdot V_A$, and they will share a low-order z bit in an x-ordinate obtained through the calculations as a session key Kse.

Next, as in the recording procedure, the security module 13 and optical disc recorder/player 100 mutually check the version numbers of the revocation lists their counterparts own respectively. If one of them has the revocation list whose version number is newer than that of the revocation list its counterpart owns, it goes to step P14 or P15 where it will send its own revocation list having the newer version number to the other. Thus, one of the security module 13 and optical disc recorder/player 100 having received the revocation list whose version number is newer, will check the digital signature TCSig made by the center TC, included in the revocation list. Only when the digital signature TCSig is correct, the one will update its own old revocation list using the received revocation list.

Next, before reading encrypted data from the optical disc 12, the optical disc recorder/player 100 acquires a content key Kco with which the data has been encrypted, and uses the acquired content key Kco to decrypt the data read from the optical disc 12. Note that in the example shown in FIG. 10, it is assumed that a value Enc(Kst, Kco) encrypted by the security module 13 using the storage key Kst is recorded in the optical disc 12. In this case, the optical disc recorder/player 100 first goes to step P16 where it will read from the optical disc 12 the value Enc(Kst, Kco) encrypted obtained by encrypting the content key Kco with the storage key Kst, and then goes to step P17 where it will send the value Enc(Kst, Kco) to the security module 13. The security module 13 obtains the content key Kco by decrypting the value Enc(Kse, Kco) using the storage key Kst already held therein, encrypts the content key Kco with the session key Kse to acquire a value Enc(Kse, Kco) and goes to step P18 where it will send the value to the optical disc recorder/player 100. The optical disc recorder/player 100 will obtain the content key Kco by decrypting the value Enc(Kse, Kco) using the session key Kse.

Thereafter, the optical disc recorder/player 100 goes to step P19 where it will read from the optical disc 12 data Enc(Kco, data) encrypted with the content key Kco, and decrypts the data with the content key Kco it has already acquired.

<Playback Procedure in the First Embodiment (Detail 2)>

In the example shown in FIG. 10, the security module 13 and optical disc recorder/player 100 go to steps P12 and P13 where they will check whether the IDs of their counterparts are included in their own revocation lists, respectively, and then go to steps P14 and P15 where they will check when the version numbers of their own revocation lists are newer or older than those of the revocation lists in their counterparts, respectively, to update the revocation list having the older version number with that having the newer version number. In this playback procedure, it may be checked in this playback procedure as well whether the version number of the revocation list in one of the security module 13 and optical disc recorder/player is newer or older than that of the revocation list in the other to check, using the revocation list having the newer version number, whether the ID of the counterpart is included in that revocation list. In this case, since the ID of the counterpart is checked using the revocation list having the newer version number with no exception, it is possible to judge more positively whether the counterpart is illegal. Note that since the revocation lists both the security module 13 and optical disc recorder/player 100 own respectively can be the same in version number as each other as in the example shown in FIG. 8, the following description will be made with consideration given also to the case that the revocation lists have the same version number.

Figure 11:
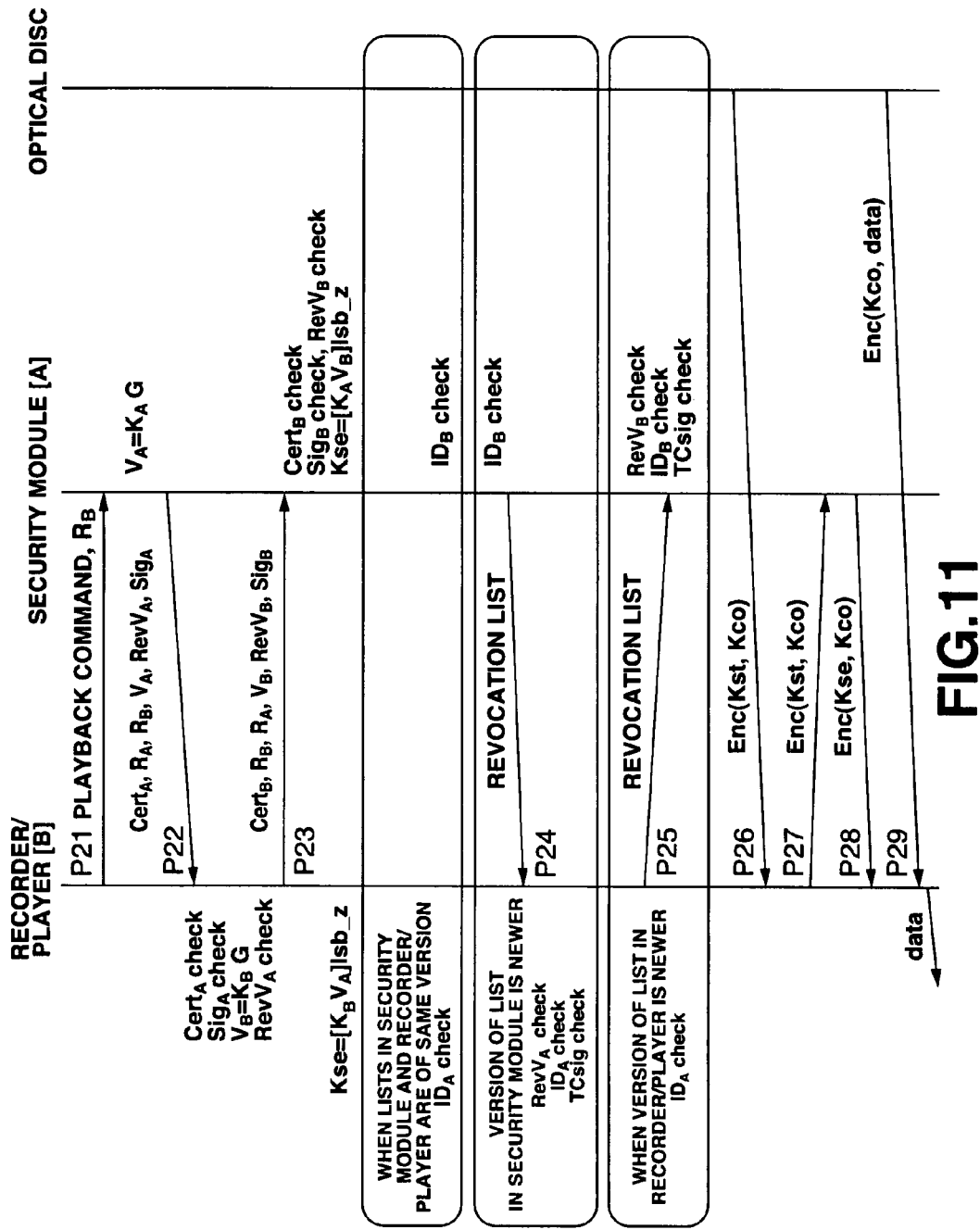
FIG. 11 shows another example of the procedure for reading data from the optical disc as the data recording medium according to the first embodiment of the present invention.

FIG. 11 show a procedure for playing back data from the optical disc 12 in which it is checked whether the version number of the revocation list owned by one of the security module 13 and optical disc recorder/player 100 is newer or older than that of the revocation list the other owns and then the ID of the counterpart is checked using the revocation list with the newer version number, as in the above.

As shown in FIG. 11, first the optical disc recorder/player 100 goes to step P21 where it will generate a random number $R_B$ and send it along with a recording command to the security module 13, as at step P11 shown in FIG. 10.

Receiving the recording command and random number $R_B$, the security module 13 goes to step P22 where it will generate a random number $R_A$, as at step P12 in FIG. 10, and also generate the secret predetermined value or random number $K_A$ and make a calculation of $V_A = K_A \cdot G$, make a digital signature to a bit string $R_A \| R_B \| V_A \| RevV_A$ as in the above to acquire $Sig_A = Sign(PriKey_A, R_A \| R_B \| V_A \| RevV_A)$, append a public key certificate $Cert_A$ to these $R_A$, $R_B$, $V_A$, $RevV_A$ and $Sig_A$, and sends them to the optical disc recorder/player 100.

Receiving $Cert_A$, $R_A$, $R_B$, $V_A$, $RevV_A$ and $Sig_A$ from the security module 13, the optical disc recorder/player 100 checks the public key certificate $Cert_A$ and digital signature $Sig_A$ of the security module 13. More specifically, the optical disc recorder/player 100 checks the public key certificate $Cert_A$. If it determines that the public key certificate $Cert_A$ is valid, it will acquire a public key $PubKey_A$ from the public key certificate $Cert_A$. Then, only when it is judged that the random number $R_B$ returned from the security module 13 is equal to the random number $R_B$ generated at step P21 and the digital signature $Sig_A$ is correct, it will go to a next step.

If the optical disc recorder/player 100 judges that the random number $R_B$ returned from the security module 13 is equal to the one it has previously generated and that the digital signature $Sig_A$ is correct, as in the above, it goes to step P23 where it will generate a random number $K_B$ ($0 < K_B < r$), calculate $V_B = K_B \cdot G$, make a digital signature to a bit string $R_B \| R_A \| V_B \| RevV_B$ consisting of the random numbers $R_B$ and $R_A$, value $V_B$ and version number $RevV_B$ to acquire $Sig_B = Sign(Prikey_B, R_B \| R_A \| V_B \| RevV_B)$, append a public key certificate $Cert_B$ to these $R_B$, $R_A$, $V_B$, $RevV_B$ and $Sig_B$, and send them to the security module 13, as at step P13 shown in FIG. 10.

Receiving $Cert_B$, $R_B$, $R_A$, $V_B$, $RevV_B$ and $Sig_B$ from the optical disc recorder/player 100, the security module 13 checks the public key certificate $Cert_B$ and digital signature $Sig_B$ of the optical disc recorder/player 100. The security module 13 checks the public key certificate $Cert_B$. If the security module 13 determines that the certificate $Cert_B$ is valid, the security module 13 acquires a public key $PubKey_B$ from the public key certificate $Cert_B$. Next, if the security module 13 judges that the random number $R_A$ returned from the optical disc recorder/player 100 is equal to the random number $R_A$ generated at step P22 and the digital signature $Sig_B$ is correct, it will go to a next step.

As in the above, the security module 13 and optical disc recorder/player 100 mutually determine that both their counterparts are legal, the security module 13 makes a calculation of $K_A \cdot V_B$ while the optical disc recorder/player 100 makes a calculation of $K_B \cdot V_A$, and they share as a session key Kse a low-order z bit in an x-ordinate obtained through the calculations. Also, if the security module 13 and optical disc recorder/player 100 mutually judge that both of them are legal, they will mutually check the version numbers of the revocation lists their counterparts own.

If the security module 13 and optical disc recorder/player 100 judge that their own revocation lists have the same version number, they mutually check the IDs of their counterparts using their own revocation lists to see that the IDs are not included in the revocation lists.

On the other hand, when it is mutually judged by the security module 13 and optical disc recorder/player 100 that the version number of the revocation list one of them has is newer than that of the revocation list the other has, one of the security module 13 and optical disc recorder/player 100 which has the revocation list with the newer version number goes to step P24 or P25 where it will send the revocation list to the other or its counterpart, and the side receiving the revocation list having the newer version number will check the ID of its counterpart using the received revocation list and thus update the revocation list having the older version number.

Thereafter, the optical disc recorder/player 100 goes to step P26 where it will read from the optical disc 12 a value Enc(Kst, Kco) obtained by encrypting the content key Kco with the storage key Kst, and then goes to step P27 where it will send the value Enc(Kst, Kco) to the security module 13. The security module 13 goes to step P28 where it will send to the optical disc recorder/player 100 the value Enc(Kst, Kco) decrypted with the storage key Kst and obtained by encrypting the content key Kco with the session key Kse. The optical disc recorder/player 100 obtains the content key Kco by decrypting the value Enc(Kse, Kco) with the session key Kse. Thereafter, the optical disc recorder/player 100 goes to step P29 where it will read the data Enc(Kco, data) from the optical disc 12 and decrypt the data with the content key Kco already obtained.

Second Embodiment (IM4, Dev4)

Next, the second embodiment of the present invention will be described herebelow:

The second embodiment of the present invention uses a memory data recording medium as a data recording medium. The memory data recording medium will be referred to as "memory medium" hereunder.

Figure 12:
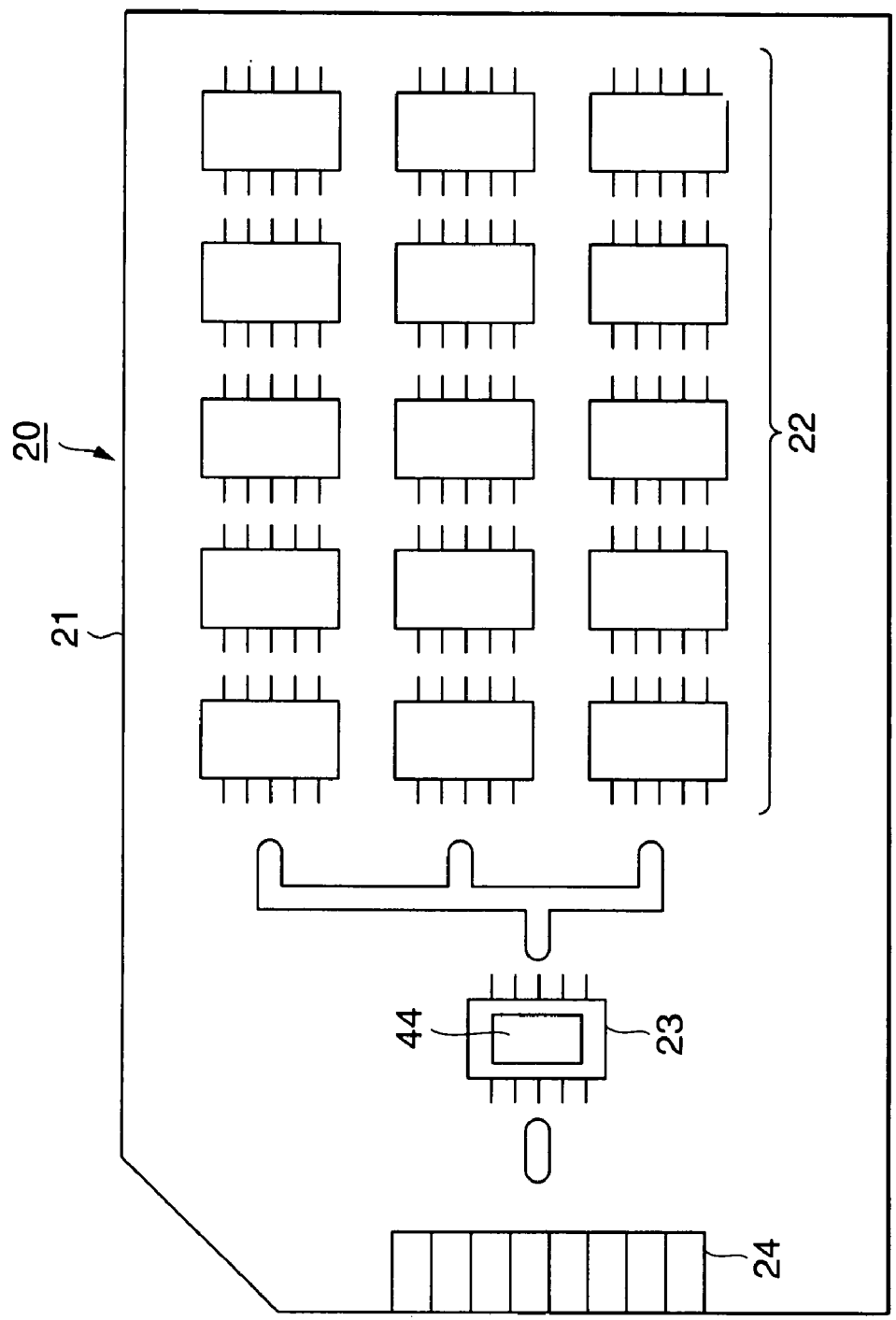
FIG. 12 shows the construction of a memory as an example of the data recording medium according to the present invention, including a security module with a nonvolatile memory for storage of the list.

Referring now to FIG. 12, there is illustrated an example construction of an memory medium 20 according to the second embodiment.

As shown, the memory medium 20 is provided, in a cartridge 21, with a memory unit 22 being a large-capacity nonvolatile memory whose content can be electrically erased for date recording such as flash ROM, EEPROM or a magnetic random access memory (MRAM) using the magneto-resistance effect, a security module 23 and an input/output terminal 24.

Figure 13:
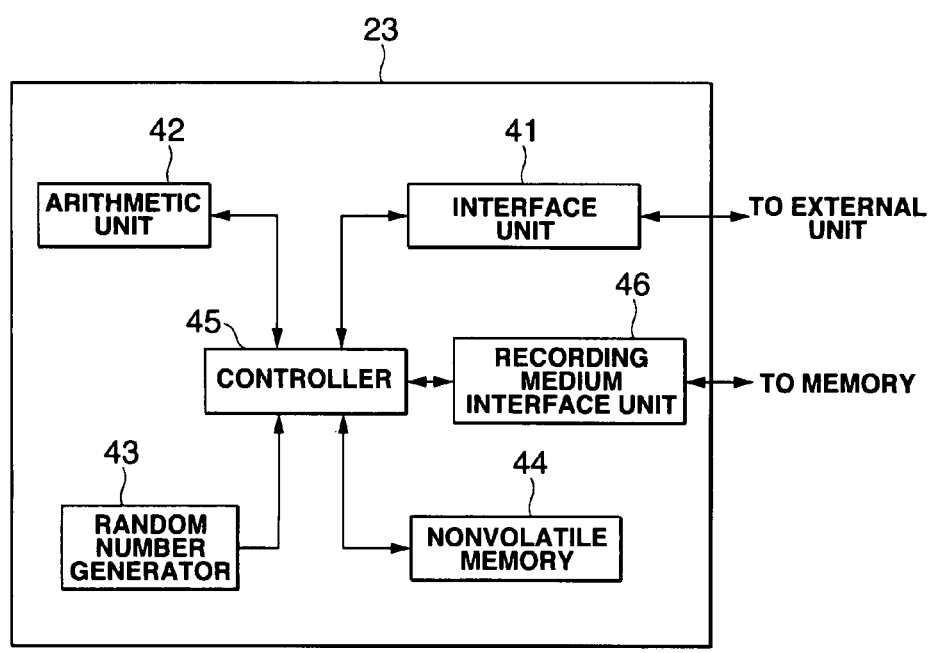
FIG. 13 is a block diagram of an example of the security module included in the memory as the data recording medium, the security module being provided with the nonvolatile memory for storage of the list.

As shown in FIG. 13, the security module 23 includes, as main components, an external interface unit 41, arithmetic unit 42, random number generator 43, nonvolatile memory 44, controller 45 and a recording medium interface 46.

Namely, the above security module 23 has similar construction and function to those of the security module 13 shown in FIG. 2, and in addition the external interface 41 providing an external interface. Also, the security module 23 has also the recording medium interface (for example, flash ROM interface or the like) 46 for interface with the memory unit 22 in the cartridge 21. Thus, data recording (write) to, and playback (read) from, the memory unit 22 are effected through the security module 23.

The nonvolatile memory 44 in the security module 23 is used to store important data such as confidential data, data to be protected against falsification, etc. If the capacity of the memory 44 is not sufficient for the purpose, such important data can be recorded to the large-capacity memory unit 22 provided outside the security module 23 and destined to record general data. In this case, the confidential data is protected by encrypting it with a storage key Kst safely stored in the nonvolatile memory 44 in the security module 23, while the data to be protected against falsification is protected by calculating a so-called integrity check value (ICV) for a block in the memory unit 22 which records the important data and storing it in the nonvolatile memory 44 in the security module 23, recalculating the ICV for that block when reading the information from the memory unit 22 outside the security module 23 and comparing it with the stored one, and thus checking that the data is not falsified.

The ICV is a value calculated using a predetermined algorithm taking as input a data and a certain secret value (in this case, storage key Kst of the security module 23) in order to assure the integrity of the data (the data is not falsified). With this measure, only one who knows the secret value can calculate an ICV for a data. So, if the data is changed for example, an ICV calculated by the same method at the time of reading the data will be different from an ICV having been calculated at the time of writing the data and stored in the security module 23, and has a similar function and the security module 23 will be able to know the fact that the data has been changed.

For calculation of the ICV, there are available a digital signature algorithm using the public-key encryption technology, message authentication code (MAC) generation algorithm using the shared key encryption technology, and an algorithm using the locked hash function. For the details, the ICV is referred to, for example, Menezes "Handbook of Applied Cryptography", CRC, ISBN 0-8493-8523-7, pp. 352-368.

Figure 14:
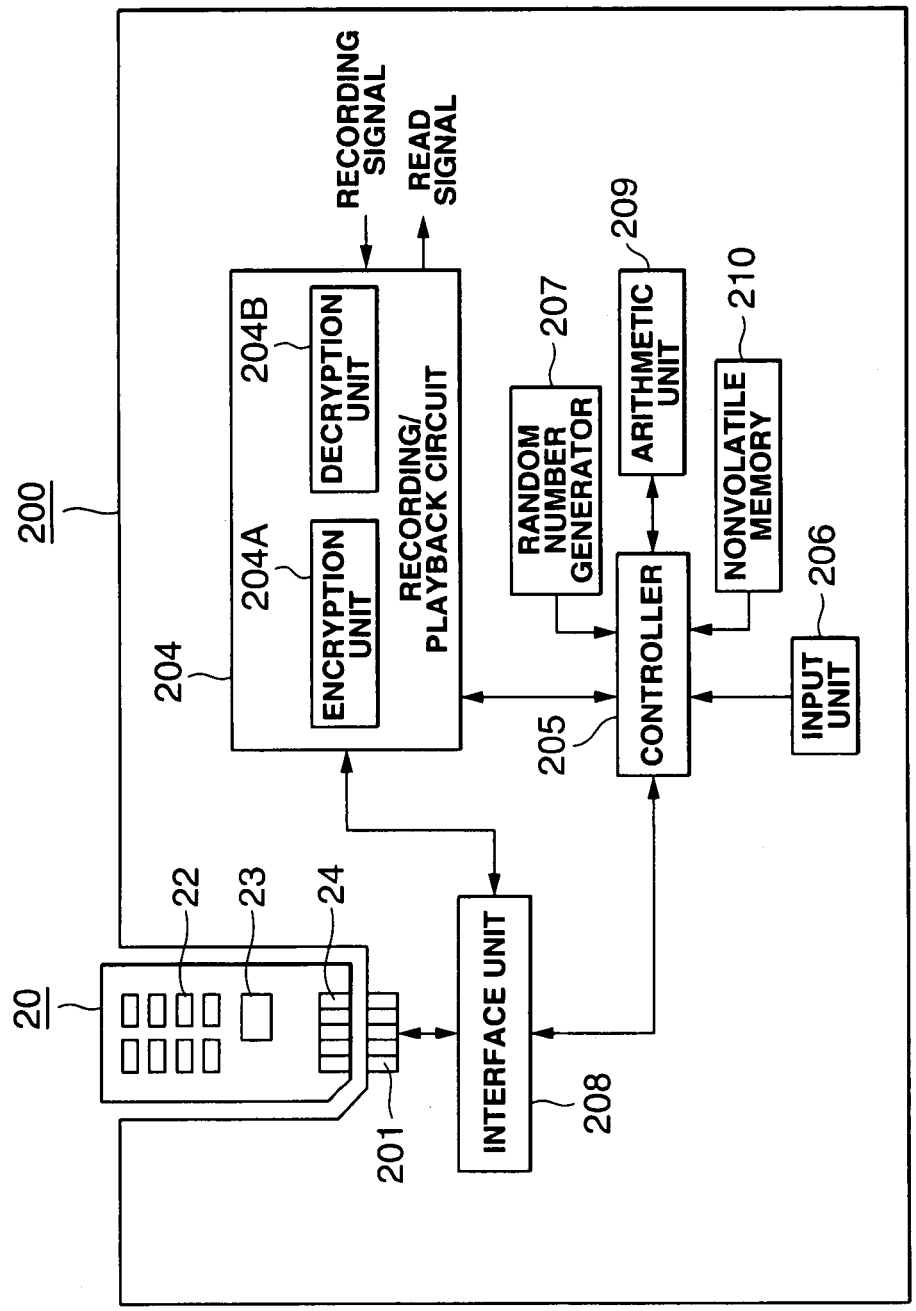
FIG. 14 is a block diagram of a memory as the recorder/player according to the present invention.

FIG. 14 shows an example construction of the memory data recorder/player 200 adapted to record (write)/play back (read) data or the like to/from the memory medium 20 according to the second embodiment of the present invention.

As shown in FIG. 14, the memory data recorder/player (will be referred to as "memory recorder/player" hereunder) 200 includes, as main components, an input/output terminal 201, controller 205, input unit 206, random number generator 207, interface unit 208, arithmetic unit 209, nonvolatile memory 210. etc.

As will be seen from FIG. 14, the memory recorder/player 200 is generally similar to the optical disc recorder/player 100 shown in FIG. 3 except that the spindle moor 101, optical head 102, servo circuit 103, etc. for the optical disc 12 are not provided as shown in FIG. 3 and there is provided instead an interface for writing/reading data to/from the memory medium 20 via the security module 23. Note that in the example shown in FIG. 14, the interface unit 208 for access to the security module 23 functions also as the interface for write/read to/from the memory medium 20. As in FIG. 14, the input/output terminal 24 of the memory medium 20 and input/output terminal 201 of the memory recorder/player 200 are electrically connected to each other.

The memory recorder/player 200 includes also a recording/playback circuit 204. The recording/playback circuit 204 includes an encryption unit 204A and decryption unit 204B, whose mode of operation is switched from one to another by the controller 205. More specifically, when the encryption unit 204A in the recording or writing mode is supplied with an external recording signal, it will encrypt the recording signal, supply the encrypted recording signal to the interface 208 and record or write it to the memory unit 22 in the memory medium 20. When in the playback or reading mode, the decryption unit 204B decrypts data read from the memory unit 22 of the memory medium 20 and delivers the data as a read signal to outside.

The input unit 206 is a button, switch, remote controller or the like similarly to the input unit 106 in FIG. 3. When the user makes an input operation with the input unit 206, the latter will provides a signal corresponding to the user's input operation. The controller 205 controls the entire system according to a stored predetermined program. The random number generator 207 is controlled by the controller 205 to generate a specified random number. The interface unit 208 transfers data to and from the security module 23 in the memory medium 20 via the input/output terminal 24 of the memory medium 20 and input/output terminal 201 of the memory recorder/player 200.

As shown, the memory recorder/player 200 according to the second embodiment of the present invention further includes an arithmetic unit 209 and nonvolatile memory 210. These arithmetic unit 209 and nonvolatile memory 210 have similar functions to those of the arithmetic unit 109 and nonvolatile memory 110 in the first embodiment shown in FIG. 3.

<Recording Procedure in the Second Embodiment>

Next, the procedure for data recording to the memory medium 20 by the memory recorder/player 200 according to the second embodiment will be described below with reference to FIGS. 15 to 18.

The memory recorder/player 200 according to the second embodiment has stored in the nonvolatile memory 210 thereof the ID given by the center TC, private key and public key of the public-key encryption system, public key certificate and the revocation list. Similarly, the security module 23 of the memory medium 20 according to the second embodiment has stored in the nonvolatile memory 44 thereof the ID given by the center TC, private key and public key of the public-key encryption system, public key certificate and the revocation list.

Figure 15:
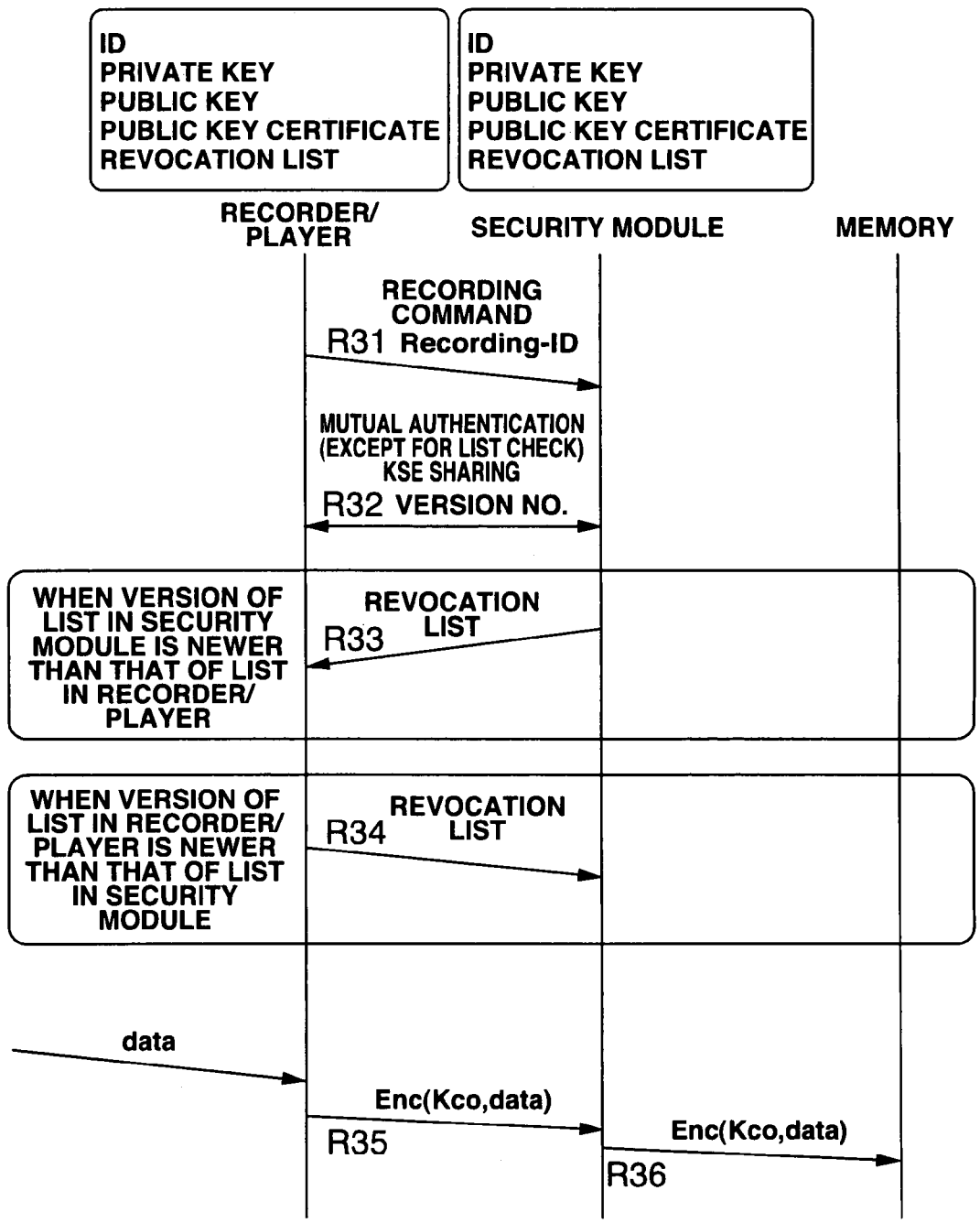
FIG. 15 shows a basic procedure for writing data to the memory as the data recording medium according to the second embodiment of the present invention.

As shown in FIG. 15, first the memory recorder/player 200 goes to step R31 where it will send, to the security module 23 of the memory medium 20, a recording command (recording start command) indicating that data is going to be recorded, and a recording ID (Recording-ID) assigned at each recording to identify each recording.

Next, the memory recorder/player 200 and the security module 23 of the memory medium 20 goes to step R32 where it will execute, by the use of the recording command as a trigger, mutual authentication and key sharing protocols using the public-key encryption technology. These protocols are similar to those used in the data recording in the first procedure and allow the security module 23 and memory recorder/player 200 to mutually check that their counterparts have correct public key and private key and the IDs of their counterparts are included in the revocation lists their counterparts have respectively, share a session key Kse and to send the version numbers of their own revocation lists to their counterparts.

Also, as at steps R3 and R4, the memory recorder/player and security module of the recording medium go to steps R33 and R34 shown in FIG. 15, where they will check if the version of the revocation list any one of them owns is newer than that the other owns. When the one has a newer version of the revocation list than that of the revocation list the other owns, it will send its own revocation list to the other. That is to say, step R33 is a flow of the revocation list when the version of the revocation list in the security module 23 is newer than that in the recorder/player 200, and step R34 is a flow of the revocation list when the version of the revocation list in the recorder/player 200 is newer than that in the security module 23.

It should be noted that the transfer of the revocation list at steps R33 and R34 may be done after the data recording at next steps R35 and R36. That is, the revocation list transfer at step R33 or R34 may be done after completion of the data recording steps R35 and R36.

Also in the second embodiment, a content key Kco for encryption of data is determined as in the first embodiment, but the second embodiment uses one of the following content key determining methods (11) to (14):

Content Key Determining Method (11):

It is assumed that Kco=Kse. Namely, a session key Kse obtained with the mutual authentication protocol and key sharing protocol is taken as a content key Kco. At this time, the security module 23 safely stores the content key Kco into the nonvolatile memory 44 provided therein, or it stores into the memory unit 22 outside the security module 23 a value Enc(Kst, Kco) obtained by encrypting the content key Kco with a storage key (Kst) stored in advance therein.

Content Key Determining Method (12):

It is assumed that the storage key Kst stored in advance in the security module 23 is the content key Kco. In this case, the security module 23 encrypts the storage key Kst with the session key Kse, sends it to the memory recorder/player 200.

Content Key Determining Method (13):

The security module 23 generates a new content key Kco by means of the random number generator or the like. In this case, the security module 23 encrypts the content key Kco with the session key Kse and sends it to the memory recorder/player 200. Also, the security module 23 safely stores the content key Kco into the nonvolatile memory 44 provided therein, or it stores into the memory unit 22 a value Enc(Kst, Kco) obtained by encrypting the content key Kco with a storage key (Kst) stored in advance therein.

Content Key Determining Method (14):

The memory recorder/player 200 generates a new content key Kco by means of the random number generator or the like, encrypts data with the content key Kco, and records it. In this case, the memory recorder/player 200 encrypts the content key Kco with the session key Kse, and sends it to the security module 23. The security module 23 safely stores the content key Kco into the nonvolatile memory 44 provided therein, or it stores into the memory unit 22 a value Enc(Kst, Kco) derived from encryption of the content key Kco with a storage key (Kst) stored in advance therein.

When a content key Kco is determined using any one of the above content key determining methods (11) to (14), the memory recorder/player 200 goes to step R35 where it will encrypt, with the content key Kco, data to be recorded into the memory unit 22 in the memory medium 20, and send the encrypted data Enc (kco, data) to the security module 23.

At this time, the security module 23 goes to R36 where it will store the encrypted data Enc(Kco, data) into the large-capacity memory unit 22.

Also, when the content key Kco or encrypted content key Kco is recorded into the nonvolatile memory 44 of the security module 23 or memory unit 22, it is recorded along with a recording ID (Recording-ID) which is to be a search key or the encrypted content key Kco is recorded in the same sector as in the memory unit 22 in which the data is to be recorded so that a correspondence can be established between the data and content key Kco. Note that for management and transmission of the content key Kco and data encryption, a common key encryption algorithm should preferably be used from the standpoint of the processing speed.

Among others, by the content key determining method (14), the memory recorder/player 200 can encrypt data in advance since the method allows the memory recorder/player 200 to determine a content key Kco.

In the second embodiment, data is recorded to the large-capacity memory unit 22 of the memory medium 20 by following the above procedure.

<Recording Procedure in the Second Embodiment (Detail 1)>

Figure 16:
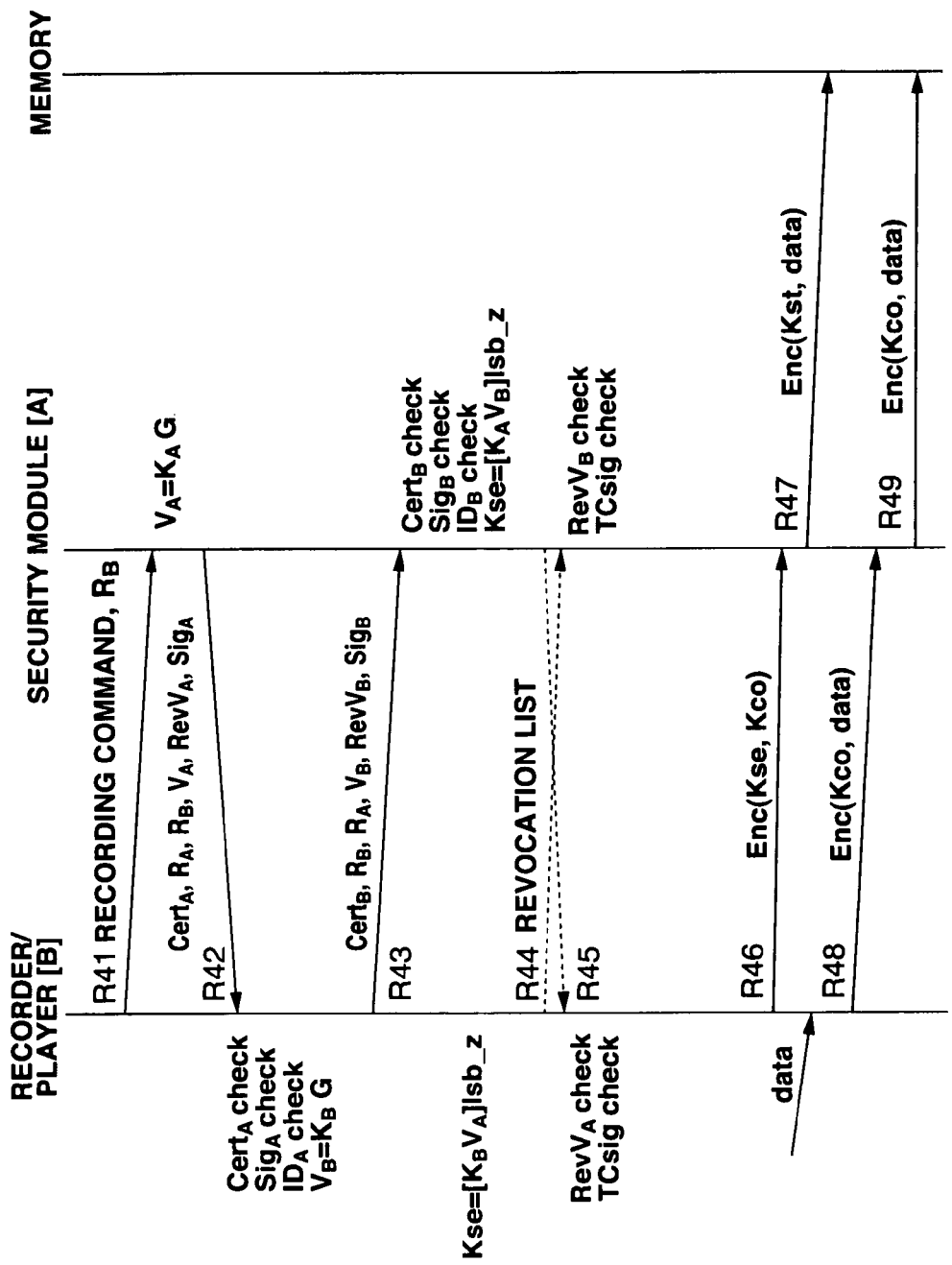
FIG. 16 shows in detail the procedure for writing data to the memory as the data recording medium according to the second embodiment of the present invention.

Referring now to FIG. 16, there is illustrated in detail a procedure followed by the memory recorder/player 200 according to the second embodiment shown in FIG. 15 to record data to the memory medium 20. Note that in FIG. 16, a letter "B" is suffixed to each data associated with the memory recorder/player 200 and a letter "A" is suffixed to each data associated with the security module 23 of the memory medium 20. As having previously been described with reference to FIG. 15, the memory recorder/player 200 and security module 23 store in their respective nonvolatile memories 210 and 44 an ID given by the center TC ($ID_A$ of the security module 23 and $ID_B$ of the memory recorder/player 200), private key of the public-key encryption system, public key, public key certificate and a revocation list.

Steps R41 to R46 in FIG. 16 are generally the same as those R11 to R16 in FIG. 7 in the first embodiment.

Namely, the memory recorder/player 200 goes to step R41 where it will generate a random number $R_B$ and sends it along with the recording command to the security module 23. Receiving the recording command and random number $R_B$, the security module 23 goes to step R42 where it will generate random numbers $R_A$ and $K_A$, make a calculation of $V_A=K_A \cdot G$, make a digital signature to a bit string consisting of the random number $R_A$, random number $R_B$, value $V_A$ and a revocation list version number $RevV_A$ to acquire $Sig_A$, and send these $R_A$, $R_B$, $V_A$, $RevV_A$ and $Sig_A$ and a public key certificate $Cert_A$ to the memory recorder/player 200. Note that when the security module 23 has or uses no revocation list, it will uses "0" for example as the version number.

Receiving $Cert_A$, $R_A$, $R_B$, $V_A$, $RevV_A$ and $Sig_A$ from the security module 23, the memory recorder/player 200 checks the public key certificate $Cert_A$. When the memory recorder/player 200 judges that the certificate cannot pass the check, it will regard the memory medium 20 with the security module 23 as an illegal one, and the protocol will be closed. On the other hand, when the memory recorder/player 200 judges the public key certificate $Cert_A$ of the security module 23 to be valid, it acquires a public key $PubKey_A$ from the public key certificate $Cert_A$. Next, the memory recorder/player 200 judges that the random number $R_B$ returned from the security module 23 is equal to the random number $R_B$ the generated at step R41 and the digital signature $Sig_A$ is correct, it goes to a next step. If not, the memory recorder/player 200 will judge that the memory medium 20 with the security module 23 is an illegal one, and the protocol will be closed.

If the memory recorder/player 200 judges that the random number $R_B$ returned from the security module 23 is equal to the one previously generated and that the digital signature $Sig_A$ is correct, it checks, using the revocation list stored in its own nonvolatile memory 210, that the $ID_A$ of the memory medium 20 with the security module 23 is not included in the revocation list. If the result of checking shows that the $ID_A$ of the memory medium 20 with the security module 23 is included in the revocation list, the memory recorder/player 200 will judge that the memory medium 20 with the security module 23 is an illegal one, and the protocol will be closed. On the other hand, if the memory recorder/player 200 judges that the $ID_A$ of the memory medium 20 with the security module 23 is not included in the revocation list, it goes to step R43 where it will generate a random number $K_B$, make a calculation of $V_B=K_B \cdot G$, and further make a digital signature to a bit string consisting of the random number $R_B$, random number $R_A$, value $V_B$ and a version number $RevV_B$ to acquire $Sig_B$. Next, the memory recorder/player 200 sends to these $R_B$, $R_A$, $V_B$, $RevV_B$ and $Sig_B$ and a public key certificate $Cert_B$ to the security module 23. Note that when the memory recorder/player 200 has or uses no revocation list, it will uses "0" for example as the version number.

Receiving $Cert_B$, $R_B$, $R_A$, $V_B$, $RevV_B$ and $Sig_B$ from the memory recorder/player 200, the security module 23 checks the public key certificate $Cert_B$. If the security module 23 judges that the certificate cannot pass the check, it regards the memory recorder/player 200 as an illegal one, and the protocol will be closed. On the other hand, if the security module 23 judges the public key certificate $Cert_B$ to be valid, it acquires a public key $PubKey_B$ from the public key certificate $Cert_B$. Next, the security module 23 judges that the random number $R_A$ returned from the memory recorder/player 200 is equal to the random number $R_A$ previously generated at step R42 and that the digital signature $Sig_B$ is correct, it goes to a next step. If not, the security module 23 will judge that the memory recorder/player 200 is an illegal one, and the protocol will be closed.

If the security module 23 judges that the random number $R_A$ returned from the memory recorder/player 200 is equal to the one previously generated and the digital signature $Sig_B$ is correct, it checks, using the revocation list stored in its own nonvolatile memory 44, that the $ID_B$ is not included in the revocation list. If the result of checking shows that the $ID_B$ is included in the revocation list, the security module 23 will judge that the memory recorder/player 200 is an illegal one, and the protocol will be closed.

On the other hand, if the security module 23 judges that the $ID_B$ is not included in the revocation list, namely, if both the security module 23 and module recorder/player 200 mutually judge that their counterparts are both legal, the security module 23 will make a calculation of $K_A \cdot V_B$ while the memory recorder/player 200 will make a calculation of $K_B \cdot V_A$, and they will share as a session key Kse a low-order z bit in an x-ordinate obtained through the calculations.

Next, the security module 23 and optical disc recorder/player 200 mutually check the version numbers of the revocation lists their counterparts own respectively. When the version number of the revocation list in one of them is newer than that of the revocation list in the other, the one goes to step R44 or R45 where it will send its own revocation list of the newer version to the other. Thus, one of the security module 23 and memory recorder/player 200 having received the revocation list having the newer version number from the other, will check the digital signature TCSig made by the center TC, included in the revocation list. If the one judges that the digital signature TCSig is judged to be correct, it will update its own revocation list using the received revocation list. If the digital signature TCSig is judged not to be correct, the protocol will be closed.

Thereafter, the memory recorder/player 200 goes to R46 where it will determine a content key Kco intended for encryption of the content data to be stored into the memory unit 22 of the memory medium 20, and send to the security module 23 a value Enc(Kse, Kco) obtained by encrypting the content key Kco with the session key Kse.

The security module 23 goes to step R47 where it will decrypt the content key Kco by decrypting, with the session key Kse, the value Enc(Kse, Kco) sent from the memory recorder/player 200, and send to the memory recorder/player 200 a value Enc(Kst, Kco) obtained by encrypting the content key Kco with its own storage key Kst or store the content key Kco into the memory unit 22.

Thereafter, the memory recorder/player 200 goes to step R48 where it will send the content data Enc(Kco, data) encrypted with the content key Kco to the security module 23.

The security module 23 goes to step R49 where it will store into the encrypted content data Enc(Kco, data) into the memory unit 22.

Note that the revocation list may be sent during transmission of the content data or after completion of the content data transmission.

<Recording Procedure in the Second Embodiment (Detail 2)>

In the example shown in FIG. 16, the security module 23 and memory recorder/player 200 mutually check at steps R42 and R43 whether their own revocation lists include the IDs of their counterparts, and then check, at steps R44 and R45, which one of the version numbers of their own revocation lists is newer or older than the other and update the revocation list with the older version number with that having the newer version number. As will be described below, however, it may be first checked whether the version number of the revocation list owned by one of the security module 23 and memory recorder/player 200 is newer or older than that of the revocation list the other owns, and then it may be checked if the ID of the counterpart is included in the revocation list with the newer version number. In this case, since the ID of the counterpart can be checked using the revocation list with the newer version number with no exception, it is possible to check more positively whether the counterpart is illegal. Note that since the revocation lists both the security module 23 and memory recorder/player 200 own respectively can have the same version number, the following description will be made with consideration given also to the case that the revocation lists have the same version number.

Figure 17:
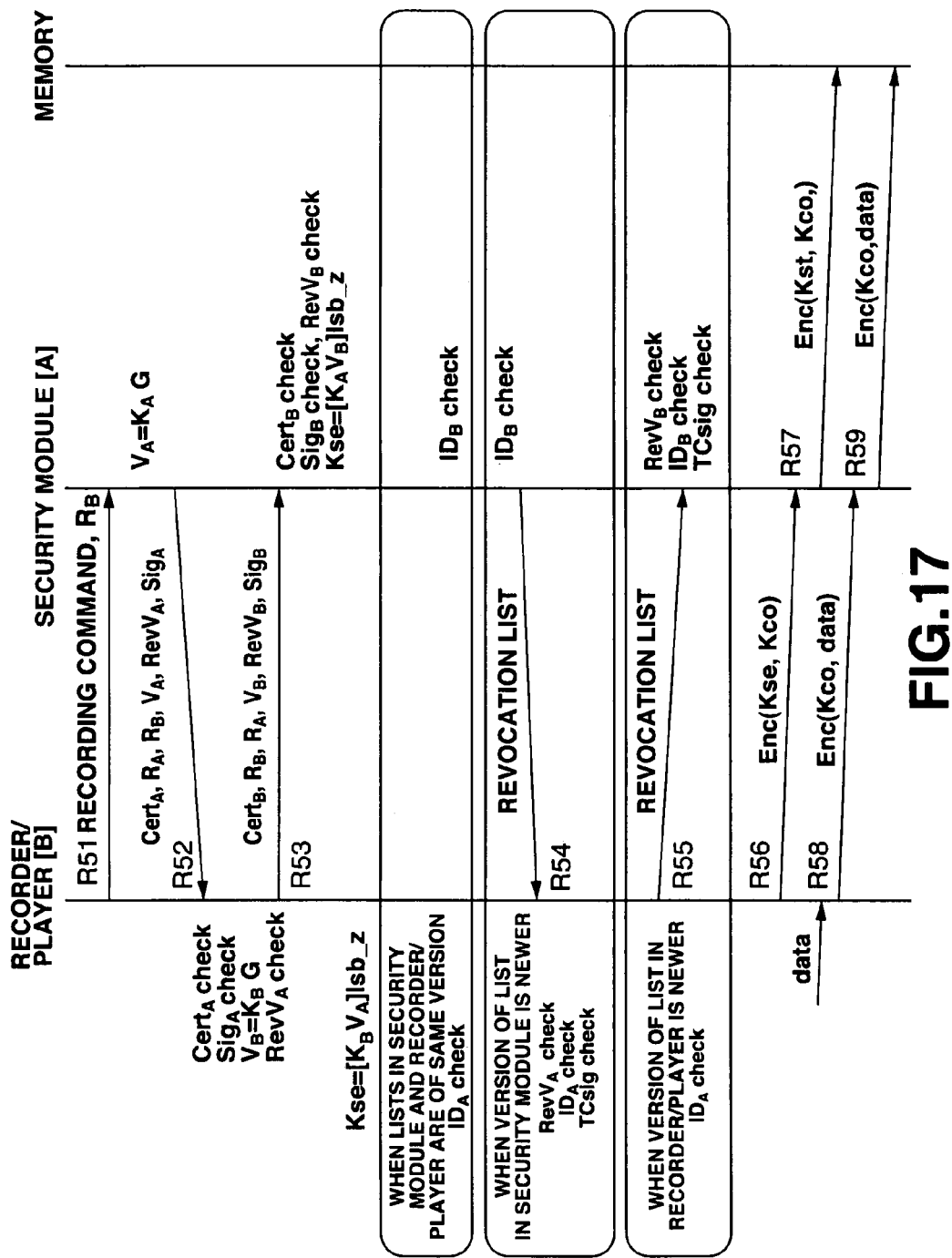
FIG. 17 shows another example of the procedure for writing data to the memory as the data recording medium according to the second embodiment of the present invention.

FIG. 17 show a data recording procedure, in the second embodiment, in which it is first checked whether the version number of the revocation list in one of the security module 23 and memory recorder/player 200 is newer or older than that of the revocation list in the other and then the ID of the counterpart is checked using the revocation list with the newer version number.

Note that steps R51 to R56 in FIG. 17 are generally similar to steps R21 to R26 in FIG. 8 in the first embodiment having previously been described.

As shown in FIG. 17, first the memory recorder/player 200 goes to step R51 where it will send a random number $R_B$ along with a recording command to the security module 23. Receiving the recording command and random number $R_B$, the security module 23 goes to step R52 where it will generate random numbers $R_A$ and $K_A$, make a calculation of $V_A=K_A \cdot G$, make a digital signature to a bit string consisting of the random numbers $R_A$ and $R_B$, value $V_A$ and version number $RevV_A$ to acquire $Sig_A$, and send these $R_A, R_B, V_A, RevV_A$ and $Sig_A$ and a public key certificate $Cert_A$ to the memory recorder/player 200.

Receiving $Cert_A$, $R_A$, $R_B$, $V_A$, $RevV_A$ and $Sig_A$ from the security module 23, the memory recorder/player 200 checks the public key certificate $Cert_A$ and digital signature $Sig_A$ of the security module 23. If the memory recorder/player 200 judges that the certificate cannot pass the check, it will regard the memory medium 20 with the security module 23 as an illegal one, and the protocol will be closed. On the other hand, if the memory recorder/player 200 judges the public key certificate $Cert_A$ of the security module 23 to be valid, it acquires a public key $PubKey_A$ from the public key certificate $Cert_A$. Next, the memory recorder/player 200 judges that the random number $R_B$ returned from the security module 23 is equal to the random number $R_B$ the memory recorder/player 200 has generated at step R51 and the digital signature $Sig_A$ is correct, it goes to a next step. If not, the memory recorder/player 200 will judge that the memory medium 20 with the security module 23 is an illegal one, and the protocol will be closed.

If the memory recorder/player 200 judges that the random number $R_B$ returned from the memory recorder/player 200 is equal to the one previously generated and that the digital signature $Sig_A$ is correct, it goes to step R53 where it will generate $K_B$, make a calculation of $V_B=K_B \cdot G$, make a digital signature to a bit string consisting of the random numbers $R_B$ and $R_A$, value $V_B$ and version number $RevV_B$ to acquire $Sig_B$, and send these $R_B, R_A, V_B, RevV_B$ and $Sig_B$ and a public key certificate $Cert_B$ to the security module 23.

Receiving $Cert_B$, $R_B$, $R_A$, $V_B$, $RevV_B$ and $Sig_B$ from the memory recorder/player 200, the security module 23 checks the public key certificate $Cert_B$ and digital signature $Sig_B$ of the memory recorder/player 200. That is, the security module 23 first checks the public key certificate $Cert_B$. If the security module 23 judges that the certificate cannot pass the check, it regards the memory recorder/player 200 as an illegal one, and the protocol will be closed. On the other hand, if the security module 23 judges the public key certificate $Cert_B$ as being correct, it acquires a public key $PubKey_B$ from the public key certificate $Cert_B$. Next, the security module 23 judges that the random number $R_A$ returned from the memory recorder/player 200 is equal to the random number $R_A$ generated at step R52 and that the digital signature $Sig_B$ is correct, it goes to a next step. If not, the security module 23 will judge that the memory recorder/player 200 is an illegal one, and the protocol will be closed.

If the security module 23 and memory recorder/player 200 mutually judge as in the above that both of them are legal, the security module 23 will make a calculation of $K_A \cdot V_B$ while the memory recorder/player 200 will make a calculation of $K_B \cdot V_A$, and they will share as a session key Kse a low-order z bit in an x-ordinate obtained through the calculations.

Also, if the security module 23 and memory recorder/player 200 mutually judge that both their counterparts are legal, the security module 23 and memory recorder/player 200 will mutually check the version numbers of the revocation lists their counterparts own.

If the security module 23 and memory recorder/player 200 judges that their own revocation lists have the same version number, they mutually check the IDs of their counterparts using their own revocation lists to see that the IDs are not included in the revocation lists. If the result of checking shows that neither of the IDs is included in the revocation lists, the security module 23 and memory recorder/player 200 will go to step R56 which will be described later. If the security module 23 has determined that the $ID_B$ of the memory recorder/player 200 is included in its own revocation list, it will judge the memory recorder/player 200 to be illegal, and the protocol will be closed. Similarly, if the memory recorder/player 200 has determined that the $ID_A$ of the security module 23 is included in its own revocation list, it will judge the security module 23 to be illegal, and the protocol will be closed.

On the other hand, if it is mutually judged by the security module 23 and memory recorder/player 200 that the version number of the revocation list one of them has is newer than that of the revocation list the other has, one of the security module 23 and memory recorder/player 200 which has the revocation list with the newer version number goes to step R54 or R55 where it will send the revocation list to the other or its counterpart. The side receiving the revocation list having the newer version number will check the ID of its counterpart using the received revocation list and update the revocation list having the old version.

More specifically, when the version number of the revocation list in the security module 23 is newer than that of the revocation list in the memory recorder/player 200, for example, the security module 23 will check the $ID_B$ of the memory recorder/player 200 using its own revocation list. When the checking result shows that the memory recorder/player 200 is not listed in the revocation list, the security module 23 goes to step R54 where it will send its own revocation list to the memory recorder/player 200. Receiving the revocation list, the memory recorder/player 200 checks the $ID_A$ of the security module 23 using the new revocation list. If the checking result shows that the $ID_A$ of the security module 23 is not included in the revocation list, the memory recorder/player 200 will check the digital signature TCSig of the center TC included in the revocation list having the new version number received from the security module 23. When the digital signature TCSig is correct, the memory recorder/player 200 will update its own old revocation list with the revocation list. On the other hand, if the digital signature TCSig is judged to be incorrect, the protocol will be closed.

Also, if the memory recorder/player 200 has the revocation list having a newer version number than that of the revocation list in the security module 23, for example, it will check the $ID_A$ of the security module 23 using its own revocation list. When the checking result shows that the security module 23 is not listed in that revocation list, the memory recorder/player 200 goes to step R55 where it will send its own revocation list to the security module 23. The security module 23 receives the revocation list and checks the $ID_B$ of the memory recorder/player 200 using the revocation list with the newer version number. When the result of checking shows that the $ID_B$ of the memory recorder/player 200 is not listed in the revocation list, the security module 23 will check the digital signature TCSig made by the center TC included in the revocation list having the new version number received from the memory recorder/player 200. If the digital signature TCSig is judged to be correct, the security module 23 will update its own old revocation list with the old version number using the received revocation list sent. On the other hand, if the digital signature TCSig is judged to be incorrect, the protocol will be closed.

Next, the memory recorder/player 200 goes to step R56 where it will send to the security module 23 a value Enc(Kse, Kco) obtained by encrypting with the session key Kse the content key Kco intended for use to encrypt content data to be recorded to the memory unit 22 of the memory medium 20.

The security module 23 goes to step R57 where it will decrypt, with the session key Kse, the value Enc(Kse, Kco) sent from the memory recorder/player 200, thereby decrypting the content key Kco, and store, into the memory unit 22 or nonvolatile memory 44, the value Enc(Kst, Kco) obtained by encrypting the content key Kco with its own storage key Kst.

Thereafter, at step R58, the memory recorder/player 200 sends to the security module 23 a content data Enc(Kco, data) encrypted with the content key Kco.

The security module 23 goes to step R59 where it will store the encrypted content data Enc(Kco, data) into the memory unit 22. Note that the revocation list may be transmitted during or after transmission of the content data.

<Recording Procedure in the Second Embodiment (Variant)>

Figure 18:
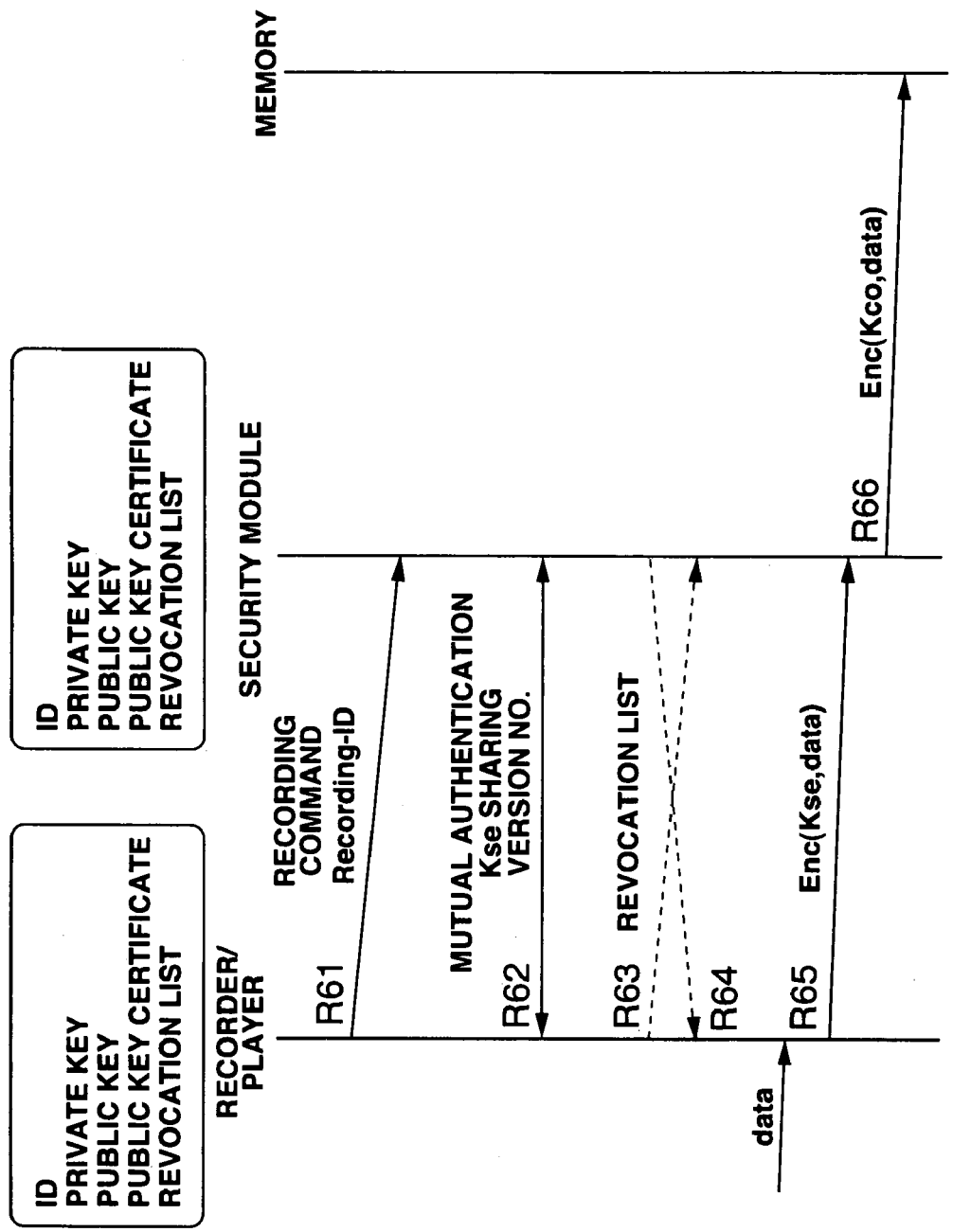
FIG. 18 shows still another example of the procedure for writing data to the memory as the data recording medium according to the second embodiment of the present invention.

In the second embodiment, data recording to the memory unit 22 of the memory medium 20 may be effected as shown in FIG. 18. Steps R61 to R64 in FIG. 18 are the same as steps R31 to R34 in FIG. 15, and so will not be described any longer.

In the variant shown in FIG. 18, the memory recorder/player 200 goes to step R65 where it will encrypt data with a session key Kse shared by itself and security module 23, and send the encrypted data Enc(Kse, data) to the security module 23.

Receiving the encrypted data Enc(Kse, data), the security module 23 goes to step R66 where decrypt the data with the session key Kse to obtain data in plaintext, and record a value Enc(Kco, data) encrypted with a newly generated content key Kco into the data memory 22.

The security module 23 stores the content key Kco safely into the internal nonvolatile memory 44 or stores into the large-capacity memory unit 22 a value Enc(Kse, Kco) obtained by encrypting the content key Kco with a storage key Kst previously stored in the security module 23. Thus, the security module 23 will not have to teach even the memory recorder/player 200 the content key Kco for the data (namely, will not leak the content key Kco).

<Playback Procedure in the Second Embodiment>

Next, the procedure for reading data from the memory unit 22 of the memory medium 20 by the memory recorder/player 200 according to the second embodiment, will be described below with reference to FIGS. 19 to 22.

Note that as having been described in the foregoing, the memory recorder/player 200 according to the second embodiment of the present invention has stored in the nonvolatile memory 210 thereof an ID given from the center TC, private key and public key of the public-key encryption system, public key certificate and a revocation list. Similarly, the security module 23 in the memory medium 20 according to the second embodiment of the present invention has stored in the nonvolatile memory 44 thereof an ID given from the center TC, private key and public key of the public-key encryption system, public key certificate and a revocation list. Also, it is assumed that the memory recorder/player 200 already knows a recording ID appended to data to be read.

Figure 19:
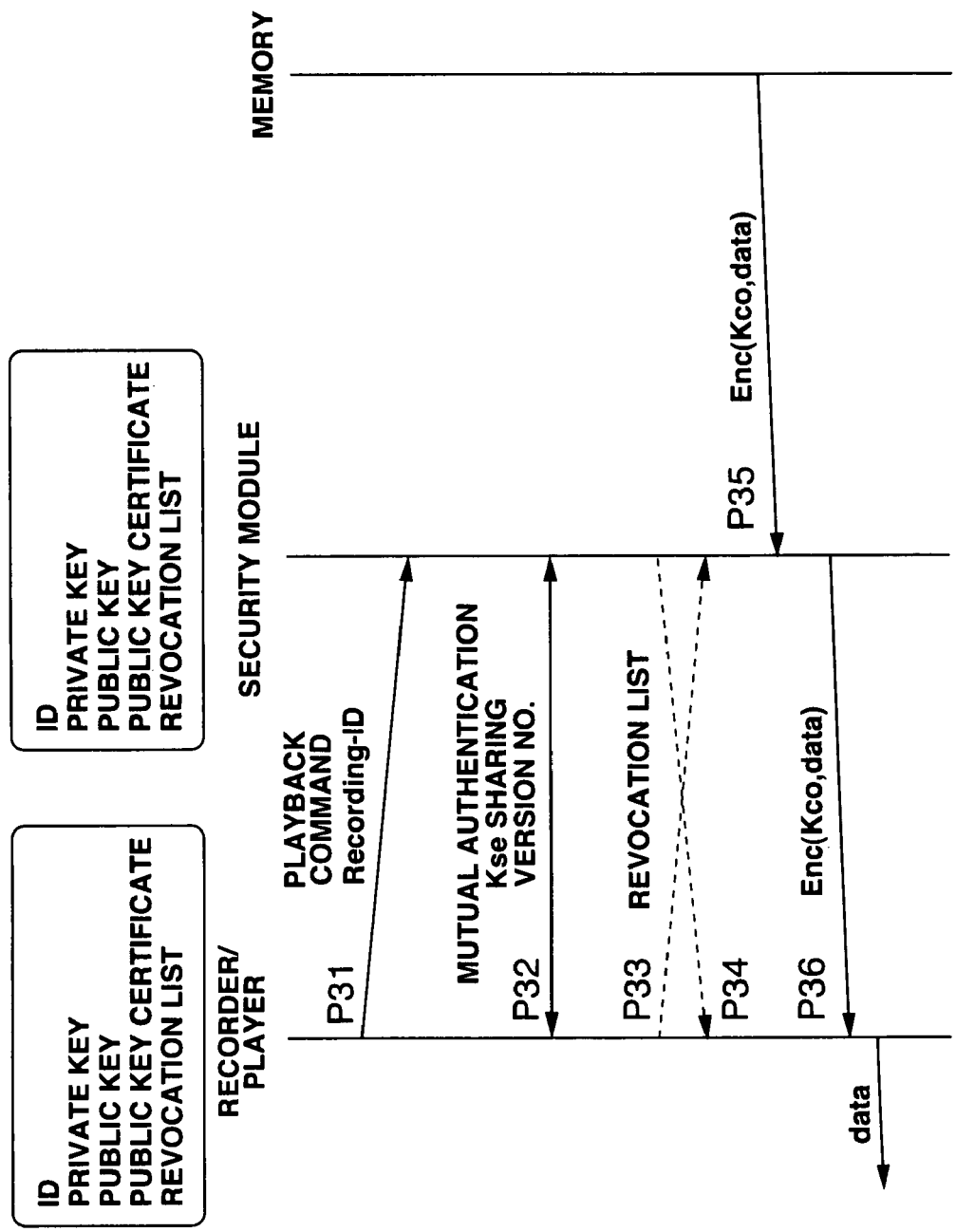
FIG. 19 shows a basic procedure for reading data from the memory as the data recording medium according to the second embodiment of the present invention.

First the memory recorder/player 200 goes to step P31 where it will send a playback command (playback start command) indicating that data is going to be read and the recording ID to the security module 23 in the memory medium 20 as shown in FIG. 19.

Next the memory recorder/player 200 and security module 23 of the memory medium 20 go to step P32 where they will execute, by the use of the playback command as a trigger, mutual authentication and key sharing protocols using the public-key encryption technology. The protocols are similar to those used in the data recording in the aforementioned first embodiment, and allow the security module 23 and memory recorder/player 200 to mutually check that their counterparts have correct public key and private key and the IDs of their counterparts are included in the revocation lists their counterparts have respectively, share a session key Kse and to send the version numbers of their own revocation lists to their counterparts.

When the result of checking made at steps P33 and P34 in FIG. 19 shows that one of the security module 23 and memory recorder/player 200 has a revocation list whose version number is newer than that of the revocation list the other owns, the one sends the revocation list to the other and the other updates its own revocation list with the received revocation, as at steps R33 and R34 in FIG. 15. That is to say, step P33 is a flow of the revocation list when the version of the revocation list in the security module 23 is newer than that in the memory recorder/player 200, and step P34 is a flow of the revocation list when the version of the revocation list in the memory recorder/player 200 is newer than that in the security module 23.

It should be noted that the transfer of the revocation list at steps P33 and P34 may be done after the data recording in next steps P35 and P36. That is, the revocation list transfer at step P33 or P34 may be done after completion of the data recording at steps P35 and P36.

Next, the memory recorder/player 200 has to know a content key Kco with which data has been encrypted before reading the data from the memory unit 22 of the memory medium 20.

The content key Kco is safely stored in the nonvolatile memory 44 of the security module 23 or recorded in the memory unit 22 as a value Enc(Kst, Kco) obtained by encrypting the content key Kco with a storage key Kst prestored in the security module 23.

In the former case, the security module 23 sends to the memory recorder/player 200 a value obtained by encrypting, with a session key Kse, the content key Kco stored in the nonvolatile memory 44. The memory recorder/player 200 obtains the content key Kco by decrypting the value Enc(Kse, Kco) with the session key Kse.

On the other hand, in the latter case, first the memory recorder/player 200 goes to step P35 where it will read from the memory unit 22 the value Enc(Kst, Kco) obtained by encrypting the content key Kco, and decrypts the value Enc(Kst, Kco) with the storage key Kst to provide the content key Kco. Further, the security module 23 obtains the value Enc(Kse, Kco) obtained by encrypting the content key Kco the session key Kse, and sends it to the memory recorder/player 200 at step P36. The memory recorder/player 200 obtains the content key Kco by decrypting the value Enc(Kse, Kco) with the session key Kse.

As in the above, the memory recorder/player 200 can obtain the content key Kco with which the data has been encrypted.

Thereafter, the memory recorder/player 200 reads, from the memory unit 22 of the memory medium 20, data Enc(Kco, data) encrypted with the content key Kco, and decrypts the data with the content key Kco already obtained to use the data.

The above is the basic procedure for reading data from the memory unit 22 of the memory medium 20.

<Playback Procedure in the Second Embodiment (Detail 1)>

Figure 20:
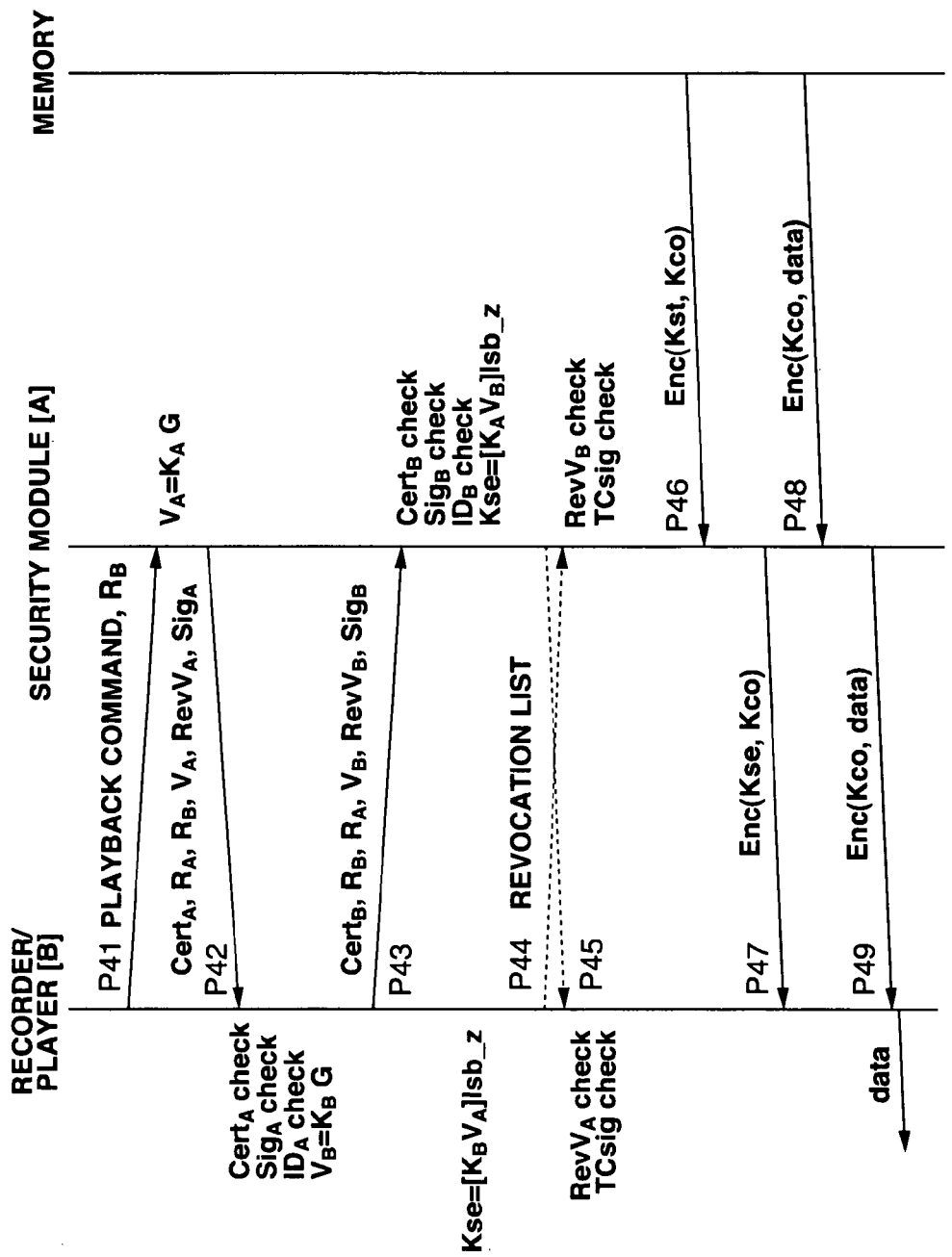
FIG. 20 shows in detail the basic procedure for reading data from the memory as the data recording medium according to the second embodiment of the present invention.

FIG. 20 shows in detail the procedure in which the memory recorder/player 200 according to the second embodiment reads data from the memory medium 20. Note that in FIG. 20, a character "B" is suffixed to each information related to the memory recorder/player 200 while a character "A" is suffixed to each information related to the security module 23. Also, as having been described in the above, the memory recorder/player 200 and security module 23 has stored in their nonvolatile memories 210 and 44, respectively, an ID ($ID_A$ of the security module 23, $ID_B$ of the memory recorder/player 200) given from the center TC, private key and public key of the public-key encryption system, public key certificate and revocation list.

Steps P41 to P46 in FIG. 20 are generally similar to steps P11 to P16 in the aforementioned first embodiment, having been described with reference to FIG. 10 in FIG. 10.

That is, the memory recorder/player 200 goes to step P41 where it will send a random number $R_B$ and playback command to the security module 23. The security module 23 goes to step P42 where it will generate random numbers $R_A$ and $K_A$, make a calculation of $V_A = K_A \cdot G$, make a digital signature to a bit string consisting of the random numbers $R_A$ and $R_B$, value $V_A$ and a version number $RevV_A$ to acquire $Sig_A$, append a public key certificate $Cert_A$, and send them to the memory recorder/player 200. Note that when the security module 23 has or uses no revocation list, it will use for example "0" as the version number.

Next, the memory recorder/player 100 checks the public key certificate $Cert_A$. When it judges that the certificate cannot pass the checking, it takes the memory medium 20 as being an illegal medium, and the protocol will be closed. On the other hand, if the checking result shows that the certificate is valid, the memory recorder/player 200 acquires a public key $PubKey_A$ from the public key certificate $Cert_A$. Next, if the memory recorder/player 200 judges that the random number $R_B$ returned from the security module 23 is equal to random number $R_B$ generated at step P41 and the digital signature $Sig_A$ is correct, it will go to a next step. If not, the memory recorder/player 200 will regard the memory medium 20 as an illegal medium, and the protocol will be closed.

If the memory recorder/player 200 judges that the random number $R_B$ returned from the security module 23 is equal to a one previously generated and the digital signature $Sig_A$ is correct, it will check, using its own revocation list, that the $ID_A$ of the memory medium 20 is not included in the revocation list. If the checking result proves that the $ID_A$ is included in the revocation list, the memory recorder/player 200 will determine that the memory medium 20 is an illegal medium, and the protocol will be closed. On the other hand, if the $ID_A$ is not included in the revocation list, the memory recorder/player 200 goes to step P43 where it will generate a value $K_B$, make a calculation of $V_B = K_B \cdot G$, and make a digital signature to a bit string consisting of the random numbers $R_B$ and $R_A$, value $V_B$ and version number $RevV_B$ to acquire $Sig_B$, append a public key certificate $Cert_B$ to these $R_B$, $R_A$, $V_B$, $RevV_B$ and $Sig_B$ and send them to the security module 23. Note that the memory recorder/player 200 has or uses no revocation list, it will use for example "0" as the version number.

Next, the security module 23 checks the public key certificate $Cert_B$. When it judges that the certificate cannot pas the checking, it takes the memory recorder/player 200 as being an illegal unit, and exits this protocol. On the other hand, if the checking result shows that the certificate is valid, the security module 23 acquires a public key $PubKey_B$ from the public key certificate $Cert_B$. Next, if the security module 23 judges that the random number $R_A$ returned from the memory recorder/player 200 is equal to the random number $R_A$ generated at step P42 and the digital signature $Sig_B$ is correct, it will go to a next step. If not, the security module 23 will regard the memory recorder/player 200 as an illegal unit, and the protocol will be closed.

If the security module 23 judges that the random number $R_A$ returned from the memory recorder/player 200 is equal to a one previously generated and the digital signature $Sig_B$ is correct, it check, using its own revocation list, that the $ID_B$ is not included in the revocation list. If the checking result shows that the $ID_B$ is included in the revocation list, the security module 23 will regard the memory recorder/player 200 as an illegal unit, and the protocol will be closed.

On the other hand, if the $ID_B$ is not included in the revocation list, namely, that both the security module 23 and memory recorder/player 200 are legal, the security module 23 and memory recorder/player 200 will generate a session key Kse and share it.

Next, the security module 23 and memory recorder/player 200 mutually check the version numbers of the revocation lists in their counterparts. If one of them has a revocation list with a newer version number than that of the revocation list in the other, they go to step P44 or P45 where they will send the revocation list having the newer version number to the other. One, of the security module 23 and memory recorder/player 200, receiving from the other the revocation list whose version number is newer, checks the digital signature TCSig made by the center TC. If the digital signature TCSig is correct, the one will updates its own revocation list with the received one. On the other hand, if the digital signature TCSIG is judged to be incorrect, the protocol will be closed.

Next, if the value Enc(Kst, Kco) encrypted with the content key Kco is stored in the memory unit 22 of the memory medium 20 for example, the security module 23 goes to step P46 where it will decrypt the value Enc(Kst, Kco) read from the memory unit 22 using the storage key Kst, and further goes to step P47 where it will send to the memory recorder/player 200 the value Enc(Kse, Kco) obtained by encrypting the content key Kco with the session key Kse. The memory recorder/player 200 obtains the content key Kco by decrypting the value Enc(Kse, Kco) with the session key Kse.

Thereafter, the security module 23 goes to step P48 where it will read an encrypted content data Enc(Kco, data) from the memory unit 22 of the memory medium 20, and send the data Enc(Kco, data) to the memory recorder/player 200. The memory recorder/player 200 uses the content key Kco previously acquired to decrypt the data Enc(Kco, data).

Note that the revocation list may be transmitted during or after the transmission of the content data.

<Playback Procedure in the Second Embodiment (Detail 1)>

Figure 21:
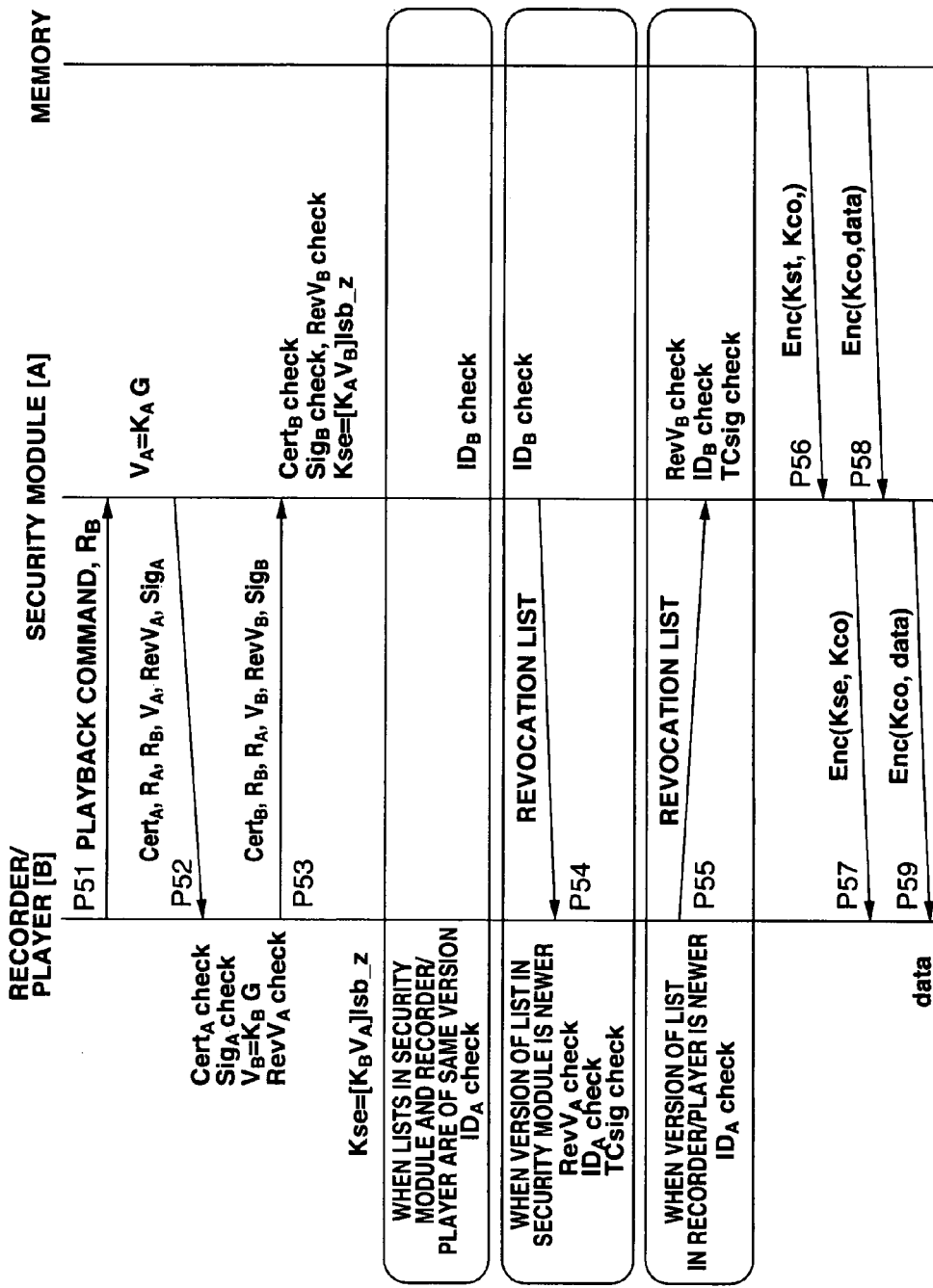
FIG. 21 shows another example of the procedure for reading data from the memory as the data recording medium according to the second embodiment of the present invention.

FIG. 21 show a data playback procedure in the second embodiment, in which it is checked whether the version number of the revocation list owned by one of the security module 23 and memory recorder/player 200 is newer or older than that of the revocation list the other owns and then the ID of the counterpart is checked using the revocation list with the newer version number, as in the example shown in FIG. 11 showing the first embodiment.

Note that steps P51 to P55 in FIG. 21 are generally same as steps P21 to P25 in FIG. 11 showing the aforementioned first embodiment.

As shown in FIG. 21, the memory recorder/player 200 goes to step R51 where it will send a random number $R_B$ along with a recording command to the security module 23. Receiving the recording command and random number $R_B$, the security module 23 goes to step R52 where it will generate random numbers $R_A$ and $K_A$, make a calculation of $V_A = K_A \cdot G$, make a digital signature to a bit string consisting of the random numbers $R_A$ and $R_B$, value $V_A$ and version number $RevV_A$ to acquire $Sig_A$, and send these $R_A$, $R_B$, $V_A$, $RevV_A$ and $Sig_A$ and a public key certificate $Cert_A$ to the memory recorder/player 200.

Receiving $Cert_A$, $R_A$, $R_B$, $V_A$, $RevV_A$ and $Sig_A$ from the security module 23, the memory recorder/player 200 checks the public key certificate $Cert_A$ and digital signature $Sig_A$ of the security module 23. When the memory recorder/player 200 determines that the certificate cannot pass the check, it will regard the memory medium 20 with the security module 23 as an illegal one, and the protocol will be closed. On the other hand, when the memory recorder/player 200 judges the public key certificate $Cert_A$ to be valid, it acquires a public key $PubKey_A$ from the public key certificate $Cert_A$. Next, the memory recorder/player 200 judges that the random number $R_B$ returned from the security module 23 is equal to the random number $R_B$ previously generated at step R51 and the digital signature $Sig_A$ is correct, it goes to a next step. If not, the memory recorder/player 200 will judge that the memory medium 20 with the security module 23 is an illegal one, and the protocol will be closed.

If the memory recorder/player 200 determines that the random number $R_B$ returned from the security module 23 is equal to a one previously generated and the digital signature $Sig_A$ is correct, the memory recorder/player 200 goes to step P53 where it will generate $K_B$, make a calculation of $V_B = K_B \cdot G$, make a digital signature to a bit string consisting of the random numbers $R_B$ and $R_A$, value $V_B$ and version number $RevV_B$ to acquire $Sig_B$, and send these $R_B$, $R_A$, $V_B$, $RevV_B$ and $Sig_B$ and a public key certificate $Cert_B$ to the security module 23.

Receiving $Cert_B$, $R_B$, $R_A$, $V_B$, $RevV_B$ and $Sig_B$ from the memory recorder/player 200, the security module 23 checks the public key certificate $Cert_B$ and digital signature $Sig_B$ of the memory recorder/player 200. The security module 23 checks the public key certificate $Cert_B$. When the security module 23 determines that the certificate $Cert_B$ cannot pass the checking, it regards the memory recorder/player 200 as an illegal unit and exits this protocol. On the other hand, if the checking result shows that the certificate is valid, the security module 23 will acquire a public key $PubKey_B$ from the public key certificate $Cert_B$. Next, when the security module 23 judges that the random number $R_A$ returned from the memory recorder/player 200 is equal to the random number $R_A$ generated at step R52 and the digital signature $Sig_B$ is correct, it will go to a next step. If not, the security module 23 will judge the memory recorder/player 200 to be an illegal unit, and the protocol will be closed.

If both the security module 23 and memory recorder/player 200 are judged to correct, they will generate and share the session key Kse.

If both the security module 23 and memory recorder/player 200 mutually have judged that both their counterparts are legal, they will check the version numbers of the revocation lists in their counterparts.

When the security module 23 and memory recorder/player 200 have determined that their own revocation lists have the same version number, they mutually check the IDs of their counterparts using their own revocation lists to see that the IDs are not included in the revocation lists.

On the other hand, when it is mutually judged by the security module 23 and memory recorder/player 200 that the version number of the revocation list one of them has is newer than that of the revocation list the other has, one of the security module 23 and memory recorder/player 200 which has the revocation list with the newer version number goes to step P54 or P55 where it will send the revocation list to the other or its counterpart. The side receiving the revocation list having the newer version number will check the ID of its counterpart using the received revocation list and update the revocation list having the old version.

Steps P56 to P59 are the same as steps P46 to P49 in FIG. 20, so they will not be described any longer.

<Playback Procedure in the Second Embodiment (Variant)>

Figure 22:
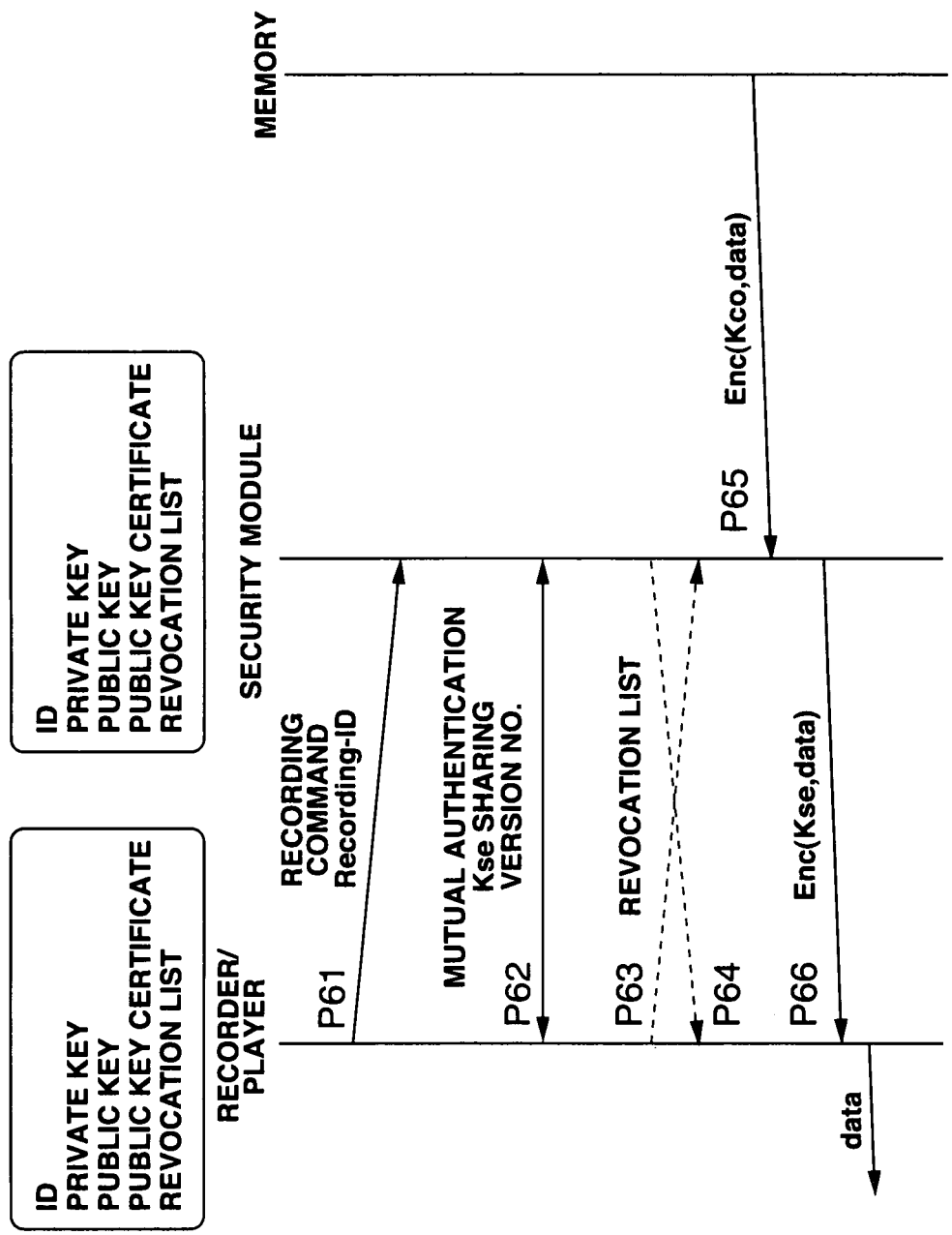
FIG. 22 shows still another example of the procedure for reading data from the memory as the data recording medium according to the second embodiment of the present invention.

As shown in FIG. 22, a procedure like the data recording procedure shown in FIG. 18 may be used as the data playback procedure in the second embodiment. Note that steps P61 to P64 in FIG. 22 are the same as steps P31 to P34 in FIG. 19 and so will not be described any further.

In the example shown in FIG. 22, the security module 23 goes to step P65 where it will decrypt, with the content key Kco, the encrypted content data Enc(Kco, data) read from the memory unit 22, and encrypts the decrypted data using the session key Kse. The security module 23 goes to step P66 where it will send to the memory recorder/player 200 the content data Enc(Kse, data) encrypted with the session key Kse.

The memory recorder/player 200 decrypts the data Enc(Kse, data) with its own session Kse, to thereby obtain the decrypted content data.

Thus, the security module 23 will have not to teach the memory recorder/player 200 the content key Kco with which the data has been encrypted (the content key Kco will not leak to outside).

Third Embodiment (IM2, Dev2)

In the aforementioned first and second embodiments, illegal data copying is prevented using a list of IDs of a data recording medium or recorder/player (ID of a unit or medium to be revoked) whose private key has been revealed or exposed to outside. According to the present invention, a registration list of legal data recording media or recorder/player units can be used to prevent data from illegally being copied.

That is, the registration list is generally called a "honest persons list". The registration list lists up IDs of data recording media or recorder/player units (will also be called "medium" and "unit" respectively herein) included in a system or a subsystem of the latter and which the center TC has judged to be legal. The center TC has made a digital signature to each of such media and units.

As shown in FIG. 23, the registration list includes a version number being for example a number which increases monotonously and indicating the version of the registration list, a list of IDs of legal data recording media or recorder/player units (IDs of registered units or media), and a digital signature made by the center TC. Registration to the registration list is effected as follows. For example, one of the units in a home network lists up IDs of units and recording media included in the home network and sends the list to the center TC, the center TC judges whether the all the media and units are legal, and makes a digital signature to the list when it determines all the media and units to be legal. The center TC returns the list to the unit. The unit having received this list distributes it within the home network. Thus, each of the units and recording media in the home network can know IDs of all the trustable units and recording media, and can execute a protocol with a trust in only the entity having an ID listed up in the registration. In other words, a recording medium or unit whose private key has been revealed or exposed to outside or a recording medium illegally copied, or unit illegally produced, using the exposed private key will not be included in the registration list. Therefore, such illegal unit and medium can be revoked from the system. Also, when a recorder/player is shipped from factory, a latest registration list is to be stored in the nonvolatile memory therein.

The third embodiment of the present invention using the registration list will be described herebelow:

In the third embodiment of the present invention, the registration list is stored, instead of the aforementioned revocation list, in the nonvolatile memory 34 of the security module 13 in the optical disc medium 10 having been described concerning the first embodiment, and nonvolatile memory 110 in the optical disc recorder/player 100. Since the optical disc medium 10 and optical disc recorder/player 100 in the third embodiment are the same as in FIGS. 1 to 3, their construction will not be described herein.

<Recording Procedure in the Third Embodiment>

Figure 24:
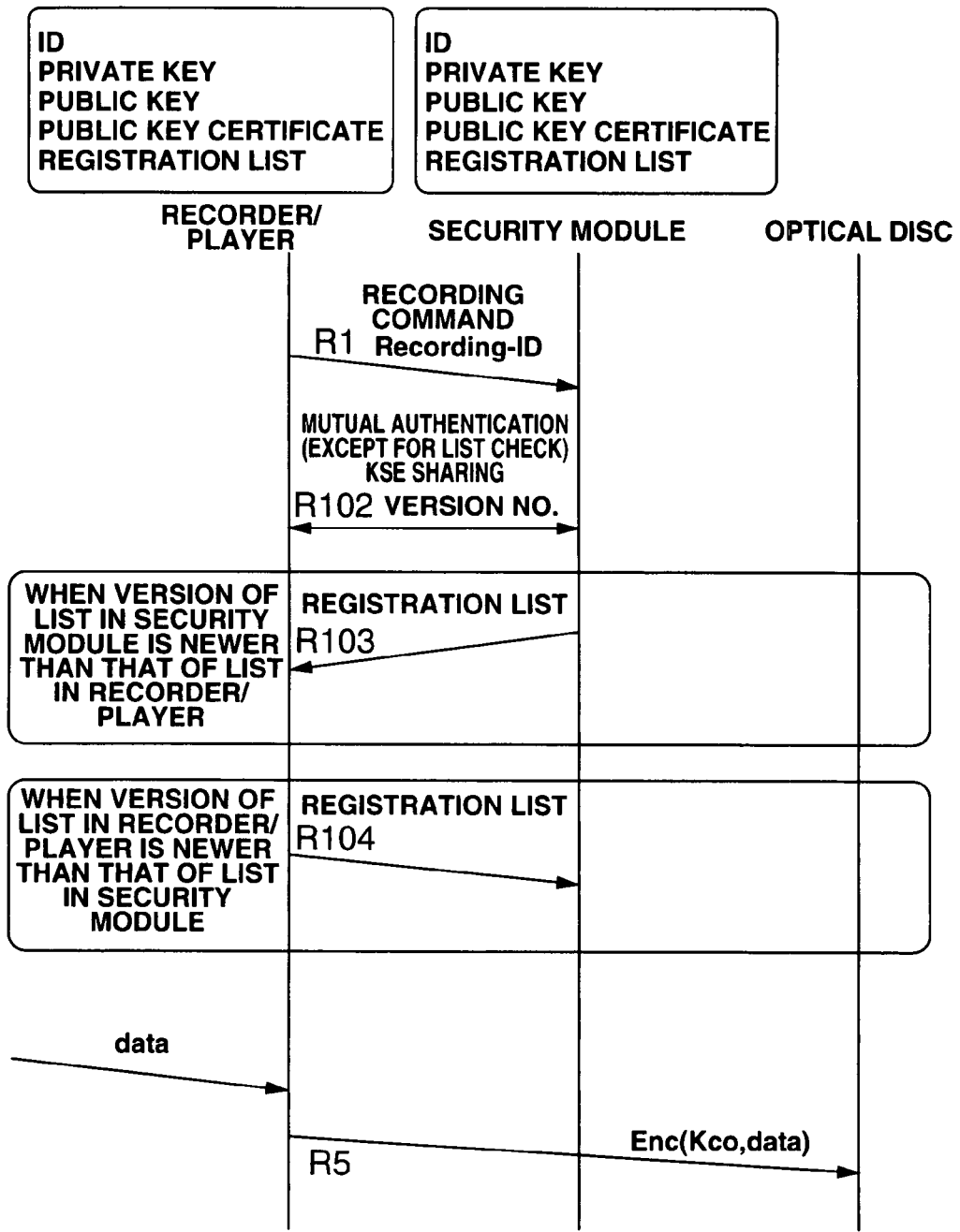
FIG. 24 shows a basic procedure for writing data to an optical disc as the data recording medium according to the third embodiment of the present invention.
Figure 25:
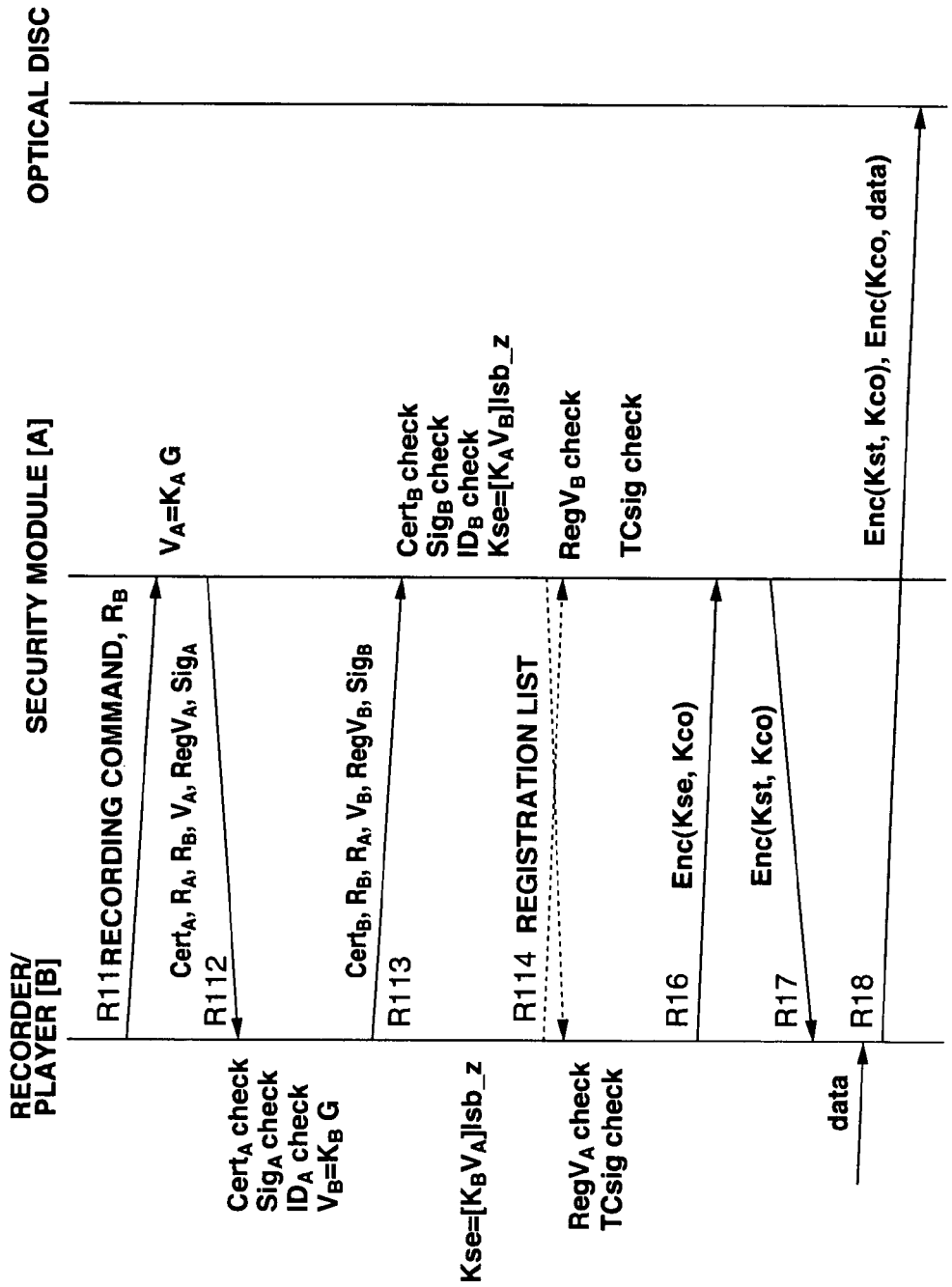
FIG. 25 shows in detail the procedure for writing data to the optical disc as the data recording medium according to the third embodiment of the present invention.
Figure 26:
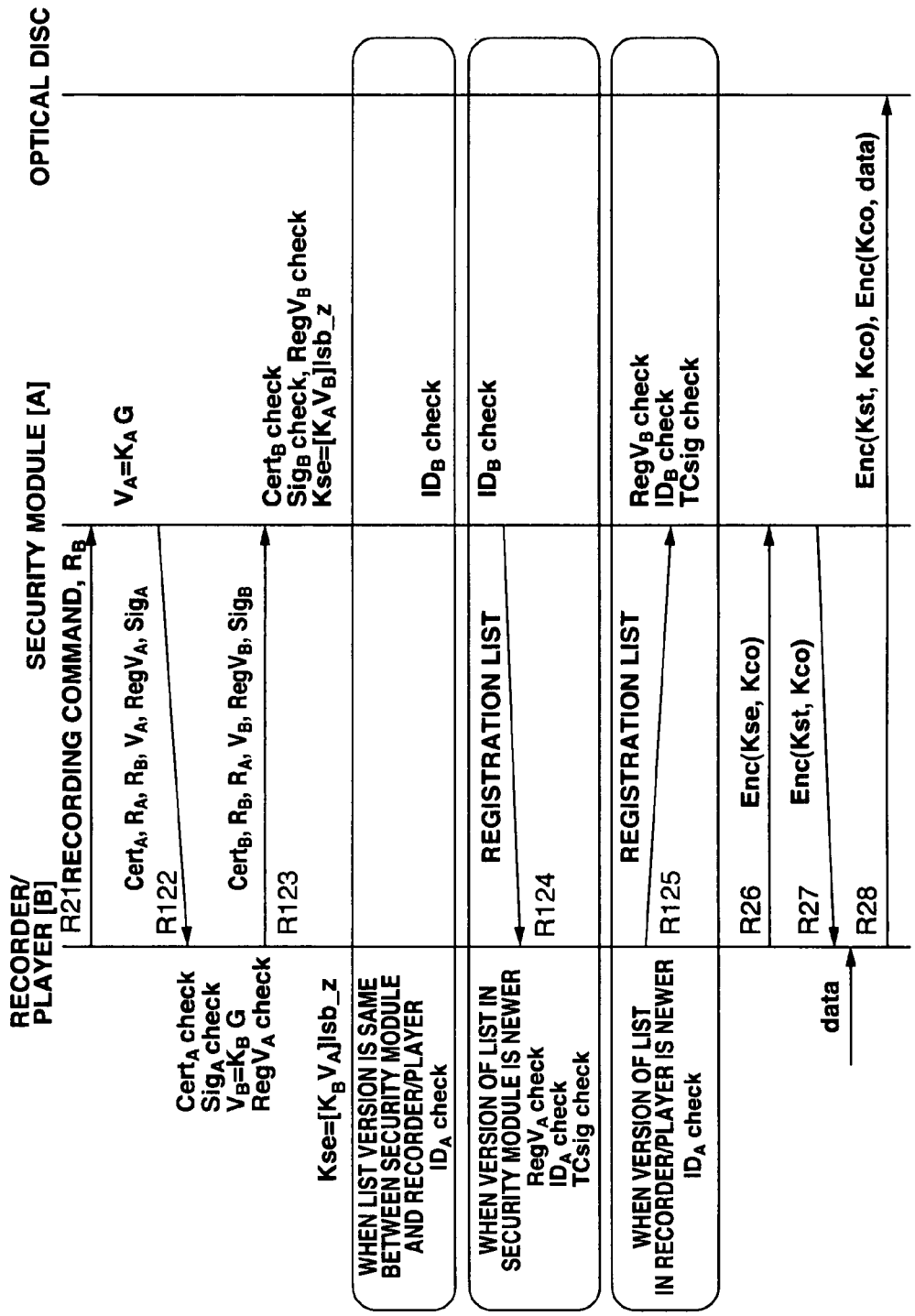
FIG. 26 shows another example of the procedure for writing data to the optical disc as the data recording medium according to the third embodiment of the present invention.

How the optical disc recorder/player 100 according to the third embodiment of the present invention records data to the optical medium 10 will be described herebelow with reference to FIGS. 24 to 26. Note that FIGS. 24 to 26 are generally similar to FIGS. 6 to 8 showing the first embodiment and the procedure in the third embodiment is also generally the same as that in the first embodiment. So, only differences of the procedures in FIGS. 24 to 26 from that in the first embodiment shown in FIGS. 6 to 8 will be described below.

Step R102 in FIG. 24 corresponds to step R2 in FIG. 6. At step R102 in the third embodiment, the optical disc recorder/player 100 and security module 13 exchange the version numbers of their own registration lists between them.

Steps R103 and R104 in FIG. 24 correspond to steps R3 and R4 in FIG. 6. At steps R103 and R104 in the third embodiment, when one of the optical disc recorder/player 100 and security module 13, having a newer registration list than that of the other, will send its own registration list to the other. On the other hand, the other having the older registration list receives the newer registration list, checks its validity, and then updates its own registration list to the received newer registration list.

Note that at steps R103 and R104, the registration list may be sent before or after data is recorded at the subsequent step R5. That is, after data is recorded at step R5, the registration list may be sent at step R103 or R104.

<Recording Procedure in the Third Embodiment (Detail 1)>

FIG. 25 shows in detail a procedure shown in FIG. 24 and which is followed by the optical disc recorder/player 100 according to the third embodiment, to record data to the optical disc medium 10. This procedure is generally similar to that shown in FIG. 7.

As shown in FIG. 25, the security module 13 goes to step R112 (R12 in FIG. 7) where it will make, using a digital signature function Sign, a digital signature to a bit string $R_A \| R_B \| V_A \| RevV_A$ consisting of the random numbers $R_A$ and $R_B$, value $V_A$ and a registration list version number $RevV_A$ to acquire $Sig_A = Sign(PriKey_A, R_A \| R_B \| V_A \| RegV_A)$. The security module 13 appends a public key certificate $Cert_A$ to these $R_A$, $R_B$, $V_A$, $RegV_A$ and $Sig_A$, and sends them to the optical disc recorder/player 100. Note that when the security module 13 has or uses no registration list, it will uses "0" for example as the version number.

Receiving $Cert_A$, $R_A$, $R_B$, $V_A$, $RegV_A$ and $Sig_A$ from the security module 13, the optical disc recorder/player 100 checks the public key certificate $Cert_A$, digital signature $Sig_A$ and $ID_A$ of the security module 13. When the optical disc recorder/player 100 judges that the certificate can pass the checking, the random number $R_B$ returned from the security module 13 is equal to a one previously generated and the digital signature $Sig_A$ is correct, it will check, using the registration list stored in its own nonvolatile memory 110, that the $ID_A$ of the optical disc medium 10 is registered in the registration list. If the result of checking shows that the $ID_A$ of the optical disc medium 10 is not registered in the registration list, the optical disc recorder/player 100 will judge that the optical disc medium 10 is an illegal medium, and the protocol will be closed.

On the other hand, the result of checking shows that the $ID_A$ is registered in the registration list and the optical disc medium 10 is correct, the optical disc recorder/player 100 goes to step R113 (R13 in FIG. 7) where it will generate a random number $K_B$, make a calculation of $V_B = K_B \cdot G$, make a digital signature to a bit string $R_B \| R_A \| V_B \| RegV_B$ consisting of the random numbers $R_B$ and $R_A$, value $V_B$ and version number $RegV_B$ of the registration list owned by the optical disc recorder/player 100 to acquire $Sig_B = Sign(Prikey_B, R_B \| R_A \| V_B \| RegV_B)$. The optical disc recorder/player 100 will append a public key certificate $Cert_B$ to these $R_B$, $R_A$, $V_B$, $RegV_B$ and $Sig_B$ and send them to the security module 13. It should be noted that when the optical disc recorder/player 100 has or uses no registration list, it will use for example "0" for the version number.

Receiving $Cert_B$, $R_B$, $R_A$, $V_B$, $RegV_B$ and $Sig_B$ from the optical disc recorder/player 100, the security module 13 checks the public key certificate $Cert_B$, digital signature $Sig_B$ and $ID_B$. When the result of checking shows that they can pass the checking, the security module 13 checks, using the registration list stored in its own nonvolatile memory 34, that the $ID_B$ of the optical disc recorder/player 100 is registered in the registration list. If the result of checking shows that the $ID_B$ of the optical disc recorder/player 100 is not registered in the registration list, the security module 13 will judge that the optical disc recorder/player 100 is an incorrect unit, and the protocol will be closed.

On the other hand, if the checking result proves that the $ID_B$ of the optical disc recorder/player 100 is registered in the registration list and the optical disc recorder/player 100 is correct, namely, that both the security module 13 and optical disc recorder/player 100 are correct, the security module 13 and optical disc recorder/player 100 will generate and share a session key Kse.

Next, the security module 13 and optical disc recorder/player 100 check the version numbers of the registration lists in their counterparts. When one of the security module 13 and optical disc recorder/player 100 has a registration list with a newer version number than that of the registration list in the other, it goes to step R114 or R115 (R14 or R15 in FIG. 7) where it will send its own registration list to the other. The other receiving the registration list with the newer version number will check the digital signature TCSig made by the center TC, included in the registration list. If the digital signature passes the checking, the other will update, using the new registration list, its own old registration list.

Step R16 and subsequent steps are similar to those shown in FIG. 7.

Note that the registration list may be sent during or after transmission of content data.

<Recording Procedure in the Third Embodiment (Detail 2)>

FIG. 26 shows an example of the procedure in the first embodiment shown in FIG. 8, using the registration list. That is, FIG. 26 shows a data recording procedure in which first the version number of the registration list in one of the security module 13 and optical disc recorder/player 100 is judged to be newer or older than that of the registration list in the other and then the registration list having the newer version number is used to check the ID of the counterpart.

As shown in FIG. 26, the security module 13 goes to step R122 (R22 in FIG. 8) where it will make, using a digital signature function Sign, a digital signature to a bit string $R_A\|R_B\|V_A\|RegV_A$ consisting of the random numbers $R_A$ and $R_B$, value $V_A$ and a registration list version number $RevV_A$ to acquire $Sig_A$, append a public key certificate $Cert_A$ to these $R_A, R_B, V_A, RegV_A$ and $Sig_A$, and send them to the optical disc recorder/player 100.

Receiving $Cert_A$, $R_A$, $R_B$, $V_A$, $RegV_A$ and $Sig_A$ from the security module 13, the optical disc recorder/player 100 checks the public key certificate $Cert_A$ and digital signature $Sig_A$. When the optical disc recorder/player 100 judges that the certificate can pass the checking, the random number $R_B$ returned from the security module 13 is equal to a one previously generated and the digital signature $Sig_A$ is correct, it goes to step R123 (R23 in FIG. 8) where it will generate a random number $K_B$, make a calculation of $V_B=K_B\cdot G$, and make a digital signature to a bit string consisting of the random numbers $R_B$ and $R_A$, value $V_B$ and version number $RegV_B$ of the registration list in the optical disc recorder/player 100 to acquire $Sig_B$. The optical disc recorder/player 100 appends a public key certificate $Cert_B$ to these $R_B, R_A, V_B, RegV_B$ and $Sig_B$, and sends them to the security module 13.

Receiving $Cert_B$, $R_B$, $R_A$, $V_B$, $RegV_B$ and $Sig_B$ from the optical disc recorder/player 100, the security module 13 will check the public key certificate $Cert_B$ and digital signature $Sig_B$. When the result of checking shows that they can pass the checking, the security module will take a next step.

If both the security module 13 and optical disc recorder/player 100 mutually check as in the above that their counterparts are legal, they will generate and share a session key Kse.

When both the security module 13 and optical disc recorder/player 100 are judged to be legal, they will check the version numbers of the registration lists in their counterparts.

When the registration lists owned by the security module 13 and optical disc recorder/player 100 are judged to be the same in version number as each other, the security module 13 and optical disc recorder/player 100 will mutually check IDs of their counterparts using their own registration lists to see that they are registered in the registration lists in their counterparts. If the checking result shows that the IDs are so registered, they goes to step R26. If the security module 13 finds that the $ID_B$ of the optical disc recorder/player 100 is not registered in its own registration list, it will determine the optical disc recorder/player 100 to be an illegal unit, and exit the protocol. Similarly, if the optical disc recorder/player 100 finds that the $ID_A$ of the security module 13 is not registered in its own revocation list, it will determine that the security module 13 is an illegal medium, and exit the protocol.

On the other hand, when it is mutually judged by the security module 13 and optical disc recorder/player 100 that the version number of the registration list in one of them is newer than that of the registration list in the other, the one goes to step R124 or R125 (R24 or R25 in FIG. 8) where it will send its own registration list to the other, and the other thus receiving the registration list with the newer version number will check the ID of its counterpart using the received registration list and thus update the registration list having the older version number.

Step R26 and subsequent steps are similar to those in FIG. 8.

<Playback Procedure in the Third Embodiment>

Figure 27:
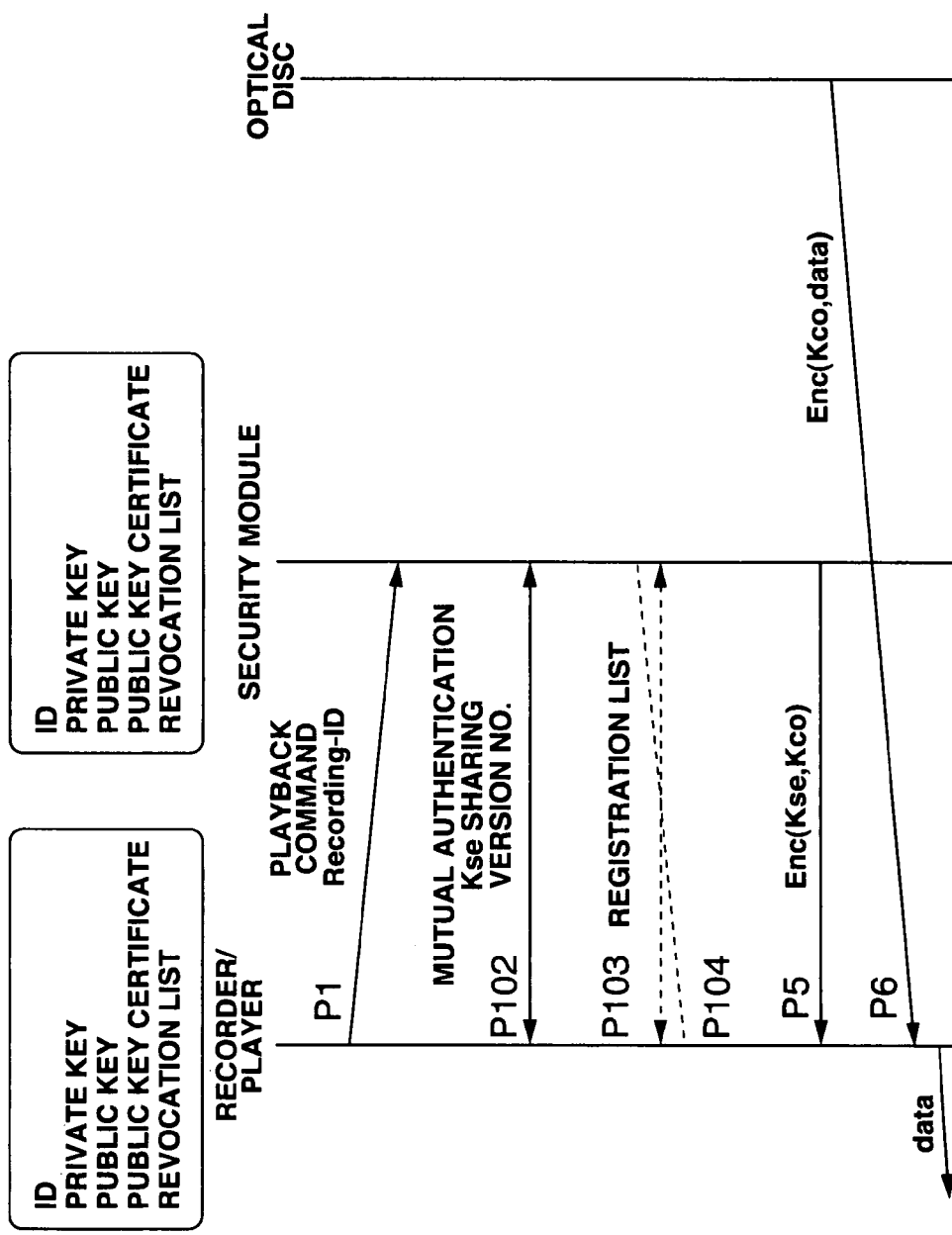
FIG. 27 shows a basic procedure for reading data from the optical disc as the data recording medium according to the third embodiment of the present invention.
Figure 28:
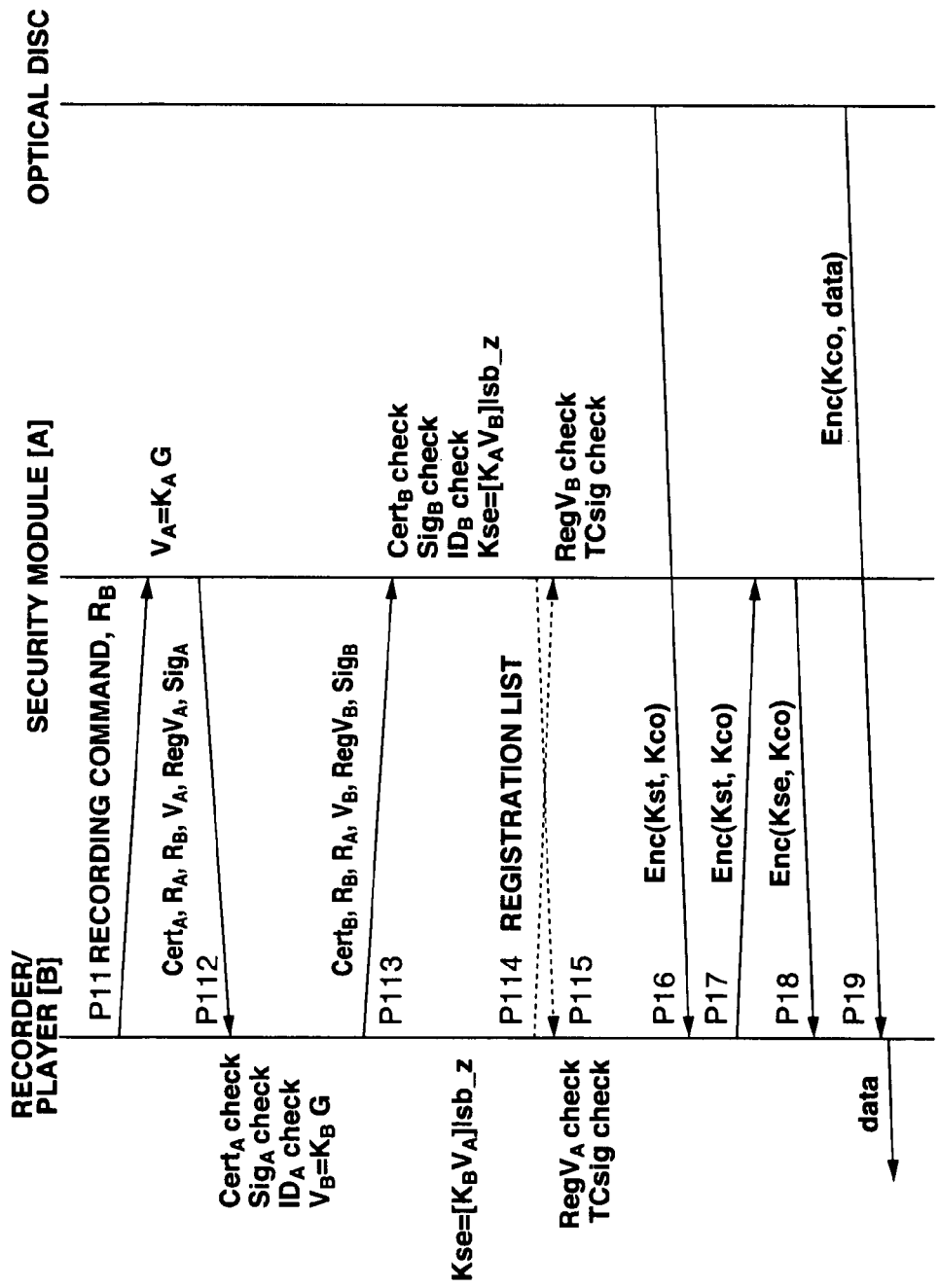
FIG. 28 shows in detail the procedure for reading data from the optical disc as the data recording medium according to the third embodiment of the present invention.
Figure 29:
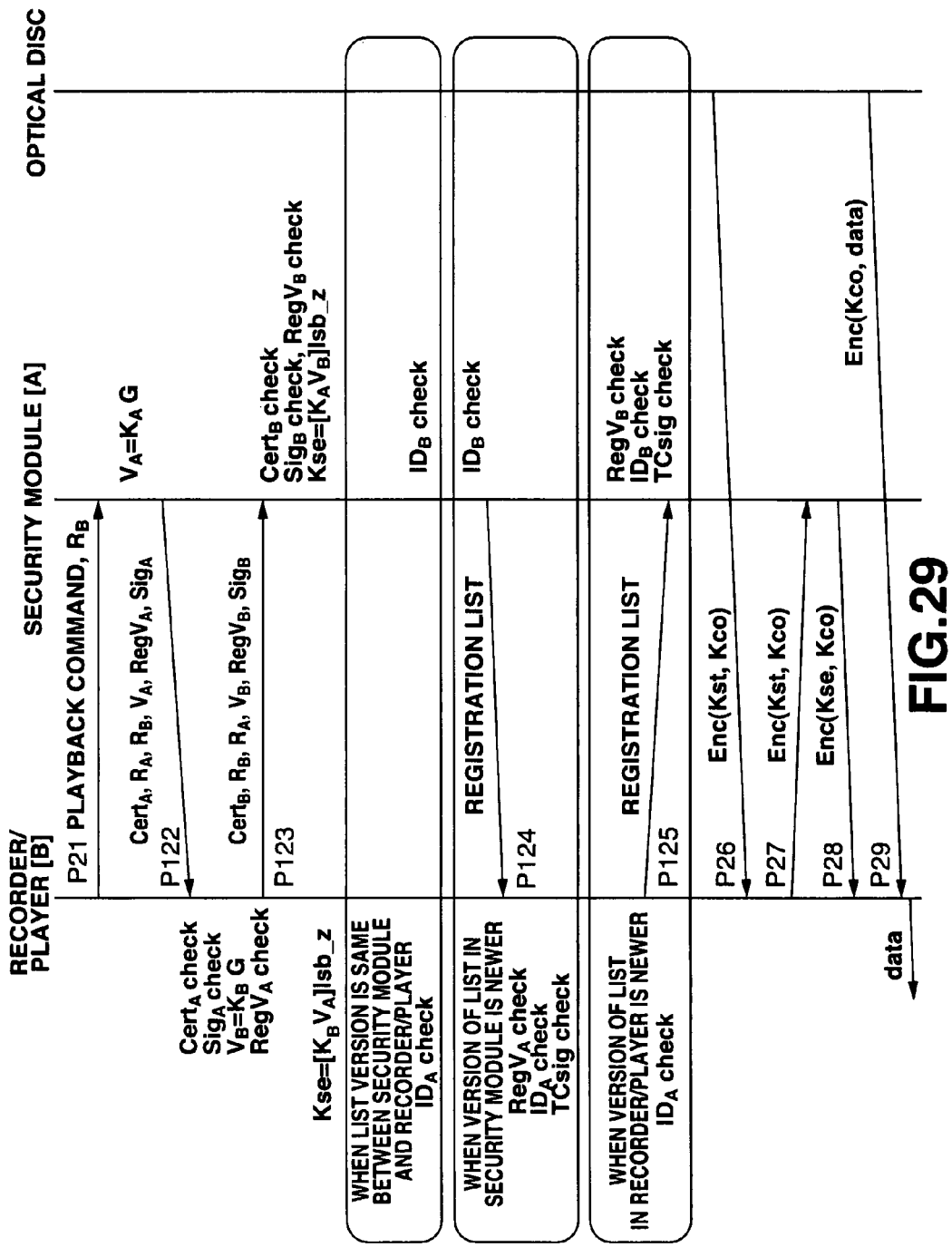
FIG. 29 shows another example of the procedure for reading data from the optical disc as the data recording medium according to the third embodiment of the present invention.

Next, a procedure in which the optical disc recorder/player 100 according to the third embodiment reads or plays back data from the optical disc 12, will be described hereinbelow with reference to FIGS. 27 to 29. Note that FIGS. 27 to 29 are generally similar to FIGS. 9 to 11 showing the first embodiment and the procedure in the third embodiment is also generally the same as that in the first embodiment. So, only differences of the procedures shown in FIGS. 27 to 29 from that in the first embodiment shown in FIGS. 9 to 11, will be described below.

As shown in FIG. 27, the optical disc recorder/player 100 and security module 13 go to step P102 (P2 in FIG. 9) where they will mutually check that IDs of their counterparts are included in their own registration lists and send the version numbers of their own registration lists to each other.

At steps P103 and P104 (P3 and P4 in FIG. 9), the security module 13 and optical disc recorder/player 100 mutually check that one of them has a registration list with a newer version than that of the registration list in the other. The one will send its own registration list to the other, and the other thus receiving the registration list will update its own registration list with the received one as in FIG. 9.

Step P5 and subsequent steps are similar to those in FIG. 9.

<Playback Procedure in the Third Embodiment (Detail 1)>

FIG. 28 shows in detail a procedure shown in FIG. 27 and which is followed by the optical disc recorder/player 100 according to the third embodiment, to record data to the optical disc medium 10. This procedure in FIG. 28 is generally similar to that shown in FIG. 10.

As shown in FIG. 28, the security module 13 goes to step R112 (R12 in FIG. 10) where it will make a digital signature to a bit string consisting of the random numbers $R_A$ and $R_B$, value $V_A$ and a registration list version number $RegV_A$ to acquire $Sig_A$. The security module 13 appends a public key certificate $Cert_A$ to these $R_A$, $R_B$, $V_A$, $RegV_A$ and $Sig_A$, and sends them to the optical disc recorder/player 100. Note that when the security module 13 has or uses no registration list, it will uses "0" for example as the version number.

Receiving $Cert_A$, $R_A$, $R_B$, $V_A$, $RegV_A$ and $Sig_A$ from the security module 13, the optical disc recorder/player 100 checks the public key certificate $Cert_A$, digital signature $Sig_A$ and $ID_A$ of the security module 13. When the optical disc recorder/player 100 judges that the certificate can pass the checking, the random number $R_B$ returned from the security module 13 is equal to a one previously generated and the digital signature $Sig_A$ is correct, it will check, using the registration list stored in its own nonvolatile memory 110, that the $ID_A$ of the optical disc medium 10 is registered in the registration list. If the result of checking shows that the $ID_A$ of the optical disc medium 10 is not registered in the registration list, the optical disc recorder/player 100 will judge that the optical disc medium 10 is an illegal medium, and the protocol will be closed.

On the other hand, the result of checking shows that the $ID_A$ is registered in the registration list and the optical disc medium 10 is legal, the optical disc recorder/player 100 goes to step P113 (P13 in FIG. 10) where it will generate a random number $K_B$, make a calculation of $V_B=K_B \cdot G$, make a digital signature to a bit string consisting of the random numbers $R_B$ and $R_A$, value $V_B$ and version number $RegV_B$ of the registration list owned by the optical disc recorder/player 100 to acquire $Sig_B$. The optical disc recorder/player 100 will append a public key certificate $Cert_B$ to these $R_B$, $R_A$, $V_B$, $RegV_B$ and $Sig_B$ and send them to the security module 13. It should be noted that when the optical disc recorder/player 100 has or uses no registration list, it will use for example "0" for the version number.

Receiving $Cert_B$, $R_B$, $R_A$, $V_B$, $RegV_B$ and $Sig_B$ from the optical disc recorder/player 100, the security module 13 checks the public key certificate $Cert_B$, digital signature $Sig_B$ and $ID_B$. When the result of checking shows that they can pass the checking, the security module 13 checks, using the registration list stored in its own nonvolatile memory 34, that the $ID_B$ of the optical disc recorder/player 100 is registered in the registration list. If the result of checking shows that the $ID_B$ of the optical disc recorder/player 100 is not registered in the registration list, the security module 13 will judge that the optical disc recorder/player 100 is an illegal unit, and the protocol will be closed.

On the other hand, if the checking result proves that the $ID_B$ of the optical disc recorder/player 100 is registered in the registration list and the optical disc recorder/player 100 is legal, namely, that both the security module 13 and optical disc recorder/player 100 are legal, the security module 13 and optical disc recorder/player 100 will generate and share a session key Kse.

Next, the security module 13 and optical disc recorder/player 100 check the version numbers of the registration lists in their counterparts. When one of the security module 13 and optical disc recorder/player 100 has a registration list with a newer version number than that of the registration list in the other, it goes to step P114 or P115 (P14 or P15 in FIG. 10) where it will send its own new registration list to the other. The other thus receiving the registration list having the newer version number will check the digital signature TCSig made by the center TC, included in the registration list. If the digital signature is judged to pass the checking, the other will update, using the new registration list, its own old registration list.

Step P16 and subsequent steps are similar to those shown in FIG. 10.

Note that the registration list may be sent during or after transmission of content data.

<Playback Procedure in the Third Embodiment (Detail 2)>

FIG. 29 shows an example of the procedure in the first embodiment shown in FIG. 11, using the registration list. That is, FIG. 29 shows a data playback procedure in which first the version number of the registration list in one of the security module 13 and optical disc recorder/player 100 is judged to be newer or older than that of the registration list in the other and then the registration list having the newer version number is used to check the ID of the counterpart.

As shown in FIG. 29, the security module 13 goes to step P122 (P22 in FIG. 11) where it will make a digital signature to a bit string consisting of the random numbers $R_A$ and $R_B$, value $V_A$ and a registration list version number $RevV_A$ to acquire $Sig_A$, append a public key certificate $Cert_A$ to these $R_A$, $R_B$, $V_A$, $RegV_A$ and $Sig_A$, and send them to the optical disc recorder/player 100.

Receiving $Cert_A$, $R_A$, $R_B$, $V_A$, $RegV_A$ and $Sig_A$ from the security module 13, the optical disc recorder/player 100 checks the public key certificate $Cert_A$ and digital signature $Sig_A$. When the optical disc recorder/player 100 judges that the certificate can pass the checking, the random number $R_B$ returned from the security module 13 is equal to a one previously generated and the digital signature $Sig_A$ is correct, it goes to step P123 (P23 in FIG. 11) where it will generate a random number $K_B$, make a calculation of $V_B=K_B \cdot G$, and make a digital signature to a bit string consisting of the random numbers $R_B$ and $R_A$, value $V_B$ and version number $RegV_B$ of the registration list in the optical disc recorder/player 100 to acquire $Sig_B$. The optical disc recorder/player 100 appends a public key certificate $Cert_B$ to these $R_B$, $R_A$, $V_B$, $RegV_B$ and $Sig_B$, and sends them to the security module 13. Receiving $Cert_B$, $R_B$, $R_A$, $V_B$, $RegV_B$ and $Sig_B$ from the optical disc recorder/player 100, the security module 13 will check the public key certificate $Cert_B$ and digital signature $Sig_B$. When they are judged to pass the checking, the security module 13 will go to a next step.

If both the security module 13 and optical disc recorder/player 100 mutually check that their counterparts are legal, they will generate and share a session key Kse. Also, when both the security module 13 and optical disc recorder/player 100 are judged to be legal, they will check the version numbers of the registration lists in their counterparts.

When the registration lists owned by the security module 13 and optical disc recorder/player 100 are judged to be the same in version number as each other, the optical disc recorder/player 100 and security module 13 will mutually check IDs of their counterparts using their own registration lists to see that they are registered in the registration lists in their counterparts. If the checking result shows that the IDs are so registered, they go to step P26. If the security module 13 finds that the $ID_B$ of the optical disc recorder/player 100 is not registered in its own registration list, it will determine the optical disc recorder/player 100 to be an illegal unit, and exit the protocol. Similarly, if the optical disc recorder/player 100 finds that the $ID_A$ of the security module 13 is not registered in its own registration list, it will determine that the security module 13 is an illegal medium, and exit the protocol.

On the other hand, when it is mutually judged by the security module 13 and optical disc recorder/player 100 that the version number of the registration list in one of them is newer than that of the registration list in the other, the one goes to step P124 or P125 (P24 or P25 in FIG. 11) where it will send its own registration list to the other, and the other thus receiving the registration list with the newer version number will check the ID of its counterpart using the received registration list and thus update the registration list having the older version number.

Step P26 and subsequent steps are similar to those in FIG. 11.

Fourth Embodiment (IM4, Dev4

Next, the fourth embodiment of the present invention will be described herebelow:

In the fourth embodiment of the present invention, the registration list is stored, instead of the aforementioned revocation list, in the nonvolatile memory 44 of the security module 23 in the memory medium 20 and nonvolatile memory 210 in the memory recorder/player 200, having been described concerning the second embodiment. Since the memory medium 20 and memory recorder/player 200 in the fourth embodiment are the same as in FIGS. 12 to 14, their construction will not be described herein.

<Recording Procedure in the Fourth Embodiment>

How the memory recorder/player 200 according to the fourth embodiment of the present invention records data to the memory medium 20 will be described herebelow with reference to FIGS. 30 to 33. Note that FIGS. 30 to 33 are generally similar to FIGS. 15 to 18 showing the second embodiment and the procedure in the fourth embodiment is also generally the same as that in the second embodiment. So, only differences of the procedures shown in FIGS. 30 to 33 from that in the second embodiment shown in FIGS. 15 to 18, will be described below.

Figure 30:
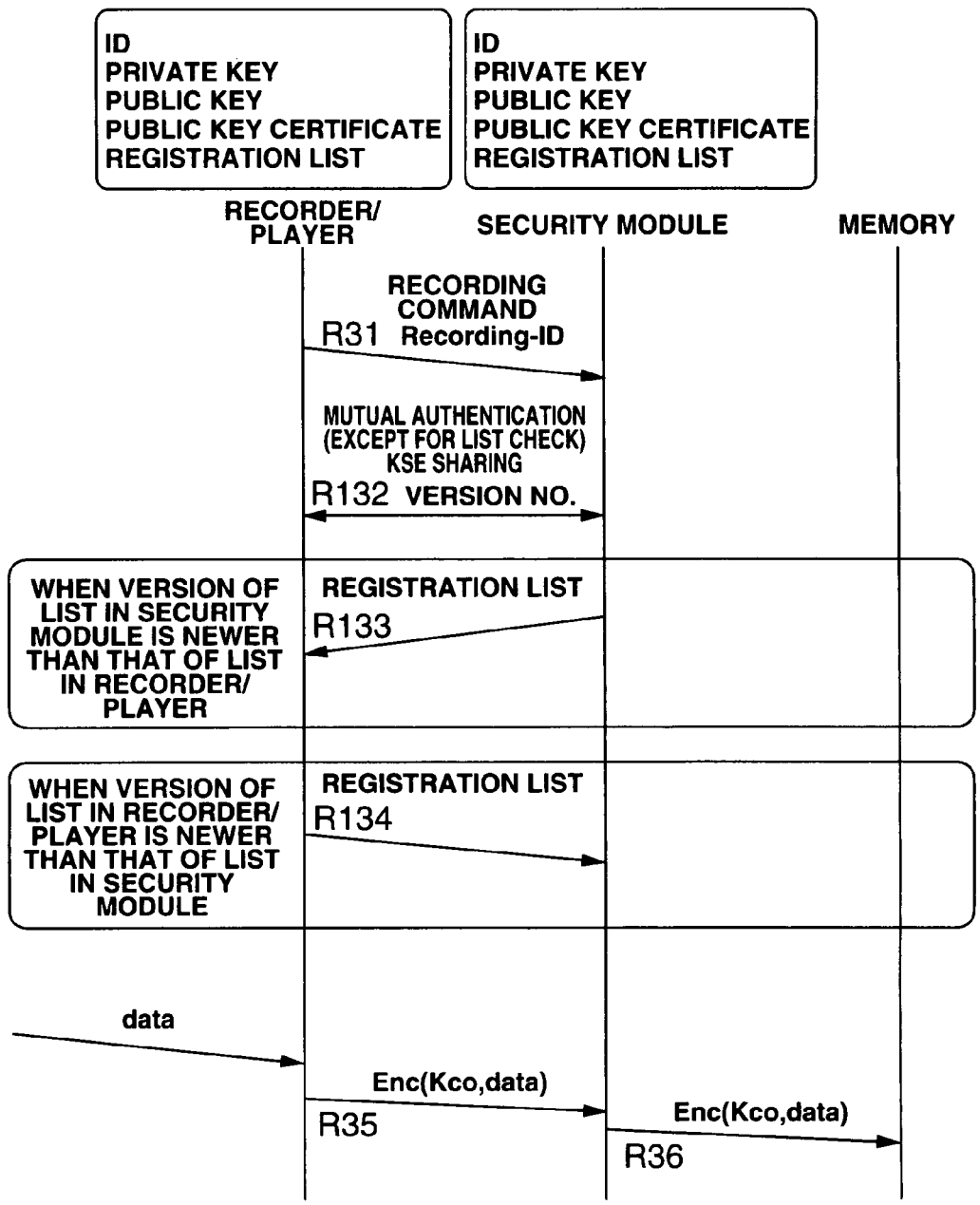
FIG. 30 shows a basic procedure for writing data to a memory as the data recording medium according to the fourth embodiment of the present invention.

FIG. 30 shows a procedure generally similar to that in FIG. 15. At step R132 (R32 in FIG. 15), the memory recorder/player 200 and security module 23 exchange the version numbers of their own registration lists between them.

At steps R133 and R134 (R33 and R34 in FIG. 15), when one of the memory recorder/player 200 and security module 13, having a newer registration list than that of the other, will send its own registration list to the other. On the other hand, the other having the older registration list receives the newer registration list, checks its validity, and then updates its own registration list to the received newer registration list.

Note that at steps R133 and R134, the registration list may be sent before or after data is recorded at subsequent step R35. That is, after data is recorded at step R35, the registration list may be sent at step R133 or R134.

<Recording Procedure in the Fourth Embodiment (Detail 1)>

Figure 31:
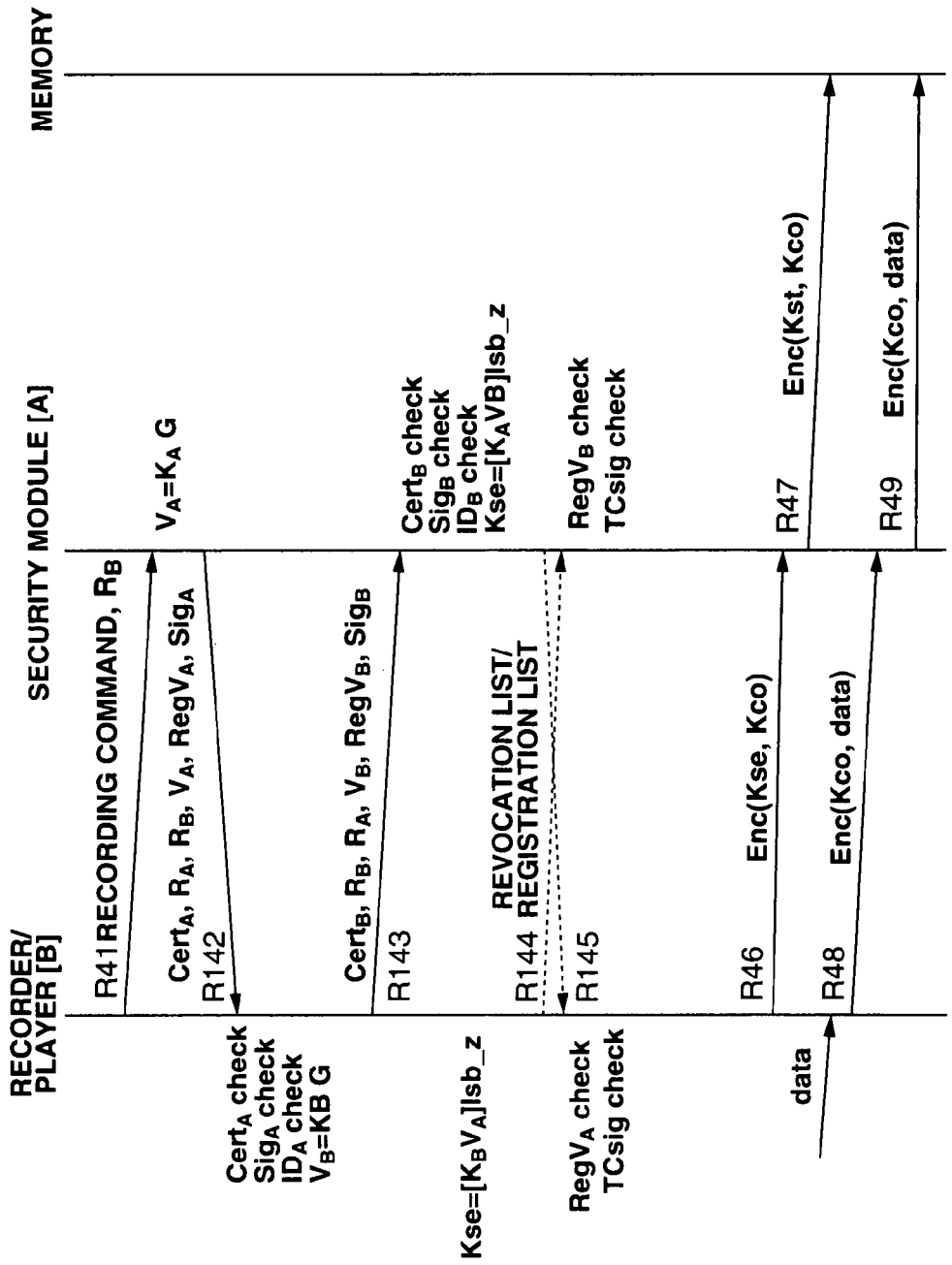
FIG. 31 shows in detail the procedure for writing data to the memory as the data recording medium according to the fourth embodiment of the present invention.

FIG. 31 shows in detail a procedure shown in FIG. 30 and which is followed by the memory recorder/player 200 according to the fourth embodiment, to record data to the memory medium 20. This procedure is generally similar to that shown in FIG. 16.

As shown in FIG. 31, the security module 23 goes to step R142 (R42 in FIG. 16) where it will make a digital signature to a bit string consisting of the random numbers $R_A$ and $R_B$, value $V_A$ and a registration list version number $RegV_A$ to acquire $Sig_A$. The security module 23 appends a public key certificate $Cert_A$ to these $R_A$, $R_B$, $V_A$, $RegV_A$ and $Sig_A$, and sends them to the memory recorder/player 200. Note that when the security module 23 has or uses no registration list, it will uses "0" for example as the version number.

Receiving $Cert_A$, $R_A$, $R_B$, $V_A$, $RegV_A$ and $Sig_A$ from the security module 23, the memory recorder/player 200 checks the public key certificate $Cert_A$, digital signature $Sig_A$ and $ID_A$ of the security module 23. When the memory recorder/player 200 judges that the certificate can pass the checking, the random number $R_B$ returned from the security module 23 is equal to a one previously generated and the digital signature $Sig_A$ is correct, it will check, using the registration list stored in its own nonvolatile memory 210, that the $ID_A$ of the memory medium 20 is registered in the registration list. If the result of checking shows that the $ID_A$ of the memory medium 20 is not registered in the registration list, the memory recorder/player 200 will judge that the memory medium 20 is an illegal medium, and the protocol will be closed.

On the other hand, the result of checking shows that the $ID_A$ is registered in the registration list and the memory medium 20 is legal, the memory recorder/player 200 goes to step R143 (R43 in FIG. 16) where it will generate a random number $K_B$, make a calculation of $V_B = K_B \cdot G$, make a digital signature to a bit string consisting of the random numbers $R_B$ and $R_A$, value $V_B$ and version number $RegV_B$ of the registration list owned by the memory recorder/player 200 to acquire $Sig_B$. The memory recorder/player 200 will append a public key certificate $Cert_B$ to these $R_B$, $R_A$, $V_B$, $RegV_B$ and $Sig_B$ and send them to the security module 23. It should be noted that when the memory recorder/player 200 has or uses no registration list, it will use for example "0" for the version number.

Receiving $Cert_B$, $R_B$, $R_A$, $V_B$, $RegV_B$ and $Sig_B$ from the memory recorder/player 200, the security module 23 checks the public key certificate $Cert_B$, digital signature $Sig_B$ and $ID_B$. When the result of checking shows that they can pass the checking, the security module 23 checks, using the registration list stored in its own nonvolatile memory 44, that the $ID_B$ of the memory recorder/player 200 is registered in the registration list. If the result of checking shows that the $ID_B$ of the memory recorder/player 200 is not registered in the registration list, the security module 23 will judge that the memory recorder/player 200 is an illegal unit, and the protocol will be closed.

On the other hand, if the checking result proves that the $ID_B$ of the memory recorder/player 200 is registered in the registration list and the memory recorder/player 200 is legal, namely, that both the security module 23 and memory recorder/player 200 are legal, the security module 23 and memory recorder/player 200 will generate and share a session key Kse.

Next, the security module 23 and memory recorder/player 200 check the version numbers of the registration lists in their counterparts. When one of the security module 23 and memory recorder/player 200 owns a registration list whose version number is newer than that of the registration list in the other, it goes to step R144 or R145 (R44 or R45 in FIG. 16) where it will send its own new registration list to the other. The other thus receiving the registration list having the newer version number will check the digital signature TCSig made by the center TC, included in the registration list. If the digital signature is judged to pass the checking, the other will update, using the new registration list, its own old registration list.

Step R46 and subsequent steps are similar to those shown in FIG. 16.

Note that the registration list may be sent during or after transmission of content data.

<Recording Procedure in the Fourth Embodiment (Detail 2)>

Figure 32:
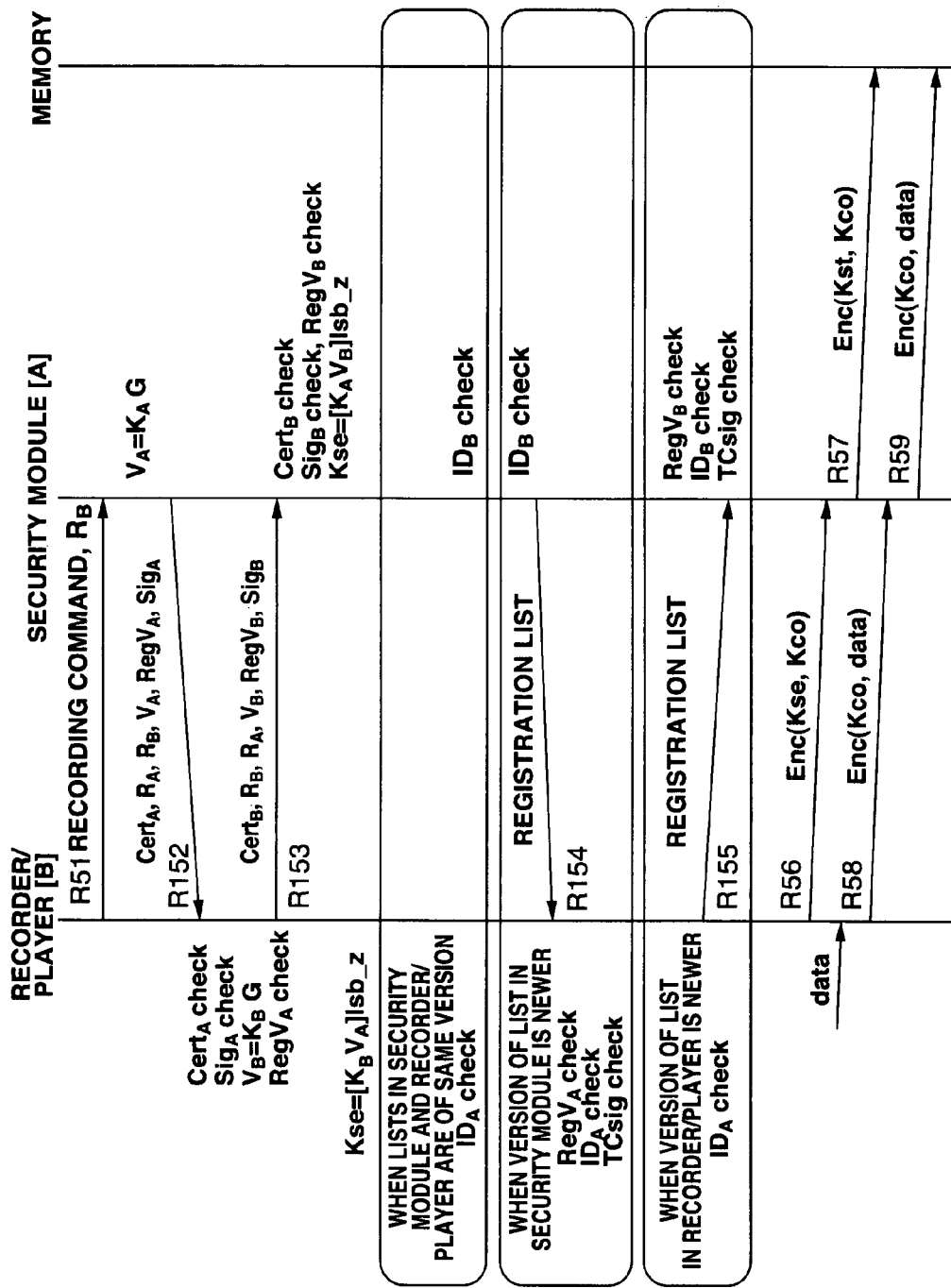
FIG. 32 shows another example of the procedure for writing data to the memory as the data recording medium according to the fourth embodiment of the present invention.

FIG. 32 shows an example of the procedure in the second embodiment shown in FIG. 17, using the registration list. That is, FIG. 32 shows a data recording procedure in which first the version number of the registration list in one of the security module 23 and memory recorder/player 200 is judged to be newer or older than that of the registration list in the other and then the registration list having the newer version number is used to check the ID of the counterpart.

As shown in FIG. 32, the security module 23 goes to step R152 (R52 in FIG. 17) where it will make a digital signature to a bit string consisting of the random numbers $R_A$ and $R_B$, value $V_A$ and a registration list version number $RevV_A$ to acquire $Sig_A$, append a public key certificate $Cert_A$ to these $R_A$, $R_B$, $V_A$, $RegV_A$ and $Sig_A$, and send them to the memory recorder/player 200.

Receiving $Cert_A$, $R_A$, $R_B$, $V_A$, $RegV_A$ and $Sig_A$ from the security module 23, the memory recorder/player 200 checks the public key certificate $Cert_A$ and digital signature $Sig_A$. When the memory recorder/player 200 judges that the certificate can pass the checking, the random number $R_B$ returned from the security module 23 is equal to a one previously generated and the digital signature $Sig_A$ is correct, it will take a step S153 (R53 in FIG. 17) to generate a random number $K_B$, make a calculation of $V_B = K_B \cdot G$, and make a digital signature to a bit string consisting of the random numbers $R_B$ and $R_A$, value $V_B$ and version number $RegV_B$ of the registration list in the memory recorder/player 200 to acquire $Sig_B$. The memory recorder/player 200 appends a public key certificate $Cert_B$ to these $R_B$, $R_A$, $V_B$ and $RegV_B$ to acquire $Sig_B$. The memory recorder/player 200 appends the public key certificate $Cert_B$ to these $R_B$, $R_A$, $V_B$ and $RegV_B$, and sends them to the security module 23.

Receiving $Cert_B$, $R_B$, $R_A$, $V_B$, $RegV_B$ and $Sig_B$ from the memory recorder/player 200, the security module 23 will check the public key certificate $Cert_B$ and digital signature $Sig_B$. When they are judged to pass the checking, the security module 23 will go to a next step.

If both the security module 23 and memory recorder/player 200 mutually judge that their counterparts are legal, they will generate and share a session key Kse.

Also, when both the security module 23 and memory recorder/player 200 are judged to be legal, they will check the version numbers of the registration lists in their counterparts.

When the registration lists owned by the security module 23 and memory recorder/player 200 are judged to be the same in version number as each other, the memory recorder/player 200 and security module 23 will mutually check IDs of their counterparts using their own registration lists to see that they are registered in the registration lists in their counterparts. If the checking result shows that the IDs are so registered, they will go to step R56. Also, if the security module 23 finds that the $ID_B$ of the memory recorder/player 200 is not registered in its own registration list, it will determine the memory recorder/player 200 to be an illegal unit, and exit the protocol. Similarly, if the memory recorder/player 200 finds that the $ID_A$ of the security module 23 is not registered in its own registration list, it will determine that the security module 23 is an illegal medium, and the protocol will be closed.

On the other hand, when it is mutually judged by the security module 23 and memory recorder/player 200 that the version number of the registration list in one of them is newer than that of the registration list in the other, the one goes to step R154 or R155 (R54 or R55 in FIG. 17) where it will send its own registration list to the other, and the other thus receiving the registration list with the newer version number will check the ID of its counterpart using the received registration list and thus update its own registration list having the older version number using the registration list having the newer version number.

Step R56 and subsequent steps are similar to those in FIG. 17.

<Recording Procedure in the Fourth Embodiment (Variant)>

Figure 33:
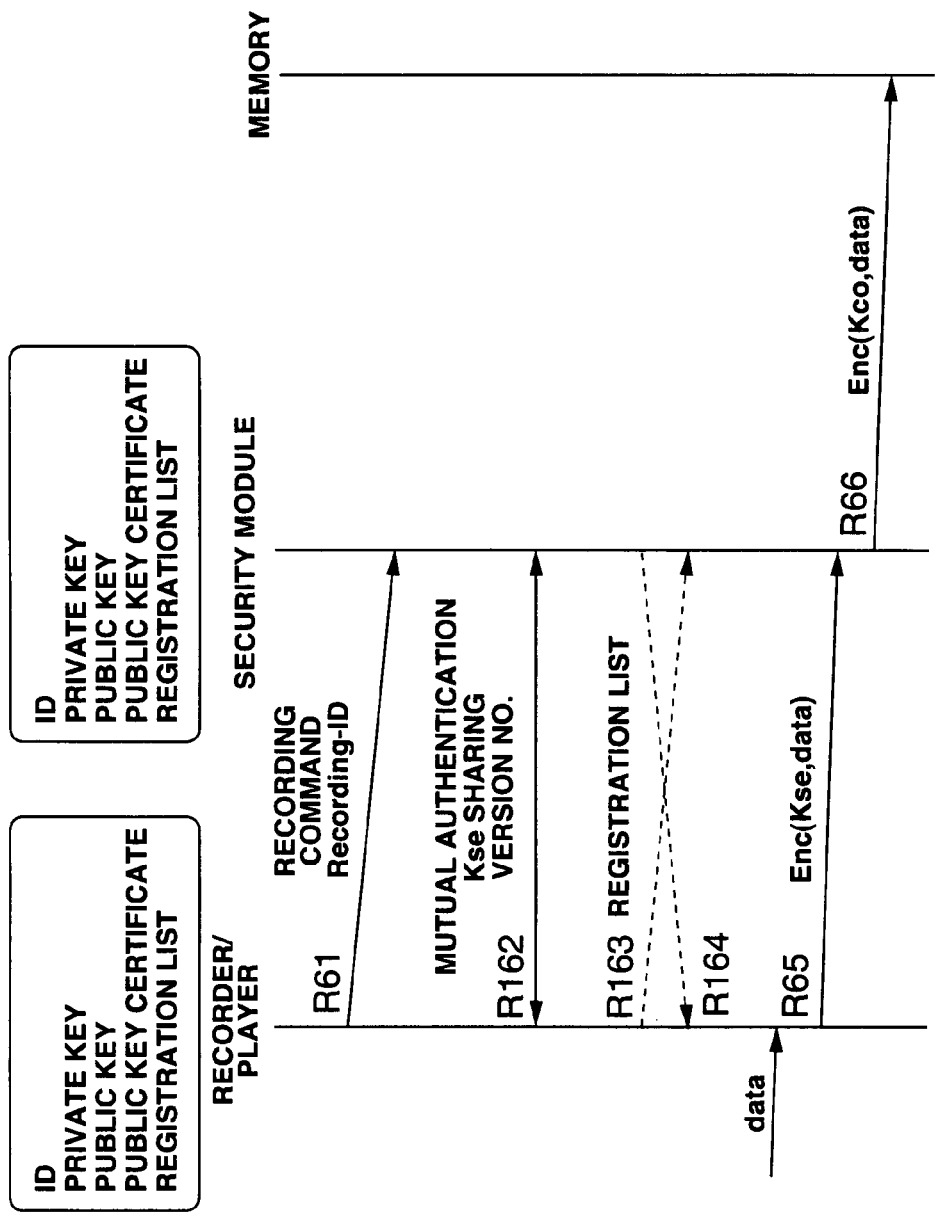
FIG. 33 shows still another example of the procedure for writing data to the memory as the data recording medium according to the second embodiment of the present invention.

In the fourth embodiment, the data may be recorded into the memory unit 22 of the memory medium 20 by following the procedure shown in FIG. 33 (similar to FIG. 18).

As shown in FIG. 33, the memory recorder/player 200 and security module 23 exchange between them version numbers of their own registration lists at step R162 (R62 in FIG. 18).

Also, at steps R163 and R164 (R63 and R64 in FIG. 18), one of the memory recorder/player 200 and security module 23, having a registration list whose version number is newer than that of the registration list in the other, will update its own old registration list with the new registration list.

Step R65 and subsequent steps are similar to those in FIG. 18.

<Playback Procedure in the Fourth Embodiment>

Next, a procedure in which the memory recorder/player 200 according to the fourth embodiment reads or plays back data from the memory unit 22 of the memory medium 20, will be described herebelow with reference to FIGS. 34 to 37. Note that FIGS. 34 to 37 are generally similar to FIGS. 19 to 22 showing the second embodiment and the procedure in the fourth embodiment is also generally the same as that in the second embodiment. So, only differences of the procedures shown in FIGS. 34 to 37 from that in the second embodiment shown in FIGS. 19 to 22, will be described in the following.

Figure 34:
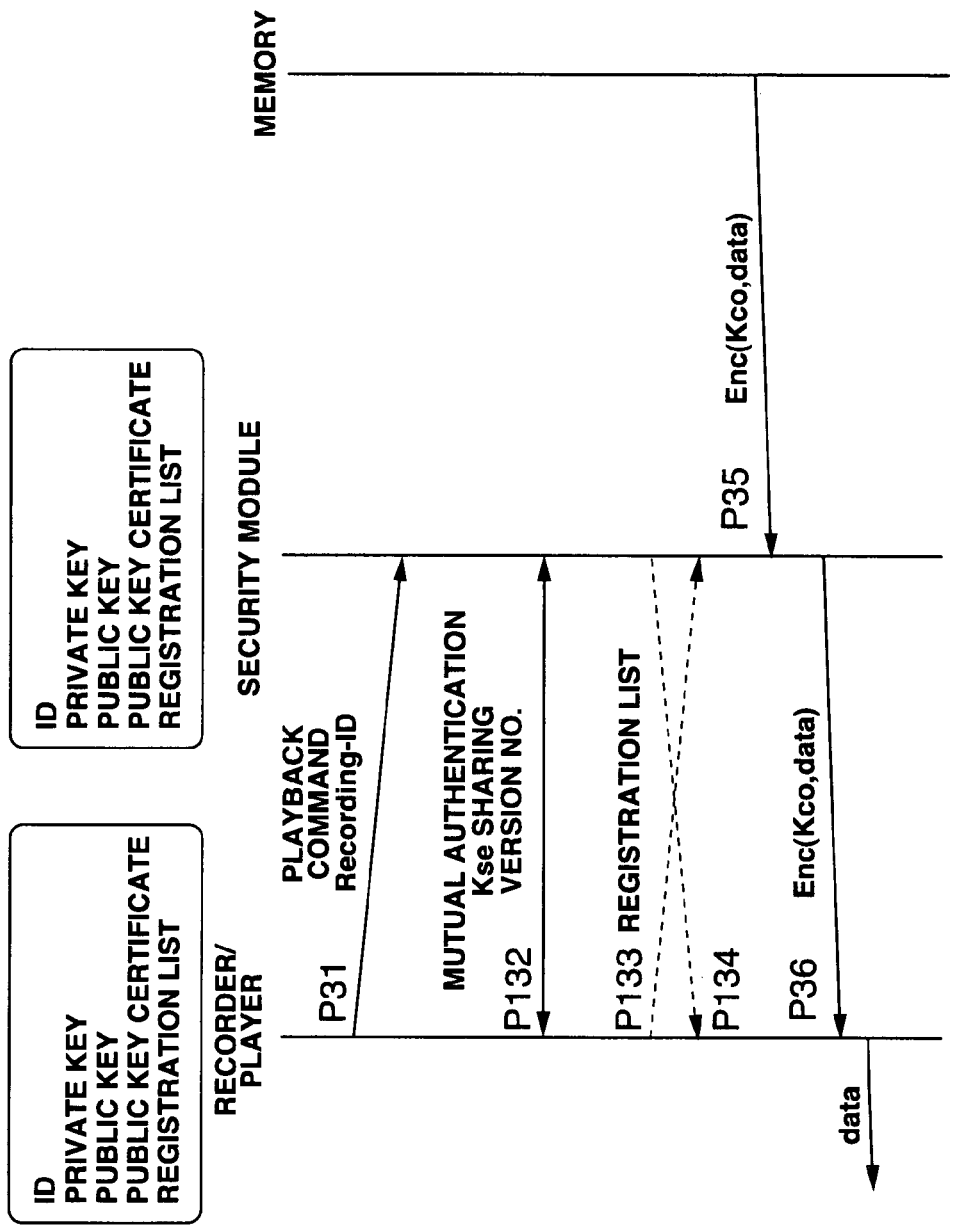
FIG. 34 shows a basic procedure for reading data from the memory as the data recording medium according to the fourth embodiment of the present invention.

As shown in FIG. 34, the memory recorder/player 200 and security module 23 go to step P132 (P32 in FIG. 19) where they will mutually check that IDs of their counterparts are included in their own registration lists and send the version numbers of their own registration lists to each other.

At steps P133 and P134 (P33 and P34 in FIG. 19), the memory recorder/player 200 and security module 23 mutually check that one of them has a registration list with a newer version than that of the registration list in the other. The one will send its own registration list to the other, and the other thus receiving the registration list will update its own registration list with the received one as in the above.

Step P35 and subsequent steps are similar to those in FIG. 19.

<Playback Procedure in the Fourth Embodiment (Detail 1)>

Figure 35:
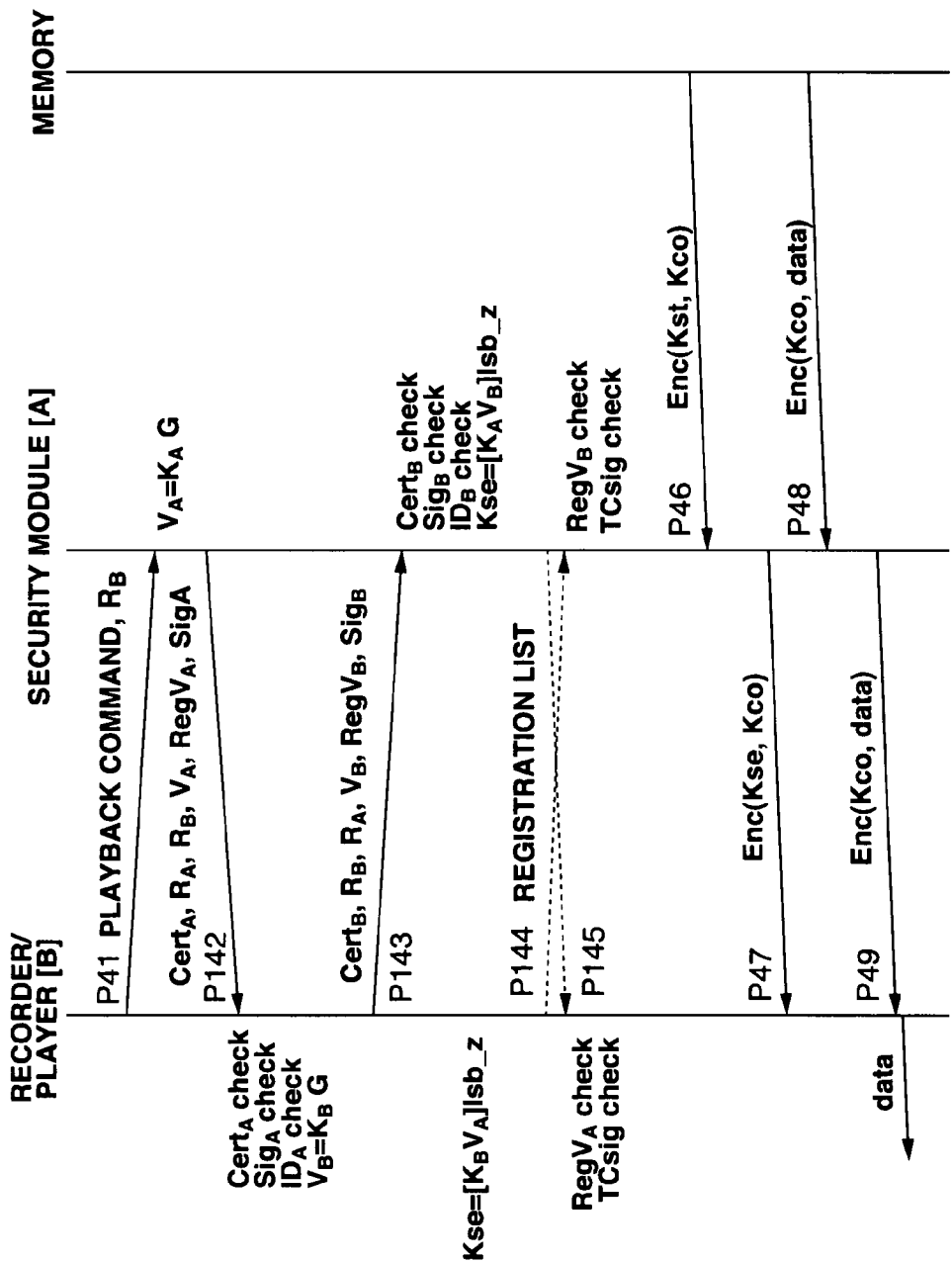
FIG. 35 shows in detail the procedure for reading data from the memory as the data recording medium according to the fourth embodiment of the present invention.

FIG. 35 shows in detail a procedure shown in FIG. 20 and which is followed by the memory recorder/player 200 according to the third embodiment, to play back or read data from the memory unit 22 of the memory medium 20. This procedure in FIG. 35 is generally similar to that shown in FIG. 20.

As shown in FIG. 35, the security module 23 goes to step P142 (P42 in FIG. 20) where it will make a digital signature to a bit string consisting of the random numbers $R_A$ and $R_B$, value $V_A$ and a registration list version $RegV_A$ to acquire $Sig_A$. The security module 23 appends a public key certificate $Cert_A$ to these $R_A$, $R_B$, $V_A$, $RegV_A$ and $Sig_A$, and sends them to the memory recorder/player 200. Note that when the security module 23 has or uses no registration list, it will uses "0" for example as the version number.

Receiving $Cert_A$, $R_A$, $R_B$, $V_A$, $RegV_A$ and $Sig_A$ from the security module 23, the memory recorder/player 200 checks the public key certificate $Cert_A$, digital signature $Sig_A$ and $ID_A$ of the security module 23. When the memory recorder/player 200 judges that the certificate can pass the checking, the random number $R_B$ returned from the security module 23 is equal to a one previously generated and the digital signature $Sig_A$ is correct, it will check, using the registration list, that the $ID_A$ of the memory medium 20 is registered in the registration list. If the result of checking shows that the $ID_A$ of the memory medium 20 is not registered in the registration list, the memory recorder/player 200 will judge that the memory medium 20 is an illegal medium, and the protocol will be closed.

On the other hand, if the result of checking shows that the $ID_A$ is registered in the registration list and the memory medium 20 is legal, the memory recorder/player 200 goes to step P143 (P43 in FIG. 20) where it will generate a random number $K_B$, make a calculation of $V_B = K_B \cdot G$, make a digital signature to a bit string consisting of the random numbers $R_B$ and $R_A$, value $V_B$ and version number $RegV_B$ of the registration list owned by the memory recorder/player 200 to acquire $Sig_B$. The memory recorder/player 200 will append a public key certificate $Cert_B$ to these $R_B$, $R_A$, $V_B$, $RegV_B$ and $Sig_B$ and send them to the security module 23. It should be noted that when the memory recorder/player 200 has or uses no registration list, it will use for example "0" for the version number.

Receiving $Cert_B$, $R_B$, $R_A$, $V_B$, $RegV_B$ and $Sig_B$ from the memory recorder/player 200, the security module 23 checks the public key certificate $Cert_B$, digital signature $Sig_B$ and $ID_B$. If the result of checking shows that they can pass the checking, the security module 23 checks, using the registration list, that the $ID_B$ of the memory recorder/player 200 is registered in the registration list. If the result of checking shows that the $ID_B$ of the memory recorder/player 200 is not registered in the registration list, the security module 23 will judge that the memory recorder/player 200 is an illegal unit, and the protocol will be closed.

On the other hand, if the checking result proves that the $ID_B$ of the memory recorder/player 200 is registered in the registration list and the memory recorder/player 200 is legal, namely, that both the security module 23 and memory recorder/player 200 are legal, the security module 23 and memory recorder/player 200 will generate and share a session key Kse.

Next, the security module 23 and memory recorder/player 200 check the version numbers of the registration lists in their counterparts. When one of the security module 23 and memory recorder/player 200 has a registration list whose version number is newer than that of the registration list in the other, it goes to step P144 or P145 (P44 or P45 in FIG. 20) where it will send its own new registration list to the other. The other thus receiving the registration list having the newer version number will check the digital signature TCSig made by the center TC, included in the registration list. If the digital signature is judged to pass the checking, the other will update, using the new registration list, its own old registration list.

Step P46 and subsequent steps are similar to those shown in FIG. 20.

Note that the registration list may be sent during or after transmission of content data.

<Playback Procedure in the Fourth Embodiment (Detail 2)>

Figure 36:
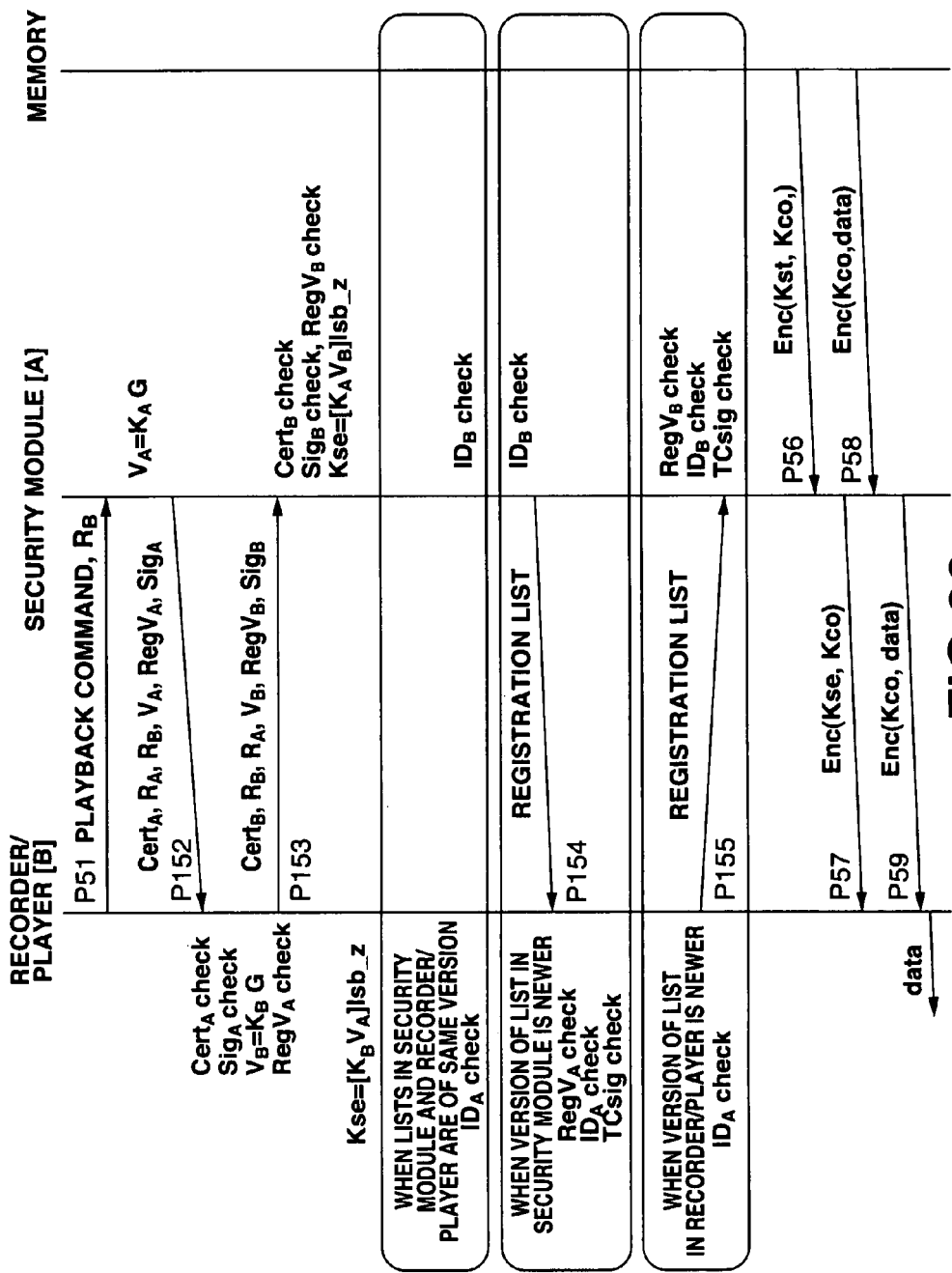
FIG. 36 shows another example of the procedure for reading data from the memory as the data recording medium according to the fourth embodiment of the present invention.

FIG. 36 shows an example of the procedure in the second embodiment shown in FIG. 21, using the registration list. That is, FIG. 36 shows a data playback procedure in which first the version number of the registration list in one of the security module 23 and memory recorder/player 200 is judged to be newer or older than that of the registration list in the other and then the registration list having the newer version number is used to check the ID of the counterpart.

As shown in FIG. 36, the security module 23 goes to step P152 (P52 in FIG. 21) where it will make a digital signature to a bit string consisting of the random numbers $R_A$ and $R_B$, value $V_A$ and a list version number $RevV_A$ to acquire $Sig_A$, append a public key certificate $Cert_A$ to these $R_A$, $R_B$, $V_A$, $RegV_A$ and $Sig_A$, and send them to the memory recorder/player 200.

Receiving $Cert_A$, $R_A$, $R_B$, $V_A$, $RegV_A$ and $Sig_A$ from the security module 23, the memory recorder/player 200 checks the public key certificate $Cert_A$ and digital signature $Sig_A$. When the memory recorder/player 200 judges that the certificate can pass the checking, the random number $R_B$ returned from the security module 23 is equal to a one previously generated and the digital signature $Sig_A$ is correct, it goes to step P153 (R53 in FIG. 21) where it will generate a random number $K_B$, make a calculation of $V_B=K_B \cdot G$, and make a digital signature to a bit string consisting of the random numbers $R_B$ and $R_A$, value $V_B$ and version number $RegV_B$ of the registration list in the memory recorder/player 200 to acquire $Sig_B$. The memory recorder/player 200 appends a public key certificate $Cert_B$ to these $R_B$, $R_A$, $V_B$, $RegV_B$ and $Sig_B$, and sends them to the security module 23.

Receiving $Cert_B$, $R_B$, $R_A$, $V_B$, $RegV_B$ and $Sig_B$ from the memory recorder/player 200, the security module 23 will check the public key certificate $Cert_B$ and digital signature $Sig_B$. When they are judged to pass the checking, the security module 23 will go to a next step.

If both the security module 23 and memory recorder/player 200 mutually check that their counterparts are legal, they will generate and share a session key Kse. Also, when both the security module 23 and memory recorder/player 200 are judged to be legal, they will check the version numbers of the registration lists in their counterparts.

When the registration lists owned by the security module 23 and memory recorder/player 200 are judged to be the same in version number as each other, the memory recorder/player 200 and security module 23 will mutually check IDs of their counterparts using their own registration lists to see that they are registered in the registration lists in their counterparts. If the checking result shows that the IDs are so registered, they will go to step P56. If the security module 23 finds that the $ID_B$ of the memory recorder/player 200 is not registered in its own registration list, it will determine the memory recorder/player 200 to be an illegal unit, and exit the protocol. Similarly, if the memory recorder/player 200 finds that the $ID_A$ of the security module 23 is not registered in its own registration list, it will determine that the security module 23 is an illegal medium, and exit the protocol.

On the other hand, when it is mutually judged by the security module 23 and memory recorder/player 200 that the version number of the registration list in one of them is newer than that of the registration list in the other, the one goes to P154 or P155 (P54 or P55 in FIG. 21) where it will send its own registration list to the other, and the other thus receiving the registration list with the newer version number will check the ID of its counterpart using the received registration list and thus update the registration list having the older version number.

Step P56 and subsequent steps are similar to those in FIG. 21.

<Playback Procedure in the Fourth Embodiment (Variant)>

Figure 37:
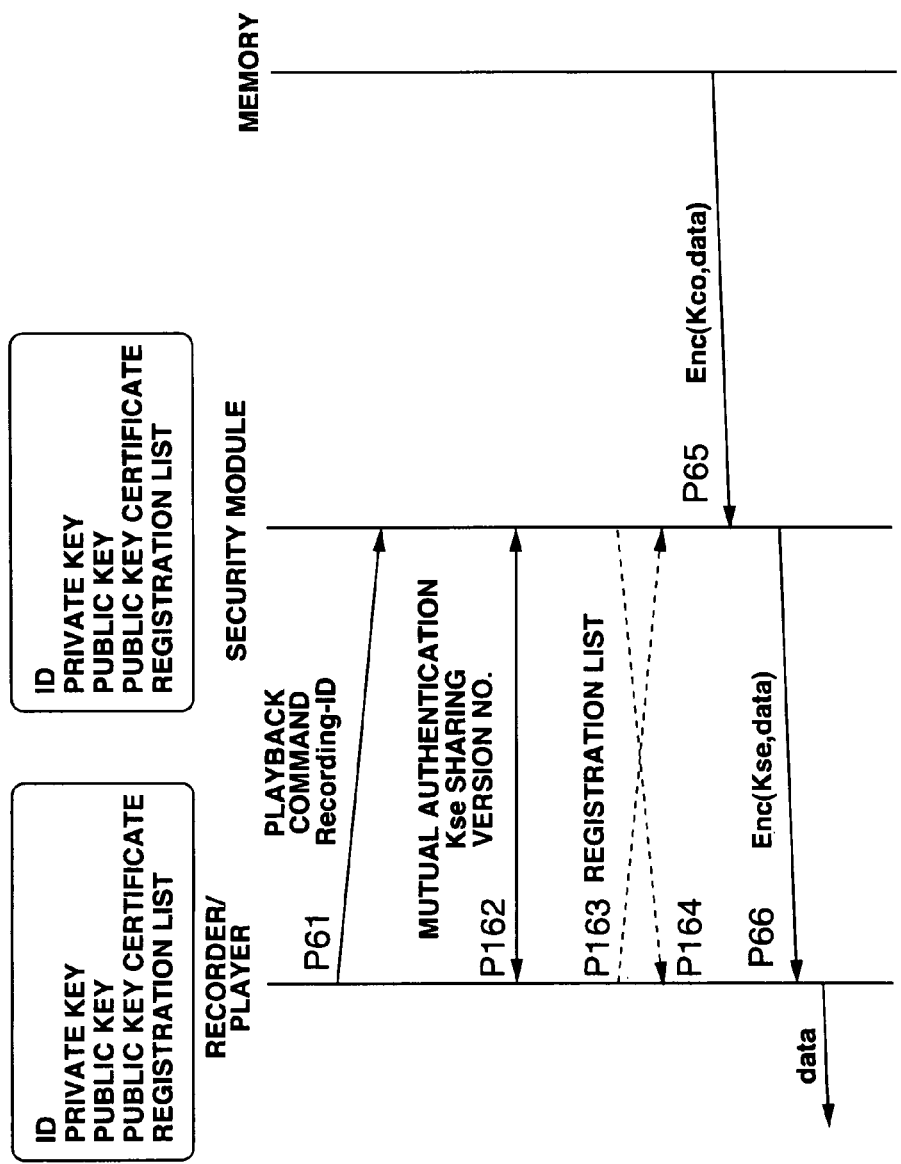
FIG. 37 shows still another example of the procedure for reading data from the memory as the data recording medium according to the fourth embodiment of the present invention.

In the fourth embodiment, the data may be read or played back from the memory unit 22 of the memory medium 20 by following the procedure shown in FIG. 37 (similar to FIG. 22).

As shown in FIG. 37, the memory recorder/player 200 and security module 23 exchange between them version numbers of their own registration lists at step P162 (P62 in FIG. 22).

Also, at steps P163 and P164 (P63 and P64 in FIG. 22), one of the memory recorder/player 200 and security module 23, having a registration list whose version number is newer than that of the registration list in the other, will update its own old registration list with the new registration list.

Step P65 and subsequent steps are similar to those in FIG. 22.

Fifth Embodiment (IM2, Dev2)

As having been described in the foregoing, the revocation lists are used to prevent illegal data copying in the first and second embodiments of the present invention, while the registration lists are used for the above purpose in the third and fourth embodiments. According to another aspect of the present invention, the revocation and registration lists can be used to more positively prevent illegal data copying.

Revocation list and registration list are used together or one of them is used preferentially while the other is left not used. When one of them is preferentially used, it should desirably be a revocation list of illegal units or media.

In case revocation and registration lists are used together, a list format shown in FIG. 38 for example can be used to differentiate between them. That is, the list format shown in FIG. 38 includes a differentiation between revocation and registration lists, version numbers of the lists, list of IDs of data recording media or recorder/player units whose private key has been revealed or exposed to outside (IDs of units or media to be revoked) when a list is a revocation list, list of IDs of legal data recording media or recorder/player units (IDs of registered units or media) when a list is a registration list, and a digital signature by the center TC.

The fifth embodiment of the present invention, using revocation and registration lists, will be described herebelow:

In the fifth embodiment, the revocation and registration lists are stored in the nonvolatile memory 34 of the security module 13 of the optical disc medium 10 and nonvolatile memory 110 of the optical disc recorder/player 100, included in the first and third embodiments. The optical disc medium 10 and optical disc recorder/player 100 included in the fifth embodiment are constructed as in FIGS. 1 to 3, so their construction will not be described any further.

<Recording Procedure in the Fifth Embodiment>

Figure 39:
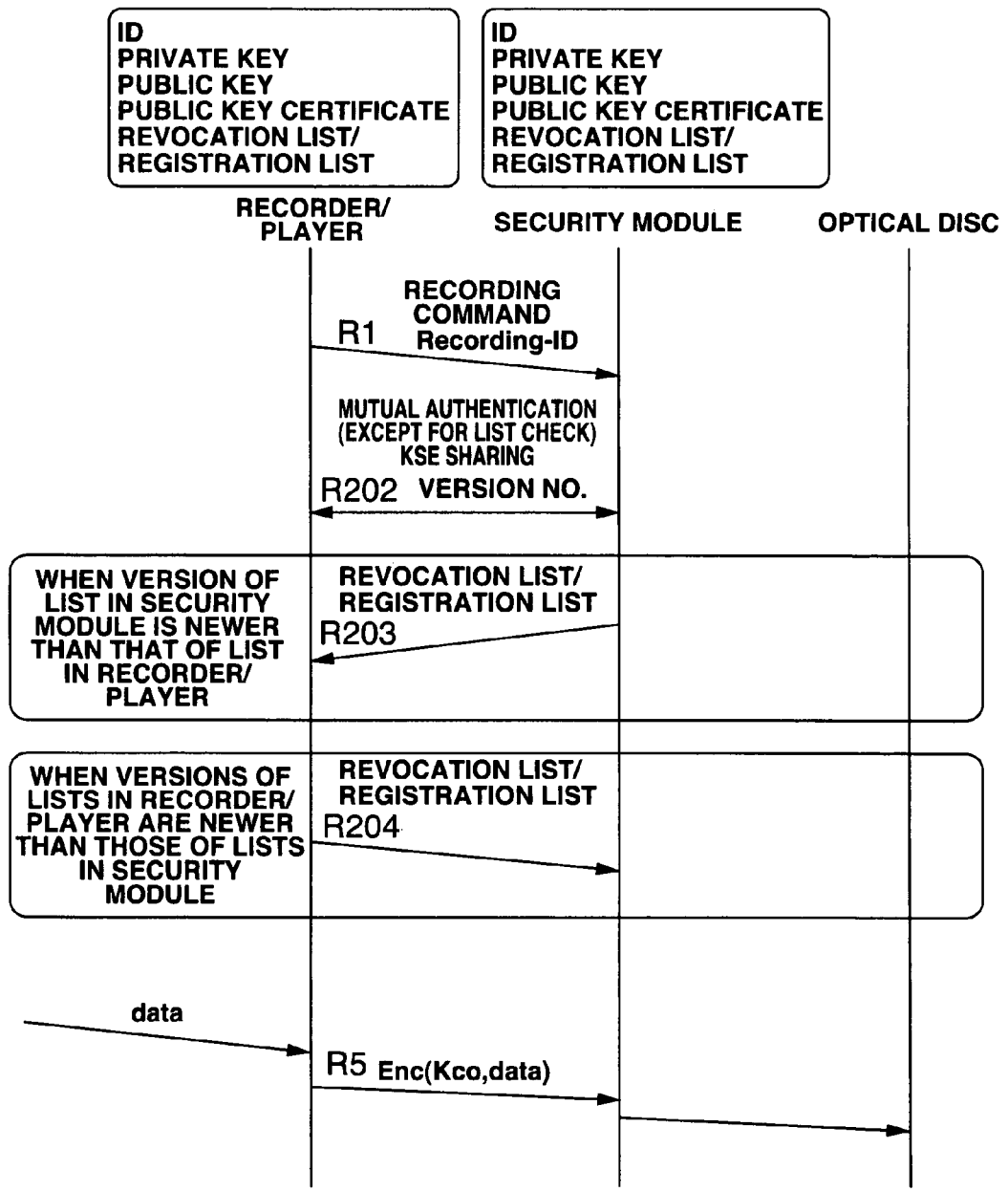
FIG. 39 shows a basic procedure for writing data to an optical disc as the data recording medium according to the fifth embodiment of the present invention.
Figure 40:
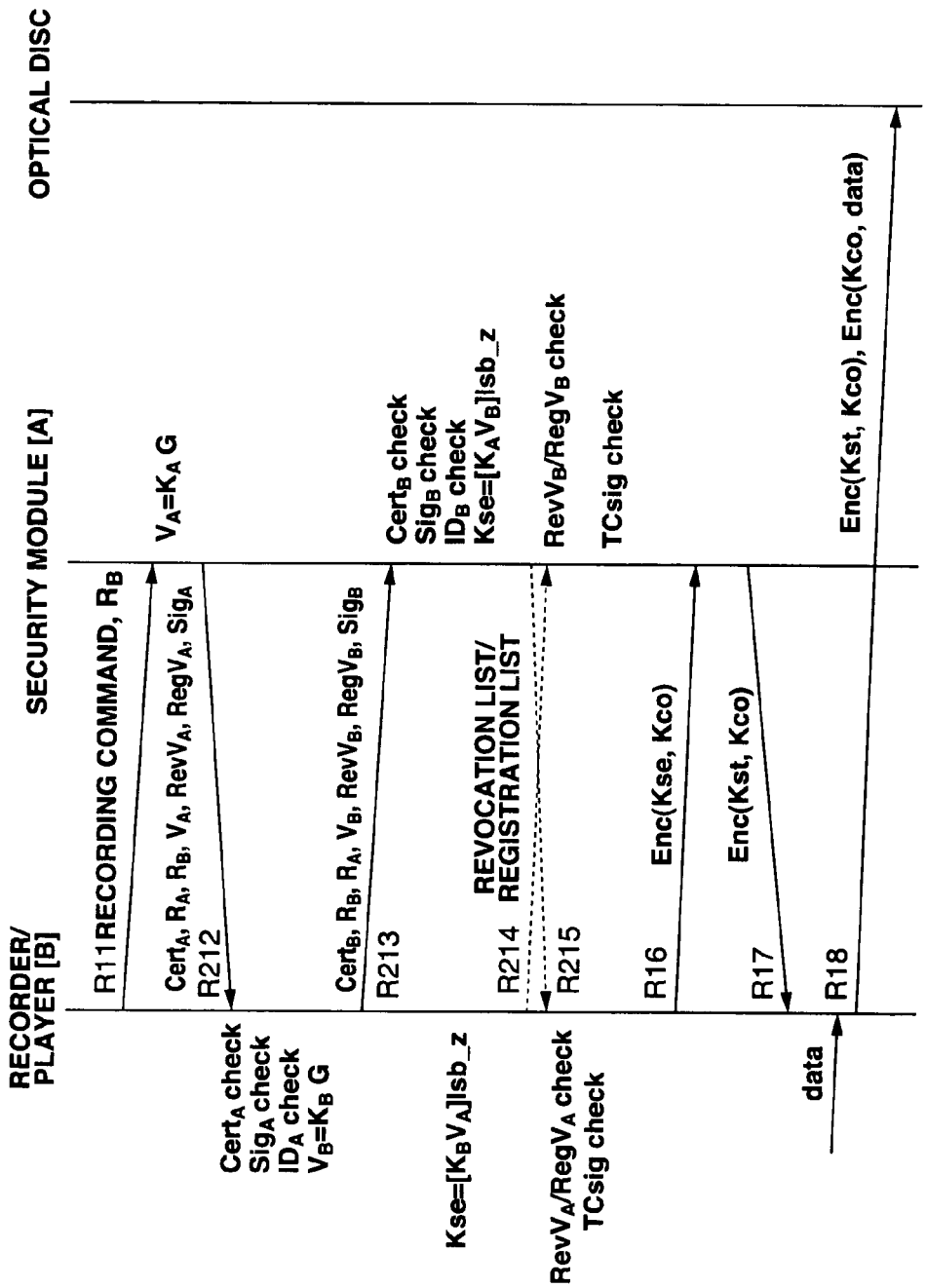
FIG. 40 shows in detail the procedure for writing data to the optical disc as the data recording medium according to the fifth embodiment of the present invention.
Figure 41:
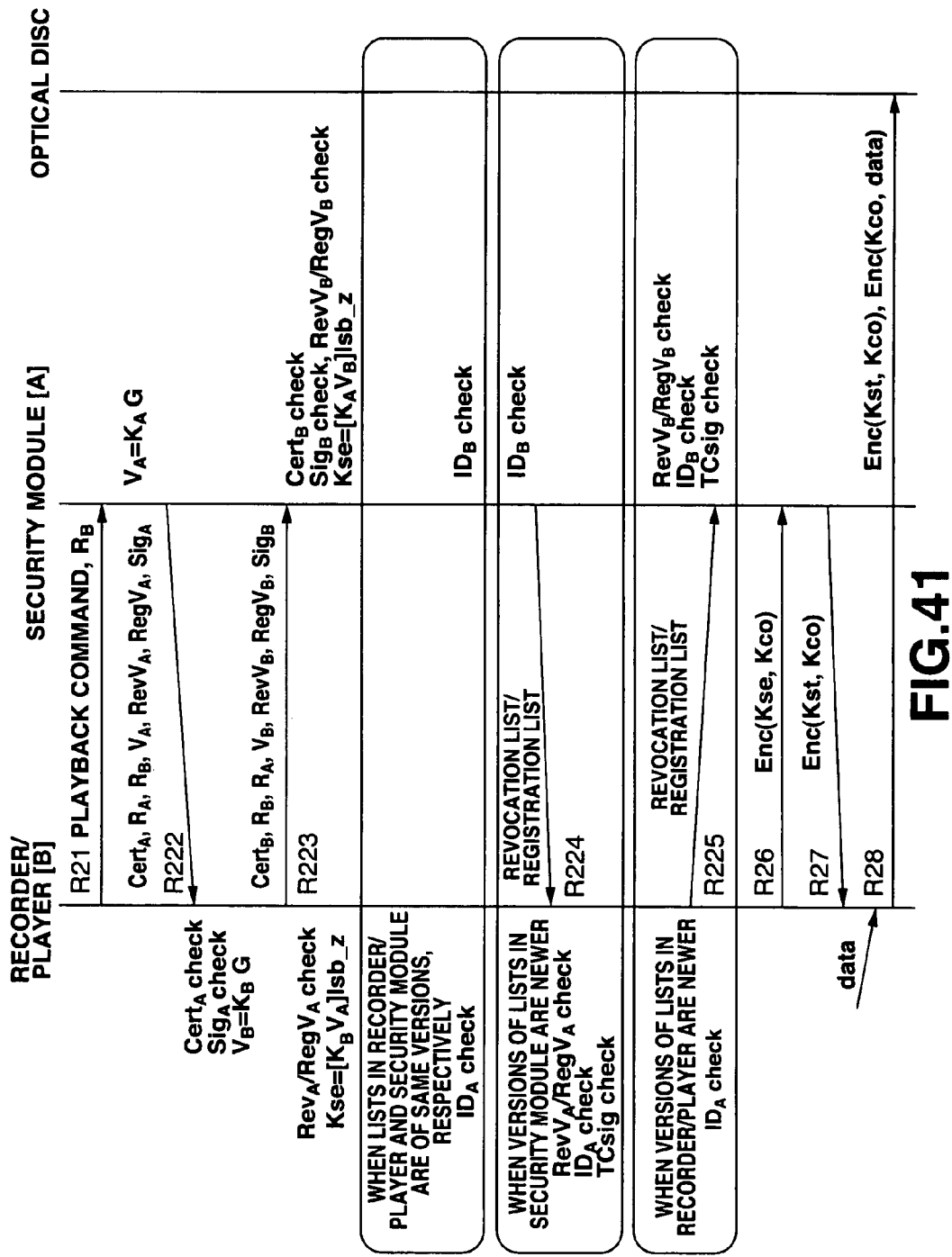
FIG. 41 shows another example of the procedure for writing data to the optical disc as the data recording medium according to the fifth embodiment of the present invention.

How the optical disc recorder/player 100 according to the fifth embodiment of the present invention records data to the optical disc medium 10 will be described herebelow with reference to FIGS. 39 to 41. Note that FIGS. 39 to 41 are generally similar to FIGS. 6 to 8 showing the first embodiment and also to FIGS. 24 to 26 showing the third embodiment and the procedure in the fifth embodiment is also generally the same as those in the first and third embodiments. So, only differences of the procedures shown in FIGS. 39 to 41 from those in the first embodiment shown in FIGS. 6 to 8 and the third embodiment shown in FIGS. 24 to 26, will be described below.

FIG. 39 shows a similar procedure to those shown in FIGS. 6 and 24. At step R202 (R2 in FIG. 6 and R102 in FIG. 24), the optical disc recorder/player 100 and security module 13 exchange between them the version numbers of their own revocation and registration lists (will be referred to as "list" wherever appropriate hereunder).

At steps R203 and R204 (R3 and R4 in FIG. 6 and R103 and R104 in FIG. 24), if one of the security module 13 and optical disc recorder/player 100 has newer revocation and registration lists than those the other has, it will send its own lists to the other. On the other hand, the other having the older lists will be supplied with the newer lists and check their validity, and then update its own lists with the received new lists.

Note that sending of the lists at steps R203 and R204 may be done before or after data recording effected at subsequent step R5. That is, after data is recorded at step R5, the lists may be sent at step R203 or R204.

<Recording Procedure in the Fifth Embodiment (Detail 1)>

FIG. 40 shows in detail a procedure shown in FIG. 39 and which is followed by the optical disc recorder/player 100 according to the fifth embodiment, to record data to the optical disc medium 10. This procedure is generally similar to those shown in FIGS. 7 and 25.

As shown in FIG. 40, the security module 13 goes to step R212 (R12 in FIG. 7 and R112 in FIG. 25) where it will make, using a digital signature function Sign, a digital signature to a bit string $R_A \| R_B \| V_A \| RegV_A \| RegV_A$ consisting of the random numbers $R_A$ and $R_B$, value $V_A$ and revocation and registration list version numbers $RevV_A$ and $RegV_A$ to acquire $Sig_A$=Sign $(PriKey_A, V_A, R_A \| R_B \| V_A \| RevV_A \| RegV_A)$. The security module 13 appends a public key certificate $Cert_A$ to these $R_A$, $R_B$, $V_A$, $RevV_A$, $RegV_A$ and $Sig_A$, and sends them to the optical disc recorder/player 100. Note that when the security module 13 has or uses no revocation list or registration list, it will uses "0" for example as the version number.

Receiving $Cert_A$, $R_A$, $R_B$, $V_A$, $RevV_A$, $RegV_A$ and $Sig_A$ from the security module 13, the optical disc recorder/player 100 checks the public key certificate $Cert_A$, digital signature $Sig_A$ and $ID_A$ of the security module 13. When the optical disc recorder/player 100 judges that the certificate can pass the checking, the random number $R_B$ returned from the security module 13 is equal to a one previously generated and the digital signature $Sig_A$ is correct, it will check, using the revocation and registration lists stored in its own nonvolatile memory 110, whether the $ID_A$ of the optical disc medium 10 is registered in the lists. In this checking, both the lists may be used together or one of them (especially the revocation list) may preferentially be used. If the result of checking shows that the optical disc medium 10 is an illegal medium, the protocol will be closed.

On the other hand, if the result of checking shows based on the result of checking that the optical disc medium 10 is legal, the optical disc recorder/player 100 goes to step R213 (R13 in FIG. 7 and R113 in FIG. 25) where it will generate a random number $K_B$, make a calculation of $V_B = K_B \cdot G$, make a digital signature to a bit string $R_B \| R_A \| V_B \| RevV_B \| RegV_B$ consisting of the random numbers $R_B$ and $R_A$, value $V_B$, version numbers $RevV_B$ and $RegV_B$ of the revocation and registration lists owned by the optical disc recorder/player 100 to acquire $Sig_B$=Sign($Prikey_B$, $R_B \| R_A \| V_A \| RevV_B \| RegV_B$). The optical disc recorder/player 100 will append a public key certificate $Cert_B$ to these $R_B$, $R_A$, $V_B$, $RevV_B$, $RegV_B$ and $Sig_B$ and send them to the security module 13. It should be noted that when the optical disc recorder/player 100 has or uses no revocation or registration list, it will use for example "0" for the version number.

Receiving $Cert_B$, $R_B$, $R_A$, $V_B$, $RevV_B$, $RegV_B$ and $Sig_B$ from the optical disc recorder/player 100, the security module 13 checks the public key certificate $Cert_B$, digital signature $Sig_B$ and $ID_B$. When the result of checking shows that they can pass the checking, the security module 13 checks, using the revocation and registration lists stored in its own nonvolatile memory 34, whether the $ID_B$ of the optical disc recorder/player 100 is registered in the lists. In this checking, the both lists may be used together as in the above or one of them (especially the revocation list) may preferentially be used. If the result of checking shows that the optical disc recorder/player 100 is an illegal unit, the protocol will be closed.

On the other hand, if the checking result proves that the optical disc recorder/player 100 is legal, namely, that both the security module 13 and optical disc recorder/player 100 are legal, the security module 13 and optical disc recorder/player 100 will generate and share a session key Kse.

Next, the security module 13 and optical disc recorder/player 100 check the version numbers of the revocation and registration lists in their counterparts. When one of the security module 13 and optical disc recorder/player 100 has lists with newer version numbers than those of the lists in the other, it goes to step R214 or R215 (R14 or R15 in FIG. 7 and R114 or R115 in FIG. 25) where it will send its own new lists to the other. The other thus receiving the lists having the newer version numbers will check the digital signature TCSig made by the center TC, included in the lists. If the digital signature is judged to pass the checking, the other will update, using the new lists, its own old lists.

Step R16 and subsequent steps are similar to those shown in FIGS. 7 and 25.

Note that the revocation and registration lists may be sent during or after transmission of content data.

<Recording Procedure in the Fifth Embodiment (Detail 2)>

FIG. 41 shows an example of the procedure in the first embodiment shown in FIG. 8 and third embodiment shown in FIG. 26, using the revocation and registration lists. That is, FIG. 41 shows a data recording procedure in which first the version numbers of the lists in one of the security module 13 and optical disc recorder/player 100 are judged to be newer or older than those of the lists in the other and then the lists having the newer version numbers are used to check the ID of the counterpart.

As shown in FIG. 41, the security module 13 goes to step R222 (R22 in FIG. 8 and R122 in FIG. 26) where it will make a digital signature to a bit string $R_A\|R_B\|V_A\|RevV_A\|RegV_A$ consisting of the random numbers $R_A$ and $R_B$, value $V_A$, revocation list version number $RevV_A$ and a registration list version number $RegV_A$ to acquire $Sig_A$, append a public key certificate $Cert_A$ to these $R_A$, $R_B$, $V_A$, $RevV_A$, $RegV_A$ and $Sig_A$, and send them to the optical disc recorder/player 100.

Receiving $Cert_A$, $R_A$, $R_B$, $V_A$, $RevV_A$, $RegV_A$ and $Sig_A$ from the security module 13, the optical disc recorder/player 100 checks the public key certificate $Cert_A$ and digital signature $Sig_A$. When the optical disc recorder/player 100 judges that the certificate can pass the checking, the random number $R_B$ returned from the security module 13 is equal to a one previously generated and the digital signature $Sig_A$ is correct, it will take a step R223 (R23 in FIG. 8 and R123 in FIG. 26) to generate a random number $K_B$, make a calculation of $V_B=K_B \cdot G$, and make a digital signature to a bit string consisting of the random numbers $R_B$ and $R_A$, value $V_B$, revocation list version number $RevV_B$ and registration list version number $RegV_B$ of the optical disc recorder/player 100 to acquire $Sig_B$. The optical disc recorder/player 100 appends a public key certificate $Cert_B$ to these $R_B$, $R_A$, $V_B$, $RevV_B$, $RegV_B$ and $Sig_B$, and sends them to the security module 13.

Receiving $Cert_B$, $R_B$, $R_A$, $V_B$, $RevV_B$, $RegV_B$ and $Sig_B$ from the optical disc recorder/player 100, the security module 13 will check the public key certificate $Cert_B$ and digital signature $Sig_B$. When they are judged to pass the checking, the security module 13 will go to a next step.

If it is mutually judged that both the security module 13 and optical disc recorder/player 100 are legal, they will generate and share a session key Kse.

Also, when both the security module 13 and optical disc recorder/player 100 are judged to be legal, they will check the version numbers of the lists in their counterparts.

When the lists owned by the security module 13 and optical disc recorder/player 100 are judged to be the same in version number as each other, the optical disc recorder/player 100 and security module 13 will check IDs of their counterparts using their own lists to see that they are registered in the lists in their counterparts. In this checking, both the revocation and registration lists may be used together or one of them (especially, the revocation list) may preferentially be used. If the checking result shows that both the security module 13 and optical disc recorder/player 100 are so registered, they will go to a step R26. If the security module 13 finds that the optical disc recorder/player 100 is an illegal unit, the protocol will be closed. Similarly, if the optical disc recorder/player 100 finds that the module 13 is an illegal medium, the protocol will be closed.

On the other hand, when it is mutually judged by the security module 13 and optical disc recorder/player 100, of the version numbers of the lists in their counterparts, that the version numbers of the lists in one of them is newer than those of the lists in the other, the one goes to step R224 or R225 (R14 or R15 in FIG. 8 and R124 or R125 in FIG. 26) where it will send its own lists to the other, and the other thus receiving the lists with the newer version numbers will check the ID of its counterpart using the lists having the new version numbers and thus update its own lists having the older version numbers.

Step R26 and subsequent steps are similar to those in FIGS. 8 and 26.

<Playback Procedure in the Fifth Embodiment>

Figure 42:
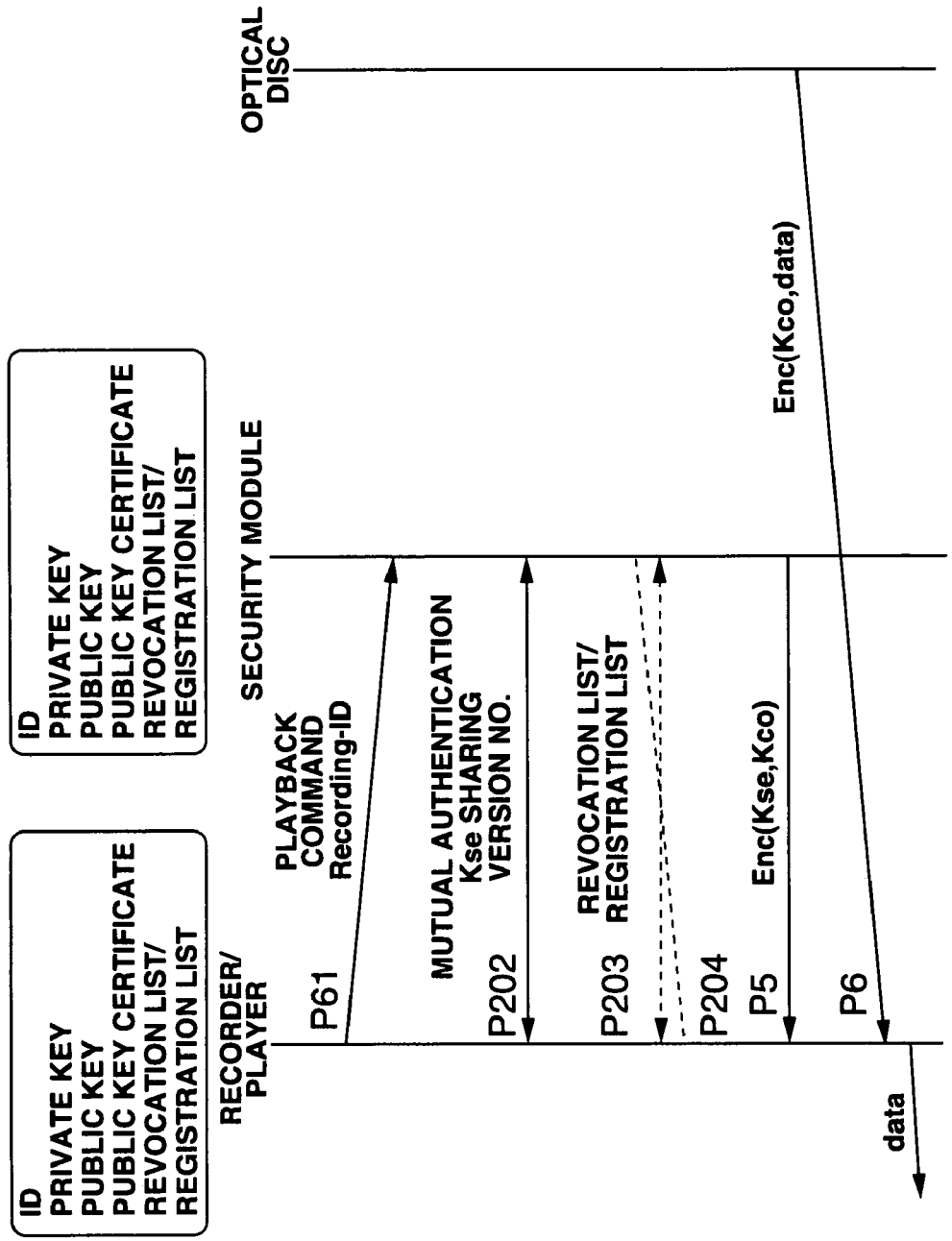
FIG. 42 shows a basic procedure for reading data from the optical disc as the data recording medium according to the fifth embodiment of the present invention.
Figure 43:
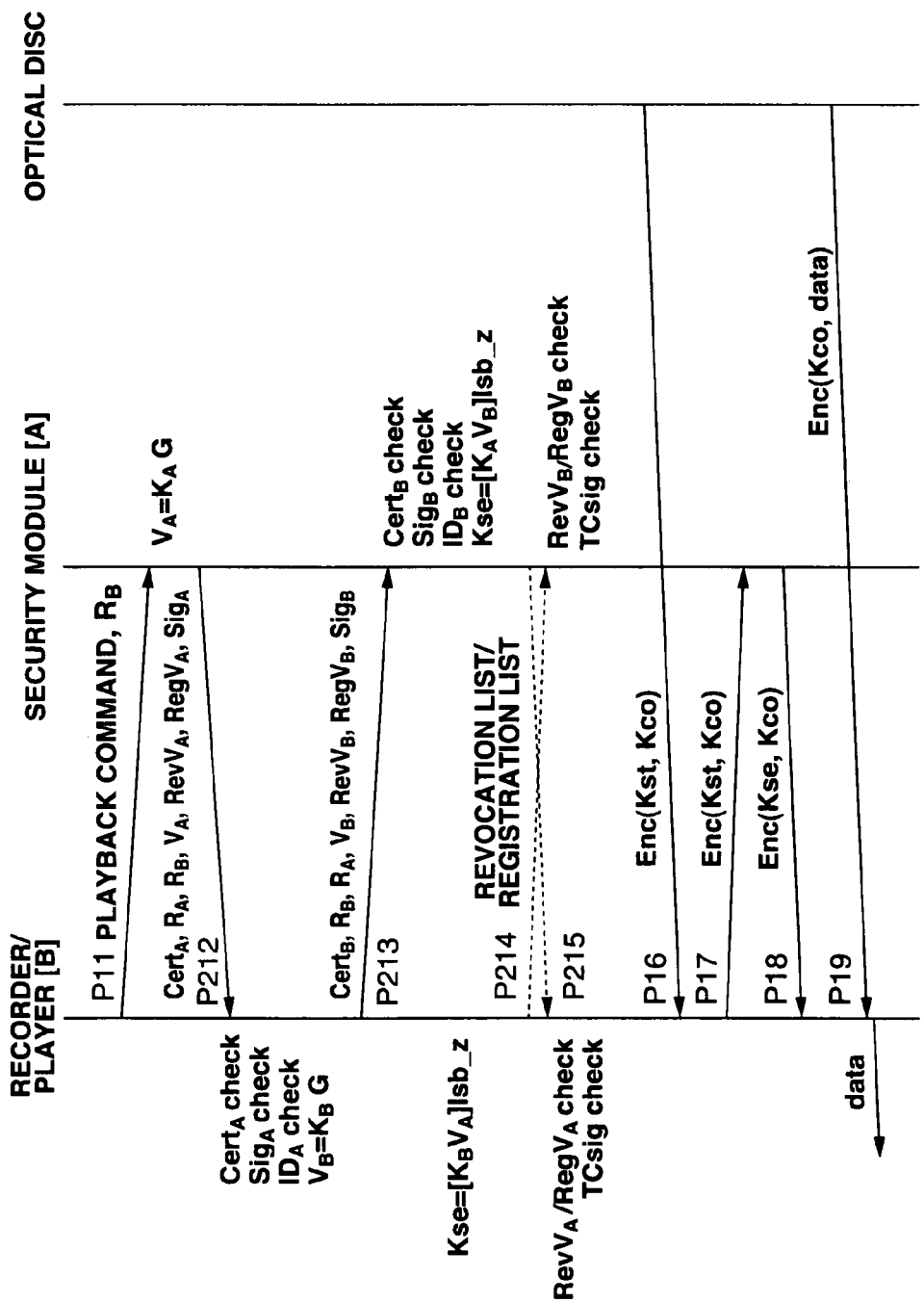
FIG. 43 shows in detail the procedure for reading data from the optical disc as the data recording medium according to the fifth embodiment of the present invention.
Figure 44:
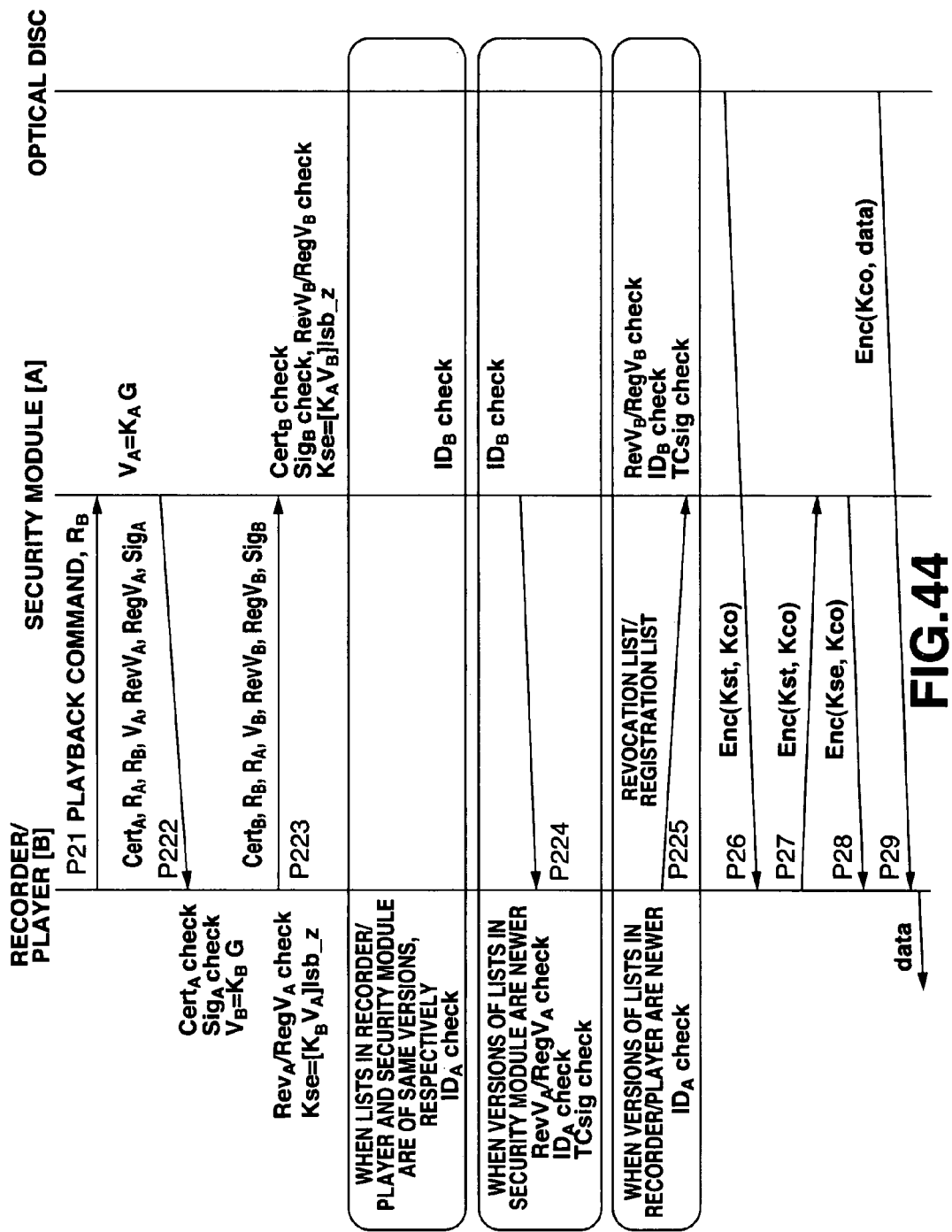
FIG. 44 shows another example of the procedure for reading data from the optical disc as the data recording medium according to the fifth embodiment of the present invention.

Next, a procedure in which the optical disc recorder/player 100 according to the fifth embodiment reads or plays back data from the optical disc 12, will be described herebelow with reference to FIGS. 42 to 44. Note that FIGS. 42 to 44 are generally similar to FIGS. 9 to 11 showing the first embodiment and FIGS. 27 to 29 showing the third embodiment and the procedure in the fifth embodiment is also generally the same as those in the first and third embodiments. So, only differences of the procedures in FIGS. 42 to 44 from those in the first embodiment shown in FIGS. 9 to 11 and third embodiment shown in FIGS. 27 and 29, will be described below.

As shown in FIG. 42, the optical disc recorder/player 100 and security module 13 go to step P202 (P2 in FIG. 9 and P102 in FIG. 27) where they will check, using the revocation and registration lists, that their counterparts are legal, and send the version numbers of their own registration lists to each other.

At steps P203 and P204 (P3 and P4 in FIG. 9 and P103 and P104 in FIG. 27), if one of the security module 13 and optical disc recorder/player 100 has lists with newer versions than those of the lists in the other, it will send its own lists to the other, and the other thus receiving the lists will update its own lists with the received ones.

Step P5 and subsequent steps are similar to those in FIGS. 9 and 27.

<Playback Procedure in the Fifth Embodiment (Detail 1)>

FIG. 43 shows in detail a procedure shown in FIG. 42 and which is followed by the optical disc recorder/player 100 according to the fifth embodiment to play back or read data from the optical disc medium 10. Note that this procedure in FIG. 43 is generally similar to those shown in FIGS. 10 and 28.

As shown in FIG. 43, the security module 13 goes to step P212 (P12 in FIG. 10 and P112 in FIG. 28) where it will make a digital signature to a bit string consisting of the random numbers $R_A$ and $R_B$, value $V_A$, revocation and registration list version numbers $RevV_A$ and $RegV_A$ to acquire $Sig_A$. The security module 13 appends a public key certificate $Cert_A$ to these $R_A$, $R_B$, $V_A$, $RevV_A$, $RegV_A$ and $Sig_A$, and sends them to the optical disc recorder/player 100. Note that when the security module 13 has or uses no list, it will uses "0" for example as the version number.

Receiving $Cert_A$, $R_A$, $R_B$, $V_A$, $RevV_A$, $RegV_A$ and $Sig_A$ from the security module 13, the optical disc recorder/player 100 checks the public key certificate $Cert_A$, digital signature $Sig_A$ and $ID_A$ of the security module 13. When the optical disc recorder/player 100 judges that the certificate can pass the checking, the random number $R_B$ returned from the security module 13 is equal to a one previously generated and the digital signature $Sig_A$ is correct, it will check, using the lists stored in its own nonvolatile memory 110, that the $ID_A$ of the optical disc medium 10 is legal. If the result of checking shows that the optical disc medium 10 is an illegal medium, the protocol will be closed.

On the other hand, the result of checking shows that the optical disc medium 10 is legal, the optical disc recorder/player 100 goes to step P213 (P13 in FIG. 10 and P113 in FIG. 28) where it will generate a random number $K_B$, make a calculation of $V_B = K_B \cdot G$, make a digital signature to a bit string consisting of the random numbers $R_B$ and $R_A$, value $V_B$ and revocation and registration version numbers $RevV_B$ and $RegV_B$ of the optical disc recorder/player 100 to acquire $Sig_B$. The optical disc recorder/player 100 will append a public key certificate $Cert_B$ to these $R_B$, $R_A$, $V_B$, $RevV_B$, $RegV_B$ and $Sig_B$ and send them to the security module 13. It should be noted that when the optical disc recorder/player 100 has or uses no list, it will use for example "0" for the version number.

Receiving $Cert_B$, $R_B$, $R_A$, $V_B$, $RevV_B$, $RegV_B$ and $Sig_B$ from the optical disc recorder/player 100, the security module 13 checks the public key certificate $Cert_B$, digital signature $Sig_B$ and $ID_B$. When the result of checking shows that they can pass the checking, the security module 13 checks, using the registration list stored in its own nonvolatile memory 34, whether the optical disc recorder/player 100 is legal. If the result of checking shows that the optical disc recorder/player 100 is an illegal unit, the protocol will be closed.

On the other hand, if the checking result proves that the optical disc recorder/player 100 is legal, namely, that both the security module 13 and optical disc recorder/player 100 are legal, the security module 13 and optical disc recorder/player 100 will generate and share a session key Kse.

Next, the security module 13 and optical disc recorder/player 100 check the version numbers of the lists in their counterparts. When one of the security module 13 and optical disc recorder/player 100 owns a registration list whose version number is newer than that of the registration list in the other, it goes to step P214 or P215 (P14 or P15 in FIG. 10 and P114 or P115 in FIG. 28) where it will send its own new registration list to the other. The other thus receiving the registration list having the newer version number will check the digital signature TCSig made by the center TC, included in the registration list. If the digital signature is judged to pass the checking, the other will update its own old registration list using the new registration list.

Step P16 and subsequent steps are similar to those shown in FIGS. 10 and 28.

Note that the lists may be sent during or after transmission of content data.

<Playback Procedure in the Fifth Embodiment (Detail 2)>

FIG. 44 shows an example of the procedure in the first embodiment shown in FIG. 11 and third embodiment shown in FIG. 29, using the revocation and registration lists. That is, FIG. 44 shows a data playback procedure in which first the version numbers of the revocation and registration lists in one of the security module 13 and optical disc recorder/player 100 is judged to be newer or older than that of the registration list in the other and then the lists having the newer version numbers are used to check the ID of the counterpart.

As shown in FIG. 44, the security module 13 goes to step P222 (P22 in FIG. 11 and P122 in FIG. 29) where it will make a digital signature to a bit string consisting of the random numbers $R_A$ and $R_B$, value $V_A$ and a revocation list version number $RevV_A$ to acquire $Sig_A$, append a public key certificate $Cert_A$ to these $R_A$, $R_B$, $V_A$, $RegV_A$ and $Sig_A$, and send them to the optical disc recorder/player 100.

Receiving $Cert_A$, $R_A$, $R_B$, $V_A$, $RegV_A$ and $Sig_A$ from the security module 13, the optical disc recorder/player 100 checks the public key certificate $Cert_A$ and digital signature $Sig_A$. When the optical disc recorder/player 100 judges that the certificate can pass the checking, the random number $R_B$ returned from the security module 13 is equal to a one previously generated and the digital signature $Sig_A$ is correct, it will take a step P223 (P23 in FIG. 11 and P123 in FIG. 29) to generate a random number $K_B$, make a calculation of $V_B = K_B \cdot G$, and make a digital signature to a bit string consisting of the random numbers $R_B$ and $R_A$, value $V_B$ and version number $RegV_B$ of the revocation list in the optical disc recorder/player 100 to acquire $Sig_B$. The optical disc recorder/player 100 appends a public key certificate $Cert_B$ to these $R_B$, $R_A$, $V_B$, $RegV_B$ and $Sig_B$ and send them to the security module 13. Receiving $Cert_B$, $R_B$, $R_A$, $V_B$, $RegV_B$ and $Sig_B$ from the optical disc recorder/player 100, the security module 13 will check the public key certificate $Cert_B$ and digital signature $Sig_B$. When they are judged to pass the checking, the security module 13 will go to a next step.

If both the security module 13 and optical disc recorder/player 100 mutually check that their counterparts are legal, they will generate and share a session key Kse. Also, when both the security module 13 and optical disc recorder/player 100 are judged to be legal, they will check the version numbers of the lists in their counterparts.

When the registration lists owned by the security module 13 and optical disc recorder/player 100 are judged to be the same in version number as each other, the optical disc recorder/player 100 and security module 13 will mutually check IDs of their counterparts using their own lists to see if their counterparts are legal. If the checking result shows that both are legal, they will go to step P26. If the security module 13 finds that the optical disc recorder/player 100 is an illegal unit, the protocol will be closed. Similarly, if the optical disc recorder/player 100 finds that the security module 13 is an illegal medium, the protocol will be closed.

On the other hand, when it is mutually judged by the security module 13 and optical disc recorder/player 100 that the version number of the registration list in one of them is newer than that of the registration list in the other, the one goes to step P224 or P225 (P24 or P25 in FIG. 11 and P124 or P125 in FIG. 29) where it will send its own registration list to the other, and the other thus receiving the registration list with the newer version number will check the ID of its counterpart using the received registration list and thus update the registration list having the older version number.

Step P26 and subsequent steps are similar to those in FIGS. 11 and 29.

Sixth Embodiment (IM4, Dev4

Next, the sixth embodiment of the present invention will be described herebelow:

In the sixth embodiment of the present invention, both the revocation and registration lists are stored in the nonvolatile memory 44 of the security module 23 in the memory medium 20 and nonvolatile memory 210 in the memory recorder/player 200, having been described concerning the second and fourth embodiments. Since the memory medium 20 and memory recorder/player 200 in the sixth embodiment are the same as in FIGS. 12 to 14, their construction will not be described herein.

<Recording Procedure in the Sixth Embodiment>

How the memory recorder/player 200 according to the sixth embodiment of the present invention records data to the memory medium 20 will be described herebelow with reference to FIGS. 45 to 48. Note that FIGS. 45 to 48 are generally similar to FIGS. 15 to 18 showing the second embodiment and FIGS. 30 to 33 showing the fourth embodiment and the procedure in the sixth embodiment is also generally the same as those in the second and fourth embodiments. So, only differences of the procedures shown in FIGS. 45 to 48 from those in the second embodiment shown in FIGS. 15 to 18 and fourth embodiments shown in FIGS. 30 to 33, respectively, will be described below.

Figure 45:
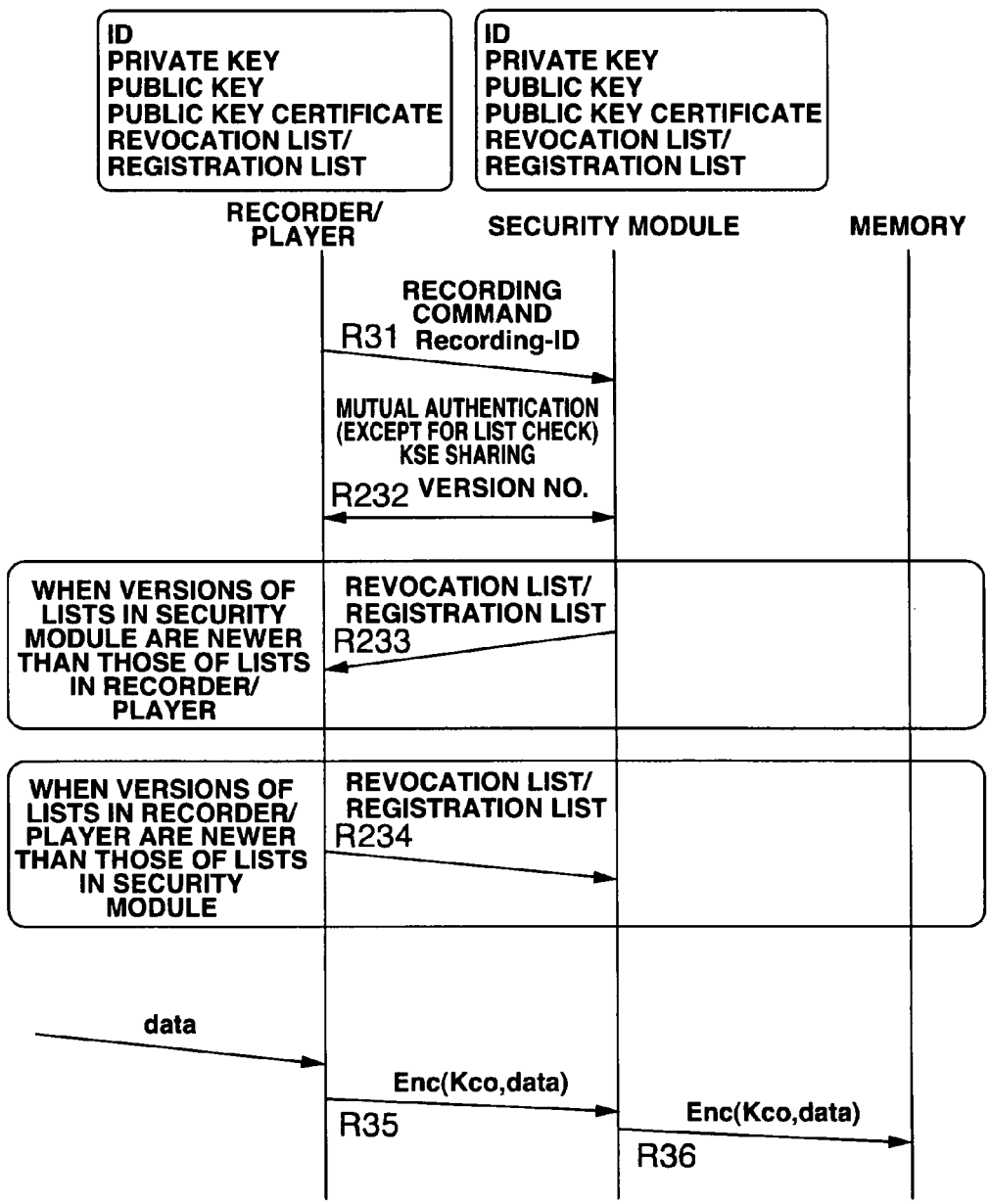
FIG. 45 shows a basic procedure for writing data to a memory as the data recording medium according to the sixth embodiment of the present invention.

FIG. 45 shows a procedure generally similar to those in FIGS. 15 and 30. At step R232 (R32 in FIG. 15 and R132 in FIG. 30), the memory recorder/player 200 and security module 23 exchange the version numbers of their own revocation and registration lists between them.

At steps R233 and R234 (R33 and R34 in FIG. 15 and R133 and R134 in FIG. 30), when one of the memory recorder/player 200 and security module 13, having newer lists than those of the other, will send its own lists to the other. On the other hand, the other having the older lists receives the newer lists, checks its validity, and then updates its own lists to the received newer lists.

Note that at steps R233 and R234, the lists may be sent before or after data is recorded at subsequent step R35. That is, after data is recorded at step R35, the lists may be sent at step R233 or R234.

<Recording Procedure in the Sixth Embodiment (Detail 1)>

Figure 46:
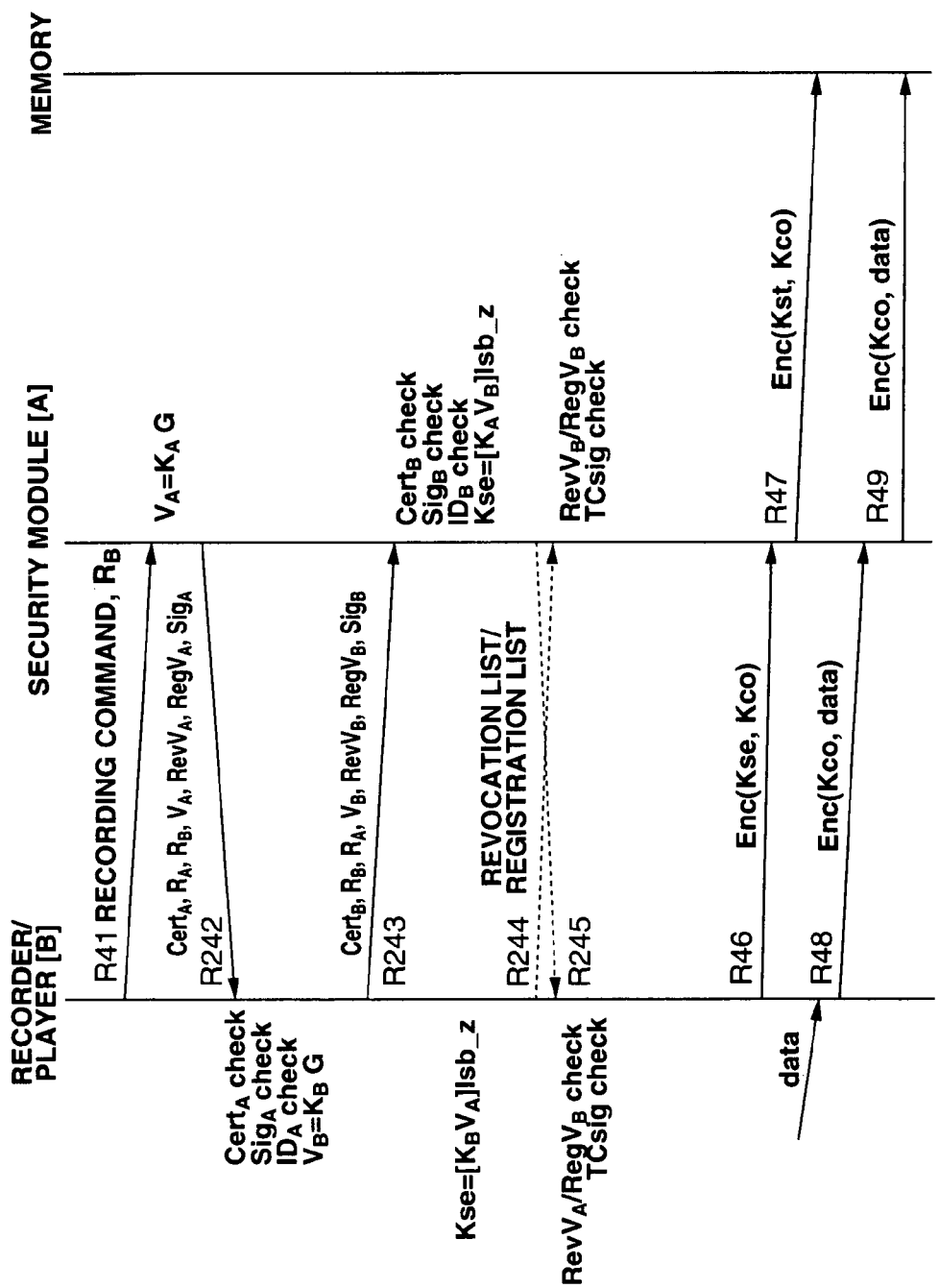
FIG. 46 shows in detail the procedure for writing data to the memory as the data recording medium according to the sixth embodiment of the present invention.

FIG. 46 shows in detail a procedure shown in FIG. 45 and which is followed by the memory recorder/player 200 according to the sixth embodiment, to record data to the memory medium 20. This procedure is generally similar to those shown in FIGS. 16 and 31.

As shown in FIG. 46, the security module 23 goes to step R242 (R42 in FIG. 16 and R142 in FIG. 31) where it will make a digital signature to a bit string consisting of the random numbers $R_A$ and $R_B$, value $V_A$ and revocation and registration list version numbers $RevV_A$ and $RegV_A$ to acquire $Sig_A$. The security module 23 appends a public key certificate $Cert_A$ to these $R_A$, $R_B$, $V_A$, $RevV_A$, $RegV_A$ and $Sig_A$, and sends them to the memory recorder/player 200. Note that when the security module 23 has or uses no revocation or registration list, it will uses "0" for example as the version number.

Receiving $Cert_A$, $R_A$, $R_B$, $V_A$, $RevV_A$, $RegV_A$ and $Sig_A$ from the security module 23, the memory recorder/player 200 checks the public key certificate $Cert_A$, digital signature $Sig_A$ and $ID_A$ of the security module 23. When the memory recorder/player 200 judges that the certificate can pass the checking, the random number $R_B$ returned from the security module 23 is equal to a one previously generated and the digital signature $Sig_A$ is correct, it will check, using its own revocation and registration lists, whether the memory medium 20 is legal. If the result of checking shows that the memory medium 20 is an illegal medium, the protocol will be closed.

On the other hand, the result of checking shows that the memory medium 20 is legal, the memory recorder/player 200 goes to step R243 (R43 in FIG. 16 and R143 in FIG. 31) where it will generate a random number $K_B$, make a calculation of $V_B = K_B \cdot G$, make a digital signature to a bit string consisting of the random numbers $R_B$ and $R_A$, value $V_B$ and version number $RevV_B$ of the revocation list in the memory recorder/player 200 to acquire $Sig_B$. The memory recorder/player 200 will append a public key certificate $Cert_B$ to these $R_B$, $R_A$, $V_B$, $RevV_B$ and $Sig_B$ and send them to the security module 23. It should be noted that when the memory recorder/player 200 has or uses no list, it will use for example "0" for the version number.

Receiving $Cert_B$, $R_B$, $R_A$, $V_B$, $RevV_B$, $RegV_B$ and $Sig_B$ from the memory recorder/player 200, the security module 23 checks the public key certificate $Cert_B$, digital signature $Sig_B$ and $ID_B$. When the result of checking shows that they can pass the checking, the security module 23 checks, using its own revocation and registration lists, if the memory recorder/player 200 is legal. If the result of checking shows that the memory recorder/player 200 is an illegal unit, the protocol will be closed.

On the other hand, if the checking result proves that the memory recorder/player 200 is legal, namely, that both the security module 23 and memory recorder/player 200 are legal, the security module 23 and memory recorder/player 200 will generate and share a session key Kse.

Next, the security module 23 and memory recorder/player 200 check the version numbers of the registration lists in their counterparts. When one of the security module 23 and memory recorder/player 200 owns lists whose version numbers are newer than those of the lists in the other, it goes to step R244 or R245 (R44 or R45 in FIG. 16 and R144 or R145 in FIG. 31) where it will send its own new lists to the other. The other thus receiving the lists having the newer version numbers will check the digital signature TCSig made by the center TC, included in the lists. If the digital signature is judged to pass the checking, the other will update, using the new lists, its own old lists.

Step R46 and subsequent steps are similar to those shown in FIGS. 16 and 31.

Note that the lists may be sent during or after transmission of content data.

<Recording Procedure in the Sixth Embodiment (Detail 2)>

Figure 47:
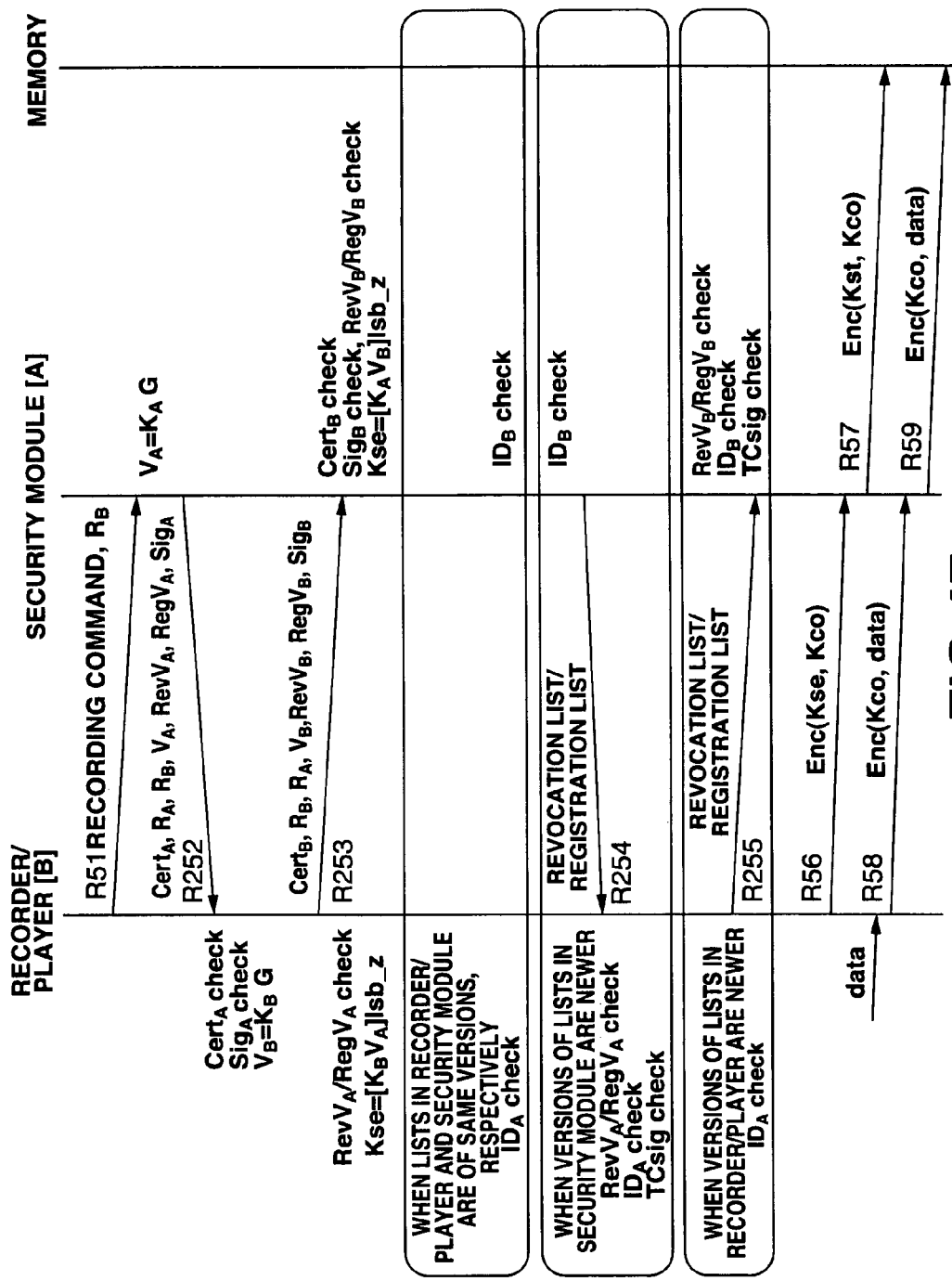
FIG. 47 shows another example of the procedure for writing data to the memory as the data recording medium according to the sixth embodiment of the present invention.

FIG. 47 shows an example of the procedure in the second embodiment shown in FIG. 17 and fourth embodiment shown in FIG. 32, using the revocation and registration lists. That is, FIG. 47 shows a data recording procedure in which first the version numbers of the lists in one of the security module 23 and memory recorder/player 200 is judged to be newer or older than those of the lists in the other and then the lists having the newer version numbers are used to check the ID of the counterpart.

As shown in FIG. 47, the security module 23 goes to step R252 (R52 in FIG. 17 and R152 in FIG. 32) where it will make a digital signature to a bit string consisting of the random numbers $R_A$ and $R_B$, value $V_A$ and revocation and registration list version numbers $RevV_A$ and $RegV_A$ to acquire $Sig_A$, append a public key certificate $Cert_A$ to these $R_A$, $R_B$, $V_A$, $RevV_A$, $RegV_A$ and $Sig_A$, and send them to the memory recorder/player 200.

Receiving $Cert_A$, $R_A$, $R_B$, $V_A$, $RevV_A$, $RegV_A$ and $Sig_A$ from the security module 23, the memory recorder/player 200 checks the public key certificate $Cert_A$ and digital signature $Sig_A$. When the memory recorder/player 200 judges that the certificate can pass the checking, the random number $R_B$ returned from the security module 23 is equal to a one previously generated and the digital signature $Sig_A$ is correct, it will take a step R253 (R53 in FIG. 17 and R153 in FIG. 32) to generate a random number $K_B$, make a calculation of $V_B = K_B \cdot G$, and make a digital signature to a bit string consisting of the random numbers $R_B$ and $R_A$, value $V_B$, and version numbers $RevV_B$ and $RegV_B$ of the revocation and registration lists in the memory recorder/player 200 to acquire $S_{igB}$. The memory recorder/player 200 appends a public key certificate $Cert_B$ to these $R_B$, $R_A$, $V_B$, $RevV_B$ and $RegV_B$ and sends them to the security module 23.

Receiving $Cert_B$, $R_B$, $R_A$, $V_B$, $RevV_B$, $RegV_B$ and $S_{igB}$ from the memory recorder/player 200, the security module 23 will check the public key certificate Cert$_B$ and digital signature S$_{igB}$. When they are judged to pass the checking, the security module 23 will go to a next step.

If both the security module 23 and memory recorder/player 200 are judged to be legal, they will generate and share a session key Kse.

Also, when both the security module 23 and memory recorder/player 200 are judged to be legal, they will check the version numbers of the lists in their counterparts.

When the lists owned by the security module 23 and memory recorder/player 200 are judged to be the same in version number as each other, the memory recorder/player 200 and security module 23 will mutually check IDs of their counterparts using their own lists to see if they are registered in the lists in their counterparts. If the checking result shows that they are legal, namely, if both are registered in the registration list (preferentially in the revocation list), not in the revocation list, they will go to step R56. Also, if the security module 23 finds that the memory recorder/player 200 is an illegal one, the protocol will be closed. Similarly, if the memory recorder/player 200 finds that the security module 23 is an illegal medium, the protocol will be closed.

On the other hand, when it is mutually judged by the security module 23 and memory recorder/player 200 that the version number of the lists in one of them is newer than those of the lists in the other, the one goes to step R254 or R255 (R54 or R55 in FIG. 17 and R154 or R155 in FIG. 32) where it will send its own lists to the other, and the other thus receiving the lists with the newer version numbers will check the ID of its counterpart using the received lists and thus update its own lists with the older version number using the lists with the never version numbers.

Step R56 and subsequent steps are similar to those in FIGS. 17 and 32.

<Recording Procedure in the Sixth Embodiment (Variant)>

Figure 48:
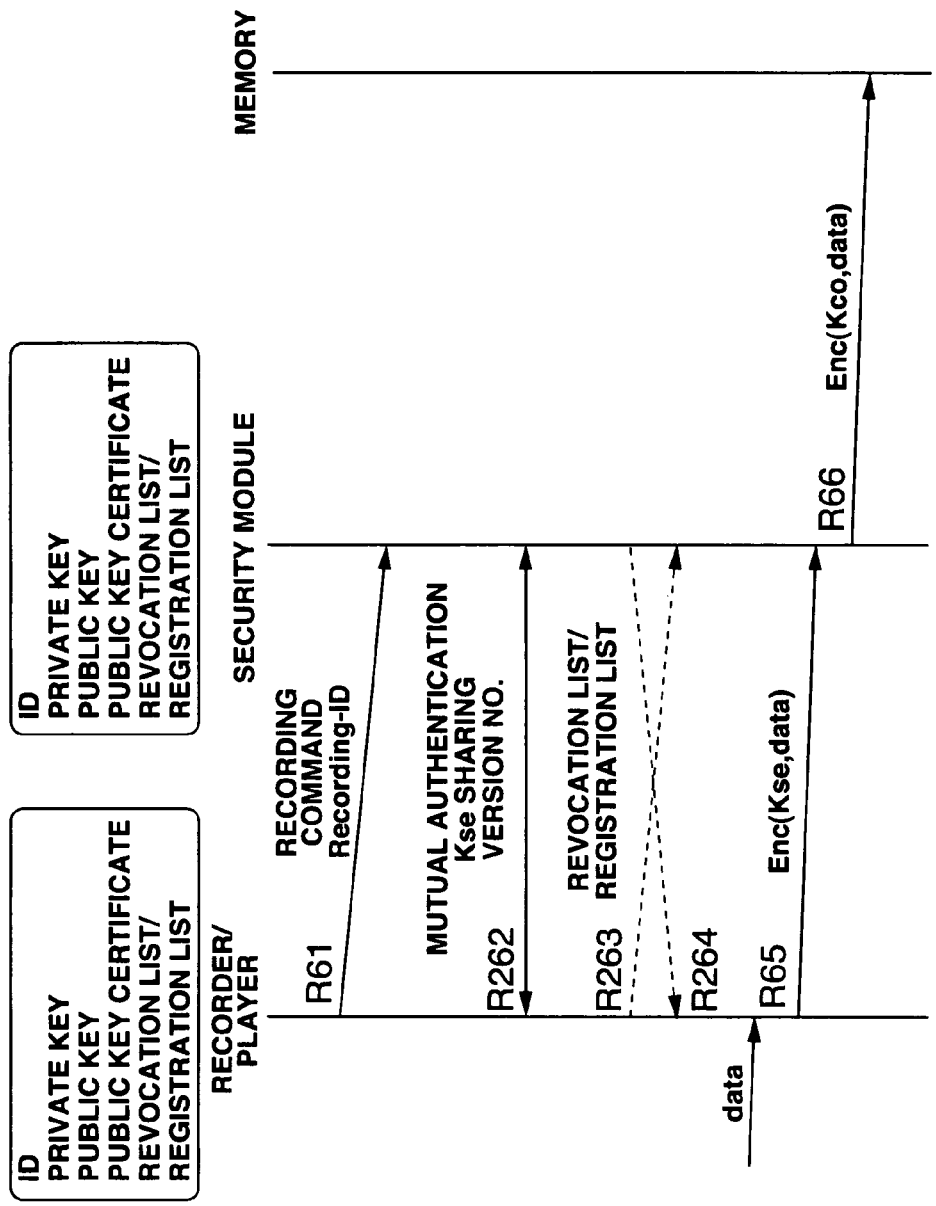
FIG. 48 shows still another example of the procedure for writing data to the memory as the data recording medium according to the second embodiment of the present invention.

In the sixth embodiment, the data may be recorded into the memory unit 22 of the memory medium 20 by following the procedure shown in FIG. 48 (similar to FIGS. 18 and 33).

As shown in FIG. 48, the memory recorder/player 200 and security module 23 exchange between them version numbers of their own revocation and registration lists at step R262 (R62 in FIG. 18 and R163 in FIG. 33).

Also, at steps R263 and R264 (R64 and R64 in FIG. 18 and R164 and R165 in FIG. 33), one of the memory recorder/player 200 and security module 23, having lists whose version numbers are newer than those of the lists in the other, will update its own old lists with the new lists.

Step R65 and subsequent steps are similar to those in FIGS. 18 and 33.

<Playback Procedure in the Sixth Embodiment>

Next, a procedure in which the memory recorder/player 200 according to the fourth embodiment reads or plays back data from the memory unit 22 of the memory medium 20, will be described herebelow with reference to FIGS. 49 to 52. Note that FIGS. 49 to 52 are generally similar to FIGS. 19 to 22 showing the second embodiment and FIGS. 34 to 37 showing the fourth embodiment and the procedure in the sixth embodiment is also generally the same as those in the second and fourth embodiments. So, only differences of the procedures shown in FIGS. 34 to 37 from those in the second embodiment shown in FIGS. 19 to 22 and fourth embodiment shown in FIGS. 34 to 37, will be described below.

Figure 49:
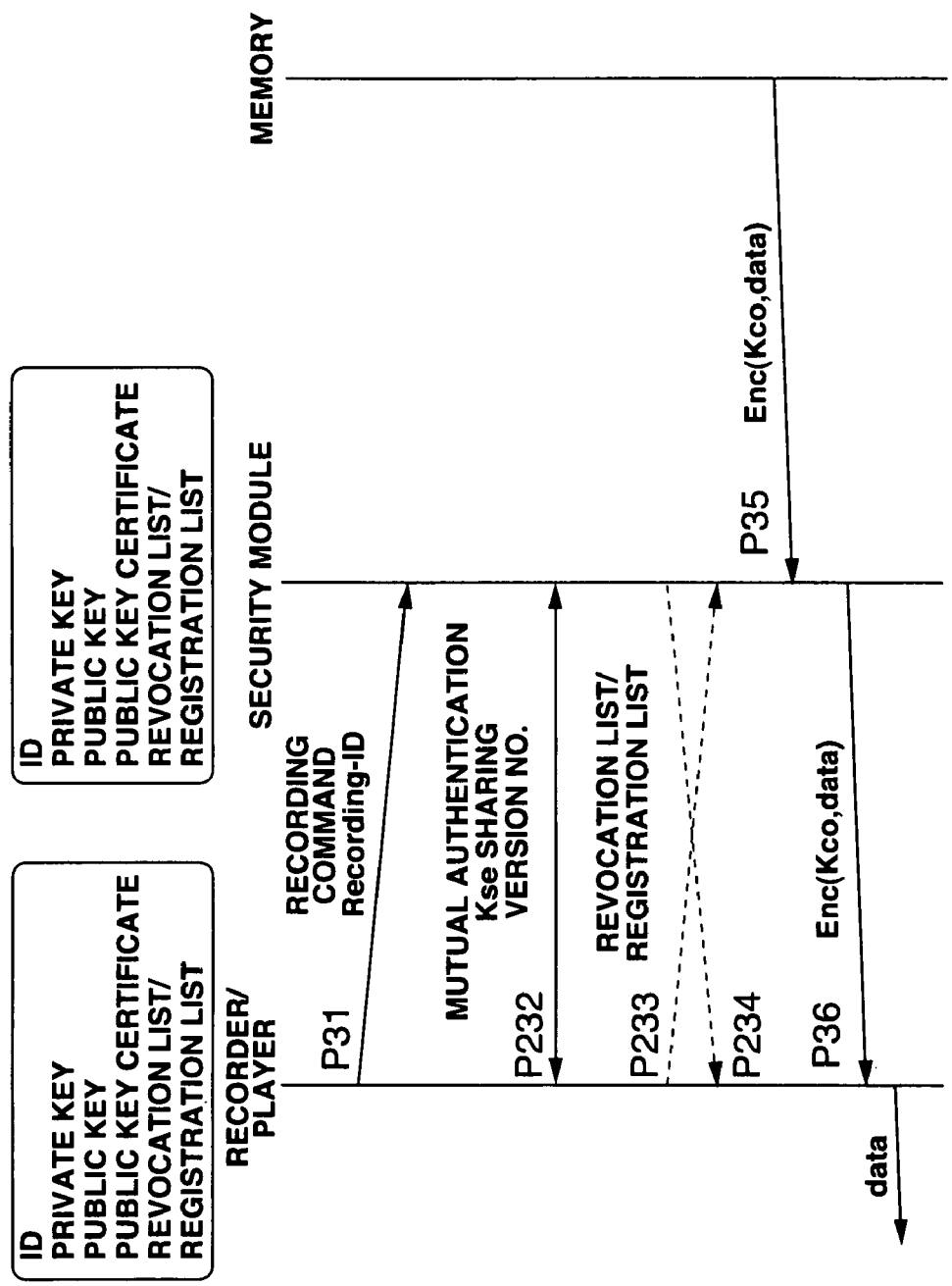
FIG. 49 shows a basic procedure for reading data from the memory as the data recording medium according to the sixth embodiment of the present invention.

As shown in FIG. 49, the memory recorder/player 200 and security module 23 go to step P232 (P32 in FIG. 19 and P132 in FIG. 34) where they will mutually check the IDs of their counterparts using the revocation and registration lists, and send the version numbers of their own lists to each other.

At steps P233 and P234 (P33 and P34 in FIG. 19 and P133 and P134 in FIG. 34), one of the memory recorder/player 200 and security module 23 having newer lists than those in the other, will send them to the other, and the other thus receiving the lists will update its own lists with the received ones.

Step P35 and subsequent steps are similar to those in FIGS. 19 and 34.

<Playback Procedure in the Sixth Embodiment (Detail 1)>

Figure 50:
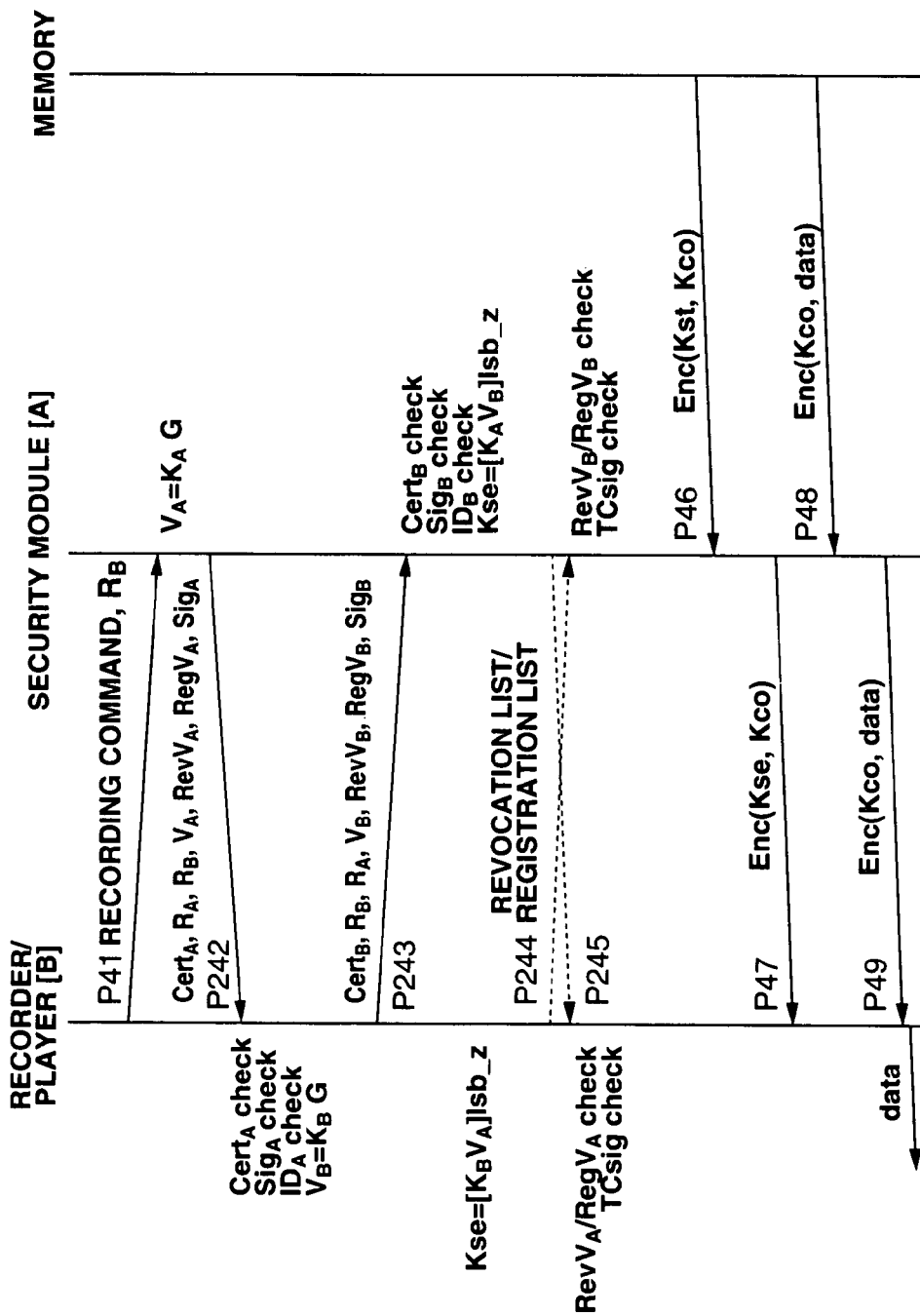
FIG. 50 shows in detail the procedure for reading data from the memory as the data recording medium according to the sixth embodiment of the present invention.

FIG. 50 shows in detail a procedure followed by the memory recorder/player 200 according to the second and fourth embodiments shown in FIGS. 20 and 35, respectively, to play back or read data from the memory unit 22 of the memory medium 20. This procedure in FIG. 50 is generally similar to those shown in FIGS. 20 and 35.

As shown in FIG. 50, the security module 23 goes to step P242 (P42 in FIG. 20 and P142 in FIG. 35) where it will make a digital signature to a bit string consisting of the random numbers R$_A$ and R$_B$, value V$_A$ and revocation and registration list version numbers RevV$_A$ and RegV$_A$ to acquire Sig$_A$. The security module 23 appends a public key certificate Cert$_A$ to these R$_A$, R$_B$, V$_A$, RevV$_A$, RegV$_A$ and Sig$_A$, and sends them to the memory recorder/player 200. Note that when the security module 23 has or uses no list, it will uses "0" for example as the version number.

Receiving Cert$_A$, R$_A$, R$_B$, V$_A$, RevV$_A$, RegV$_A$ and Sig$_A$ from the security module 23, the memory recorder/player 200 checks the public key certificate Cert$_A$, digital signature Sig$_A$ and ID$_A$ of the security module 23. When the memory recorder/player 200 judges that the certificate can pass the checking, the random number R$_B$ returned from the security module 23 is equal to a one previously generated and the digital signature Sig$_A$ is correct, it will check, using its own lists, if the memory medium 20 is legal. If the result of checking shows that the memory medium 20 is an illegal medium, the protocol will be closed.

On the other hand, the result of checking shows that the memory medium 20 is legal, the memory recorder/player 200 goes to step P243 (P43 in FIG. 20 and P143 in FIG. 35) where it will generate a random number K$_B$, make a calculation of V$_B$=K$_B$·G, make a digital signature to a bit string consisting of the random numbers R$_B$ and R$_A$, value V$_B$ and revocation and registration version numbers Rev$_{VB}$ and Reg$_{VB}$ of the memory recorder/player 200 to acquire S$_{igB}$. The memory recorder/player 200 will append a public key certificate Cert$_B$ to these R$_B$, R$_A$, V$_B$, RevV$_B$, RegV$_B$ and S$_{igB}$ and send them to the security module 23. It should be noted that when the memory recorder/player 200 has or uses no list, it will use for example "0" for the version number.

Receiving Cert$_B$, R$_B$, R$_A$, V$_B$, RevV$_B$, RegV$_B$ and S$_{igB}$ from the memory recorder/player 200, the security module 23 checks the public key certificate Cert$_B$, digital signature S$_{igB}$ and ID$_B$. When the result of checking shows that they can pass the checking, the security module 23 checks, using its own lists, if the memory recorder/player 200 is legal, registered in the registration list. If the result of checking shows that the memory recorder/player 200 is an illegal unit, the protocol will be closed.

On the other hand, if the checking result proves that the memory recorder/player 200 is legal, namely, that both the security module 23 and memory recorder/player 200 are legal, the security module 23 and memory recorder/player 200 will generate and share a session key Kse.

Next, the security module 23 and memory recorder/player 200 check the version numbers of the revocation and registration lists in their counterparts. When one of the security module 23 and memory recorder/player 200 has lists whose version numbers are newer than those of the lists in the other, it goes to step P244 or P245 (P44 or P45 in FIG. 20 and P144 or 145 in FIG. 35) where it will send its own new lists to the other. The other thus receiving the lists having the newer version numbers will check the digital signature TCSig made by the center TC, included in the registration list. If the digital signature is judged to pass the checking, the other will update its own old lists using the new lists.

Step P46 and subsequent steps are similar to those shown in FIGS. 20 and 35.

Note that the lists may be sent during or after transmission of content data.

<Playback Procedure in the Sixth Embodiment (Detail 2)>

Figure 51:
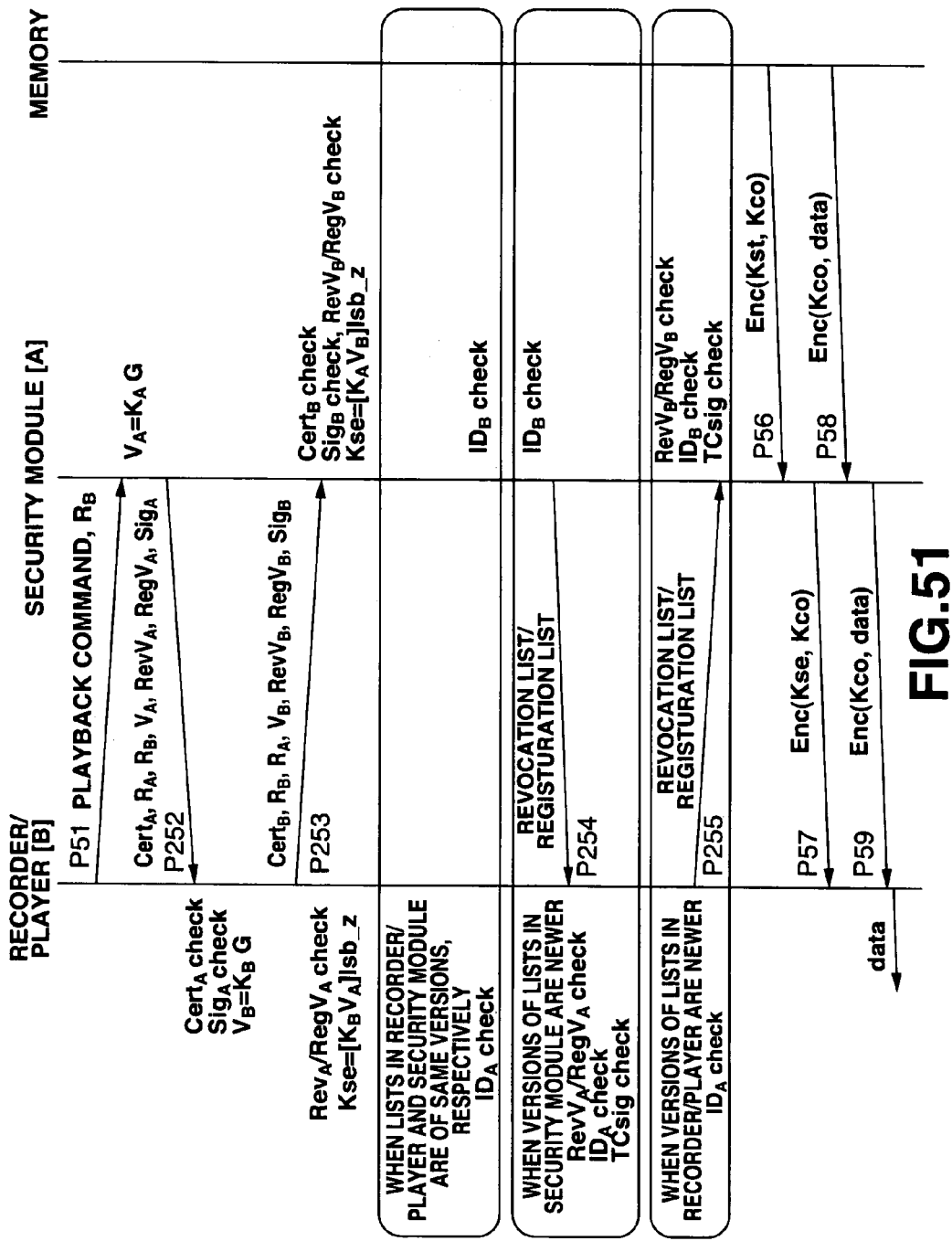
FIG. 51 shows another example of the procedure for reading data from the memory as the data recording medium according to the sixth embodiment of the present invention.

FIG. 51 shows an example of the procedure in the second and fourth embodiments shown in FIGS. 21 and 36, respectively, using the revocation and registration lists. That is, FIG. 51 shows a data playback procedure in which first the version numbers of the revocation and registration lists in one of the security module 23 and memory recorder/player 200 are judged to be newer or older than those of the lists in the other and then the lists having the newer version numbers are used to check the ID of the counterpart.

As shown in FIG. 51, the security module 23 goes to step P252 (P53 in FIG. 21 and P152 in FIG. 36) where it will make a digital signature to a bit string consisting of the random numbers $R_A$ and $R_B$, value $V_A$ and revocation and registration list version numbers $RevV_A$ and $RegV_A$ to acquire $Sig_A$, append a public key certificate $Cert_A$ to these $R_A$, $R_B$, $V_A$, $RevV_A$, $RegV_A$ and $Sig_A$, and send them to the memory recorder/player 200.

Receiving $Cert_A$, $R_A$, $R_B$, $V_A$, $RevV_A$, $RegV_A$ and $Sig_A$ from the security module 23, the memory recorder/player 200 checks the public key certificate $Cert_A$ and digital signature $Sig_A$. When the memory recorder/player 200 judges that the certificate can pass the checking, the random number $R_B$ returned from the security module 23 is equal to a one previously generated and the digital signature $Sig_A$ is correct, it goes to step P253 (P53 in FIG. 21 and P153 in FIG. 36) where it will generate a random number $K_B$, make a calculation of $V_B = K_B \cdot G$, and make a digital signature to a bit string consisting of the random numbers $R_B$ and $R_A$, value $V_B$ and revocation and registration list version numbers $RevV_B$ and $RegV_B$ in the memory recorder/player 200 to acquire $S_{igB}$. The memory recorder/player 200 appends a public key certificate $Cert_B$ to these $R_B$, $R_A$, $V_B$, $RevV_B$, $RegV_B$ and $S_{igB}$, and sends them to the security module 23.

Receiving $Cert_B$, $R_B$, $R_A$, $V_B$, $RevV_B$, $RegV_B$ and $S_{igB}$ from the memory recorder/player 200, the security module 23 will check the public key certificate $Cert_B$ and digital signature $S_{igB}$. When they are judged to pass the checking, the security module 23 will go to a next step.

If both the security module 23 and memory recorder/player 200 mutually determines that their counterparts are legal, they will generate and share a session key Kse. Also, when both the security module 23 and memory recorder/player 200 are judged to be legal, they will check the version numbers of the lists in their counterparts.

When the lists owned by the security module 23 and memory recorder/player 200 are judged to be the same in version number as each other, the memory recorder/player 200 and security module 23 will mutually check IDs of their counterparts using their own lists to see if they are both legal. If the checking result shows that they are both legal, they will go to step P56. If the security module 23 finds that the memory recorder/player 200 is an illegal unit, the protocol will be closed. Similarly, if the memory recorder/player 200 finds that the security module 23 is an illegal medium, the protocol will be closed.

On the other hand, when it is mutually judged by the security module 23 and memory recorder/player 200 that the version numbers of the lists in one of them is newer than those of the lists in the other, the one goes to step P254 or P255 (P54 or P55 in FIG. 21 and P154 or 155 in FIG. 36) where it will send its own lists to the other, and the other thus receiving the lists with the newer version numbers will check the ID of its counterpart using the received lists having the newer version numbers and thus update its own old lists with the new lists.

Step P56 and subsequent steps are similar to those in FIGS. 21 and 36.

<Playback Procedure in the Sixth Embodiment (Variant)>

Figure 52:
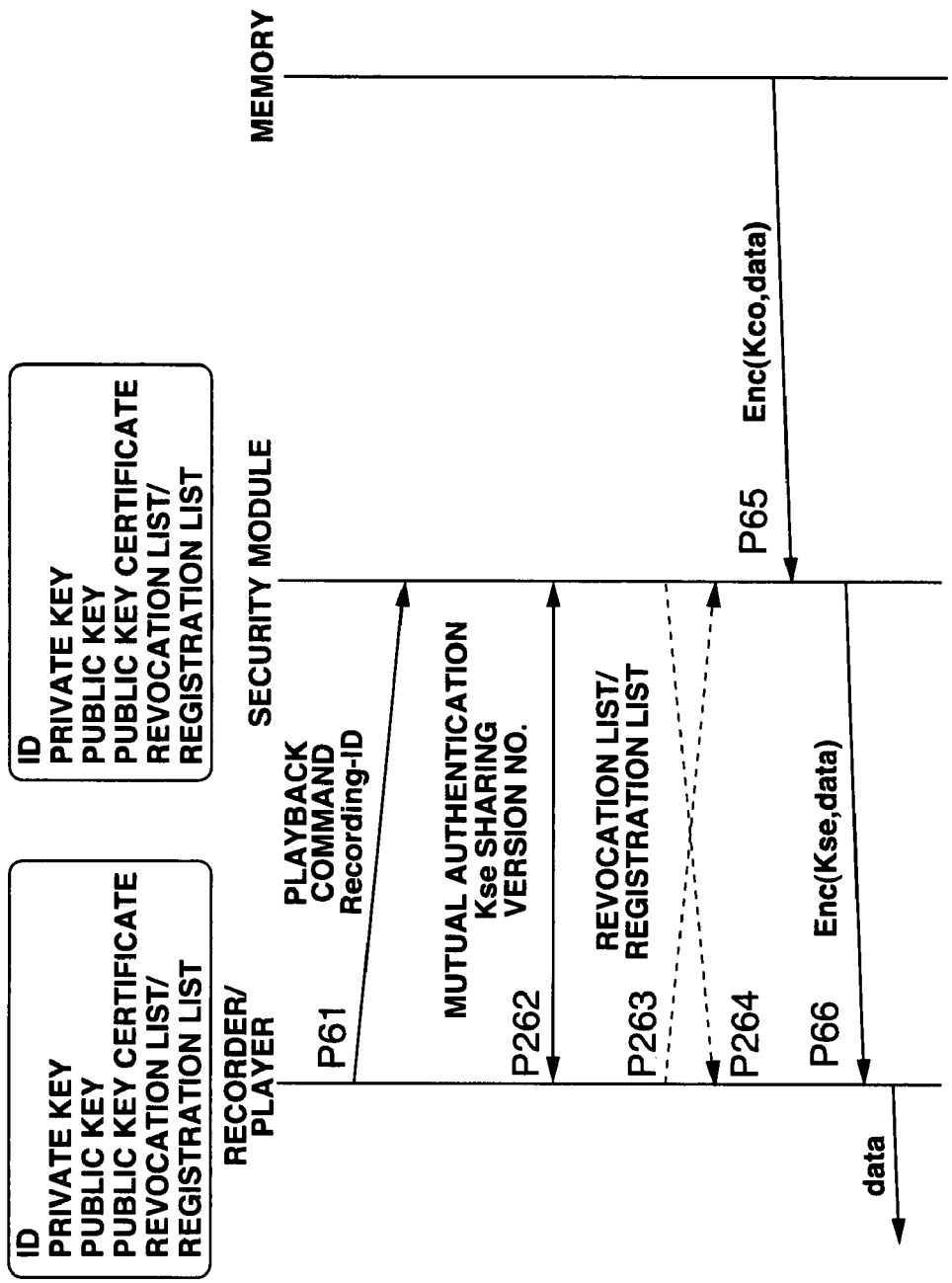
FIG. 52 shows still another example of the procedure for reading data from the memory as the data recording medium according to the sixth embodiment of the present invention.

In the sixth embodiment, the data may be read or played back from the memory unit 22 of the memory medium 20 by following the procedure shown in FIG. 52 (similar to FIGS. 22 and 37).

As shown in FIG. 52, the memory recorder/player 200 and security module 23 exchange between them version numbers of their own revocation and registration lists at step P262 (P62 in FIG. 22 and P162 in FIG. 37).

At steps P263 and P264 (P63 and P64 in FIG. 22 and P163 and P164 in FIG. 37), the lists having old version numbers are updated with the lists having the new version numbers.

Step P65 and subsequent steps are similar to those in FIGS. 22 and 37.

Note that in each of the aforementioned embodiments of the present invention, lists are stored in a single nonvolatile memory. Of course, however, lists may be stored in two or more nonvolatile memories or in a partial area of one nonvolatile memory. Further, in the above embodiments, the nonvolatile memory is provided in the data recording medium. However, it may be provided outside the security module. In other words, in the aforementioned embodiments of the present invention, the nonvolatile memory to store the lists is a storage area other than an area where encrypted content data is recorded, such as data storage area of the optical disc 12, memory unit 22. Namely, it is a storage area specially provided to store the lists and different from the storage area for holding the public and private keys.

[Embodiments Corresponding to Combination of Medium and Unit Types]

In the aforementioned first to sixth embodiments of the present invention, the recorder/player (100 or 200) is provided with the nonvolatile memory (110 or 210), the security module (13 or 23) of the data recording medium is provided with the nonvolatile memory (34, 44), and revocation list and/or registration list are stored in these nonvolatile memories. However, there is a possibility that one or both of the recorder/player and data recording medium is not provided with a nonvolatile memory to store the revocation list and/or registration list. That is to say, since the provision of the nonvolatile memory for storage of the lists will lead to an increased cost, it is possible that a recorder/player and data recording medium provided with no such nonvolatile memory or a recorder/player and data recording medium capable of storing private and public keys but provided with only a low-cost nonvolatile memory having no sufficient capacity to store list data.

The data recording medium can be classified into first and second medium types which will be described below, and also the recorder/player can be classified into first and second unit types, depending upon whether it is provided with a nonvolatile memory having a sufficient capacity to store a revocation list and/or registration list.

The first medium type is a data recording medium not provided with a nonvolatile memory to store the revocation list and/or registration list but adapted to store the lists in an area thereof in which content data is to be recorded. Note that the first medium type includes a one provided with a nonvolatile memory which however has no sufficient capacity to store the lists.

The second medium type is a data recording medium provided with a nonvolatile memory to store the revocation list and/or registration list.

The first unit type is a recorder/player not provided with a nonvolatile memory to store the revocation list and/or registration list. Note that the first unit type includes a one provided with a nonvolatile memory which however has no sufficient capacity to store the lists.

The second unit type is a recorder/player provided with a nonvolatile memory to store the revocation list and/or registration list.

Note that in the following description, an optical disc medium corresponding to the first medium type will be referred to as "media type IM1", an optical disc medium corresponding to the second medium type will be referred to as "media type IM2", a memory medium corresponding to the first medium type will be referred to as "media type IM3", and a memory medium corresponding to the second medium type will be referred to as "media type IM4". Further, an optical disc recorder/player corresponding to the first unit type will be referred to as "device type Dev1", an optical disc recorder/player corresponding to the second unit type will be referred to as "device type Dev2", a memory recorder/player corresponding to the first unit type will be referred to as "device type Dev3", and a memory recorder/player corresponding to the second unit type will be referred to as "device type Dev4".

Figure 53:
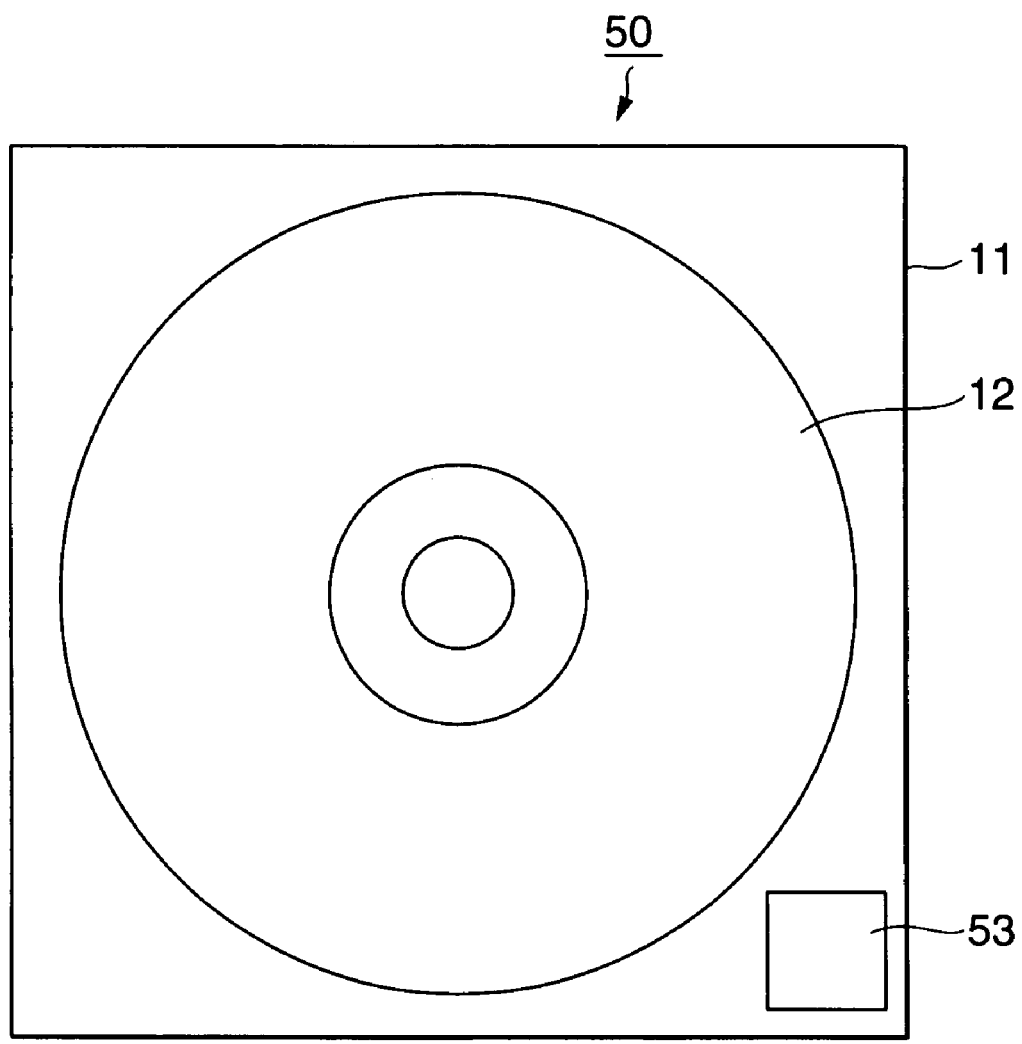
FIG. 53 shows the construction of an optical disc as the data recording medium having a security module not provided with the nonvolatile memory for storage of the list.
Figure 54:
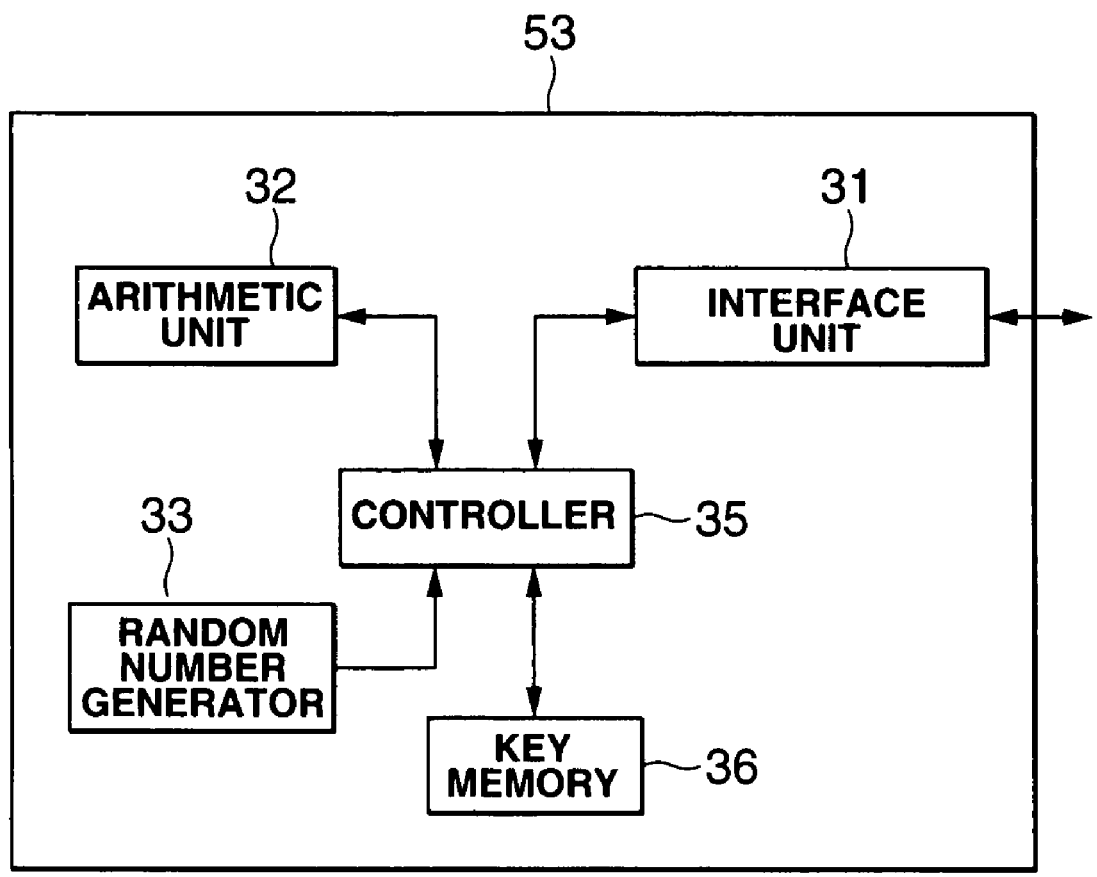
FIG. 54 is a block diagram of an example of a security module included in the optical disc as the data recording medium, the security module being not provided with the nonvolatile memory for storage of the list.

FIG. 53 schematically shows the construction of an optical disc medium 50 corresponding to the media type IM1. The optical disc medium 50 shown in FIG. 53 includes a security module 53 having no nonvolatile memory to store lists as shown in FIG. 54. However, it should be noted that even the security module 53 having no nonvolatile memory for storage of lists as shown in FIG. 54 needs a memory for storage of a private key, public key, public key certificate, ID and version numbers of the lists. Therefore, the security module 53 shown in FIG. 54 has a nonvolatile key memory 36 to store the private key, public key, public key certificate, ID and list version numbers. Note that the construction of each part in FIGS. 53 and 54 is the same as those shown in FIGS. 1 and 2, and so it will not be described any longer.

Figure 55:
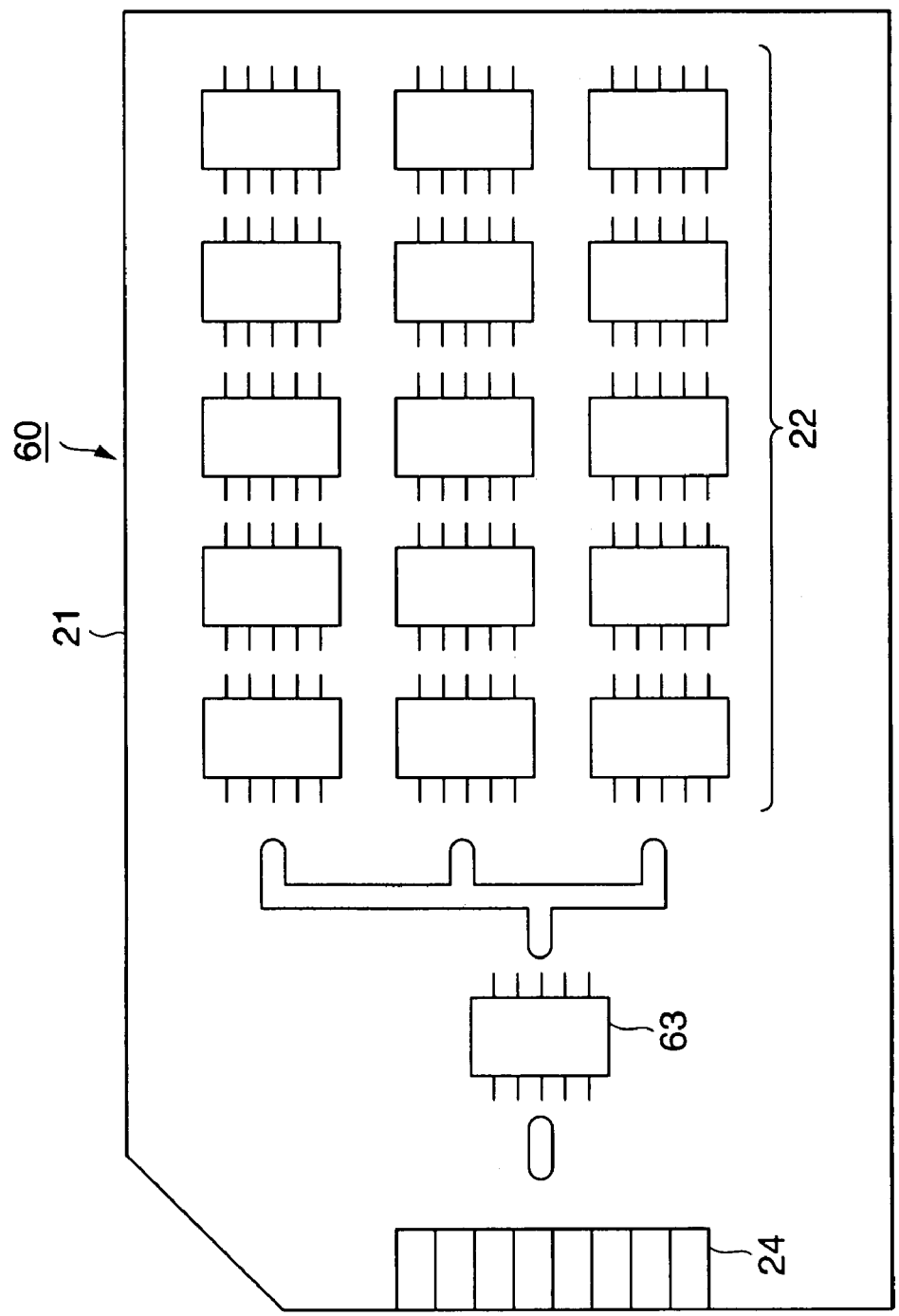
FIG. 55 shows the construction of a memory as the data recording medium having a security module provided with no nonvolatile memory for storage of the list.
Figure 56:
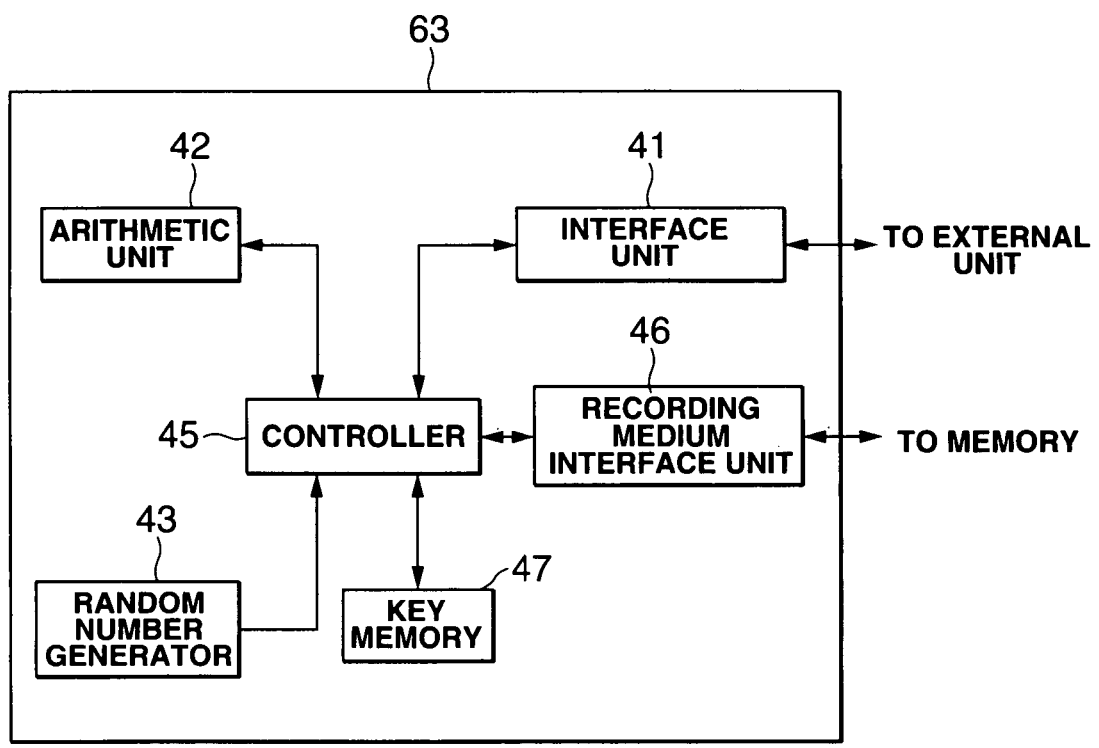
FIG. 56 is a block diagram of an example of a security module included in the memory as the data recording medium, the security module being not provided with the nonvolatile memory for storage of the list.

FIG. 55 schematically illustrates the construction of a memory medium 60 corresponding to the media type IM3. The optical disc medium 60 shown in FIG. 55 includes a security module 63 having no nonvolatile memory to store lists as shown in FIG. 56. However, it should be noted that even the security module 63 having no nonvolatile memory for storage of lists as shown in FIG. 56 needs a memory for storage of a private key, public key, public key certificate, ID and version numbers of the lists. Therefore, the security module 63 shown in FIG. 56 has a nonvolatile key memory 47 to store the private key, public key, public key certificate, ID and list version numbers. Note that the construction of each part in FIGS. 55 and 56 is the same as those shown in FIGS. 12 and 13, and so it will not be described any longer.

There will be described below procedures for data recording and data playback in each of combinations of the media type IM1 and device type Dev1 (IM1, Dev1), the media type IM1 and device type Dev2 (IM1, Dev2), media type IM2 and device type Dev1 (IM2, Dev1), media type IM3 and device type Dev3 (IM3, Dev3), media type IM3 and device type Dev4 (IM3, Dev4) and media type IM4 and device type Dev3 (IM4, De$_{VB}$3). Note that the combination of the media type IM2 and device type Dev2 (IM2, Dev2) corresponds to the aforementioned first, third and fifth embodiments, and the combination of the media type IM4 and device type Dev 4 (IM4, Dev4) corresponds to the second, fourth and sixth embodiments. Therefore, these combinations will not be described any further below.

It should be noted that the seventh and subsequent embodiments which will be described herebelow uses both the revocation and registration lists as in the aforementioned fifth and sixth embodiments but they may be ones using only either of the revocation and registration lists as in the first to fourth embodiments. In the following description of the seventh and subsequent embodiments, the version number of a list at one side is first judged to be newer or older than that of a list at the other side and then the list having a newer version number is used to check the ID of the other. This does not correspond to all the procedures having been described concerning the first to sixth embodiments, but similar procedures to those adopted in the first to sixth embodiments may be used with each of the seventh and subsequent embodiments.

Seventh Embodiment (IM1, Dev1)

First the combination of the media type IM1 and device type Dev1 (IM1, Dev1) will be described herebelow as the seventh embodiment.

Figure 57:
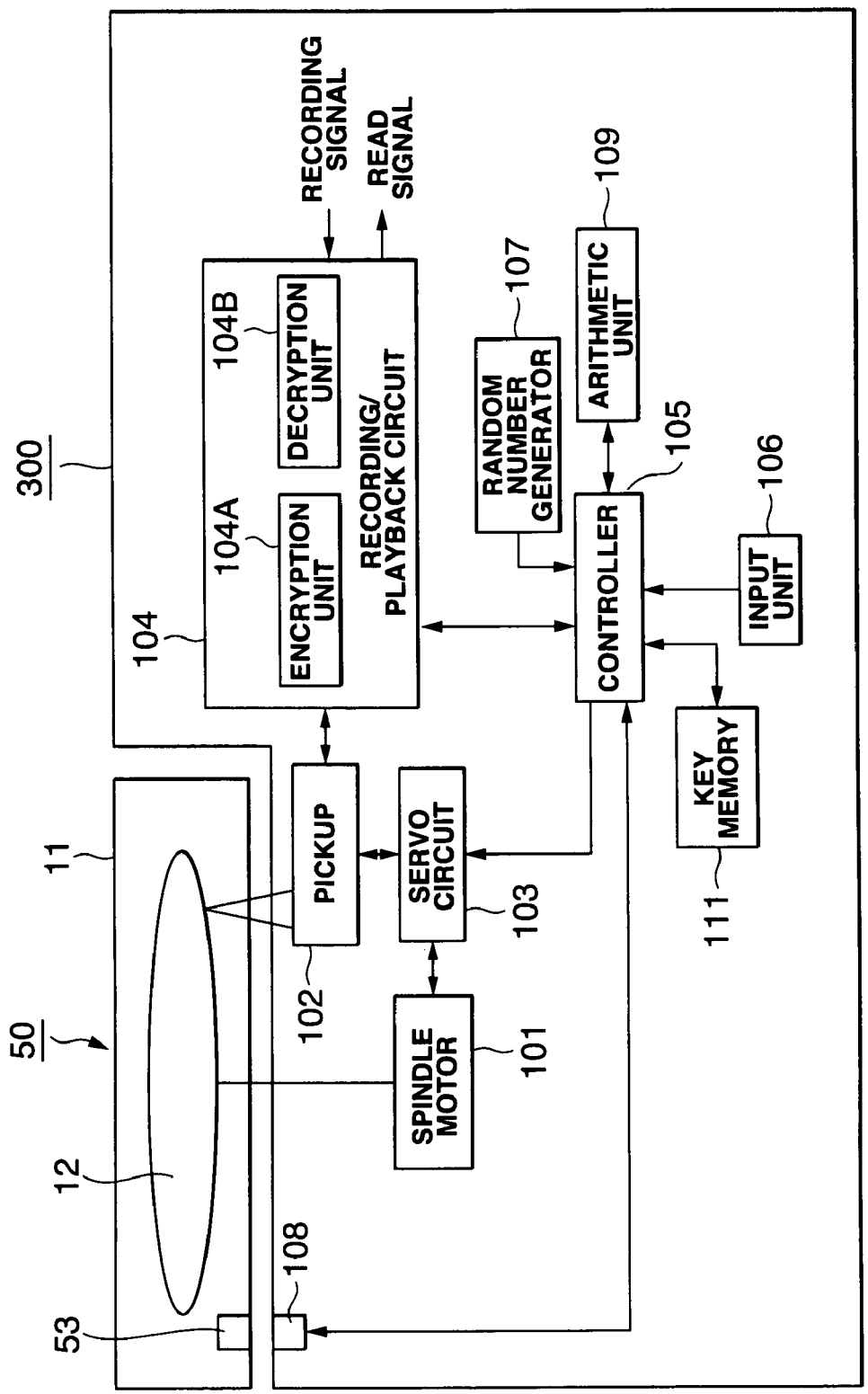
FIG. 57 is a block diagram of an optical disc as the data recording medium according to the seventh embodiment of the present invention and a recorder/player for the optical disc.

The system construction of the seventh embodiment is constructed as shown in FIG. 57. As shown, the seventh embodiment includes an optical disc recorder/player 300 of the device type Dev1, having no nonvolatile memory dedicated to store lists (or having only a nonvolatile memory with no sufficient capacity to store the lists), and an optical disc memory 50 of the media type IM1 including a security module 53 having no nonvolatile memory to store the lists (or having only a nonvolatile memory with no sufficient capacity to store the lists). As shown in FIG. 57, however, even the optical disc recorder/player 300 having no dedicated nonvolatile memory to store the lists needs a memory to store a private key, public key certificate, ID and list version numbers. Therefore, the optical disc recorder/player 300 includes a nonvolatile key memory 111 to store a private key, public key certificate, ID and list version numbers, as shown in FIG. 57. Note that each of the components shown in FIG. 57 is constructed similarly to the embodiment shown in FIG. 3, and so will not further explained herebelow.

<Recording Procedure in the Seventh Embodiment>

Figure 58:
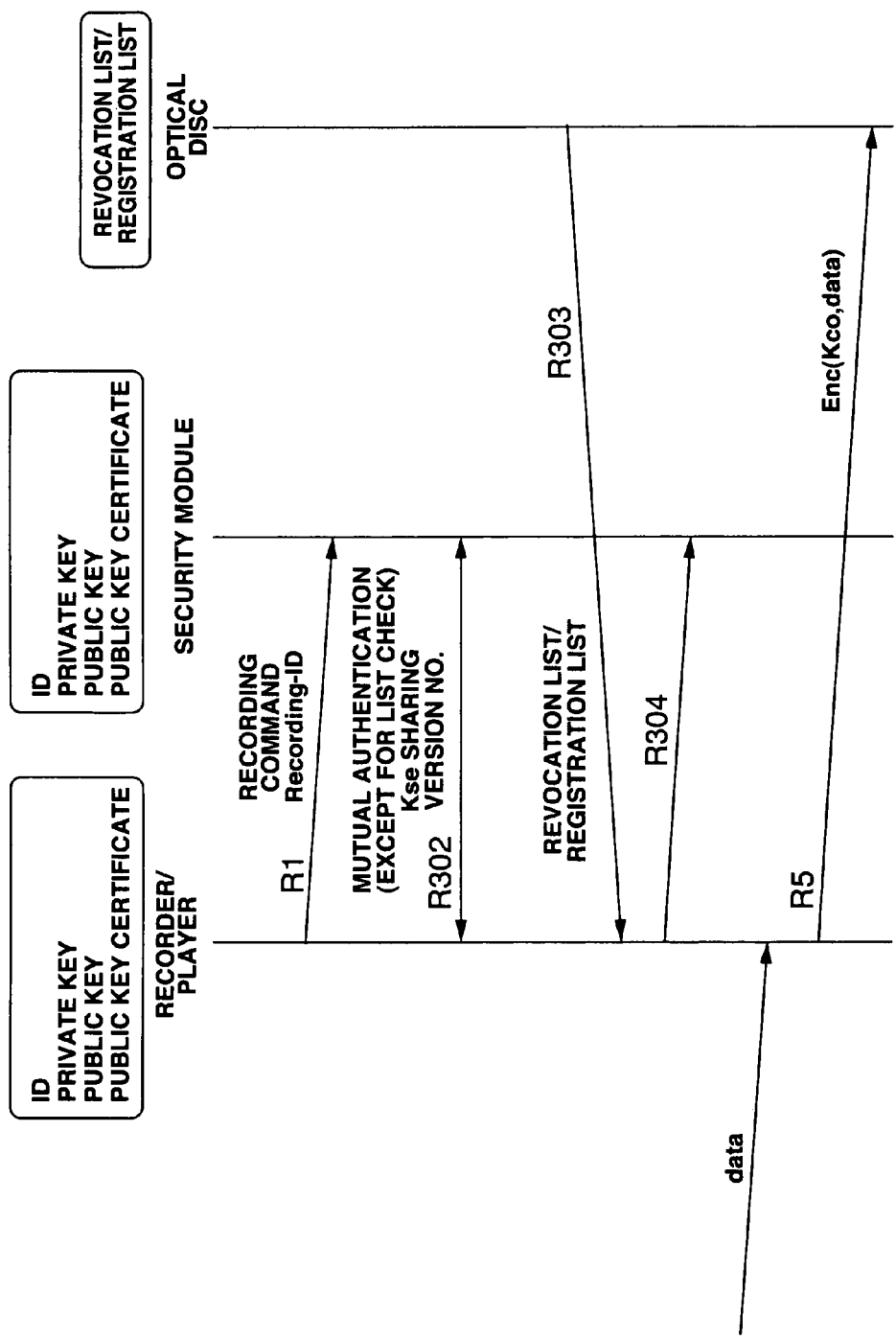
FIG. 58 shows a basic procedure for writing data to the optical disc as the data recording medium according to the seventh embodiment of the present invention.

FIG. 58 explains a procedure in which in the combination of the media type IM1 and device type Dev1 (IM1, Dev1) as the seventh embodiment, the optical disc recorder/player 300 records data to the optical disc memory 50. Note that the same steps in FIG. 58 as in the aforementioned embodiments will not be repeated herebelow and only differences from the aforementioned embodiments will be described.

FIG. 58 shows a procedure generally similar to that shown in FIG. 39. At step R302 (R202 in FIG. 39), the optical disc recorder/player 300 and security module 53 exchange their own revocation and registration list version numbers between them. Since in the seventh embodiment, the optical disc recorder/player 300 has no lists, it goes to step R302 where it will send a version number "0" to the security module 53 while the security module 53 will read from a key memory 36 version numbers of revocation and registration lists recorded in a content data recording area of the optical disc 12 and send them to the optical disc recorder/player 300.

Next, the optical disc recorder/player 300 goes to step R303 where it will read the revocation and registration lists recorded in the content data recording area of the optical disc 12 in the optical disc medium 50.

The optical disc recorder/player 300 checks if the optical disc medium 50 is legal, using the lists read from the content data recording area of the optical disc 12 in the optical disc medium 50. If the optical disc medium 50 is judged to be illegal, the protocol will be closed. On the other hand, if the optical disc medium 50 is judged to be legal, the optical disc recorder/player 300 goes to step R304 where it will send the lists to the security module 53.

Using the received lists, the security module 53 checks if the optical disc recorder/player 300 is legal. If the optical disc recorder/player 300 is judged to be legal, the protocol will be closed.

When the security module 53 has judged by the checking with the lists that the optical disc recorder/player 300 is legal, namely, that both the optical disc recorder/player 300 and security module 53 are legal, the security module 53 will go to step R5 where data will be encrypted and recorded.

<Recording Procedure in the Seventh Embodiment (Detail)>

Figure 59:
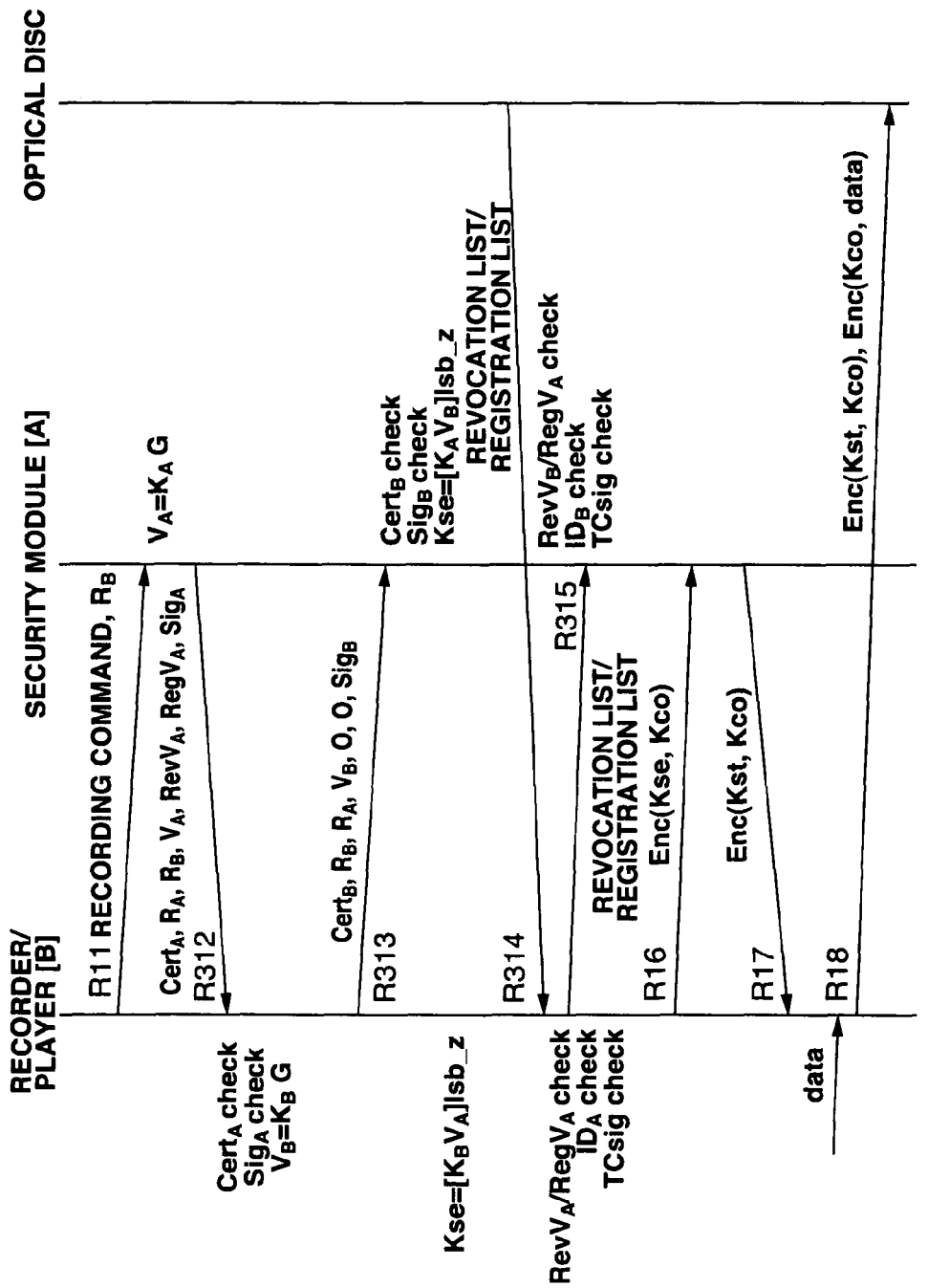
FIG. 59 shows in detail the procedure for writing data to the optical disc as the data recording medium according to the seventh embodiment of the present invention.

FIG. 59 shows in detail the procedure in which the optical disc recorder/player 300 in the seventh embodiment records data to the optical disc medium 50 shown in FIG. 58. This procedure is generally similar to that shown in FIG. 40.

As shown in FIG. 59, the security module 53 goes to step R312 (R212 in FIG. 40) where it will append a public key certificate $Cert_A$ to a bit string consisting of random numbers $R_A$ and $R_B$, value $V_A$ and version numbers $RevV_A$ and $RegV_A$ of the lists stored in the key memory 36, and send them to the optical disc recorder/player 300.

Receiving $Cert_A$, $R_A$, $R_B$, $V_A$, $RevV_A$, $RegV_A$ and $Sig_A$ from the security module 53, the optical disc recorder/player 300 checks the public key certificate $Cert_A$ and digital signature $Sig_A$. If the optical disc recorder/player 300 has judged that the certificate can pass the checking, the random number $R_B$ returned from the security module 53 is equal to a one previously generated and the digital signature $Sig_A$ is correct, it goes to step R313 where it will make a digital signature to a bit string consisting of the random numbers $R_B$, $R_A$, value $V_B$ and a version number "0" indicating that the optical disc recorder/player 300 has no lists, append a public key certificate $Cert_B$ to these $R_B$, $R_A$, $V_B$, 0, 0 and $S_{igB}$, and send them to the security module 53.

Receiving $Cert_B$, $R_B$, $R_A$, $V_B$, 0, 0 and $S_{igB}$ from the optical disc recorder/player 300, the security module 53 will check the public key certificate $Cert_B$ and digital signature $S_{igB}$. When they are judged not to pass the checking, the protocol will be closed.

If the public key certificate $Cert_B$ and digital signature $S_{igB}$ are judged to pass the checking, namely, if both the optical disc recorder/player 300 and security module 53 have passed the checking, the optical disc recorder/player 300 and security module 53 will generate and share a session key Kse.

Next, the optical disc recorder/player 300 goes to step R314 where it will read the revocation and registration lists stored in the data recording area of the optical disc 12 and check if the version numbers of the lists are equal to those ($RevV_A$ and $RegV_A$) acquired at step R312, check, using the lists, if the optical disc memory 50 is legal and also check the digital signature TCSig made by the center TC, included in the lists. If the optical disc medium 50 is judged to be illegal, by the checking, the protocol will be closed. On the other hand, if the optical disc medium 50 is judged to be legal, the optical disc recorder/player 50 goes to step R315 where it will send the lists to the security module 53. It should be noted that the lists may be sent to the security module 53 in the course of the checking.

Receiving the lists, the security module 53 checks if the version numbers of the lists are equal to those ($RevV_A$ and $RegV_A$) stored in the key memory 36 in the security module 53, check, using the lists, if the optical disc recorder/player 300 is legal and also check the digital signature TCSig made by the center TC, included in the lists. If the optical disc 12 is judged to be illegal, the protocol will be closed.

On the other had, if the optical disc 12 is judged to be illegal, namely, if both the optical disc recorder/player 300 and security module 53 are judged to be legal, the security module 53 goes to step R16 and subsequent steps where data will be encrypted and recorded.

<Playback Procedure in the Seventh Embodiment>.

Figure 60:
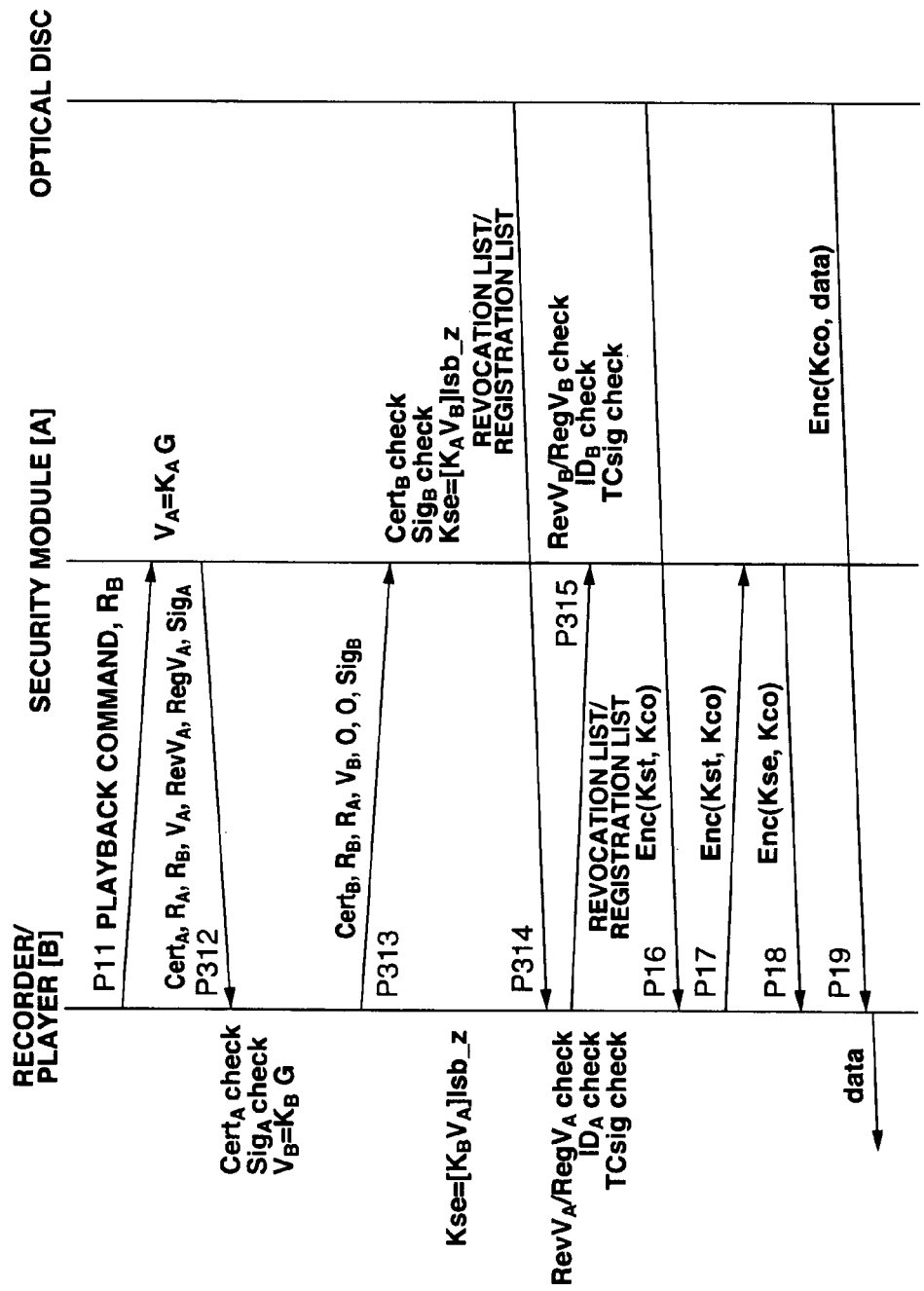
FIG. 60 shows a basic procedure for reading data from the optical disc as the data recording medium according to the seventh embodiment of the present invention.

FIG. 60 explains a procedure in which the optical disc recorder/player 300 according to the seventh embodiment reads or plays back data from the optical disc 12. Note that FIG. 60 is generally similar to FIG. 43 and the procedure is also generally similar to that in FIG. 43. So, only differences of the procedure in FIG. 60 from that in FIG. 43 will be described in the following.

As shown in FIG. 60, the security module 53 goes to step P312 (P212 in FIG. 43) where it will append a public key certificate $Cert_A$ to a bit string consisting of random numbers $R_A$ and $R_B$, value $V_A$ and version numbers $RevV_A$ and $RegV_A$ of the lists recorded in the key memory 36, and send them to the optical disc recorder/player 300.

Receiving $Cert_A$, $R_A$, $R_B$, $V_A$, $RevV_A$, $RegV_A$ and $Sig_A$ from the security module 53, the optical disc recorder/player 300 checks the public key certificate $Cert_A$ and digital signature $Sig_A$. If the optical disc recorder/player 300 has judged that the certificate can pass the checking, the random number $R_B$ returned from the security module 53 is equal to a one previously generated and the digital signature $Sig_A$ is correct, it goes to step P313 (P213 in FIG. 43) where it will make a digital signature to a bit string consisting of the random numbers $R_B$ and $R_A$, value $V_B$ and a version number "0" indicating that the optical disc recorder/player 300 has no lists, append a public key certificate $Cert_B$ to these $R_B$, $R_A$, $V_B$, 0, 0 and $S_{igB}$, and send them to the security module 53.

Receiving $Cert_B$, $R_B$, $R_A$, $V_B$, 0, 0 and $S_{igB}$ from the optical disc recorder/player 300, the security module 53 will check the public key certificate $Cert_B$ and digital signature $S_{igB}$. When they are judged not to pass the checking, the protocol will be closed.

If the public key certificate $Cert_B$ and digital signature $S_{igB}$ are judged by the security module 53 to pass the checking, namely, if both the optical disc recorder/player 300 and security module 53 have passed the checking, the optical disc recorder/player 300 and security module 53 will generate and share a session key Kse.

Next, the optical disc recorder/player 300 goes to step P314 where it will read the revocation and registration lists stored in the data recording area of the optical disc 12 and check if the version numbers of the lists are equal to those ($RevV_A$ and $RegV_A$) acquired at step P312, check, using the lists, if the optical disc memory 50 is legal and also check the digital signature TCSig made by the center TC, included in the lists. If the optical disc medium 50 is judged to be illegal, by the checking, the protocol will be closed. On the other hand, if the optical disc medium 50 is judged to be legal as the result of checking, the optical disc recorder/player 300 goes to step P315 where it will send the lists to the security module 53. It should be noted that the lists may be sent to the security module 53 in the course of the checking.

Receiving the lists, the security module 53 checks if the version numbers of the lists are equal to the above-mentioned version numbers (RevV$_A$ and RegV$_A$), check, using the lists, if the optical disc recorder/player 300 is legal and also check the digital signature TCSig made by the center TC, included in the lists. If the optical disc 12 is judged to be illegal as the result of checking, the protocol will be closed.

On the other had, if the optical disc 12 is judged to be illegal, namely, if both the optical disc recorder/player 300 and security module 53 are judged to be legal, the security module 53 goes to step P16 and subsequent steps where data will be played back and decrypted.

Eighth Embodiment (IM1, Dev2)

Next, a combination of the media type IM1 and device type Dev2 (IM1, Dev2) will be described herebelow as the eighth embodiment of the present invention.

Figure 61:
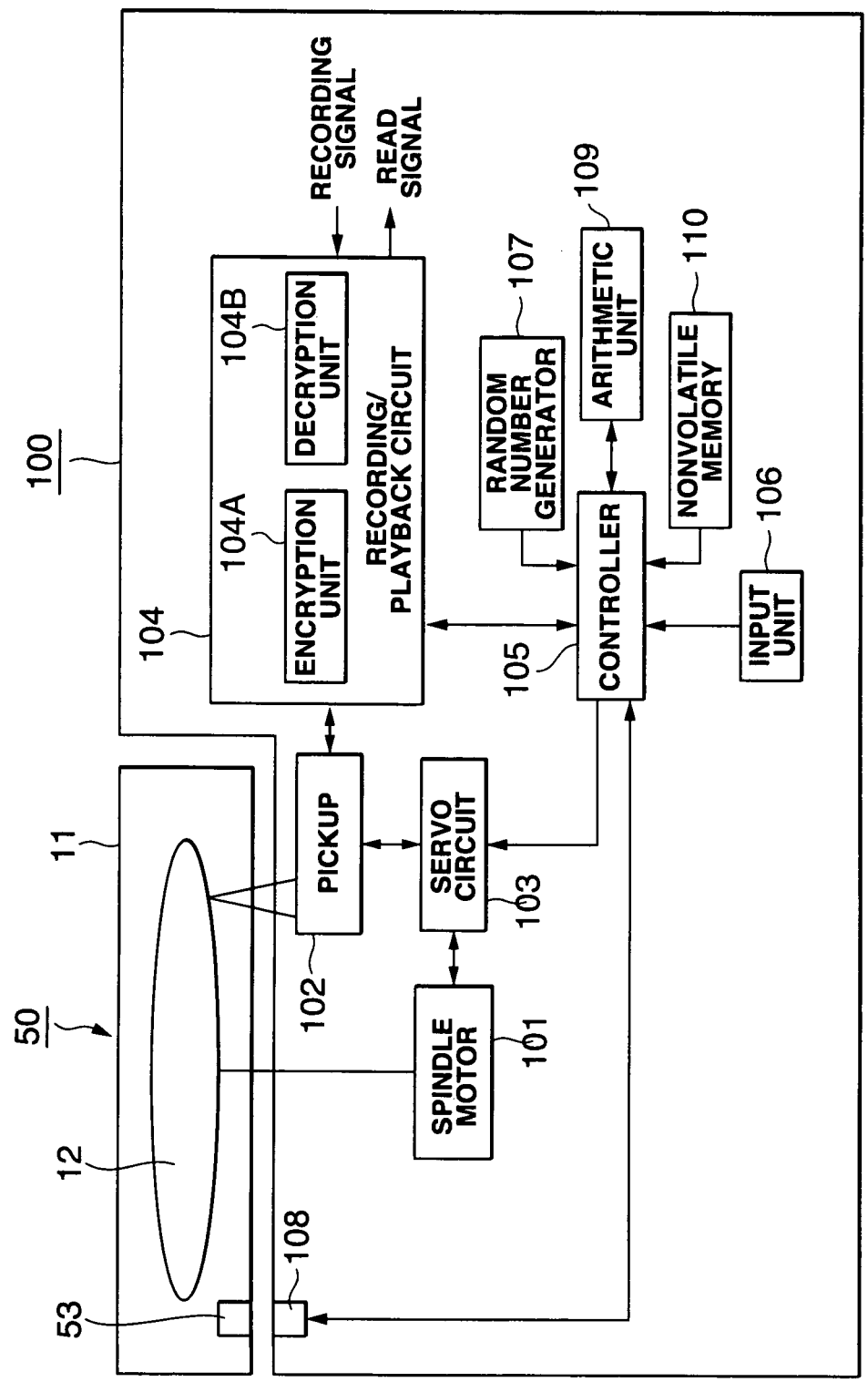
FIG. 61 is a block diagram of an optical disc as the data recording medium according to the eighth embodiment of the present invention and a recorder/player for the optical disc.

The system construction of the media/device combination as the eighth embodiment is as shown in FIG. 61. As shown, the optical disc recorder/player 100 of the device type Dev2 includes a dedicated nonvolatile memory 110 for storage of the lists while the security module 53 of the optical disc medium 50 of the media type IM1 has not any nonvolatile memory for storage of the lists. Note that the construction of each component in FIG. 61 is similar to that shown in FIG. 3 and so will not further be described herein.

<Recording Procedure in the Eighth Embodiment>

Figure 62:
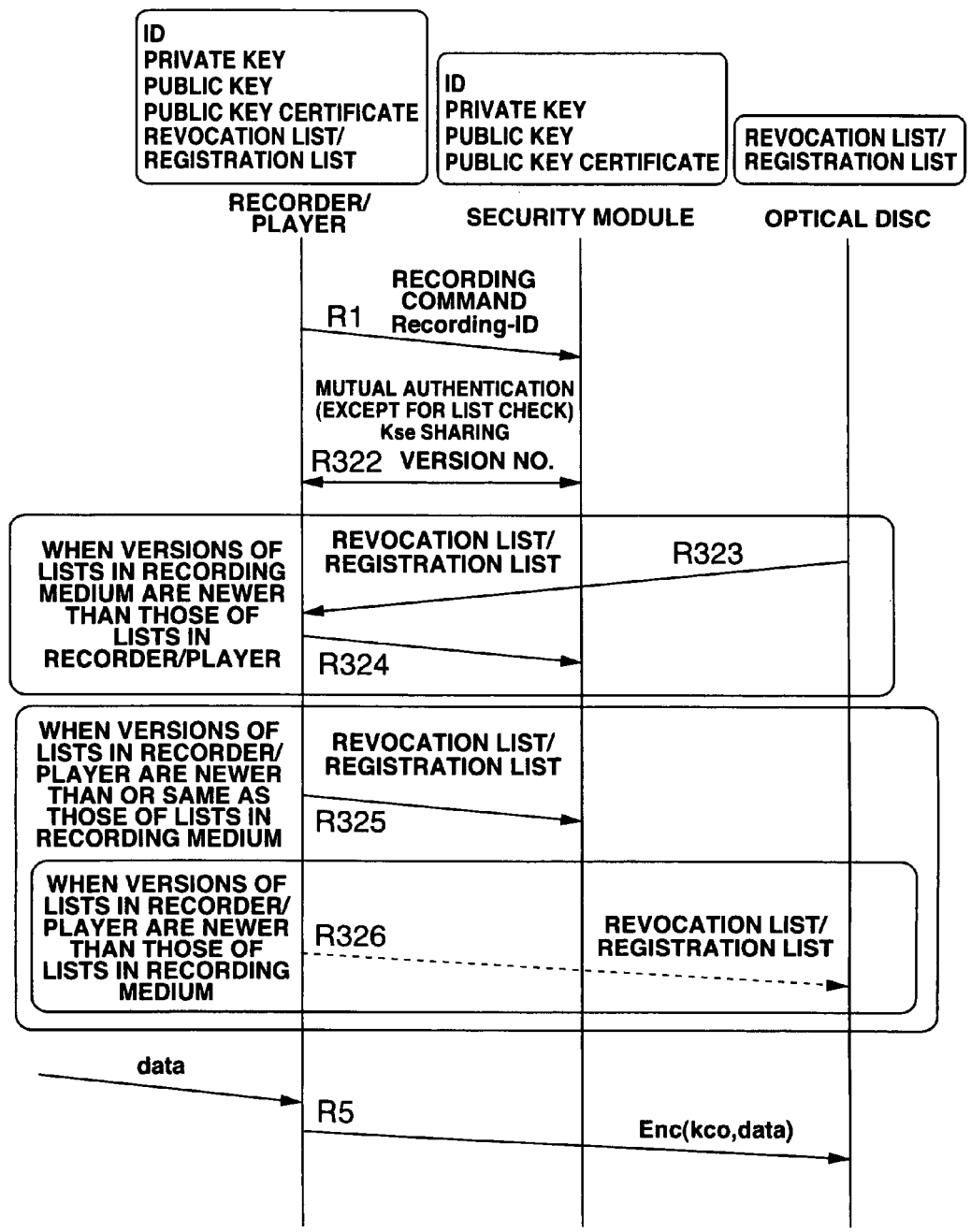
FIG. 62 shows a basic procedure for writing data to the optical disc as the data recording medium according to the eighth embodiment of the present invention.

FIG. 62 explains a procedure in which in the combination of the media type IM1 and device type Dev1 (IM1, Dev2) as the eighth embodiment, the optical disc recorder/player 100 records data to the optical disc medium 50. Note that the same steps in FIG. 62 as in the aforementioned embodiments will not be repeated herebelow and only differences of the procedure in FIG. 62 from those in the aforementioned embodiments will be described below.

FIG. 62 shows a procedure generally similar to that shown in FIG. 39. At step R322 (R202 in FIG. 39), the optical disc recorder/player 100 and security module 53 exchange their own revocation and registration list version numbers between them. Since in the eighth embodiment, the optical disc recorder/player 100 has revocation and registration lists stored in a nonvolatile memory 110, it will send the version numbers of the lists to the security module 53 while the security module 53 will read from a key memory 36 version numbers of revocation and registration lists recorded in a content data recording area of the optical disc 12 and send them to the optical disc recorder/player 100.

If the version numbers of the lists owned by the security module 53 after exchange, at step R322, of the list version numbers with the optical disc recorder/player 100 are newer than those of the lists in the optical disc recorder/player 100, the optical disc recorder/player 100 goes to step R123 where it will read revocation and registration lists recorded in the content data recording area of the optical disc 12 in the optical disc medium 50.

Using the read lists, the optical disc recorder/player 100 will check if the optical disc medium 50 is legal. If the optical disc medium 50 is judged to be illegal as the result of checking, the protocol will be closed. On the other hand, if the result of checking shows that the optical disc medium 50 is legal, the optical disc recorder/player 100 goes to step R324 where it will send the lists it has read from the optical disc 12 to the security module 53 and update the lists in its own nonvolatile memory 110 using the read lists. At this time, the security module 53 will check, using the lists, if the optical disc recorder/player 100 is legal. If the optical disc recorder/player 100 is judged to be illegal, the protocol will be closed.

If it is found as the result of checking using the lists that the security module 53 is legal, namely, if both the optical disc recorder/player 100 and security module 53 are judged to be legal, the optical disc recorder/player 100 goes to step R5 where data will be encrypted and recorded.

On the other hand, if the version numbers of the lists owned by the optical disc recorder/player 100 after the exchange of the list version numbers at step R322 are newer or equal to those of the lists owned by the security module 53, the optical disc recorder/player 100 goes to step R325 where it will send the lists held in its own nonvolatile memory 110 to the security module 53.

At this time, the security module 53 will check, using the lists, if the optical disc recorder/player 100 is legal. If the latter is judged to be illegal, the protocol will be closed.

If the security module 53 has judged based on the lists that the optical disc recorder/player 100 is legal, that is, if the optical disc recorder/player 100 is legal and when the version numbers of the lists in the optical disc recorder/player 100 are equal to those of the lists in the security module 53, the security module 53 goes to step R5 where data is encrypted and recorded.

Also, if the version numbers of the lists owned by the optical disc recorder/player 100 after the exchange of the list version numbers at step R322, the optical disc recorder/player 100 goes to step R326 where it will record the lists held in its own nonvolatile memory 110 to the data recording area in the optical disc 12. At this time, the security module 53 will memorize the version numbers, and use them. Thereafter, the security module 53 goes to step R5 where data will be encrypted and recorded.

<Recording Procedure in the Eighth Embodiment (Detail)>

Figure 63:
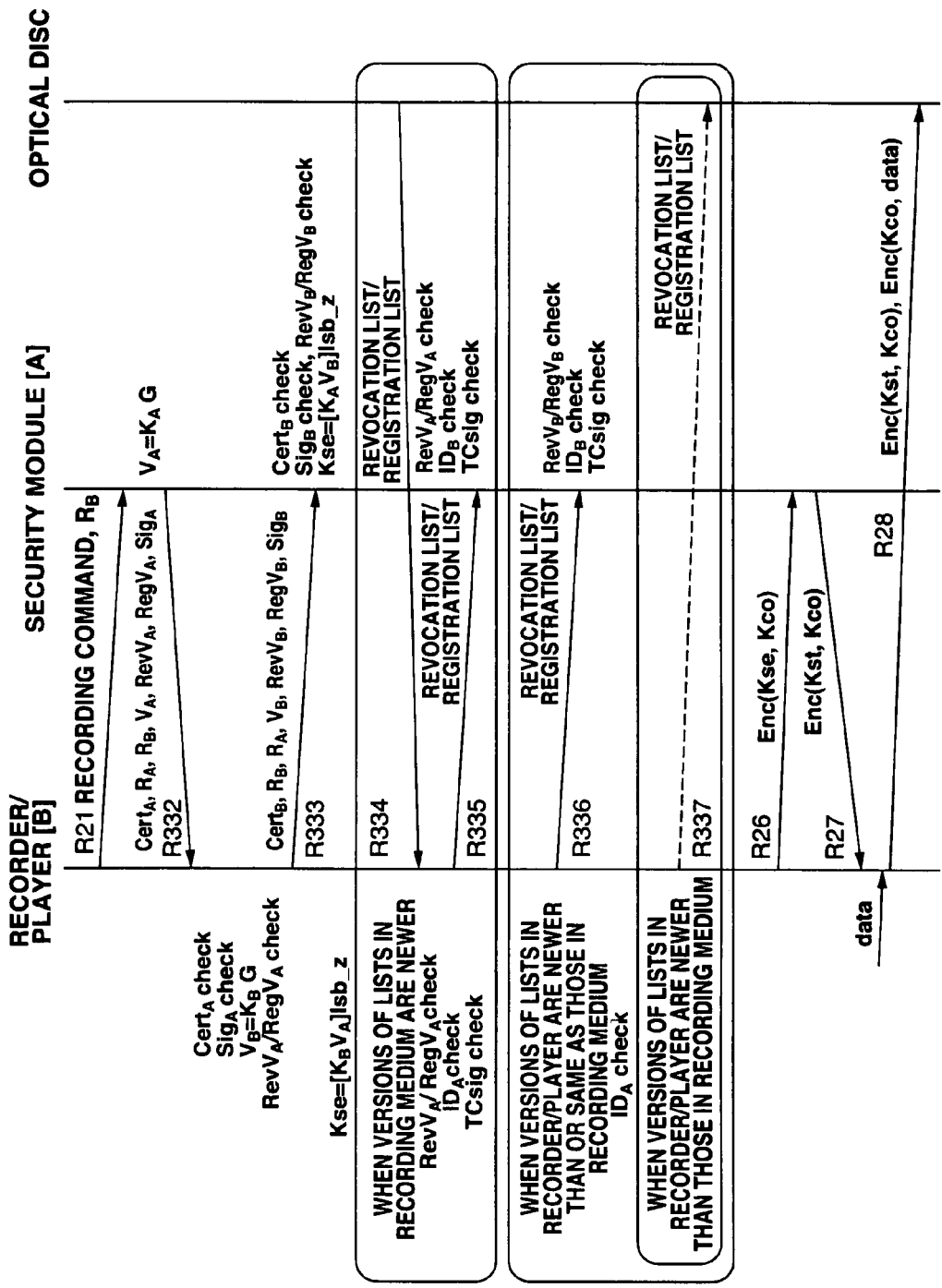
FIG. 63 shows in detail the procedure for writing data to the optical disc as the data recording medium according to the eighth embodiment of the present invention.

FIG. 63 shows in detail the procedure in which the optical disc recorder/player 100 in the eighth embodiment shown in FIG. 62 records data to the optical disc medium 50. It should be noted that only differences of the procedure in FIG. 63 from that shown in FIG. 41 will be described in the following.

As shown in FIG. 63, the security module 53 goes to step R332 (R222 in FIG. 41) where it will append a public key certificate Cert$_A$ to a bit string consisting of random numbers R$_A$ and R$_B$, value V$_A$ and version numbers RevV$_A$ and RegV$_A$ of the lists stored in the key memory 36, and send them to the optical disc recorder/player 100.

Receiving Cert$_A$, R$_A$, R$_B$, V$_A$, RevV$_A$, RegV$_A$ and Sig$_A$ from the security module 53, the optical disc recorder/player 100 checks the public key certificate Cert$_A$ and digital signature Sig$_A$. When the optical disc recorder/player 100 judges that the certificate can pass the checking, the random number R$_B$ returned from the security module 13 is equal to a one previously generated and the digital signature Sig$_A$ is correct, it goes to step R333 (R223 in FIG. 41) where it will make a digital signature to a bit string consisting of the random numbers R$_B$ and R$_A$, value V$_B$, revocation and registration list version numbers RevV$_B$ and RegV$_B$ stored in its own nonvolatile memory 110, append a public key certificate Cert$_B$ to these R$_B$, R$_A$, V$_B$, RevV$_B$, RegV$_B$ and S$_{igB}$, and send them to the security module 53.

Receiving Cert$_B$, R$_B$, R$_A$, V$_B$, RevV$_B$, RegV$_B$ and S$_{igB}$ from the optical disc recorder/player 100, the security module 53 will check the public key certificate Cert$_B$ and digital signature S$_{igB}$. When they are judged to pass the checking, the protocol will be closed.

At this time, if the public key certificate Cert$_B$ and digital signature S$_{igB}$ are judged by the security module 53 to pass the checking, namely, if both the optical disc recorder/player 100 and security module 53 are judged to pass the checking, the optical disc recorder/player 100 and security module 53 will generate and share a session key Kse. Also, the checking, the optical disc recorder/player 100 and security module 53 will check which the version numbers of their own lists are newer.

It the list version numbers of the security module 53 are judged to be newer than those of the optical disc recorder/player 100, the optical disc recorder/player 100 goes to step R334 where it will read the revocation and registration lists recorded in the content data recording area of the optical disc 12 in the optical disc memory 50, and check if the version numbers of the lists are equal to those ($RevV_A$ and $RegV_A$) previously acquired, check, using the lists, if the optical disc medium 50 is legal and also check the digital signature TCSig made by the center TC, included in the lists. If the optical disc medium 50 is judged to be illegal as the result of checking, the protocol will be closed. On the other hand, if the optical disc medium 50 is judged to be legal as the result of checking, the optical disc recorder/player 300 goes to step P335 where it will send the lists to the security module 53 and update, using the lists read from the optical disc 12, the lists in its own nonvolatile memory 110. It should be noted that the lists may be sent to the security module 53 in the course of the checking.

Receiving the lists, the security module 53 checks if the version numbers of the lists are equal to the above-mentioned ($RevV_A$ and $RegV_A$) held in the key memory 36 in the security module 53, check, using the lists, if the optical disc recorder/player 100 is legal and also check the digital signature TCSig made by the center TC, included in the lists. If the optical disc recorder/player 100 is judged to be illegal as the result of checking, the protocol will be closed.

If the optical disc recorder/player 100 is judged to be legal, namely, if both the optical disc recorder/player 100 and security module 53 are judged to be legal, the security module 53 goes to step P26 and subsequent steps where data will be encrypted and recorded.

On the other hand, if it is found, as the result of the checking of list version numbers to be newer or older, that the list version numbers held by the security module 53 are newer than those held in the optical disc recorder/player 100, the optical disc recorder/player 100 will check, using its own lists, if the optical disc medium 50 is legal. If the optical disc medium 50 is judged to pass the checking, the optical disc recorder/player 100 goes to step R336 where it will send the lists to the security module 53. Note that the lists may be sent to the security module 53 in the course of the checking.

Receiving the lists, the security module 53 will check if the version numbers of the lists are equal to the aforementioned version numbers ($RevV_B$ and $RegV_B$) check, using the lists, if the optical disc recorder/player 100 is legal, and also check if the digital signature TCSig made by the center TC, included in the lists. If the optical disc recorder/player 100 is judged to be illegal as the result of checking, the protocol will be closed.

At this time, if the optical disc recorder/player 100 is found legal, namely, if the optical disc recorder/player 100 and security module 53 are judged to be legal and the version numbers of the lists held in the optical disc recorder/player 100 are the same as those of the lists held in the security module 53, the security module 53 goes to step R26 and subsequent steps where data will be encrypted and recorded.

Also, if it is found, as the result of the checking of list version numbers to be newer or older, that the list version numbers held by the optical disc recorder/player 100 are newer than those held in the security module 53, the optical disc recorder/player 100 goes to step R337 where it will record the lists held in its own nonvolatile memory 110 to the data recording area of the optical disc 12. At this time, the security module 53 updates the stored version numbers, Thereafter, the security module 53 goes to step R26 and subsequent steps where data will be encrypted and recorded.

<Playback Procedure in the Eighth Embodiment>

Figure 64:
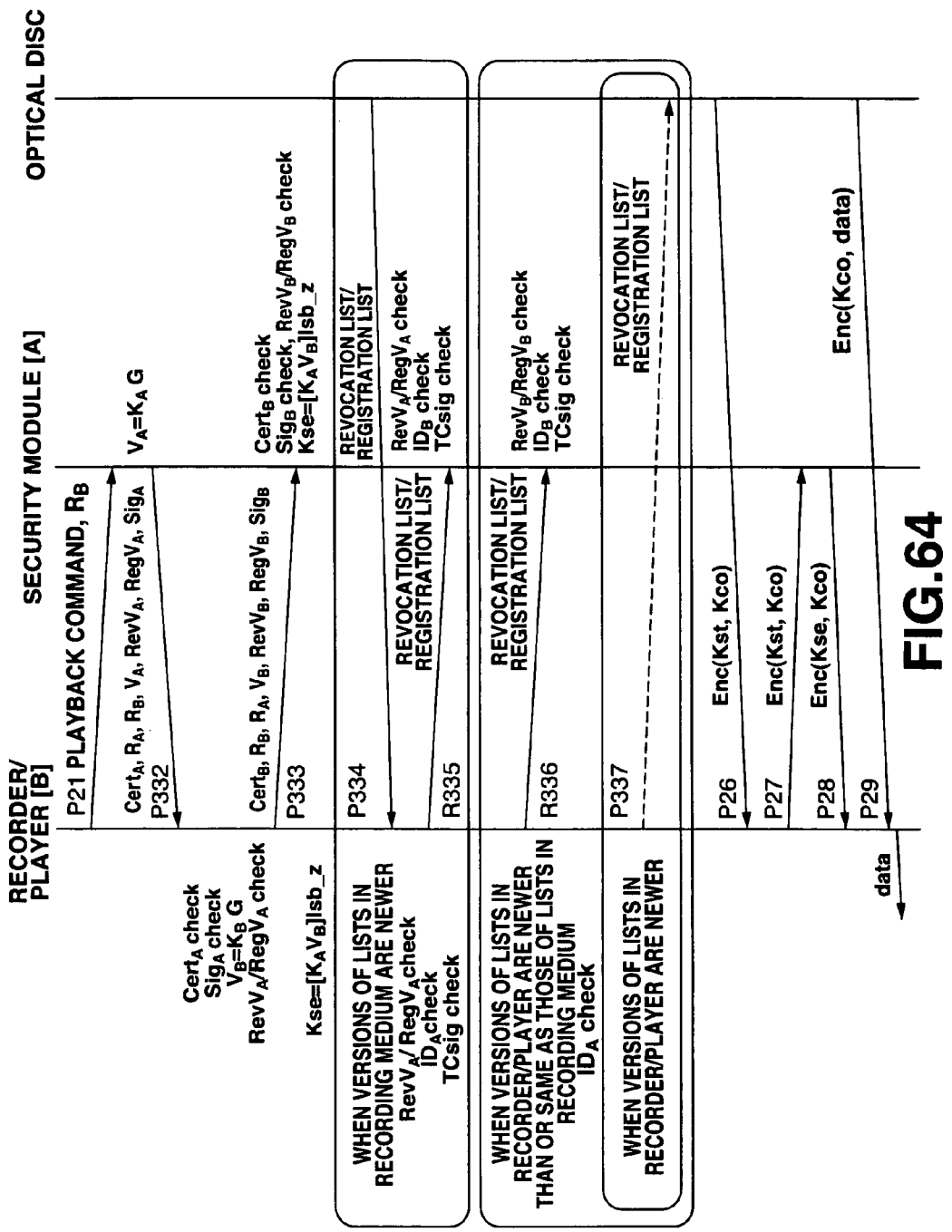
FIG. 64 shows a basic procedure for reading data from the optical disc as the data recording medium according to the eighth embodiment of the present invention.

FIG. 64 explains a procedure in which the optical disc recorder/player 100 according to the eighth embodiment reads or plays back data from the optical disc 12 in the optical disc medium 50. Note that the procedure shown in FIG. 64 is generally similar to that shown in FIG. 44. So, only differences of the procedure in FIG. 64 from that shown in FIG. 44 will be described in the following.

As shown in FIG. 64, the security module 53 goes to step P332 (P222 in FIG. 44) where it will append a public key certificate $Cert_A$ to a bit string consisting of random numbers $R_A$ and $R_B$, value $V_A$ and version numbers $RevV_A$ and $RegV_A$ of the lists stored in the key memory 36, and send them to the optical disc recorder/player 100.

Receiving $Cert_A$, $R_A$, $R_B$, $V_A$, $RevV_A$, $RegV_A$ and $Sig_A$ from the security module 53, the optical disc recorder/player 100 checks the public key certificate $Cert_A$ and digital signature $Sig_A$. When the optical disc recorder/player 100 judges that the certificate can pass the checking, the random number $R_B$ returned from the security module 13 is equal to a one previously generated and the digital signature $Sig_A$ is correct, it goes to step P333 (P223 in FIG. 44) to make a digital signature to a bit string consisting of the random numbers $R_B$ and $R_A$, value $V_B$, revocation and registration list version numbers $RevV_B$ and $RegV_B$ stored in its own nonvolatile memory 110, append a public key certificate $Cert_B$ to these $R_B$, $R_A$, $V_B$, $RevV_B$, $RegV_B$ and $S_{igB}$, and send them to the security module 53.

Receiving $Cert_B$, $R_B$, $R_A$, $V_B$, $RevV_B$, $RegV_B$ and $S_{igB}$ from the optical disc recorder/player 100, the security module 53 will check the public key certificate $Cert_B$ and digital signature $S_{igB}$. When they are judged to pass the checking, the protocol will be closed.

At this time, if the public key certificate $Cert_B$ and digital signature $S_{igB}$ are judged by the security module 53 to pass the checking, namely, if both the optical disc recorder/player 100 and security module 53 are judged to pass the checking, the optical disc recorder/player 100 and security module 53 will generate and share a session key Kse. Also, the checking, the optical disc recorder/player 100 and security module 53 will check which the version numbers of their own lists are newer.

It the list version numbers of the security module 53 are found newer than those of the optical disc recorder/player 100 as the result of the above checking, the optical disc recorder/player 100 goes to step R334 where it will read the revocation and registration lists recorded in the content data recording area of the optical disc 12 in the optical disc medium 50, and check if the version numbers of the lists are equal to those ($RevV_A$ and $RegV_A$) previously acquired, check, using the lists, if the optical disc medium 50 is legal and also check the digital signature TCSig made by the center TC, included in the lists. If the optical disc medium 50 is judged to be illegal as the result of checking, the protocol will be closed. On the other hand, if the optical disc medium 50 is found legal as the result of checking, the optical disc recorder/player 100 goes to step P335 where it will send the lists to the security module 53 and update, using the lists read from the optical disc 12, the lists in its own nonvolatile memory 110. It should be noted that the lists may be sent to the security module 53 in the course of the checking.

Receiving the lists, the security module 53 checks if the version numbers of the lists are equal to the previously acquired version numbers (RevV$_A$ and RegV$_A$), check, using the lists, if the optical disc recorder/player 100 is legal and also check the digital signature TCSig made by the center TC, included in the lists. If the optical disc recorder/player 100 is found illegal, the protocol will be closed.

If the optical disc recorder/player 100 is judged by the security module 53 to be legal, namely, if both the optical disc recorder/player 100 and security module 53 are judged to be legal, the security module 53 goes to step P26 and subsequent steps where data will be played back and decrypted.

On the other hand, if it is found, as the result of the checking of list version numbers to be newer or older, that the list version numbers held by the security module 53 are newer than those held in the optical disc recorder/player 100, the optical disc recorder/player 100 will check, using its own lists, if the optical disc medium 50 is legal. If the optical disc medium 50 is judged to pass the checking, the optical disc recorder/player 100 goes to step P136 where it will send the lists to the security module 53. Note that the lists may be sent to the security module 53 in the course of the checking.

Receiving the lists, the security module 53 will check if the version numbers of the lists are equal to the aforementioned version numbers (RevV$_B$ and RegV$_B$) check, using the lists, if the optical disc recorder/player 100 is legal, and also check if the digital signature TCSig made by the center TC, included in the lists. If the optical disc recorder/player 100 is found illegal as the result of checking, the protocol will be closed.

At this time, if the optical disc recorder/player 100 is judged legal as the result of checking, namely, if the optical disc recorder/player 100 and security module 53 are judged legal and the version numbers of the lists held in the optical disc recorder/player 100 are the same as those of the lists held in the security module 53, the security module 53 goes to step R26 and subsequent steps where data will be played back and decrypted.

Also, if it is judged, as the result of the checking of list version numbers to be newer or older, that the list version numbers held by the optical disc recorder/player 100 are newer than those held in the security module 53, the optical disc recorder/player 100 goes to step R337 where it will record the lists held in its own nonvolatile memory 110 to the data recording area of the optical disc 12. At this time, the security module 53 updates the version numbers, Thereafter, the security module 53 goes to step R26 and subsequent steps where data will be played back and decrypted.

Ninth Embodiment (IM2, Dev1)

Next, a combination of the media type IM2 and device type Dev1 (IM2, Dev1) will be described herebelow as the ninth embodiment of the present invention.

Figure 65:
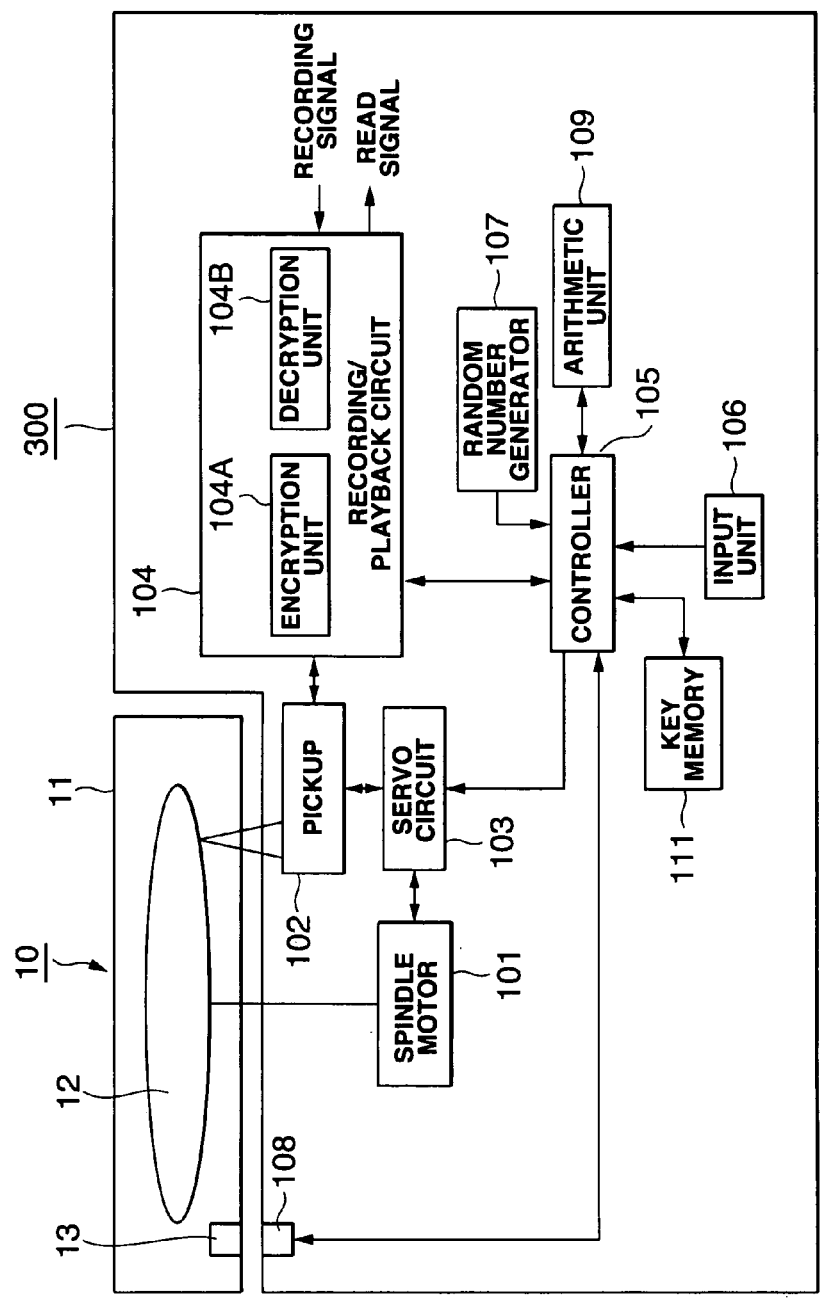
FIG. 65 is a block diagram of an optical disc as the data recording medium according to the ninth embodiment of the present invention and a recorder/player for the optical disc.

The system construction of the media/device combination as the ninth embodiment is as shown in FIG. 65. As shown, the optical disc recorder/player 300 of the device type Dev1 includes no dedicated nonvolatile memory for storage of the lists (however, a key memory 111 is provided to store keys etc. as in the above) while the security module 13 of the optical disc medium 10 of the media type IM2 has a nonvolatile memory 34 for storage of the lists. Note that the construction of each component in FIG. 65 is similar to that shown in FIGS. 3 and 65, and so will not further be described herein.

<Recording Procedure in the Ninth Embodiment>

Figure 66:
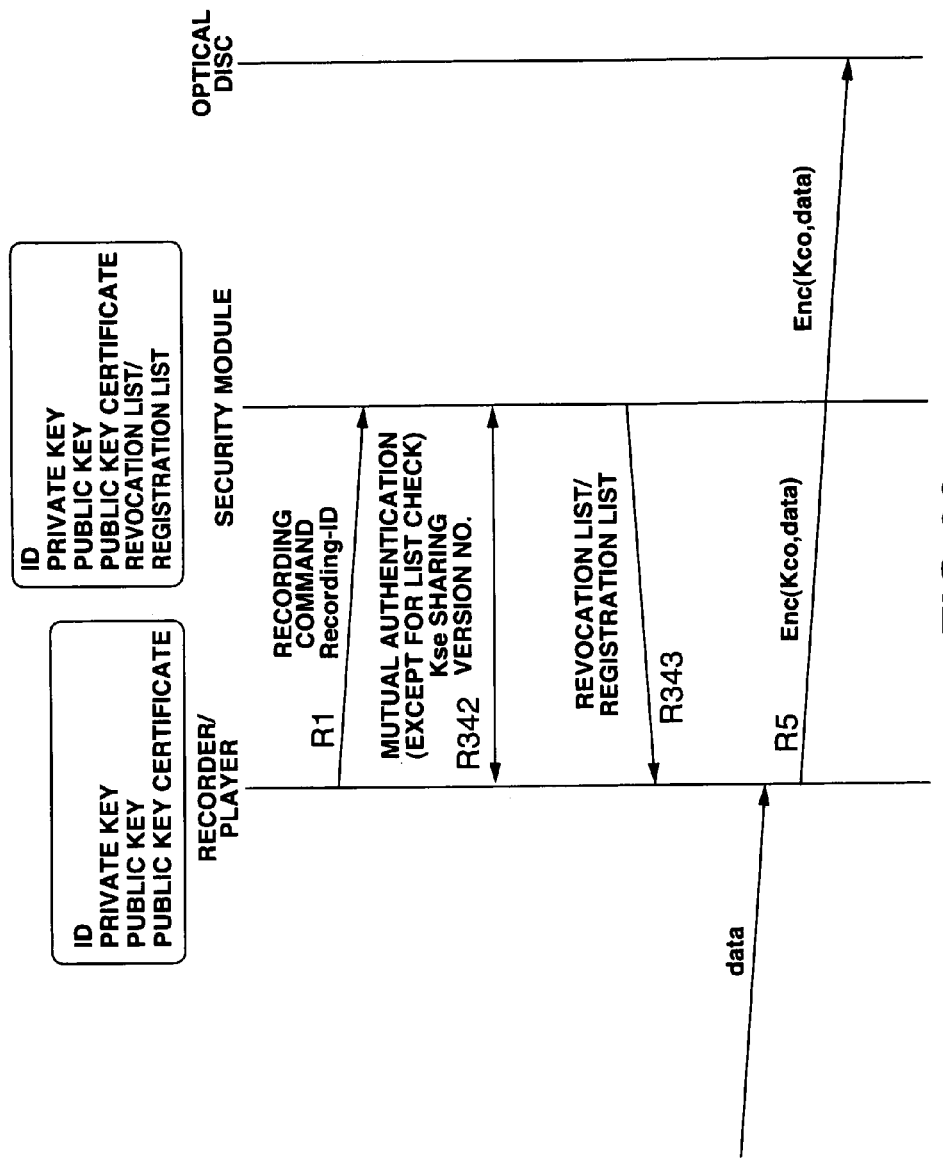
FIG. 66 shows a basic procedure for writing data to the optical disc as the data recording medium according to the ninth embodiment of the present invention.

FIG. 66 explains a procedure in which in the combination of the media type IM2 and device type Dev1 (IM2, Dev1) as the ninth embodiment, the optical disc recorder/player 300 records data to the optical disc medium 10. Note that the same steps in FIG. 66 as in the aforementioned embodiments will not be repeated herebelow and so only differences of the procedure in FIG. 66 from those in the aforementioned embodiments will be described below.

FIG. 66 shows a procedure generally similar to that shown in FIG. 39. At step R342 (R202 in FIG. 39), the optical disc recorder/player 300 and security module 13 exchange their own revocation and registration list version numbers between them. Since in the ninth embodiment, the optical disc recorder/player 300 has no revocation and registration lists, it goes to step R342 where it will send the version numbers "0" to the security module 13 while the optical disc medium 10 will send to the optical disc recorder/player 300 the list version numbers stored in the nonvolatile memory 34 in the security module 13.

Even if the optical disc recorder/player 300 and security module 13 have tried to exchange their own list version numbers between them at step R342, the security module 13 will not receive any lists from the optical disc recorder/player 300 for the latter has no lists. Therefore, the security module 13 will check, using the lists stored in the nonvolatile memory 34, if the optical disc recorder/player 300 is legal. If the optical disc recorder/player 100 is judged illegal as the result of checking, the protocol will be closed. On the other hand, if the result of checking shows that the optical disc recorder/player 300 is legal, the security module 13 goes to step R343 where it will send the revocation and registration lists stored in the nonvolatile memory 34 to the optical disc recorder/player 300.

Using the received lists, the optical disc recorder/player 300 checks if the optical disc medium 10 is legal. If the result of checking shows that the optical disc medium 10 is illegal, the protocol will be closed. On the other hand, if the optical disc medium 10 is judged legal, the optical disc recorder/player 300 goes to step R5 where data will be encrypted and recorded.

<Recording Procedure in the Ninth Embodiment (Detail)>

Figure 67:
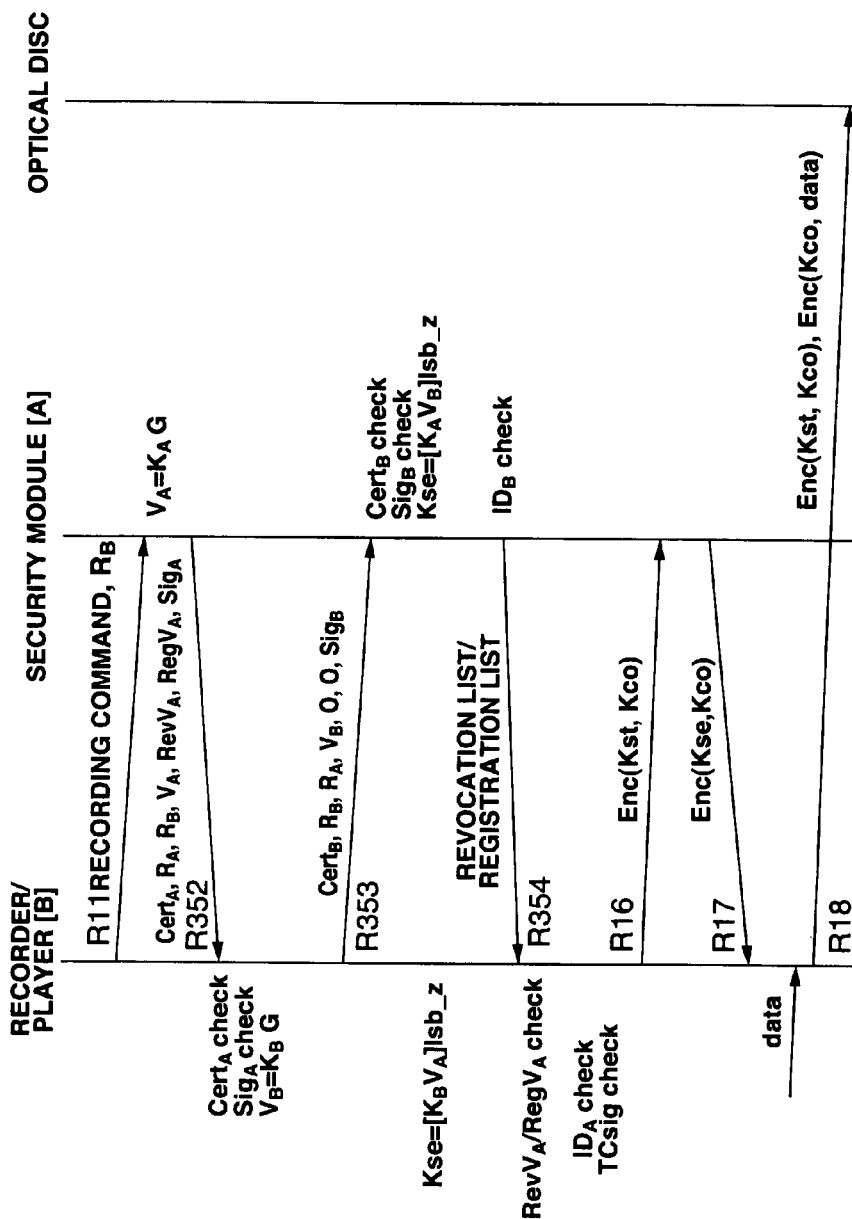
FIG. 67 shows in detail the procedure for writing data to the optical disc as the data recording medium according to the ninth embodiment of the present invention.

FIG. 67 shows in detail the procedure in which the optical disc recorder/player 300 in the ninth embodiment shown in FIG. 66 records data to the optical disc medium 10. It should be noted that only differences of the procedure in FIG. 67 from that shown in FIG. 43 will be described in the following.

As shown in FIG. 67, the security module 13 goes to step R352 (R212 in FIG. 43) where it will append a public key certificate Cert$_A$ to a bit string consisting of random numbers R$_A$ and R$_B$, value V$_A$ and version numbers RevV$_A$ and RegV$_A$ of the revocation and registration lists read from the nonvolatile memory 34, and send them to the optical disc recorder/player 300.

Receiving Cert$_A$, R$_A$, R$_B$, V$_A$, RevV$_A$, RegV$_A$ and Sig$_A$, the optical disc recorder/player 300 checks the public key certificate Cert$_A$ and digital signature Sig$_A$. If the optical disc recorder/player 300 has judged that the certificate can pass the checking, the random number R$_B$ returned from the security module 13 is equal to a one previously generated and the digital signature Sig$_A$ is correct, it goes to step R353 (R213 in FIG. 43) where it will make a digital signature to a bit string consisting of the random numbers R$_B$ and R$_A$, value V$_B$ and a version number "0" indicating that the optical disc recorder/player 300 has no lists, append a public key certificate Cert$_B$ to these R$_B$, R$_A$, V$_B$, 0, 0 and S$_{igB}$, and send them to the security module 13.

Receiving Cert$_B$, R$_B$, R$_A$, V$_B$, 0, 0 and S$_{igB}$ from the optical disc recorder/player 300, the security module 13 will check the public key certificate Cert$_B$ and digital signature S$_{igB}$. Also, the security module 13 checks, using its own lists, if the optical disc recorder/player 300 is legal. If the optical disc recorder/player 300 is judged not to pass the checking, the protocol will be closed.

If the public key certificate $Cert_B$ and digital signature $_{SigB}$ are judged by the security module 53 to pass the checking, namely, if both the optical disc recorder/player 300 and security module 13 have passed the checking, the optical disc recorder/player 300 and security module 13 will generate and share a session key Kse.

Next, the security module 13 goes to step P354 where it will send the lists stored in the nonvolatile memory 34 to the optical disc recorder/player 300.

Receiving the lists, the optical disc recorder/player 300 checks if the version numbers of the lists are equal to the above-mentioned version numbers ($RevV_A$ and $RegV_A$) having been received from the security module 13 at step R352, checks, using the lists, if the optical disc medium 10 is legal and also checks the digital signature TCSig made by the center TC, included in the lists. If the optical disc medium 10 is judged to be illegal, the protocol will be closed.

On the other had, if the optical disc 12 is judged to be illegal, namely, if both the optical disc recorder/player 300 and security module 13 are judged to be legal, the security module 53 goes to step R16 and subsequent steps where data will be encrypted and recorded.

<Playback Procedure in the Ninth Embodiment>

Figure 68:
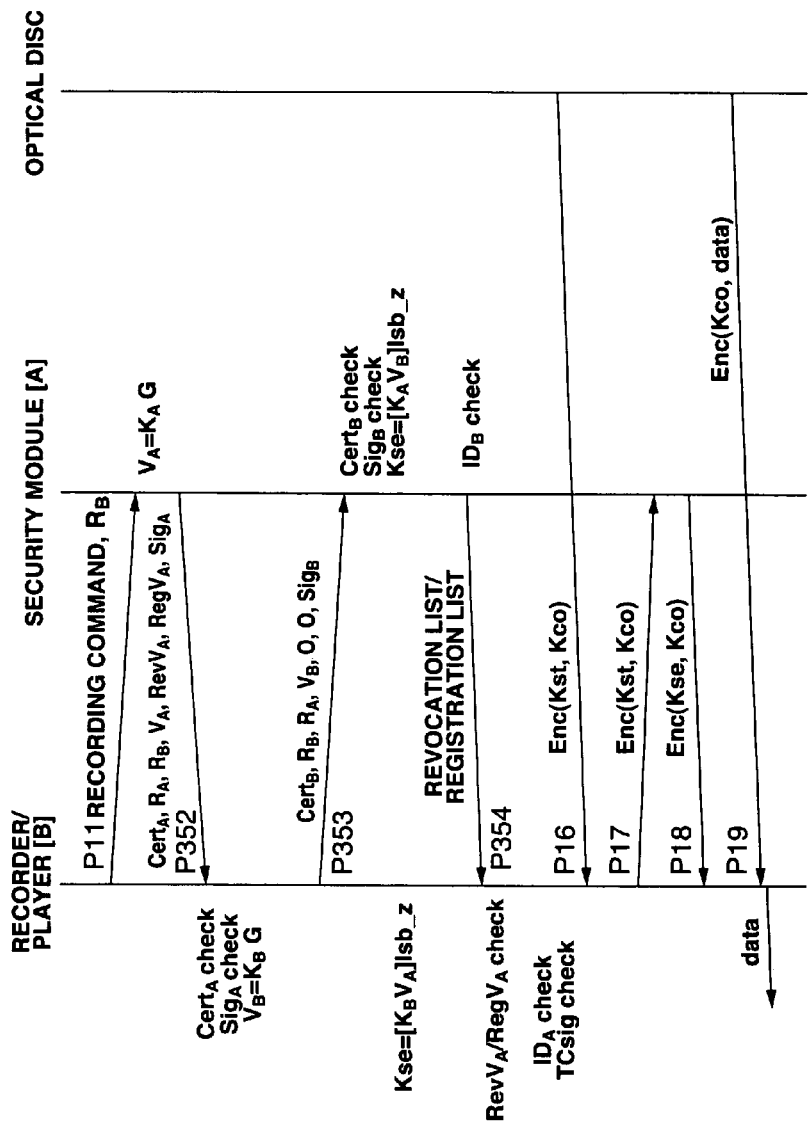
FIG. 68 shows a basic procedure for reading data from the optical disc as the data recording medium according to the ninth embodiment of the present invention.

FIG. 68 explains a procedure in which the optical disc recorder/player 300 according to the ninth embodiment of the present invention reads or plays back data from the optical disc 12 in the optical disc medium 10. Note that the procedure shown in FIG. 68 is generally similar to that shown in FIG. 60. So, only differences of the procedure in FIG. 68 from that shown in FIG. 60 will be described in the following.

As shown in FIG. 68, the security module 13 goes to step P352 (P312 in FIG. 60) where it will append a public key certificate $Cert_A$ to a bit string consisting of random numbers $R_A$ and $R_B$, value $V_A$ and version numbers $RevV_A$ and $RegV_A$ of the revocation and registration lists read from the nonvolatile memory 34, and send them to the optical disc recorder/player 300.

Receiving $Cert_A$, $R_A$, $R_B$, $V_A$, $RevV_A$, $RegV_A$ and $Sig_A$, the optical disc recorder/player 300 checks the public key certificate $Cert_A$ and digital signature $Sig_A$. If the optical disc recorder/player 300 has judged that the certificate can pass the checking, the random number $R_B$ returned from the security module 13 is equal to a one previously generated and the digital signature $Sig_A$ is correct, it goes to step P353 where it will make a digital signature to a bit string consisting of the random numbers $R_B$, $R_A$, value $V_B$ and a version number "0" indicating that the optical disc recorder/player 300 has no lists, append a public key certificate $Cert_B$ to these $R_B$, $R_A$, $V_B$, 0, 0 and $S_{igB}$, and send them to the security module 13.

Receiving $Cert_B$, $R_B$, $R_A$, $V_B$, 0, 0 and $S_{igB}$ from the optical disc recorder/player 300, the security module 13 will check the public key certificate $Cert_B$ and digital signature $S_{igB}$. Also, the security module 13 checks, using its own lists, if the optical disc recorder/player 300 is legal. If the optical disc recorder/player 300 is judged not to pass the checking, the protocol will be closed.

If the public key certificate $Cert_B$ and digital signature $S_{igB}$ are judged by the security module 13 to pass the checking, namely, if both the optical disc recorder/player 300 and security module 13 have passed the checking, the optical disc recorder/player 300 and security module 13 will generate and share a session key Kse.

Next, the security module 13 goes to step P354 where it will send the lists stored in the nonvolatile memory 34 to the optical disc recorder/player 300.

Receiving the lists, the optical disc recorder/player 300 checks if the version numbers of the lists are equal to the above-mentioned version numbers ($RevV_A$ and $RegV_A$) having been received from the security module 13 at step P352 and the optical disc medium 10 is legal and also check the digital signature TCSig made by the center TC, included in the lists. If the optical disc medium 10 is found illegal as the result of checking, the protocol will be closed.

On the other had, if the optical disc medium 10 is judged to be illegal, namely, if both the optical disc recorder/player 300 and security module 13 are found legal, the security module 13 goes to step P16 and subsequent steps where data will be played back and decrypted.

Tenth Embodiment (IM3, Dev3)

Next, a combination of the media type IM3 and device type Dev3 (IM3, Dev3) will be described herebelow as the tenth embodiment of the present invention.

Figure 69:
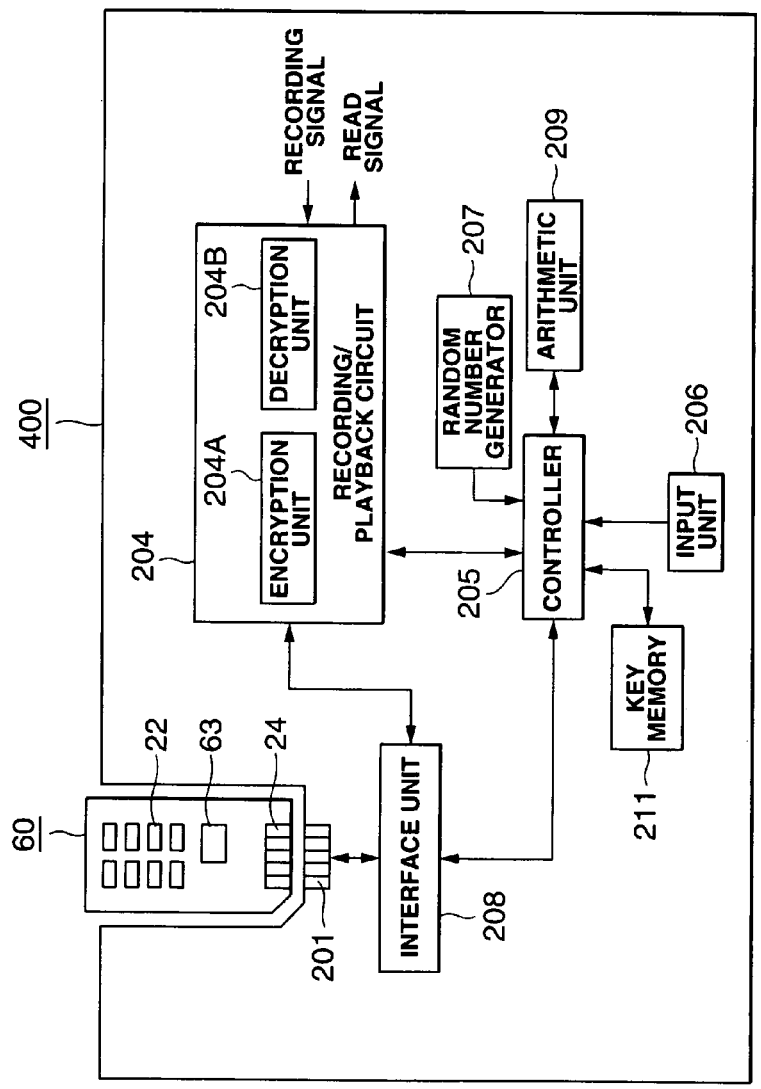
FIG. 69 is a block diagram of a memory as the data recording medium according to the tenth embodiment of the present invention and a recorder/player for the memory.

The system construction of the media/device combination as the tenth embodiment is as shown in FIG. 69. As shown, a memory recorder/player 400 of the device type Dev3 includes no dedicated nonvolatile memory for storage of the lists (however, a key memory 211 is provided to store keys etc. as in the above) while a security module 63 of a memory medium 60 of the media type IM3 has no nonvolatile memory for storage of the lists (however, a key memory 47 for storage of keys etc is provided). Note that the construction of each component in FIG. 69 is similar to that shown in FIGS. 14 and 55, and so will not further be described herein.

<Recording Procedure in the Tenth Embodiment>

Figure 70:
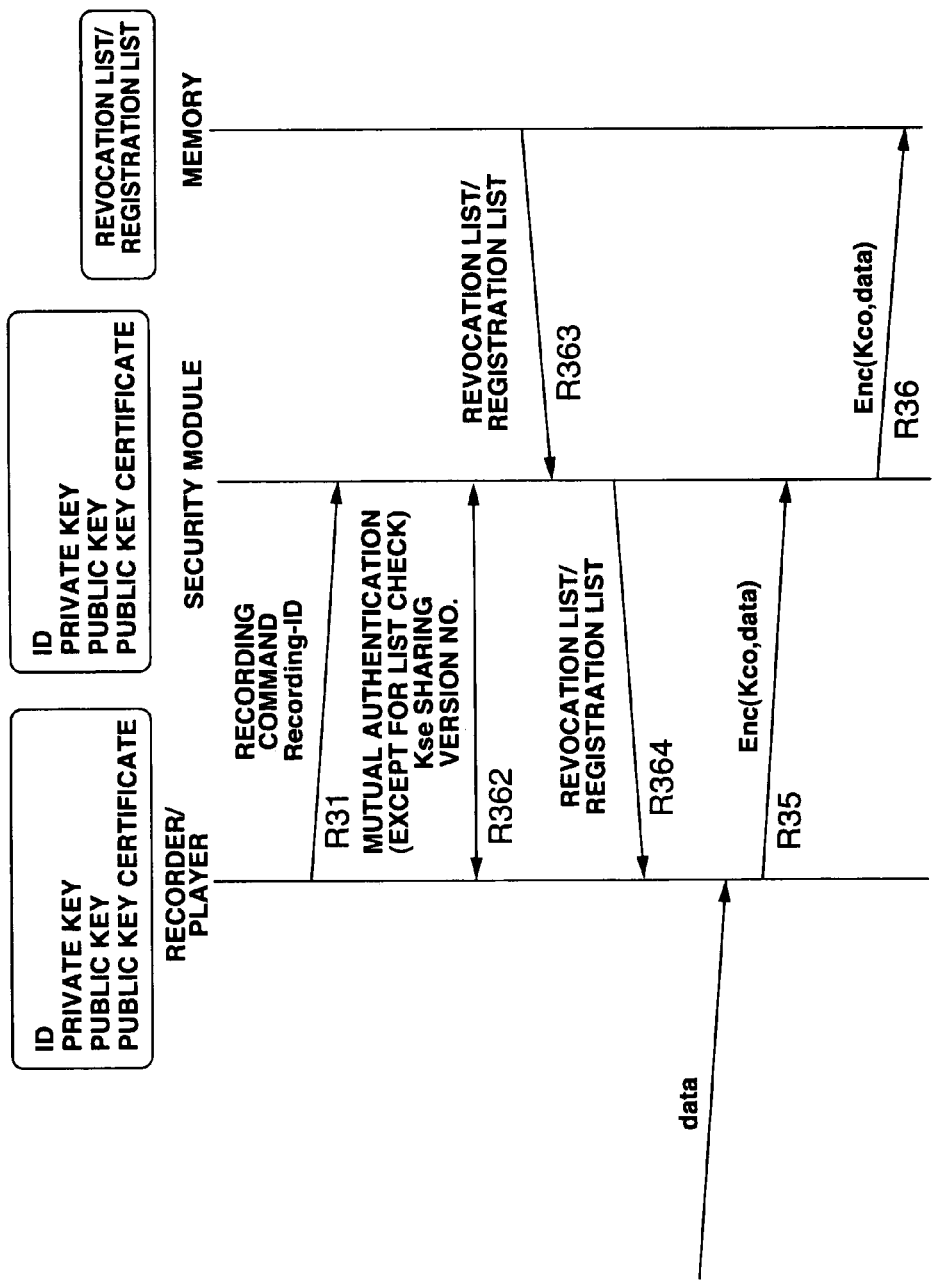
FIG. 70 shows a basic procedure for writing data to the memory as the data recording medium according to the tenth embodiment of the present invention.

FIG. 70 explains a procedure in which in the combination of the media type IM3 and device type Dev3 (IM3, Dev3) as the tenth embodiment, the memory recorder/player 400 records data to the memory medium 60. Note that the same steps in FIG. 70 as in the aforementioned embodiments will not be repeated herebelow and only differences of the procedure in FIG. 70 from those in the aforementioned embodiments will be described below.

FIG. 70 shows a procedure generally similar to that shown in FIG. 45. At step R362 (R232 in FIG. 45), the memory recorder/player 400 and security module 63 exchange their own revocation and registration list version numbers between them. Since in the tenth embodiment, the memory recorder/player 400 has no revocation and registration lists, it goes to step R362 where it will send the version numbers "0" to the security module 63 while the security module 63 will read from the key memory 47 the version numbers of revocation and registration lists recorded in the content data recording area of the memory unit 22 and send hem to the memory recorder/player 400.

Next, at step R363, the security module 63 reads revocation and registration lists recorded in the content data recording area of the memory unit 22 of the memory medium 60. The security module 63 checks, using the lists, if the memory recorder/player 400 is legal. If the result of checking shows that the memory recorder/player 400 is illegal, the protocol will be closed. On the other hand, if the memory recorder/player 400 is found legal, the security module 63 will send the lists to the memory recorder/player 400 at step R364.

Using the lists received from the security module 63, the memory recorder/player 400 checks if the memory medium 60 is legal. If the result of checking shows that the memory medium 60 is illegal, the protocol will be closed.

On the other hand, if the memory medium 60 is found legal, namely, if both the memory recorder/player 400 and memory medium 60 are judged to be legal, the memory recorder/player 400 goes to step R35 where data will be encrypted and recorded.

<Recording Procedure in the Tenth Embodiment (Detail)>

Figure 71:
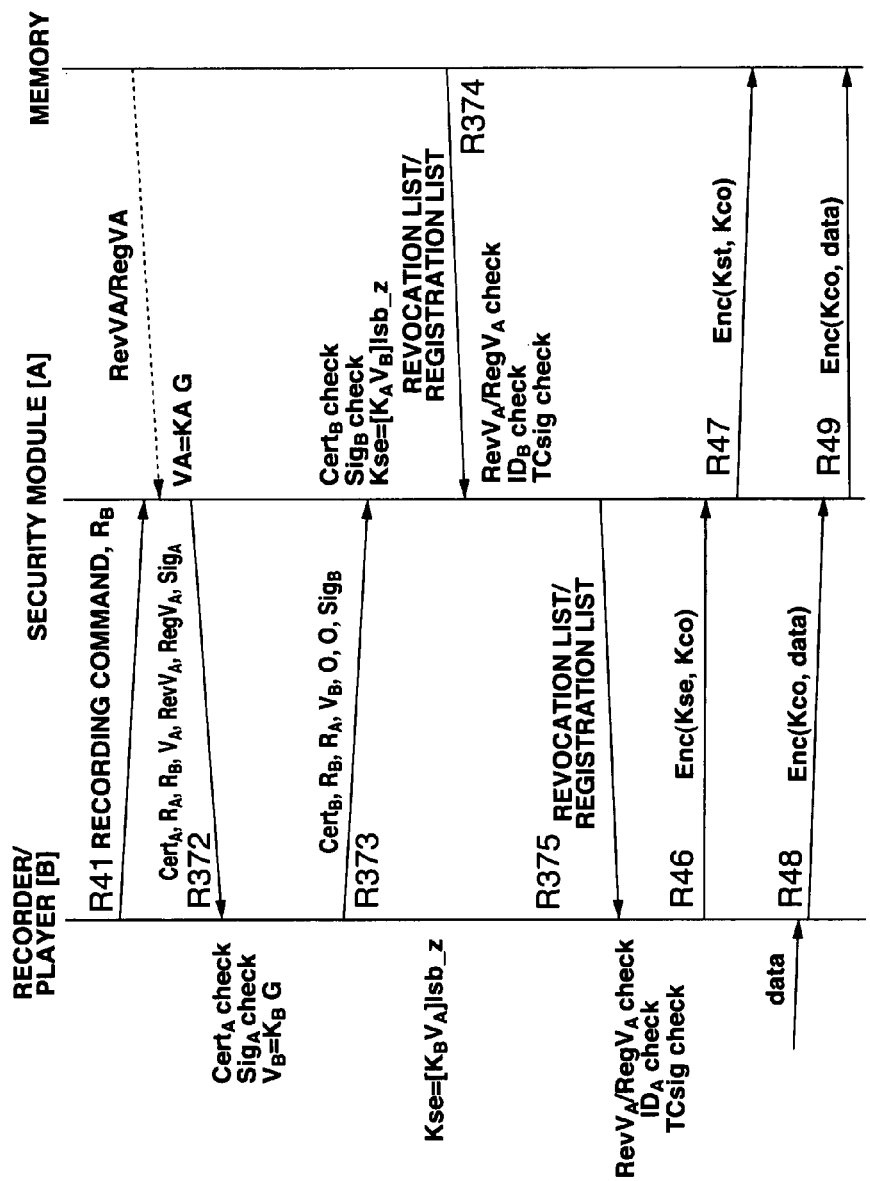
FIG. 71 shows in detail the procedure for writing data to the memory as the data recording medium according to the tenth embodiment of the present invention.

FIG. 71 shows in detail the procedure in which the memory recorder/player 400 in the tenth embodiment shown in FIG. 70 records data to the memory medium 60. The procedure is generally similar to that shown in FIG. 46.

As shown in FIG. 71, the security module 63 goes to step R372 (R242 in FIG. 46) where it will append the public key certificate $Cert_A$ to a bit string consisting of random numbers $R_A$ and $R_B$, value $V_A$, and list version numbers $RevV_A$ and $RegV_A$ read from the key memory 47 and send them to the memory recorder/player 400.

Receiving $Cert_A$, $R_A$, $R_B$, $V_A$, $RevV_A$, $RegV_A$ and $Sig_A$, the memory recorder/player 400 checks the public key certificate $Cert_A$ and digital signature $Sig_A$. If the memory recorder/player 400 has judged that the certificate can pass the checking, the random number $R_B$ returned from the security module 63 is equal to a one previously generated and the digital signature $Sig_A$ is correct, it goes to step R373 (R243 in FIG. 46) where it will make a digital signature to a bit string consisting of the random numbers $R_B$, $R_A$, value $V_B$ and version numbers "0" indicating that the security module 63 has no lists, append a public key certificate $Cert_B$ to these $R_B$, $R_A$, $V_B$, 0, 0 and $S_{igB}$, and send them to the security module 63.

Receiving $Cert_B$, $R_B$, $R_A$, $V_B$, 0, 0 and $S_{igB}$ from the memory recorder/player 400, the security module 63 will check the public key certificate $Cert_B$ and digital signature $S_{igB}$. When they are judged not to pass the checking, the protocol will be closed.

If the public key certificate $Cert_B$ and digital signature $S_{igB}$ are judged by the security module 63 to pass the checking, namely, if both the memory recorder/player 400 and security module 63 have passed the checking, the security module 63 and memory recorder/player 400 will generate and share a session key Kse.

Next, the security module 63 goes to step R374 where it will read the revocation and registration lists stored in the data recording area of the memory unit 22 and check if the version numbers of the lists are equal to those ($RevV_A$ and $RegV_A$) previously acquired, check, using the lists, if the memory recorder/player 400 is legal and also check the digital signature TCSig made by the center TC, included in the lists. If the memory recorder/player 400 is found illegal, by the checking, the protocol will be closed. On the other hand, if the memory recorder/player 400 is found legal as the result of checking, the security module 63 goes to step R375 where it will send the lists to the memory recorder/player 400. It should be noted that the lists may be sent to the memory recorder/player 400 in the course of the checking.

Receiving the lists, the memory recorder/player 400 checks if the version numbers of the lists are equal to the previously acquired version numbers ($RevV_A$ and $RegV_A$), check, using the lists, if the memory medium 60 is legal and also check the digital signature TCSig made by the center TC, included in the lists. If the memory medium 60 is found illegal as the result of checking, the protocol will be closed.

On the other had, if the memory medium 60 is judged to be illegal, namely, if both the memory recorder/player 400 and memory medium 60 are found legal, the memory recorder/player 400 goes to step R46 and subsequent steps where data will be encrypted and recorded.

<Playback Procedure in the Tenth Embodiment>

Figure 72:
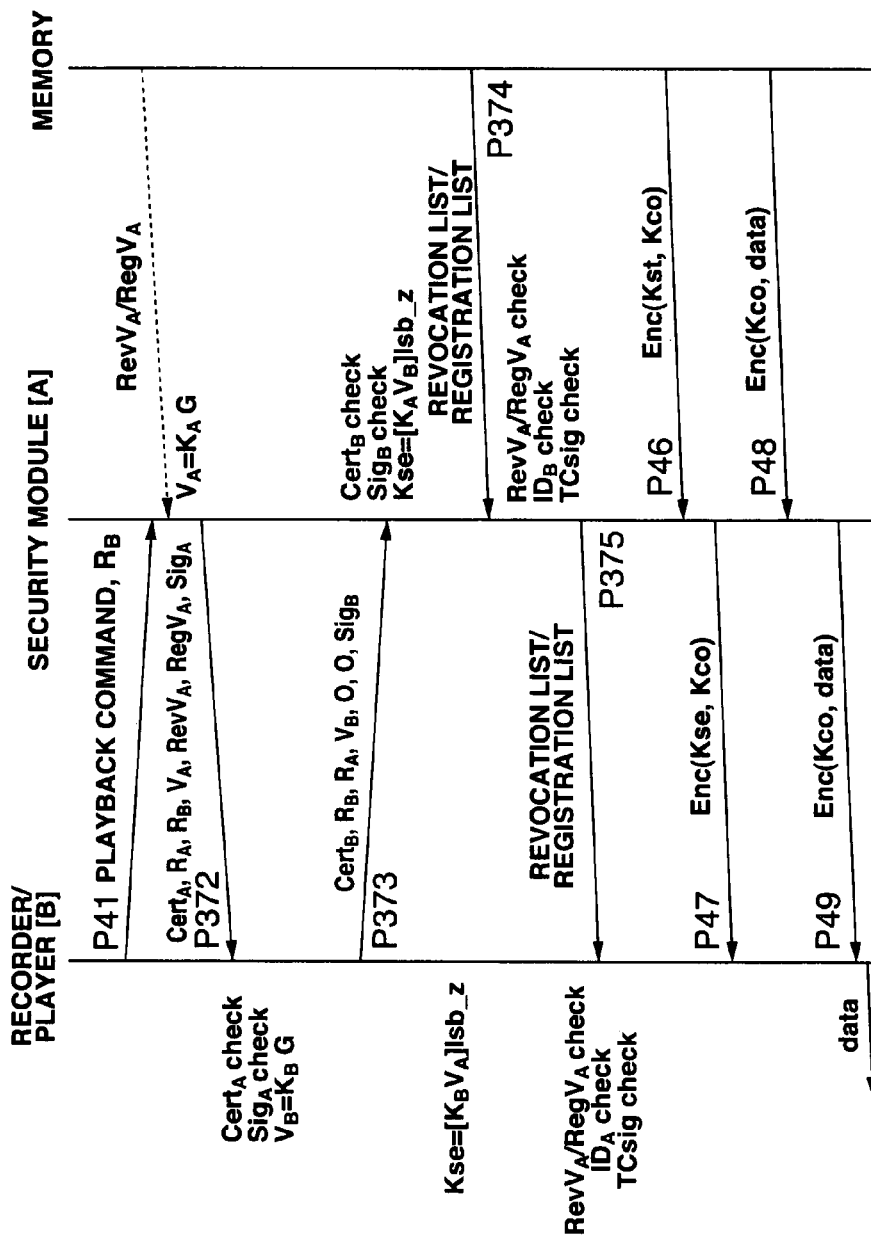
FIG. 72 shows a basic procedure for reading data from the memory as the data recording medium according to the tenth embodiment of the present invention.

FIG. 72 explains a procedure in which the memory recorder/player 400 according to the tenth embodiment reads or plays back data from the memory unit 22 in the memory medium 60. Note that the procedure in FIG. 72 is generally similar to that in FIG. 50. So, only differences of the procedure in FIG. 72 from that shown in FIG. 50 will be described in the following.

As shown in FIG. 72, the security module 63 goes to step P372 (P242 in FIG. 50) where it will append a public key certificate $Cert_A$ to a bit string consisting of random numbers $R_A$ and $R_B$, value $V_A$ and version numbers $RevV_A$ and $RegV_A$ of the lists read from the key memory 47, and send them to the memory recorder/player 400.

Receiving $Cert_A$, $R_A$, $R_B$, $V_A$, $RevV_A$, $RegV_A$ and $Sig_A$, the memory recorder/player 400 checks the public key certificate $Cert_A$ and digital signature $Sig_A$. If the memory recorder/player 400 has judged that the certificate can pass the checking, the random number $R_B$ returned from the security module 63 is equal to a one previously generated and the digital signature $Sig_A$ is correct, it goes to step P373 (P243 in FIG. 50) where it will make a digital signature to a bit string consisting of the random numbers $R_B$, $R_A$, value $V_B$ and version numbers "0" indicating that the memory recorder/player 400 has no lists, append a public key certificate $Cert_B$ to these $R_B$, $R_A$, $V_B$, 0, 0 and $S_{igB}$, and send them to the security module 63.

Receiving $Cert_B$, $R_B$, $R_A$, $V_B$, 0, 0 and $S_{igB}$ from the memory recorder/player 400, the security module 63 will check the public key certificate $Cert_B$ and digital signature $S_{igB}$. When they are judged not to pass the checking, the protocol will be closed.

If the public key certificate $Cert_B$ and digital signature $S_{igB}$ are judged by the security module 63 to pass the checking, namely, if both the memory recorder/player 400 and security module 63 have passed the checking, the security module 63 and memory recorder/player 400 will generate and share a session key Kse.

Next, the security module 63 goes to step P374 where it will read the revocation and registration lists stored in the data recording area of the memory unit 22 and check if the version numbers of the lists ($RevV_A$ and $RegV_A$) are equal to ones previously acquired, check, using the lists, if the memory recorder/player 400 is legal and also check the digital signature TCSig made by the center TC, included in the lists. If the memory recorder/player 400 is found illegal, by the checking, the protocol will be closed. On the other hand, if the memory recorder/player 400 is found legal as the result of checking, the security module 63 goes to step P375 where it will send the lists to the memory recorder/player 400. It should be noted that the lists may be sent to the memory recorder/player 400 in the course of the checking.

Receiving the lists, the memory recorder/player 400 checks if the version numbers of the lists are equal to the version numbers ($RevV_A$ and $RegV_A$) received from the key memory 47 in the security module 63 at step R372, check, using the lists, if the memory medium 60 is legal and also check the digital signature TCSig made by the center TC, included in the lists. If the memory medium 60 is found illegal as the result of checking, the protocol will be closed.

On the other had, if the memory medium 60 is judged to be legal, namely, if both the memory recorder/player 400 and security module 63 are found legal, the security module 63 goes to step P46 and subsequent steps where data will be played back and decrypted.

Eleventh Embodiment (IM3, Dev4)

Next, a combination of the media type IM3 and device type Dev4 (IM3, Dev4) will be described herebelow as the eleventh embodiment of the present invention.

Figure 73:
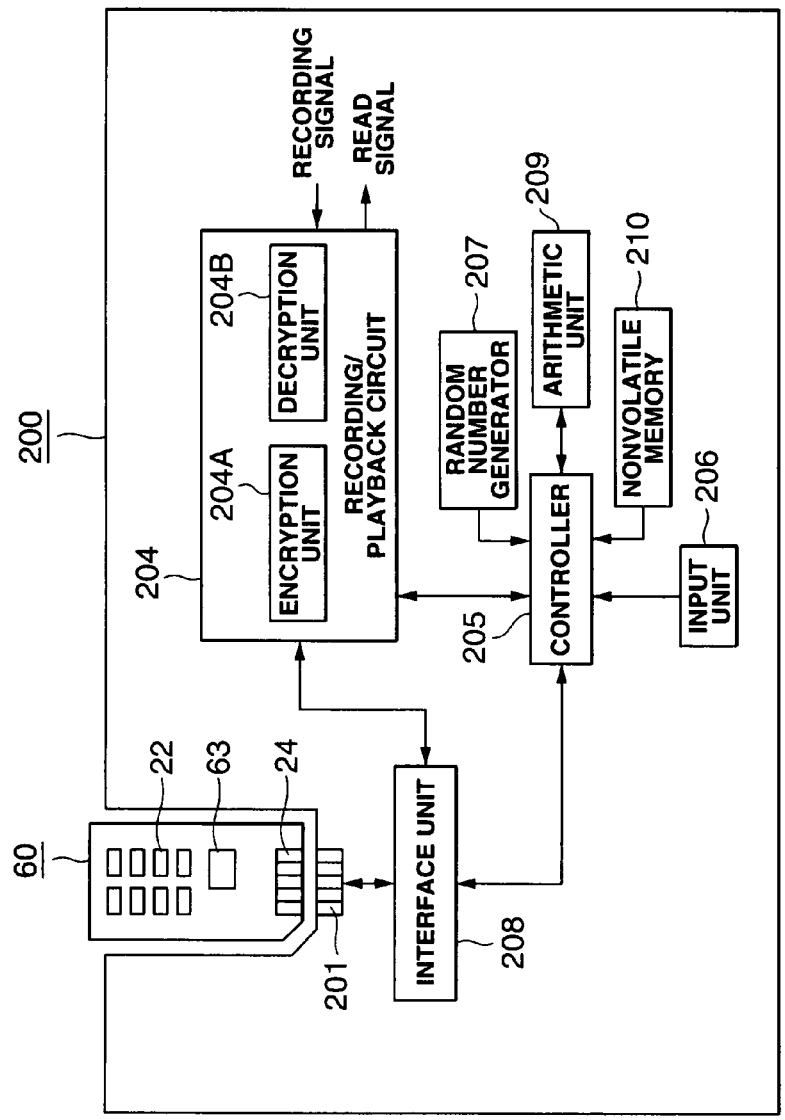
FIG. 73 is a block diagram of a memory as the data recording medium according to the eleventh embodiment of the present invention and a recorder/player for the memory.

The system construction of the media/device combination as the eleventh embodiment is as shown in FIG. 73. As shown, the memory recorder/player 200 of the device type Dev4 includes a dedicated nonvolatile memory 210 for storage of the lists while the security module 63 of the memory medium 60 of the media type IM3 has not any nonvolatile memory for storage of the lists (however, a key memory 47 for storage of keys etc. is provided as in the above). Note that the construction of each component in FIG. 73 is similar to that shown in FIGS. 14 and 55, and so will not further be described herein.

<Recording Procedure in the Eleventh Embodiment>

Figure 74:
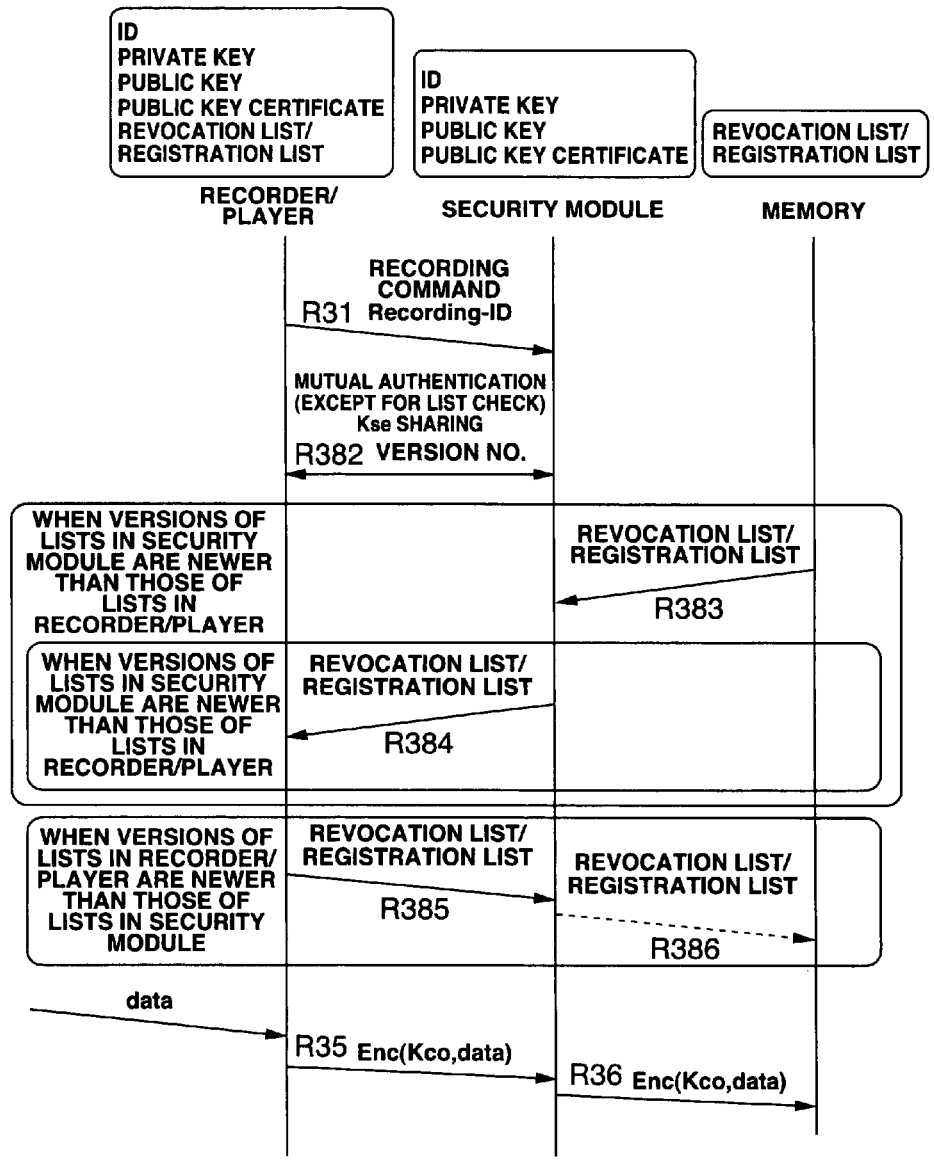
FIG. 74 shows a basic procedure for writing data to the memory as the data recording medium according to the eleventh embodiment of the present invention.

FIG. 74 explains a procedure in which in the combination of the media type IM3 and device type Dev4 (IM3, Dev4) as the eleventh embodiment, the memory recorder/player 200 records data to the memory medium 60. Note that the same steps in FIG. 74 as in the aforementioned embodiments will not be repeated herebelow and only differences of the procedure in FIG. 74 from those in the aforementioned embodiments will be described below.

FIG. 74 shows a procedure generally similar to that shown in FIG. 45. At step R382 (R232 in FIG. 45), the memory recorder/player 200 and security module 63 exchange their own revocation and registration list version numbers between them. Since in the eleventh embodiment, the memory recorder/player 200 has revocation and registration lists stored in a nonvolatile memory 210, it will send the version numbers of the lists to the security module 63 while the security module 63 will send version numbers stored in the key memory 47 to the memory recorder/player 200.

If the version numbers of the lists owned by the security module 63 after the exchange, at step R382, of the list version numbers with the memory recorder/player 200 are newer than or the same as those of the lists in the memory recorder/player 200, the security module 63 goes to step R383 where it will read the lists recorded in the memory unit 22. Using the lists, the security module 63 checks if the memory recorder/player 200 is legal. If the result of checking shows that the memory recorder/player 220 is illegal, the protocol will be closed.

On the other hand, if the memory recorder/player 200 is judged to be legal, namely, if the memory recorder/player 200 and security module 63 are both legal and the version numbers of the lists held in the memory recorder/player 200 are found the same as those of the lists held in the security module 63, the security module 63 goes to step R35 where data will be encrypted and recorded.

Also, when the version numbers of the lists held in the security module 63 are newer than those of the lists held in the memory recorder/player 200, the security module 63 will send the lists to the memory recorder/player 200 at step R384.

Next, using the supplied lists, the memory recorder/player 200 checks if the memory medium 60 is legal. If the result of checking shows that the memory medium 60 is illegal, the protocol will be closed.

On the other hand, if the memory medium 60 is judged to be legal, the memory recorder/player 200 will update its own lists with those received at step R384, and goes to step R35 where data will be encrypted and recorded.

Also, if the version numbers of the lists owned by the memory recorder/player 200 after the exchange of the list version numbers at step R382 are newer than those of the lists held in the security module 63, the memory recorder/player 200 will send its own lists to the security module 63 at step R385.

Using the received lists, the security module 63 checks if the memory recorder/player 200 is legal. If the result of checking shows that the memory recorder/player 200 is illegal, the protocol will be closed.

On the other hand, if the memory recorder/player 200 is found legal, the security module 63 updates the version numbers of its own lists with those of the lists received at step R382, and goes to step R386 where it will record the lists supplied from the memory recorder/player 200 to the data recording area of the memory unit 22. Then, it will go to step R35.

<Recording Procedure in the Eleventh Embodiment (Detail)>

Figure 75:
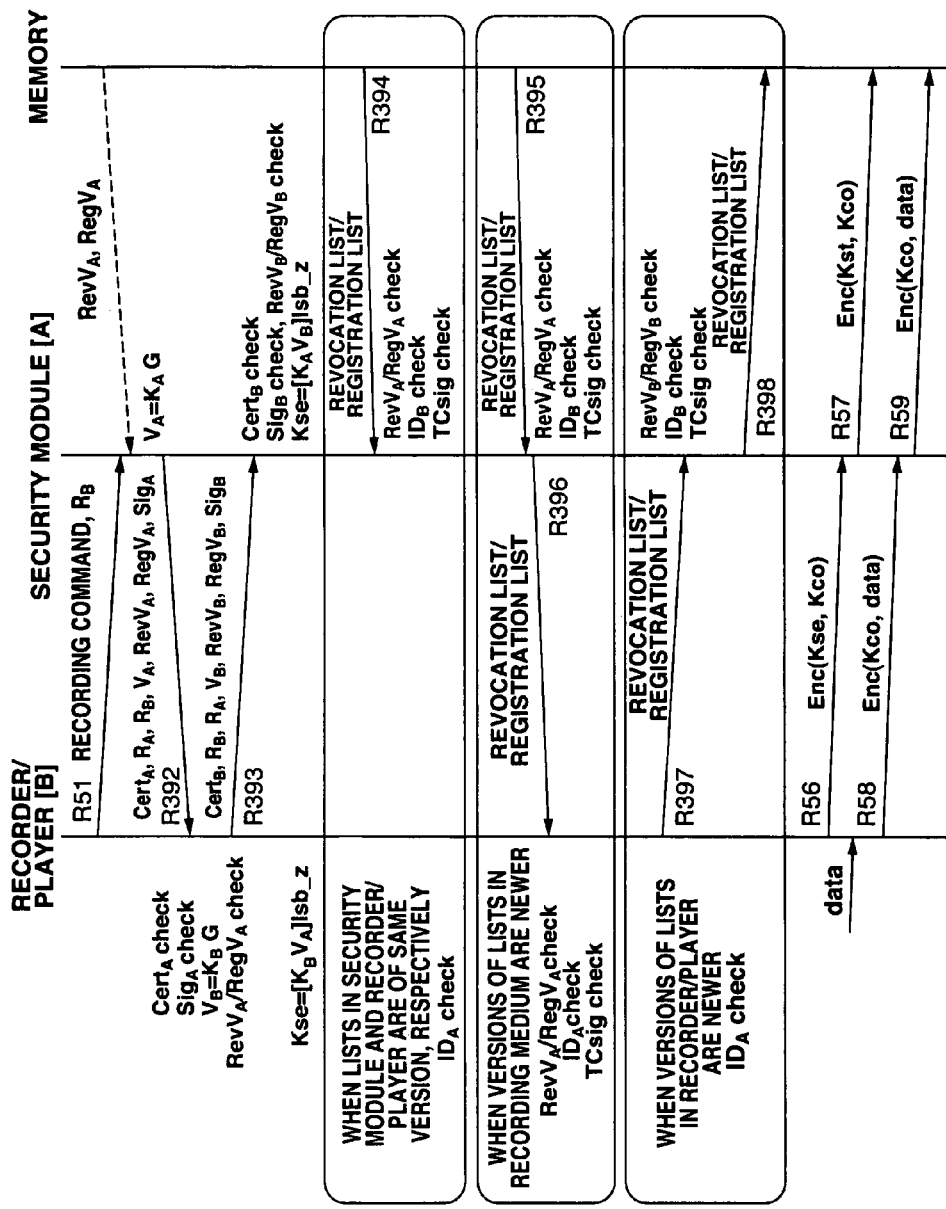
FIG. 75 shows in detail the procedure for writing data to the memory as the data recording medium according to the eleventh embodiment of the present invention.

FIG. 75 shows in detail the procedure in which the memory recorder/player 200 in the eleventh embodiment shown in FIG. 74 records data to the memory medium 60. It should be noted that only differences of the procedure in FIG. 75 from that in FIG. 47 will be described in the following.

As shown in FIG. 75, the security module 63 goes to step R392 (R252 in FIG. 47) where it will append a public key certificate $Cert_A$ to a bit string consisting of random numbers $R_A$ and $R_B$, value $V_A$ and version numbers $RevV_A$ and $RegV_A$ of the lists read from the key memory 47, and send them to the memory recorder/player 200.

Receiving $Cert_A$, $R_A$, $R_B$, $V_A$, $RevV_A$, $RegV_A$ and $Sig_A$, the memory recorder/player 200 checks the public key certificate $Cert_A$ and digital signature $Sig_A$. When the memory recorder/player 200 judges that the certificate can pass the checking, the random number $R_B$ returned from the security module 63 is equal to a one previously generated and the digital signature $Sig_A$ is correct, it goes to step R393 (R253 in FIG. 47) where it will make a digital signature to a bit string consisting of the random numbers $R_B$ and $R_A$, value $V_B$, revocation and registration list version numbers $RevV_B$ and $RegV_B$ stored in its own nonvolatile memory 210, append a public key certificate $Cert_B$ to these $R_B$, $R_A$, $V_B$, $RevV_B$, $RegV_B$ and $S_{igB}$, and send them to the security module 63.

Receiving $Cert_B$, $R_B$, $R_A$, $V_B$, $RevV_B$, $RegV_B$ and $S_{igB}$ from the memory recorder/player 200, the security module 63 will check the public key certificate $Cert_B$ and digital signature $S_{igB}$. When they are judged not to pass the checking, the protocol will be closed.

At this time, if the public key certificate $Cert_B$ and digital signature $S_{igB}$ are judged by the security module 63 to pass the checking, namely, if the memory recorder/player 200 and security module 63 are judged to pass the checking, the security module 63 and memory recorder/player 200 will generate and share a session key Kse.

Also, if the security module 63 and memory recorder/player 200 are judged to be legal, they will check the version numbers of the lists in their counterparts.

At this time, if the version numbers of the lists in both the memory recorder/player 200 and security module 63 are judged to be the same, the security module 63 goes to step R394 where it will read the lists from the memory unit 22, check if the version numbers of the lists are equal to the version numbers ($RevV_A$ and $RegV_A$) previously acquired, check, using the lists, if the memory recorder/player 200 is legal and also check the digital signature TCSig made by the center TC, included in the lists. If the result of checking shows that the memory recorder/player 200 is illegal, the protocol will be closed. Also, the memory recorder/player 200 will check, using its own lists, if the memory medium 60 is legal. If the memory medium 60 is judged to be illegal, the protocol will be closed. If the security module 63 and memory recorder/player 200 are judged to be both legal, the memory recorder/player 200 will go to step R56.

Also, if the result of checking of the version numbers of the lists in both the security module 63 and memory recorder/player 200 shows that the version numbers of the lists held in the security module 63 are newer than those of the lists held in the memory recorder/player 200, the security module 63 goes to step R395 where it will read the lists from the memory unit 22, check if the version numbers of the lists are equal to the version numbers ($RevV_A$ and $RegV_A$) previously acquired, check, using the lists, if the memory recorder/player 200 is legal and also check the digital signature TCSig made by the center TC, included in the lists. If the memory recorder/player 200 is judged to be illegal, the protocol will be closed. On the other hand, if the memory recorder/player 200 is judged to be legal, the security module 63 will send the lists to the memory recorder/player 200 at step R396.

Receiving the lists, the memory recorder/player 200 check if the version numbers of the lists are equal to the version numbers ($RevV_A$ and $RegV_A$) acquired at step R392, check, using the lists, if the memory medium 60 is legal, and check the digital signature TCSig made by the center TC, included in the lists. If the memory medium 60 is judged to be illegal, the protocol will be closed. On the other hand, if the memory medium 60 is judged to be legal, the memory recorder/player 200 will update its own lists using the received lists, and go to step R56.

Also, if the result of checking of the version numbers of the lists in the security module 63 and memory recorder/player 200 shows that the version numbers of the lists held in the memory recorder/player 200 are newer than those of the lists held in the security module 63, the memory recorder/player 200 will check, using the lists, if the memory medium 60 is legal. If the memory medium 60 is judged to be illegal, the protocol will be closed. On the other hand, if the memory medium 60 is judged to be legal, the memory recorder/player 200 will send the lists to the security module 63 at step R397.

Receiving the lists, the security module 63 check if the version numbers of the lists are equal to the version numbers ($RevV_A$ and $RegV_A$) previously acquired from the memory recorder/player 200 at step R393, check, using the lists, if the memory recorder/player 200 is legal, and check the digital signature TCSig made by the center TC, included in the lists. If the memory recorder/player 200 is judged to be illegal, the protocol will be closed. On the other hand, if the memory recorder/player 200 is judged to be legal, the security module 63 updates, at step R398, the version numbers of its own lists with those of the lists acquired at step R393 and writes the lists to the memory unit 22 and updates them, and then goes to step R56 and subsequent steps. Note that the lists may be updated before or after the operation at step R56 and subsequent steps. With this media type IM3, the version numbers of the lists stored in the key memory 47 are read. However, the version numbers of the lists from the memory unit 22 may be read in the course of the protocol being executed for example. However, to prevent the falsification of the lists in the memory unit 22, it is desirable that the version numbers of the lists should be stored in the security module 63 (key memory 47) as in the above.

<Playback Procedure in the Eleventh Embodiment>

Figure 76:
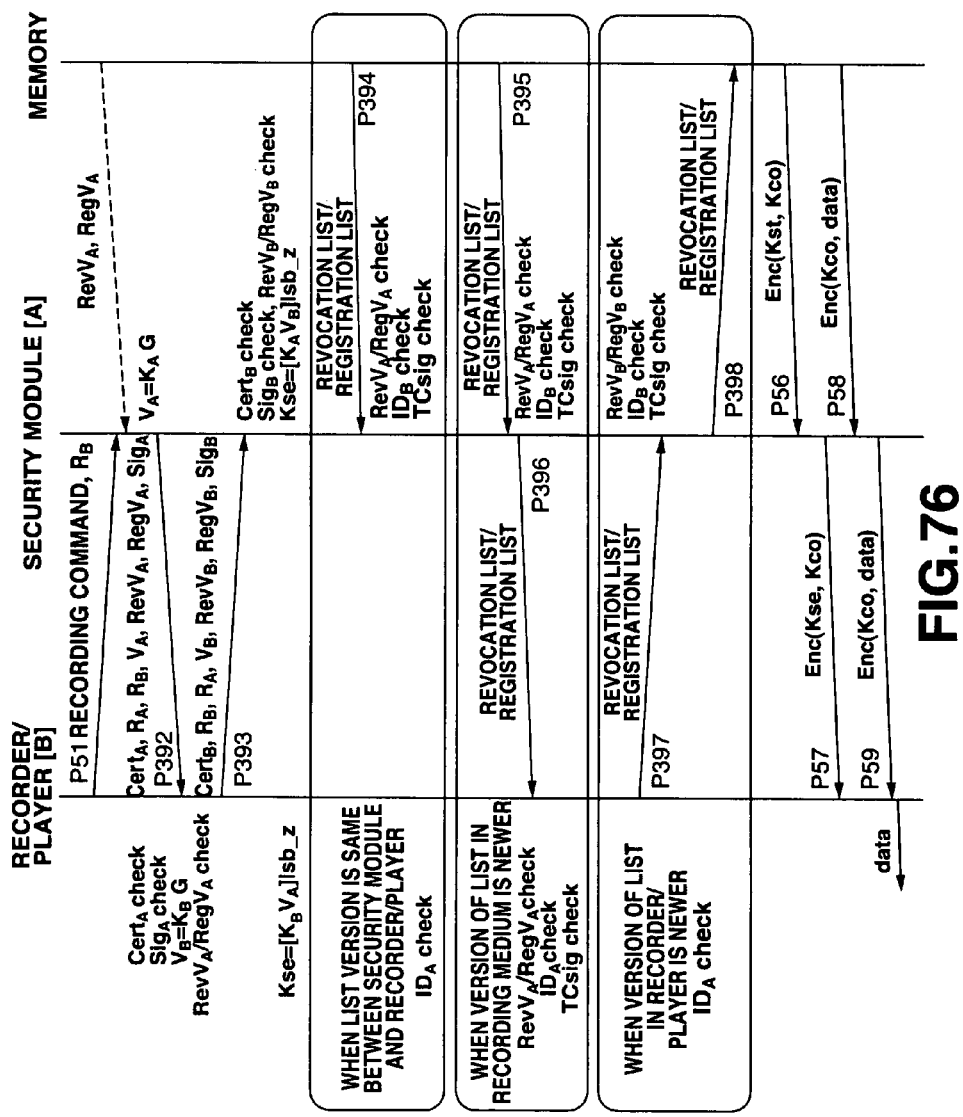
FIG. 76 shows a basic procedure for reading data from the memory as the data recording medium according to the eleventh embodiment of the present invention.

FIG. 76 explains a procedure in which the memory recorder/player 200 according to the eleventh embodiment of the present invention reads or plays back data from the memory unit 22 in the memory medium 60. Note that the procedure shown in FIG. 76 is generally similar to that shown in FIG. 51. So, only differences of the procedure in FIG. 76 from that shown in FIG. 51 will be described in the following.

As shown in FIG. 76, the security module 63 goes to step P392 (P252 in FIG. 51) where it will append a public key certificate $Cert_A$ to a bit string consisting of random numbers $R_A$ and $R_B$, value $V_A$ and version numbers $RevV_A$ and $RegV_A$ of the lists read from the key memory 47, and send them to the memory recorder/player 200.

Receiving $Cert_A$, $R_A$, $R_B$, $V_A$, $RevV_A$, $RegV_A$ and $Sig_A$, the memory recorder/player 200 checks the public key certificate $Cert_A$ and digital signature $Sig_A$. When the memory recorder/player 200 judges that the certificate can pass the checking, the random number $R_B$ returned from the security module 63 is equal to a one previously generated and the digital signature $Sig_A$ is correct, it goes to step P393 (P253 in FIG. 51) where it will make a digital signature to a bit string consisting of the random numbers $R_B$ and $R_A$, value $V_B$, version numbers $RevV_B$ and $RegV_B$ of the lists stored in its own nonvolatile memory 210, append a public key certificate $Cert_B$ to these $R_B$, $R_A$, $V_B$, $RevV_B$, $RegV_B$ and $S_{igB}$, and send them to the security module 63.

Receiving $Cert_B$, $R_B$, $R_A$, $V_B$, $RevV_B$, $RegV_B$ and $S_{igB}$ from the memory recorder/player 200, the security module 63 will check the public key certificate $Cert_B$ and digital signature $S_{igB}$. When they are judged to pass the checking, the protocol will be closed.

At this time, if the public key certificate $Cert_B$ and digital signature $S_{igB}$ are judged by the security module 63 to pass the checking, namely, if both the memory recorder/player 200 and security module 63 are judged to pass the checking, the memory recorder/player 200 and security module 63 will generate and share a session key Kse.

Also, if the security module 63 and memory recorder/player 200 have mutually judged that their counterparts are legal, they will check the version numbers of their own lists.

At this time, it the list version numbers of the security module 63 are judged to be the same as those of the memory recorder/player 200, the security module 63 goes to step P394 where it will read the lists from the memory unit 22 and check if the version numbers of the lists are equal to the previously acquired version numbers ($RevV_A$ and $RegV_A$), check, using the lists, if the memory recorder/player 200 is legal, and also check the digital signature TCSig made by the center TC, included in the lists. If the memory recorder/player 200 is judged to be illegal, the protocol will be closed. Also, at this time, the memory recorder/player 200 checks, using its own lists, if the memory medium 60 is legal. If the memory medium 60 is judged to be illegal, the protocol will be closed. If both the security module 63 and memory recorder/player 200 are judged to be legal, the memory recorder/player 200 will go to step R56.

Also, if the version numbers of the lists held in the security module 63 are judged as the result of version number checking to be newer than those of the lists held in the memory recorder/player 200, the security module 63 will goes to step P395 where it will read the lists from the memory unit 22, and check if the version numbers of the lists are equal to the previously acquired version numbers ($RevV_A$ and $RegV_A$), check, using the lists, if the memory recorder/player 200 is legal and also check the digital signature TCSig made by the center TC, included in the lists. If the memory recorder/player 200 is judged to be illegal, the protocol will be closed. On the other hand, if the memory recorder/player 200 is judged to be legal, the security module goes to step P396 where it will send the lists to the memory recorder/player 200.

Receiving the lists, the memory recorder/player 200 will check if the version numbers of the lists are equal to the version numbers (RevV$_A$ and RegV$_A$) previously acquired from the security module 63 at step P392, check, using the lists, if the memory medium 60 is legal, and also check the digital signature TCSig made by the center TC, included in the lists. If the memory medium 60 is judged based on the checking to be illegal, the protocol will be closed. On the other hand, if the memory medium 60 is judged to legal, the memory recorder/player 200 will update its own lists with the received lists and go to step P56.

Also, if the version numbers of the lists held in the security module 63 are judged as the result of the above version number checking to be newer than those of the lists held in the memory unit 22 of the memory medium 60, the memory recorder/player 200 will check, using the lists, if the memory medium 60 is legal. If the memory medium 60 is judged based on the result of checking to be illegal, the protocol will be closed. On the other hand, if the memory medium 60 is judged to be legal, the memory recorder/player 200 goes to step P397 where it will send the lists to the security module 63.

Receiving the lists, the security module 63 will check if the version numbers of the lists are equal to the version numbers (RevV$_B$ and RegV$_B$) acquired from the memory recorder/player 200 at step P393, check, using the lists, if the memory recorder/player 200 is legal, and also check the digital signature TCSig made by the center TC, included in the lists. If the memory recorder/player 200 is judged based on the result of checking to be illegal, the protocol will be closed. On the other, if the memory recorder/player 200 is judged to be legal, the security module 63 updates the version numbers of its own lists with those acquired at step P393, writes the lists to the memory unit 22 and updates them, and goes to step P56 and subsequent steps. Note that the lists may be updated before or after the operations at step P56.

Twelfth Embodiment (IM4, Dev3)

Next, a combination of the media type IM4 and device type Dev3 (IM4, Dev3) will be described hereafter as the twelfth embodiment of the present invention.

Figure 77:
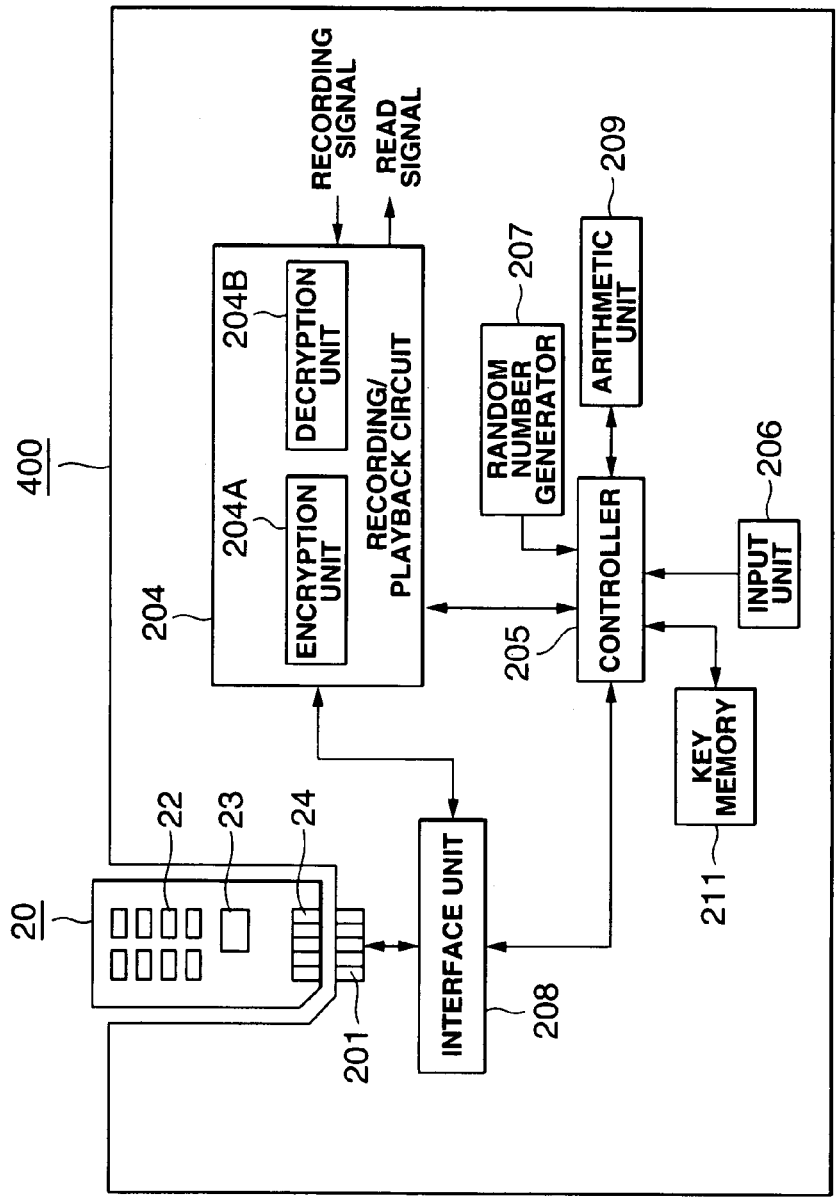
FIG. 77 is a block diagram of a memory as the data recording medium according to the twelfth embodiment of the present invention and a recorder/player for the memory.

The system construction of the media/device combination as the twelfth embodiment is as shown in FIG. 77. As shown, the memory recorder/player 400 of the device type Dev3 includes no dedicated nonvolatile memory for storage of the lists (however, a key memory 211 is provided to store keys etc. as in the above) while the security module 23 of the memory medium 20 of the media type IM4 has a nonvolatile memory 43 for storage of the lists. Note that the construction of each component in FIG. 77 is similar to that shown in FIGS. 14 and 69, and so will not further be described herein.

<Recording Procedure in the Twelfth Embodiment>

Figure 78:
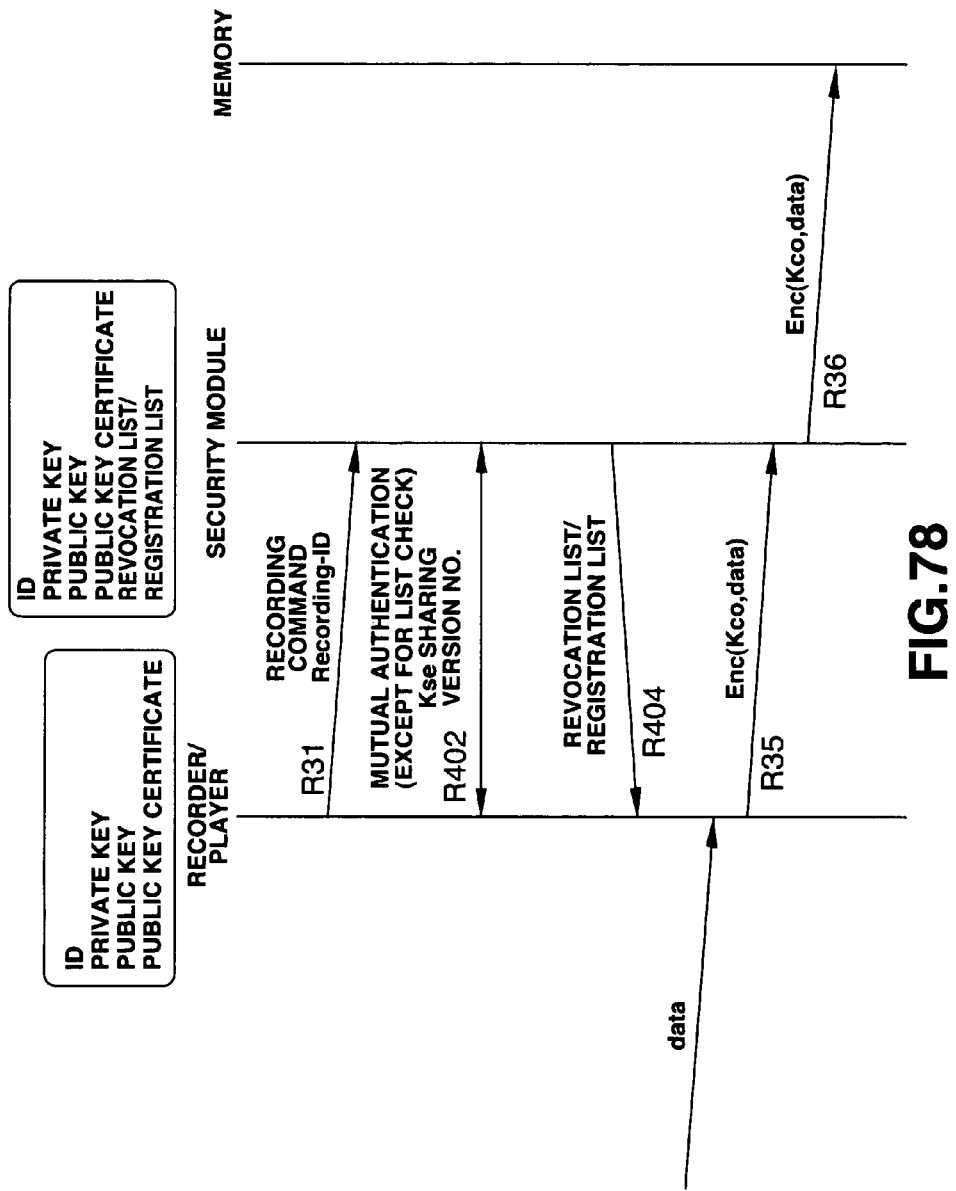
FIG. 78 shows a basic procedure for writing data to the memory as the data recording medium according to the twelfth embodiment of the present invention.

FIG. 78 explains a procedure in which in the combination of the media type IM4 and device type Dev3 (IM4, Dev3) as the twelfth embodiment, the memory recorder/player 400 records data to the memory medium 10. Note that the same steps in FIG. 78 as in the aforementioned embodiments will not be repeated hereinafter and only differences of the procedure in FIG. 78 from those the aforementioned embodiments will be described below.

FIG. 78 shows a procedure generally similar to that shown in FIG. 45. At step R402 (R232 in FIG. 45), the memory recorder/player 400 and security module 23 exchange their own revocation and registration list version numbers between them. Since in the twelfth embodiment, the memory recorder/player 200 has no revocation and registration lists, it will send "0" as list version to the security module 23 while the memory medium 20 will send the version numbers of the lists stored in the nonvolatile memory 44 of the security module 23 to the memory recorder/player 400.

Since the memory recorder/player 400 has no lists even after the above exchange, effected at step R402, of the list version numbers, the security module 23 will check, using the lists stored in the nonvolatile memory 44, if the memory recorder/player 400 is legal. If the result of checking shows that the memory recorder/player 400 is illegal, the protocol will be closed. On the other hand, if the memory recorder/player 400 is judged to be legal, the security module 23 goes to step R403 where it will send the revocation and registration lists stored in the nonvolatile memory 44 to the memory recorder/player 400.

Using the received lists, the memory recorder/player 400 will check if the memory medium 20 is legal. If the result of checking shows that the memory medium 20 is illegal, the protocol will be closed. On the other hand, if the memory medium 20 is judged to be legal, the memory recorder/player 400 goes to step R35 where data will be encrypted and recorded.

<Recording Procedure in the Twelfth Embodiment (Detail)>

Figure 79:
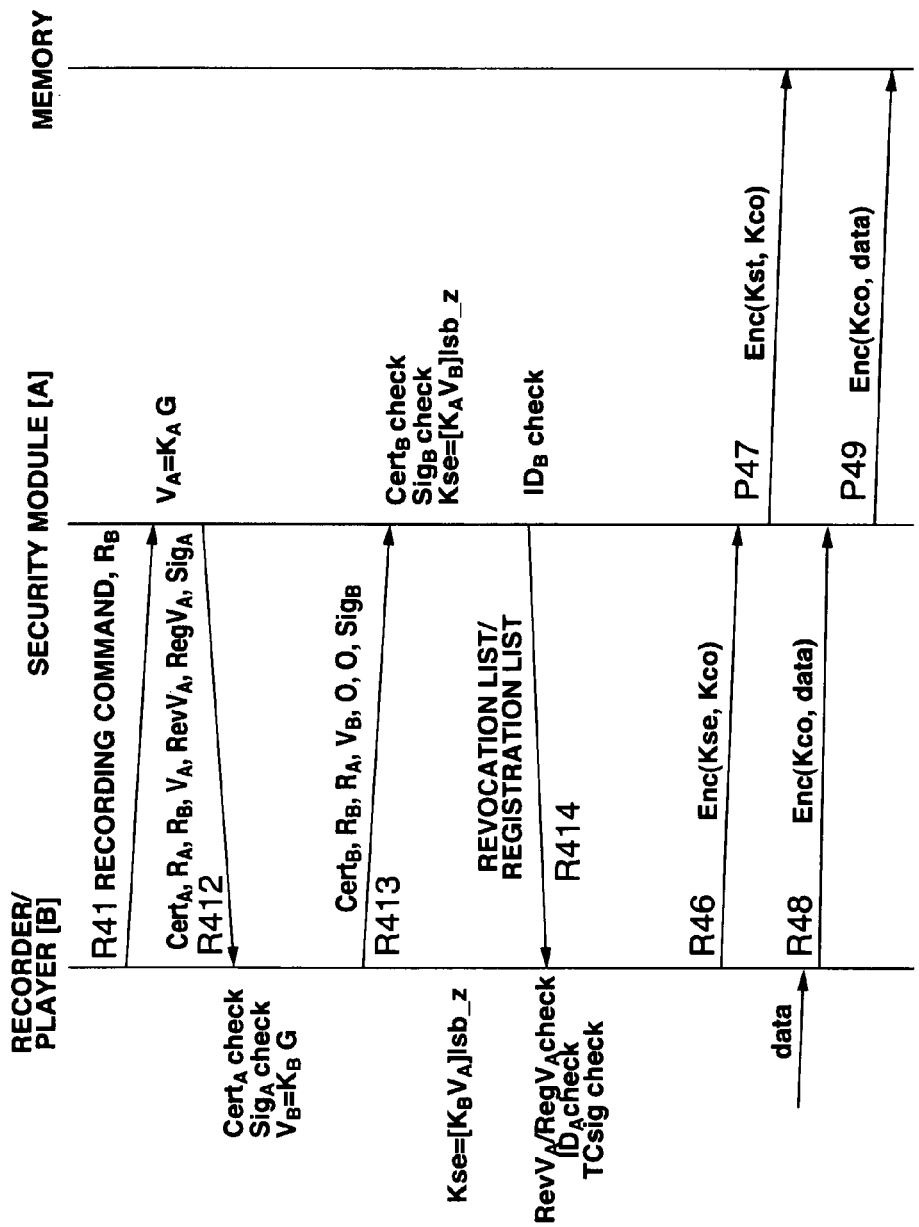
FIG. 79 shows in detail the procedure for writing data to the memory as the data recording medium according to the twelfth embodiment of the present invention.

FIG. 79 shows in detail the procedure in which the memory recorder/player 400 according to the twelfth embodiment of the present invention, shown in FIG. 78, records data to the memory medium 20. It should be noted that only differences of the procedure shown in FIG. 79 from that shown in FIG. 46 will be described in the following.

As shown in FIG. 79, the security module 23 goes to step R412 (R242 in FIG. 46) where it will append a public key certificate Cert$_A$ to a bit string consisting of random numbers R$_A$ and R$_B$, value V$_A$ and version numbers RevV$_A$ and RegV$_A$ of the revocation and registration lists read from the nonvolatile memory 44, and send them to the memory recorder/player 400.

Receiving Cert$_A$, R$_A$, R$_B$, V$_A$, RevV$_A$, RegV$_A$ and Sig$_A$, the memory recorder/player 400 checks the public key certificate Cert$_A$ and digital signature Sig$_A$. If the memory recorder/player 400 has judged that the certificate can pass the checking, the random number R$_B$ returned from the security module 23 is equal to a one previously generated and the digital signature Sig$_A$ is correct, it goes to step R413 (R243 in FIG. 46) where it will make a digital signature to a bit string consisting of the random numbers R$_B$ and R$_A$, value V$_B$ and version numbers "0" indicating that the memory recorder/player 400 has no lists, append a public key certificate Cert$_B$ to these R$_B$, R$_A$, V$_B$, 0, 0 and S$_{igB}$, and send them to the security module 23.

Receiving Cert$_B$, R$_B$, R$_A$, V$_B$, 0, 0 and S$_{igB}$ from the memory recorder/player 400, the security module 23 will check the public key certificate Cert$_B$ and digital signature S$_{igB}$. Also, the security module 23 checks, using its own lists, if the memory recorder/player 400 is legal. If the memory recorder/player 400 is judged not to pass the checking, the protocol will be closed.

If the public key certificate Cert$_B$ and digital signature S$_{igB}$ are judged by the security module 23 to pass the checking, namely, if both the memory recorder/player 400 and security module 23 have passed the checking, the memory recorder/player 400 and security module 23 will generate and share a session key Kse.

Next, the security module 23 goes to step P414 where it will send the lists stored in the nonvolatile memory 44 to the memory recorder/player 400.

Receiving the lists, the memory recorder/player 400 checks if the version numbers of the lists are equal to the version numbers (RevV$_A$ and RegV$_A$) received from the security module 23 at step R412, check, using the lists, if the memory medium 20 is legal and also check the digital signature TCSig made by the center TC, included in the lists. If the memory medium 20 is judged to be illegal, the protocol will be closed.

On the other had, if the memory medium 20 is judged to be legal, namely, if both the memory recorder/player 400 and security module 33 are judged to be legal, the security module 23 goes to step R46 where data will be encrypted and recorded.

<Playback Procedure in the Twelfth Embodiment>

Figure 80:
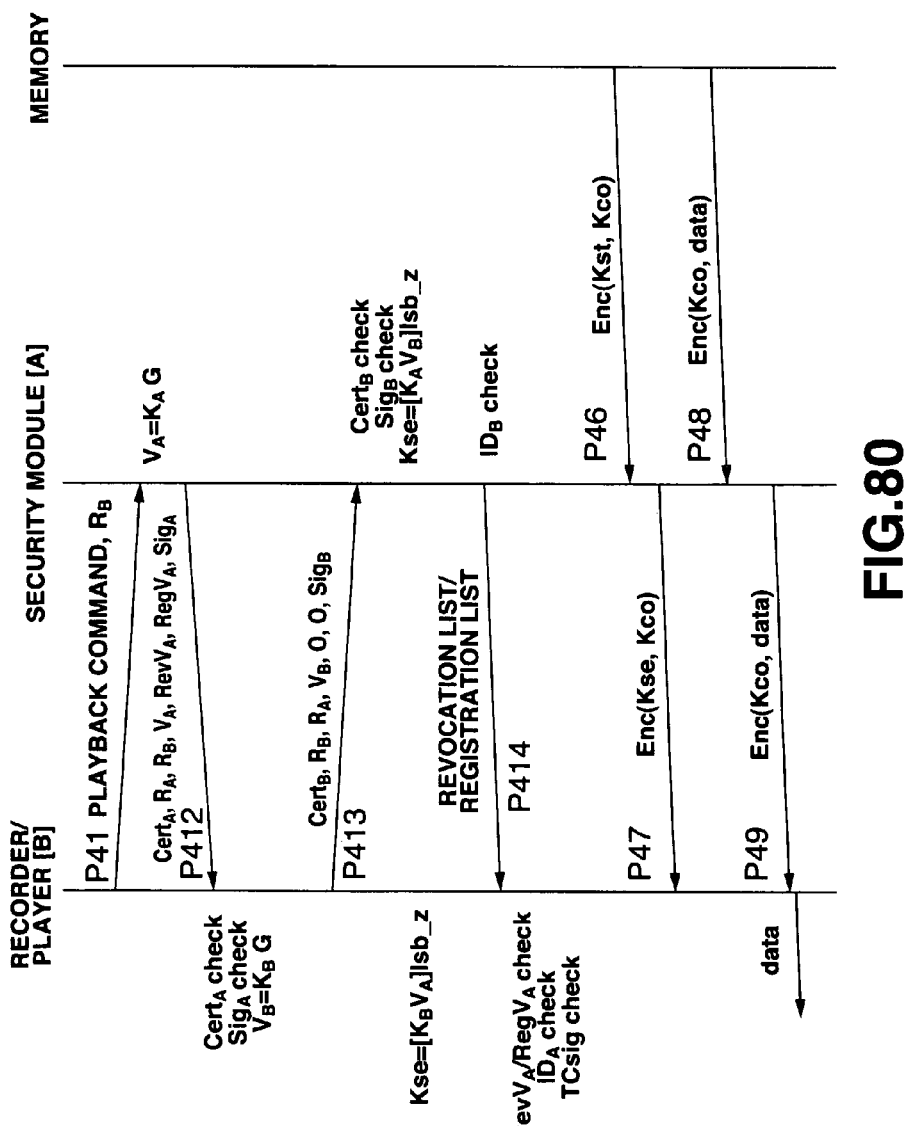
FIG. 80 shows a basic procedure for reading data from the memory as the data recording medium according to the twelfth embodiment of the present invention.

FIG. 80 explains a procedure in which the memory recorder/player 400 according to the twelfth embodiment of the present invention reads or plays back data from the memory unit 22 of the memory medium 20. Note that the procedure shown in FIG. 80 is generally similar to that shown in FIG. 50. So, only differences of the procedure in FIG. 80 from that shown in FIG. 50 will be described in the following.

As shown in FIG. 80, the security module 23 goes to step P412 (P242 in FIG. 50) where it will append a public key certificate Cert$_A$ to a bit string consisting of random numbers R$_A$ and R$_B$, value V$_A$ and version numbers RevV$_A$ and RegV$_A$ of the revocation and registration lists read from the nonvolatile memory 44, and send them to the memory recorder/player 400.

Receiving Cert$_A$, R$_A$, R$_B$, V$_A$, RevV$_A$, RegV$_A$ and Sig$_A$, the memory recorder/player 400 checks the public key certificate Cert$_A$ and digital signature Sig$_A$. If the memory recorder/player 400 has judged that the certificate can pass the checking, the random number R$_B$ returned from the security module 23 is equal to a one previously generated and the digital signature Sig$_A$ is correct, it goes to step P413 (P243 in FIG. 50) where it will make a digital signature to a bit string consisting If the memory recorder/player 400 has judged that the certificate can pass the checking, the random number R$_B$ returned from the security module 23 is equal to a one previously generated and the digital signature Sig$_A$ is correct, it goes to step P413 (P243 in FIG. 50) where it will make a digital signature to a bit string consisting of the random numbers R$_B$ and R$_A$, value V$_A$ and version numbers "0" indicating that the memory recorder/player 400 has no lists, append a public key certificate Cert$_B$ to these R$_B$, R$_A$, V$_B$, 0, 0 and S$_{igB}$, and send them to the security module 23.

Receiving Cert$_B$, R$_B$, R$_A$, V$_B$, 0, 0 and S$_{igB}$ from the memory recorder/player 400, the security module 23 will check the public key certificate Cert$_B$ and digital signature S$_{igB}$. Also, the security module 23 checks, using its own lists, if the memory recorder/player 400 is legal. If the memory recorder/player 400 is judged not to pass the checking, the protocol will be closed.

If the public key certificate Cert$_B$ and digital signature S$_{igB}$ are judged by the security module 23 to pass the checking, namely, if both the memory recorder/player 400 and security module 23 have passed the checking, the memory recorder/player 400 and security module 23 will generate and share a session key Kse.

Next, the security module 23 goes to step P414 where it will send the lists stored in the nonvolatile memory 44 to the memory recorder/player 400.

Receiving the lists, the memory recorder/player 400 checks if the version numbers of the lists are equal to the version numbers (RevV$_A$ and RegV$_A$) received from the security module 23 at step P412, check, using the lists, if the memory medium 20 is legal and also check the digital signature TCSig made by the center TC, included in the lists. If the memory medium 20 is judged to be illegal, the protocol will be closed.

On the other had, if the memory medium 20 is judged to be legal, namely, if both the memory recorder/player 400 and security module 23 are judged to be legal, the security module 23 goes to step P16 and subsequent steps where data will be played back and decrypted.

[Media Type-/Device Type-Specific Procedure]

Next, referring to the flow charts in FIGS. 81 to 87, media or device type-specific flow of operations of the combination of a security module and recorder/player according to each of the embodiments of the present invention will be described herebelow. Note that examples of the security module and recorder/player using both the revocation and registration lists will be described below.

[Media Type-Specific Procedure]

<Media Type IM1>

Figure 81:
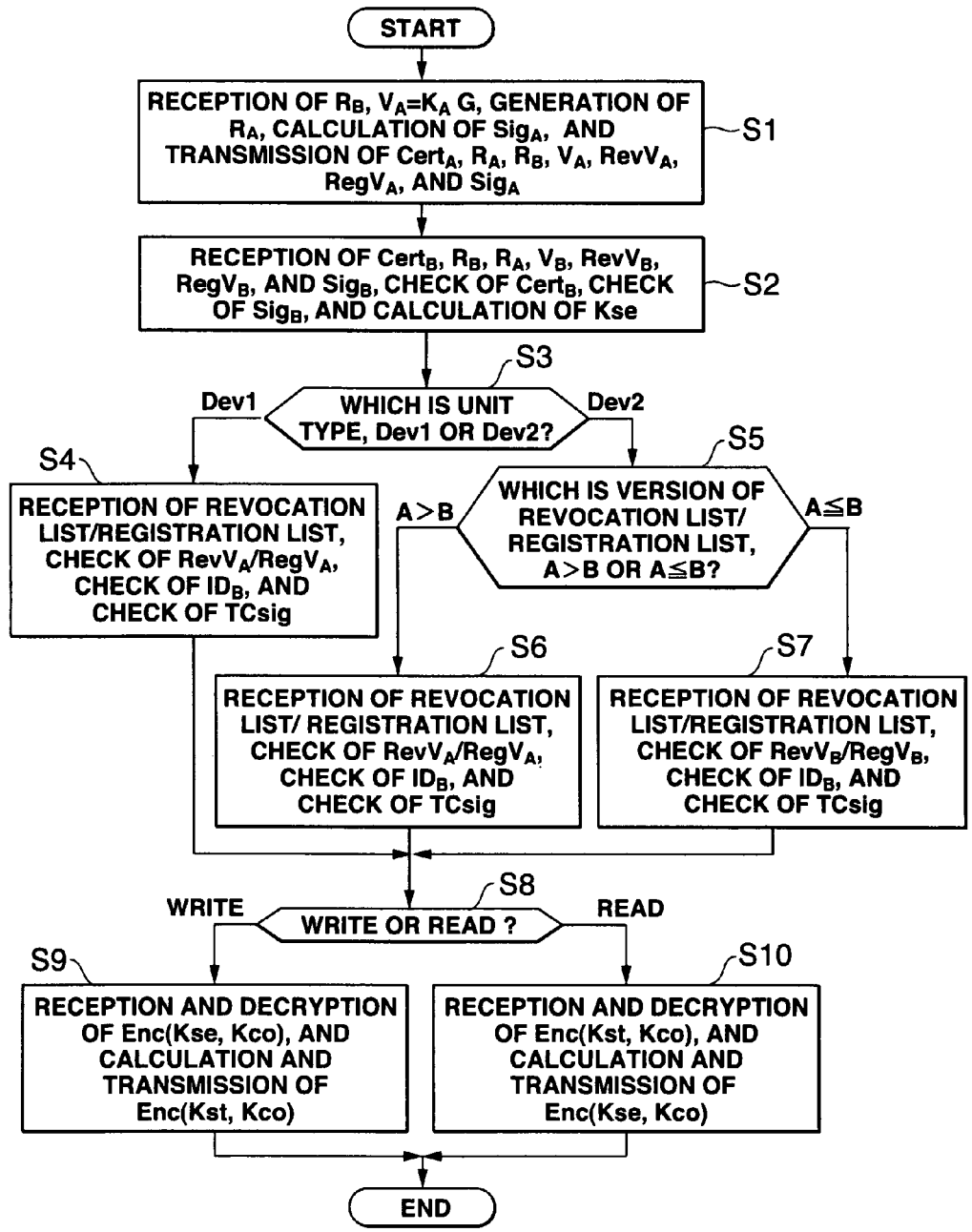
FIG. 81 shows a flow of operations effected in the security module in the optical disc as the data recording medium equivalent to the media type IM1.

FIG. 81 shows a flow of operations effected by the security module 53 in the optical disc medium 50 corresponding to the media type IM1.

As shown in FIG. 81, at step S1, the security module 53 receives a random number R$_B$ generated by the optical disc recorder/player, makes a calculation of V$_A$=K$_A$·G, generates a random number R$_A$, makes a digital signature to acquire Sig$_A$, and sends Cert$_A$, R$_A$, R$_B$, V$_A$, RevV$_A$, RegV$_A$ and Sig$_A$ to the optical disc recorder/player, as having been described in the foregoing.

Next at step S2, the security module 53 receives Cert$_B$, R$_B$, R$_A$, V$_B$, RevV$_B$, RegV$_B$ and S$_{igB}$ sent from the optical disc recorder/player, checks Cert$_B$ and S$_{igB}$ and make a calculation of a session key Kse.

Next, at step S3, the security module 53 judges, by checking if the list version number is "0" or not for example, the device type of the optical disc recorder/player as a counterpart. If it is judged at step S3 that the list version number is "0" and thus the device type is Dev1 (namely, optical disc recorder/player 300), the security module 53 will go to step S4. On the other hand, if it is judged at step S3 that the list version number is not "0 and thus the device type is Dev2 (namely, optical disc recorder/player 100), the security module 53 will go to step S5.

At step S4, the security module 53 will receive the revocation and registration lists read by the optical recorder/player from the data recording area of the optical disc 12, check the version numbers (RevV$_A$ and RegV$_A$) of the lists, check, using the lists, ID$_B$ of the optical disc recorder/player (300 of the device type Dev1) and check the digital signature TCSig made by the center TC, and then go to Step S8.

At step S5, the security module 53 will check if the version numbers of the revocation and registration lists recorded in the data recording area of the optical disc 12 are larger (A>B) or smaller (A≦B) than those of the lists held in the optical disc recorder/player 100 of the device type Dev2. If the judgment made at step S5 is A>B, the security module 53 will go to step S6. On the other hand, if the judgment at step S5 is A≦B, the security module 53 will go to step S7.

At step S6, the security module 53 receives the revocation and registration lists read by the optical disc recorder/player from the data recording area of the optical disc 12, checks the version numbers (RevV$_A$ and RegV$_A$) of the lists, check, using the lists, ID$_B$ of the optical disc recorder/player 100 and check the digital signature TCSig made by the center TC, and then go to step S8.

Also at step S7, the security module 53 will receive the revocation and registration lists held in the optical disc recorder/player 100, check the version numbers (RevV$_A$ and RegV$_A$) of the lists, check, using the lists, ID$_B$ of the optical disc recorder/player 100 and check the digital signature TCSig made by the center TC, and then go to Step S8.

At step S8, the security module 53 judges which operation the optical disc recorder/player has requested, recording or playback.

If it is judged at step S8 that the optical disc recorded/player requests recording, the security module 53 will go to step S9. At this step S9, the security module 53 will receive and decrypt a value Enc(Kse, Kco) the optical disc recorder/player has obtained by encrypting the content key Kco with the session key Kse, generate a value Enc(Kst, Kco) obtained by encrypting, with its own storage key Kst, the content key Kco obtained by the decryption, and send it to the optical disc recorder/player. Thereafter, there will be recorded into the optical disc 12 a content data Enc(Kco, data) encrypted with the content key Kco and the value Enc(Kst, Kco) obtained by encrypting the content key Kco with the storage key Kst, in the optical disc recorder/player.

On the other had, if it is judged at step S8 that the optical disc recorder requests playback, the security module 53 will go to step S10. At this step S10, the security module 53 receives and decrypts the value Enc(Kst, Kco) obtained by encrypting the content key Kco with the storage key Kst read by the optical disc recorder/player from the data recording area of the optical disc 12, generates a value Enc(Kse, Kco) obtained by encrypting, with the session key Kse, the content key Kco obtained by the decryption, and sends it to the optical disc recorder/player. Thereafter, the content data Enc(Kco, data) encrypted with the content key Kco will be read from the optical disc 12 and sent to the optical disc reorder/player.

<Media Type IM2>

Figure 82:
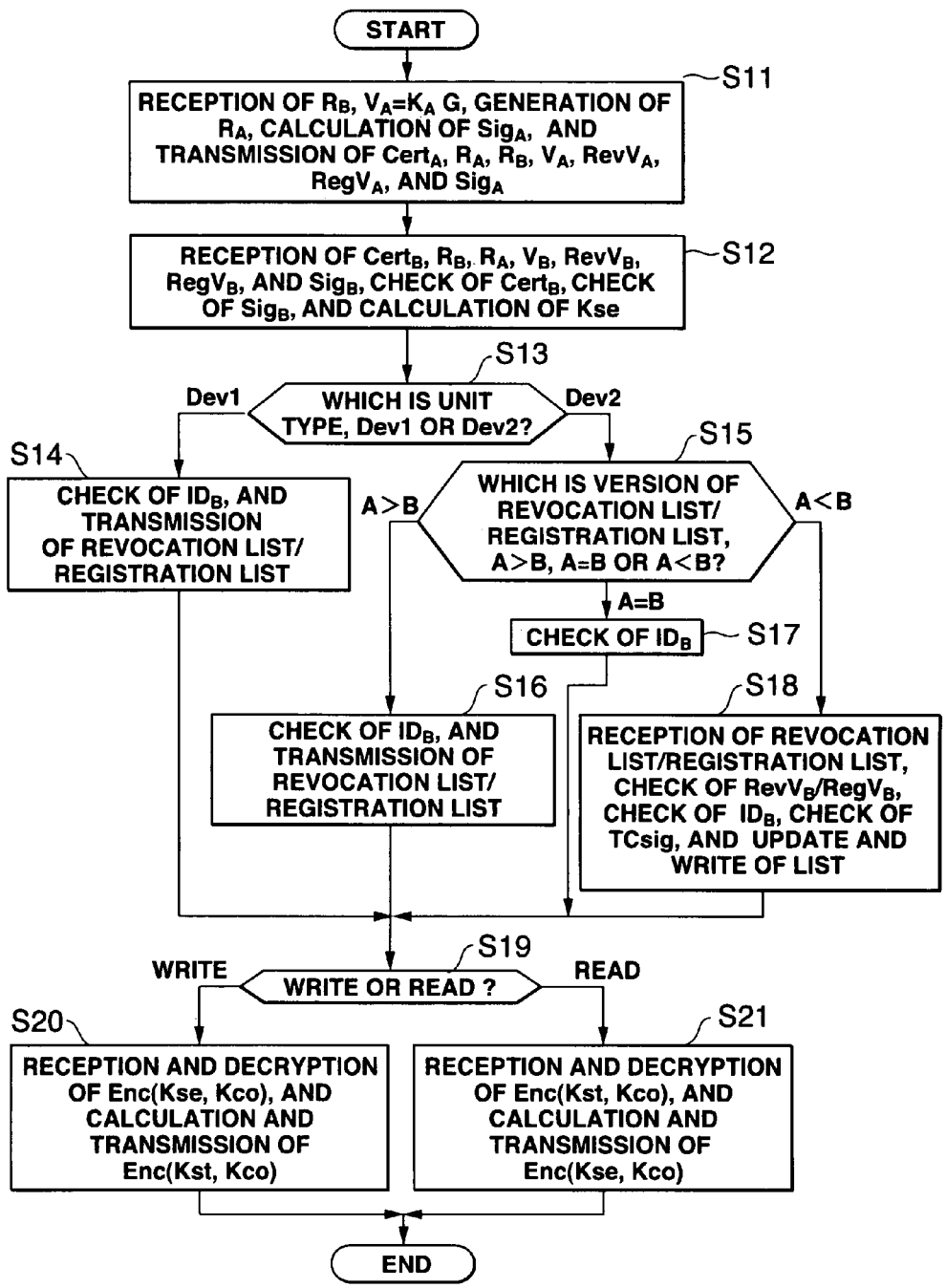
FIG. 82 shows a flow of operations effected in the security module in the optical disc as the data recording medium equivalent to the media type IM2.

FIG. 82 shows a flow of operations effected by the security module 13 in the optical disc medium 10 corresponding to the media type IM2.

As shown in FIG. 82, at step S11, the security module 13 receives a random number R$_B$ generated by the optical disc recorder/player, makes a calculation of V$_A$=K$_A$·G, generates a random number R$_A$, makes a digital signature to acquire Sig$_A$, and sends Cert$_A$, R$_A$, R$_B$, V$_A$, RevV$_A$, RegV$_A$ and Sig$_A$ to the optical disc recorder/player, as having been described in the foregoing.

Next at step S12, the security module 13 receives Cert$_B$, R$_B$, R$_A$, V$_B$, RevV$_B$, RegV$_B$ and S$_{igB}$ sent from the optical disc recorder/player, checks Cert$_B$ and S$_{igB}$ and make a calculation of a session key Kse.

Next, at step S13, the security module 13 judges, by checking if the list version number is "0" or not for example, the device type of the optical disc recorder/player as a counterpart. If it is judged at step S13 that the list version number is "0" and thus the device type is Dev1 (namely, optical disc recorder/player 300), the security module 13 will go to step S14. If it is judged at step S13 that the list version number is not "0 and thus the device type is Dev2 (namely, optical disc recorder/player 100), the security module 13 will go to step S15.

At step S14, the security module 13 will check, using the lists stored in the nonvolatile memory 34, ID$_B$ of the optical disc recorder/player 300. If the ID$_B$ is judged to pass the checking, the security module 13 sends the lists to the optical disc recorder/player 300 and then goes to step S19.

At step S15, the security module 13 will check if the version numbers of the revocation and registration lists stored in the nonvolatile memory 34 are larger (A>B), equal to (A=B), or smaller (A<B) than those of the lists held in the optical disc recorder/player 100. If the judgment made at step S15 is A>B, the security module 13 will go to step S16. If the judgment at step S15 is A=B, the security module 13 will go to step S17. If the judgment at step S15 is A<B, the security module 13 will go to step S18.

At step S16, the security module 13 checks the ID$_B$ of the optical disc recorder/player 100 using its own lists, sends the lists to the optical disc recorder/player 100 and then goes to step S19.

At step S17, the security module 13 checks the ID$_B$ of the optical disc recorder/player 100 using its own lists and then goes to step S19.

Also, at step S18, the security module 13 receives the lists from the optical disc recorder/player 100, checks the version numbers (RevV$_B$ and RegV$_B$) of the lists, checks, using the lists, the ID$_B$ of the optical disc recorder/player 100, and checks the digital signature TCSig made by the center TC. If they are judged to pass the checking, the security module 13 updates its own lists using the received lists, and then goes to step S19.

At step S19, the security module 13 judges which operation the optical disc recorder/player has requested, recording or playback.

If it is judged at step S19 that the optical disc recorded/player requests recording, the security module 13 will go to step S20. At this step S20, the security module 13 will receive and decrypt a value Enc(Kse, Kco) the optical disc recorder/player has obtained by encrypting the content key Kco with the session key Kse, generate a value Enc(Kst, Kco) obtained by encrypting, with its own storage key Kst, the content key Kco obtained by the decryption, and send it to the optical disc recorder/player. Thereafter, there will be recorded into the optical disc 12 a content data Enc(Kco, data) encrypted with the content key Kco and the value Enc(Kst, Kco) obtained by encrypting the content key Kco with the storage key Kst, in the optical disc recorder/player.

On the other had, if it is judged at step S19 that the optical disc recorder requests playback, the security module 13 will go to step S21. At this step S21, the security module 13 receives and decrypts the value Enc(Kst, Kco) obtained by encrypting the content key Kco with the storage key Kst read by the optical disc recorder/player from the data recording area of the optical disc 12, generates a value Enc(Kse, Kco) obtained by encrypting, with the session key Kse, the content key Kco obtained by the decryption, and sends it to the optical disc recorder/player. Thereafter, the content data Enc(Kco, data) encrypted with the content key Kco will be read from the optical disc 12 and sent to the optical disc reorder/player.

<Media Type IM3>

Figure 83:
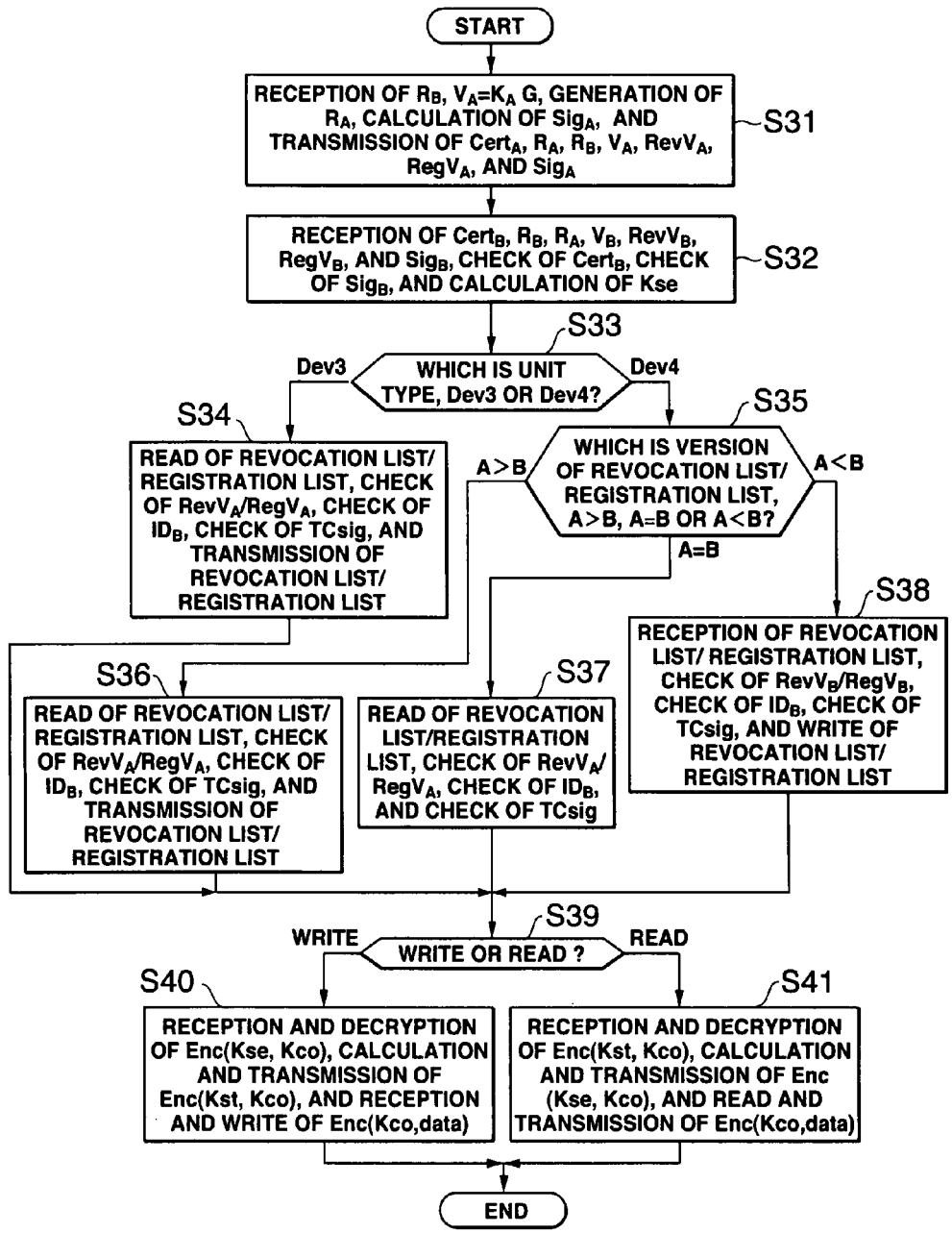
FIG. 83 shows a flow of operations effected in the security module in the memory as the data recording medium equivalent to the media type IM3.

FIG. 83 shows a flow of operations effected by the security module 63 in the memory medium 60 corresponding to the media type IM3.

As shown in FIG. 83, at step S31, the security module 63 receives a random number R$_B$ generated by the memory recorder/player, makes a calculation of V$_A$=K$_A$·G, generates a random number R$_A$, makes a digital signature to acquire Sig$_A$, and sends Cert$_A$, R$_A$, R$_B$, V$_A$, RevV$_A$, RegV$_A$ and Sig$_A$ to the memory recorder/player, as having been described in the foregoing.

Next at step S32, the security module 63 receives Cert$_B$, R$_B$, R$_A$, V$_B$, RevV$_B$, RegV$_B$ and S$_{igB}$ sent from the memory recorder/player, checks Cert$_B$ and Sig$_B$ and make a calculation of a session key Kse.

Next, at step S33, the security module 63 judges, by checking if the list version number is "0" or not for example, the device type of the memory recorder/player as a counterpart. If it is judged at step S33 that the list version number is. "0" and thus the device type is Dev3 (namely, memory recorder/player 400), the security module 63 will go to step S34. If it is judged at step S33 that the list version number is not "0 and thus the device type is Dev4 (namely, memory recorder/player 200), the security module 63 will go to step S35.

At step S34, the security module 63 will read the lists stored in the data recording area of the memory unit 22 and check the version numbers (RevV$_A$ and RegV$_A$) of the lists, check, using the lists, ID$_B$ of the memory recorder/player 400 and the digital signature TCSig made by the center TC. If the ID$_B$ and digital signature are judged to pass the checking, the security module 63 sends the lists to the memory recorder/player 400 and then goes to step S39

At step S35, the security module 63 will check if the version numbers of the lists stored in the data recording area of the memory unit 22 are larger (A>B), equal to (A=B), or smaller (A<B) than those of the lists held in the memory recorder/player 200. If the judgment made at step S35 is A>B, the security module 63 will go to step S36. If the judgment at step S35 is A=B, the security module 63 will go to step S37. If the judgment at step S35 is A<B, the security module 63 will go to step S38.

At step S36, the security module 63 reads the lists recorded in the data recording area of the memory unit 22, checks the version numbers (RevV$_A$ and RegV$_A$) of the lists, check, using the lists, ID$_B$ of the memory recorder/player 200, checks the digital signature TCSig made by the center TC, sends the lists to the memory recorder/player 200 and then goes to step S39.

At step S37, the security module 63 reads the lists recorded in the data recording area of the memory unit 22, checks the version numbers (RevV$_A$ and RegV$_A$) of the lists, check, using the lists, ID$_B$ of the memory recorder/player 200, checks the digital signature TCSig made by the center TC, and then goes to step S39.

Also, at step S38, the security module 63 receives the lists from the memory recorder/player 200, checks the version numbers (RevV$_B$ and RegV$_B$) of the lists, checks, using the lists, the ID$_B$ of the memory recorder/player 200, checks the digital signature TCSig made by the center TC, writes the lists into the memory unit 22 an updates the lists, and then goes to step S39.

At step S39, the security module 63 judges which operation the memory recorder/player, recording or playback.

If it is judged at step S39 that the memory recorded/player requests recording, the security module 63 will go to step S40. At this step S40, the security module 63 will receive and decrypt a value Enc(Kse, Kco) the memory recorder/player has obtained by encrypting the content key Kco with the session key Kse, generate a value Enc(Kst, Kco) obtained by encrypting, with its own storage key Kst, the content key Kco obtained by the decryption, and write it to the memory unit 22. Thereafter, the security module 63 receives the content data Enc(Kco, data) encrypted with the content key Kco and records it to the memory unit 22.

On the other hand, if it is judged at step S39 that the memory recorder/player 200 requests playback, the security module 63 goes to step S41 where it will read and decrypts the value Enc(Kst, Kco) recorded in the data recording area of the memory unit 22 for example, obtained by encrypting the content key Kco with the storage key Kst, generate a value Enc(Kse, Kco) obtained by encrypting, with the session key Kse, the content key Kco obtained by the decryption, and send it to the memory recorder/player. Thereafter, the security module 63 reads from the memory unit 22 the content data Enc(Kco, data) encrypted with the content key Kco, and sends it to the memory recorder/player.

<Media Type IM4>

Figure 84:
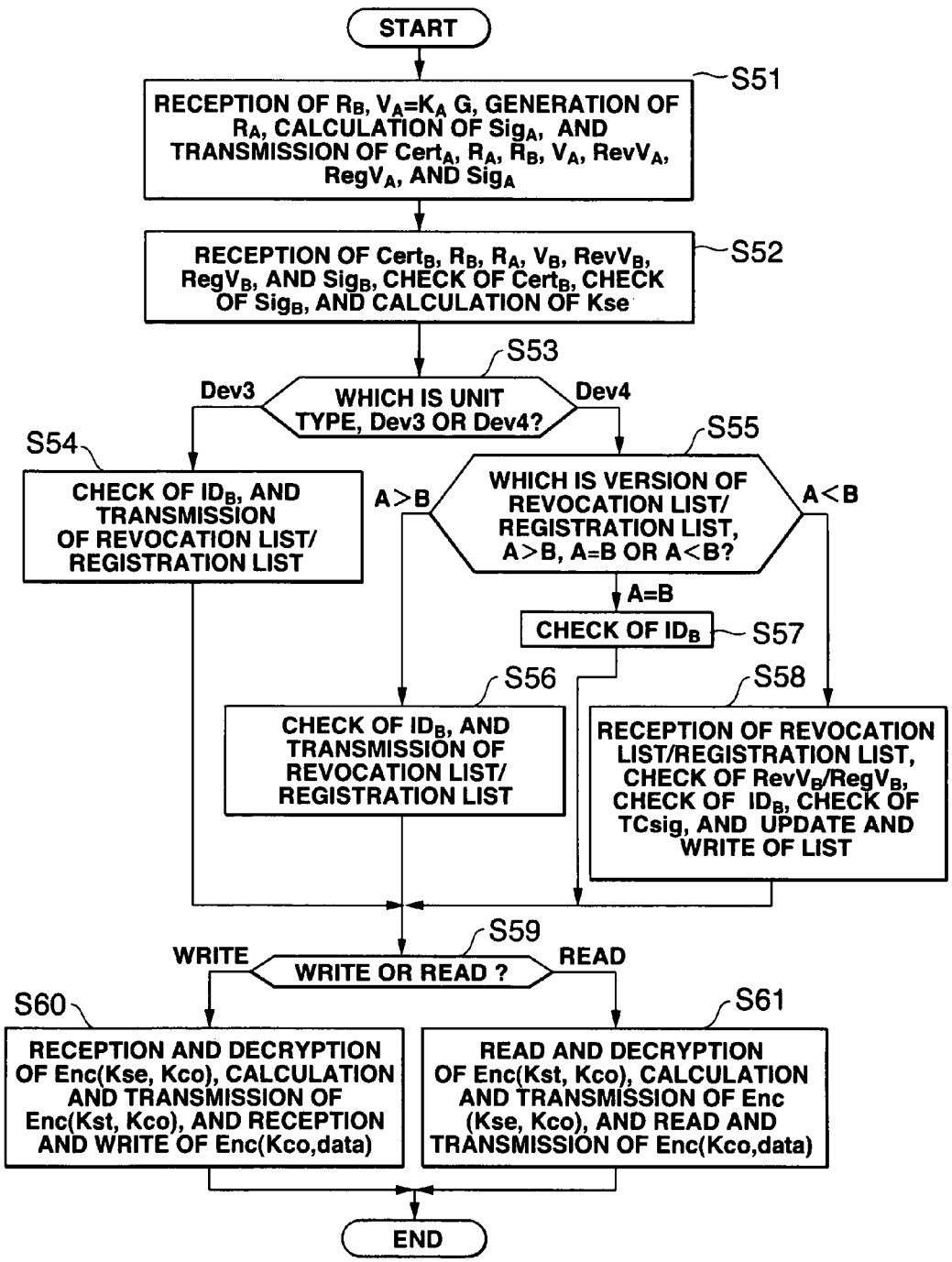
FIG. 84 shows a flow of operations effected in the security module in the memory as the data recording medium equivalent to the media type IM4.

FIG. 84 shows a flow of operations effected by the security module 23 in the memory medium 20 corresponding to the media type IM4.

As shown in FIG. 84, at step S51, the security module 23 receives a random number R$_B$ generated by the memory recorder/player, makes a calculation of V$_A$=K$_A$·G, generates a random number R$_A$, makes a digital signature to acquire Sig$_A$, and sends Cert$_A$, R$_A$, R$_B$, V$_A$, RevV$_A$, RegV$_A$ and Sig$_A$ to the memory recorder/player, as having been described in the foregoing.

Next at step S52, the security module 23 receives Cert$_B$, R$_B$, R$_A$, V$_B$, RevV$_B$, RegV$_B$ and S$_{igB}$ sent from the memory recorder/player, checks Cert$_B$ and S$_{igB}$ and make a calculation of a session key Kse.

Next, at step S53, the security module 23 judges, by checking if the list version number is "0" or not for example, the device type of the memory recorder/player as a counterpart. If it is judged at step S53 that the list version number is "0" and thus the device type is Dev3 (namely, memory recorder/player 400), the security module 23 will go to step S54. If it is judged at step S53 that the list version number is not "0 and thus the device type is Dev4 (namely, memory recorder/player 200), the security module 23 will go to step S55.

At step S54, the security module 23 will check, using the lists stored in the nonvolatile memory 44, ID$_B$ of the memory recorder/player 400. If the ID$_A$ is judged to pass the checking, the security module 23 sends the lists to the memory recorder/player 400 and then goes to step S59.

At step S55, the security module 23 will check if the version numbers of the lists stored in the data recording area of the nonvolatile memory 44 are larger (A>B), equal to (A=B), or smaller (A<B) than those of the lists held in the memory recorder/player 200. If the judgment made at step S55 is A>B, the security module 23 will go to step S56. If the judgment at step S55 is A=B, the security module 23 will go to step S57. If the judgment at step S35 is A<B, the security module 23 will go to step S58.

At step S56, the security module 23 checks, using its own lists, ID$_B$ of the memory recorder/player 200, sends the lists to the memory recorder/player 100 and then goes to step S59.

At step S57, the security module 23 checks, using its own lists, ID$_B$ of the memory recorder/player 200, and then goes to step S59.

Also, at step S58, the security module 23 receives the lists from the memory recorder/player 200, checks the version numbers (RevV$_B$ and RegV$_B$) of the lists, checks, using the lists, the ID$_B$ of the optical disc recorder/player 200, and checks the digital signature TCSig made by the center TC. If they are judged to pass the checking, the security module 23 updates its own lists using the received lists and then goes to step S59.

At step S59, the security module 23 judges which operation the memory recorder/player, recording or playback.

If it is judged at step S59 that the memory recorded/player requests recording, the security module 23 will go to step S60. At this step S60, the security module 23 will receive and decrypt a value Enc(Kse, Kco) the memory recorder/player has obtained by encrypting the content key Kco with the session key Kse, generate a value Enc(Kst, Kco) obtained by encrypting, with its own storage key Kst, the content key Kco obtained by the decryption, and write it to the memory unit 22. Thereafter, the security module 23 receives the content data Enc(Kco, data) encrypted with the content key Kco and records it to the memory unit 22.

On the other hand, if it is judged at step S59 that the memory recorder/player 200 request playback, the security module 23 goes to step S61. At this step S61, the security module 23 reads and decrypts the value Enc(Kst, Kco) recorded in the data recording area of the memory unit 22 for example, obtained by encrypting the content key Kco with the storage key Kst, generates a value Enc(Kse, Kco) obtained by encrypting, with the session key Kse, the content key Kco obtained by the decryption, and sends it to the memory recorder/player. Thereafter, the security module 23 reads from the memory unit 22 the content data Enc(Kco, data) encrypted with the content key Kco, and sends it to the memory recorder/player.

[Device Type-Specific Procedure]

Next, a flow of operations effected by the optical disc and memory recorder/players corresponding to the aforementioned device types Dev1 to Dev4, respectively, will be described herebelow. Note that since the flow of operations effected by the optical disc recorder/player 300 of the device type Dev1 is generally the same as that of operations effected by the memory recorder/player 400 of the device type Dev3, and the flow of operations effected by the optical disc recorder/player 100 of the device type Dev2 is generally the same as that of operations effected by the memory recorder/player 200 of the device type Dev4, the operations of the optical disc recorder/player units of the device types Dev1 and Dev3 and those of the memory recorder/player units of the device types Dev2 and Dev4, will be collectively described, respectively.

<Device Type Dev1/Dev3>

Figure 85:
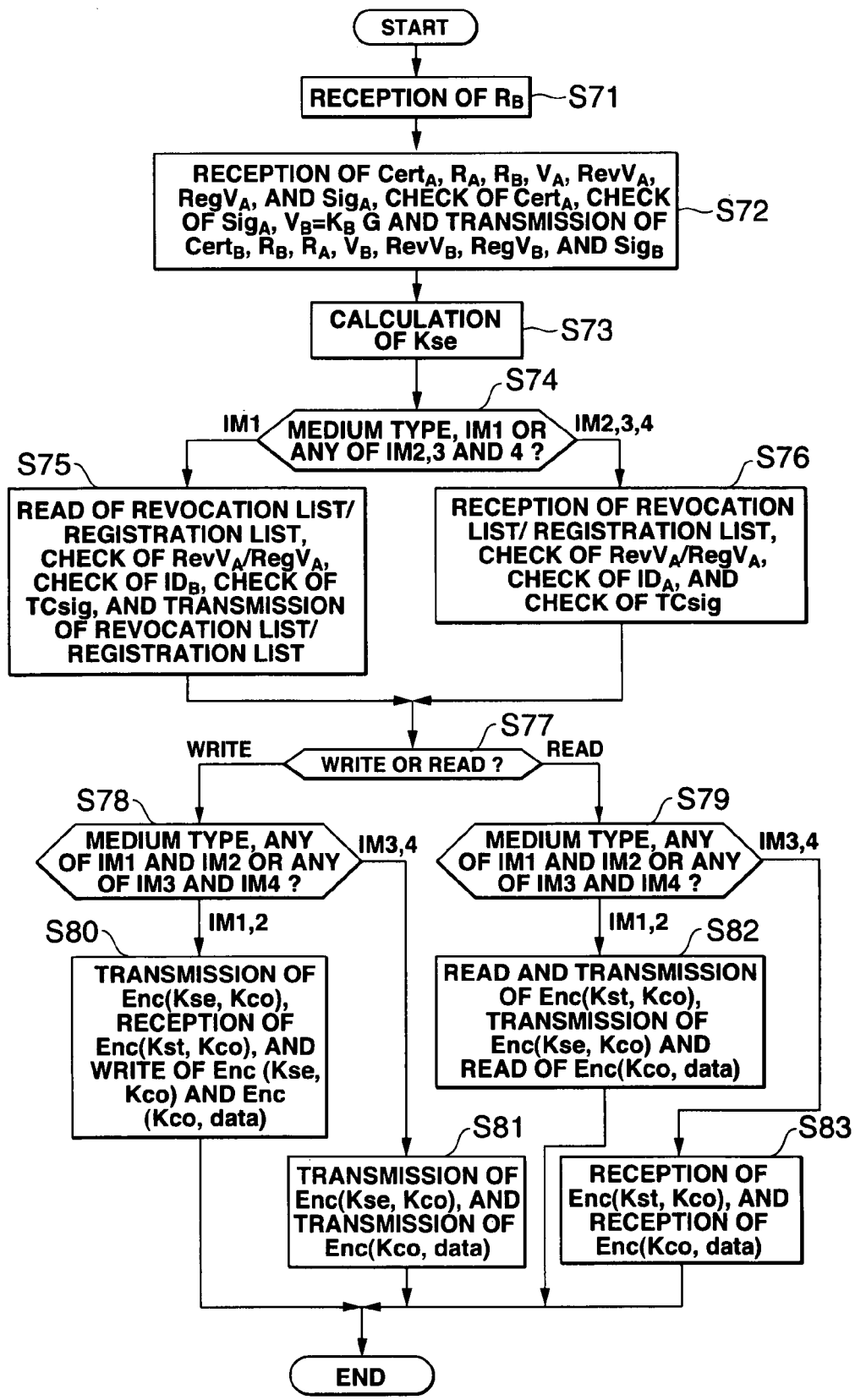
FIG. 85 shows a flow of operations effected in a recorder/player of a device type Dev1 or Dev3.

FIG. 85 shows a flow of operations effected by the recorder/player units of the device types Dev1 and Dev3 (will be referred to as "recorder/player" hereinafter).

As shown in FIG. 85, the recorder/player first generates a random number $R_B$ and sends it to the data recording medium, at step S71.

Next, at step S72, the recorder/player receives $Cert_A$, $R_A$, $R_B$, $V_A$, $RevV_A$, $RegV_A$ and $Sig_A$ from the data recording medium. After sending them to a media recorder/player and checking $Cert_A$ and $Sig_A$, and make a calculation of $V_B=K_B \cdot G$ as in the above, the recorder/player sends $Cert_B$, $R_B$, $R_A$, $V_B$, $RevV_B$, $RegV_B$ and $S_{igB}$ to the data recording medium. Note that at this time, version numbers $RevV_B$ and $RegV_B$ are "0".

Next, the recorder/player makes a calculation of a session key Kse at step S73.

Next, at step S74, the recorder/player judges if the media type of the data recording medium is IM1 or any other (IM2, IM3 or IM4). If it is judged at step S74 that the media type of the data recording medium is IM1, the recorder/player goes to step S75. If it is judged at step S74 that the media type of the data recording medium is other than IM1 (namely, it may be IM2, IM3 or IM4), the reorder/player goes to step S76.

At step S75, the recorder/player reads the revocation and registration lists from the optical disc 12 of the optical disc medium 50 of the media type IM1, checks the version numbers ($RevV_A$ and $RegV_A$) of the lists, checks, using the lists, $ID_A$ of the optical disc medium 50, check the digital signature TCSig made by the center CT, sends the lists to the security module 53 in the optical disc medium 50, and then goes to step S77.

Also, at step S76, the recorder/player receives the revocation and registration lists from the security module of the data recording medium of a media type (IM2 or IM4) other than the media type IM1, checks the version numbers ($RevV_A$ and $RegV_A$) of the lists, check, using the lists, $ID_A$ of the data recording medium, checks the digital signature TCSig made by the center TC, and then goes to step S77.

At step S77, it is judged which operation the recorder/player has to do, data recording to the data recording medium or data reading from the data recording medium.

If it is judged at step S77 that the data recording is to be done, the recorder/player goes to step S78. At step S78, the recorder/player judges which the media type of the data recording medium is, IM1, IM2 (optical disc medium), IM3 or IM4 (memory medium). If it is judged at step S78 that the media type is IM1 or IM2, the recorder/player goes to step S80. If it is judged that the media type is IM3 or IM4, the recorder/player goes to step S81.

Also, if it is judged at step S77 that the data playback is to be done, the recorder/player goes to step S79. At step S79, the recorder/player judges which the media type of the data recording medium is, IM1, IM2 (optical disc medium), IM3 or IM4 (memory medium). If it is judged at step S79 that the media type is IM1 or IM2, the recorder/player goes to step S82. If it is judged that the media type is IM3 or IM4, the recorder/player goes to step S83.

At step S80, the recorder/player sends the value Enc(Kse, Kco) obtained by encrypting the content key Kco with the session key Kse, and correspondingly receives the value Enc (Kst, Kco) the security module of the data recording medium has obtained by encrypting the content key Kco with the storage key Kst. Then, the recorder/player writes into the optical disc in the data recording medium the value Enc(Kst, Kco) obtained by encrypting the content key Kco with the storage key Kst and data Enc(Kco, data) obtained by encrypting content data with the content key Kco.

Also, at step S81, the recorder/player sends to the security module the value Enc(Kse, Kco) obtained by encrypting the content key Kco with the session key Kse, sends the data Enc(Kco, data) obtained by encrypting the content data with the content key Kco and then writes it to the memory unit.

Also, at step S82, the recorder/player reads from the data recording medium the value Enc(Kst, Kco) obtained by encrypting the content key Kco with the storage key Kst, sends the value Enc(Kst, Kco) to the security module in the data recording medium, decrypts the value Enc(Kst, Kco) read from the data recording medium with the storage key Kst, receives the value Enc(Kse, Kco) obtained by encrypting the content key Kco with the session key Kse, and then reads from the data recording medium the content data Enc(Kco, data) encrypted with the content key Kco.

Also, at step S83, the recorder/player receives from the security module in the data recording medium the value Enc (Kse, Kco) obtained by encrypting the content key Kco with the session key Kse, and then receives from the security module in the data recording medium the content data Enc (Kco, data) encrypted with the content key Kco.

<Device Type Dev2/Dev4>

Figure 86:
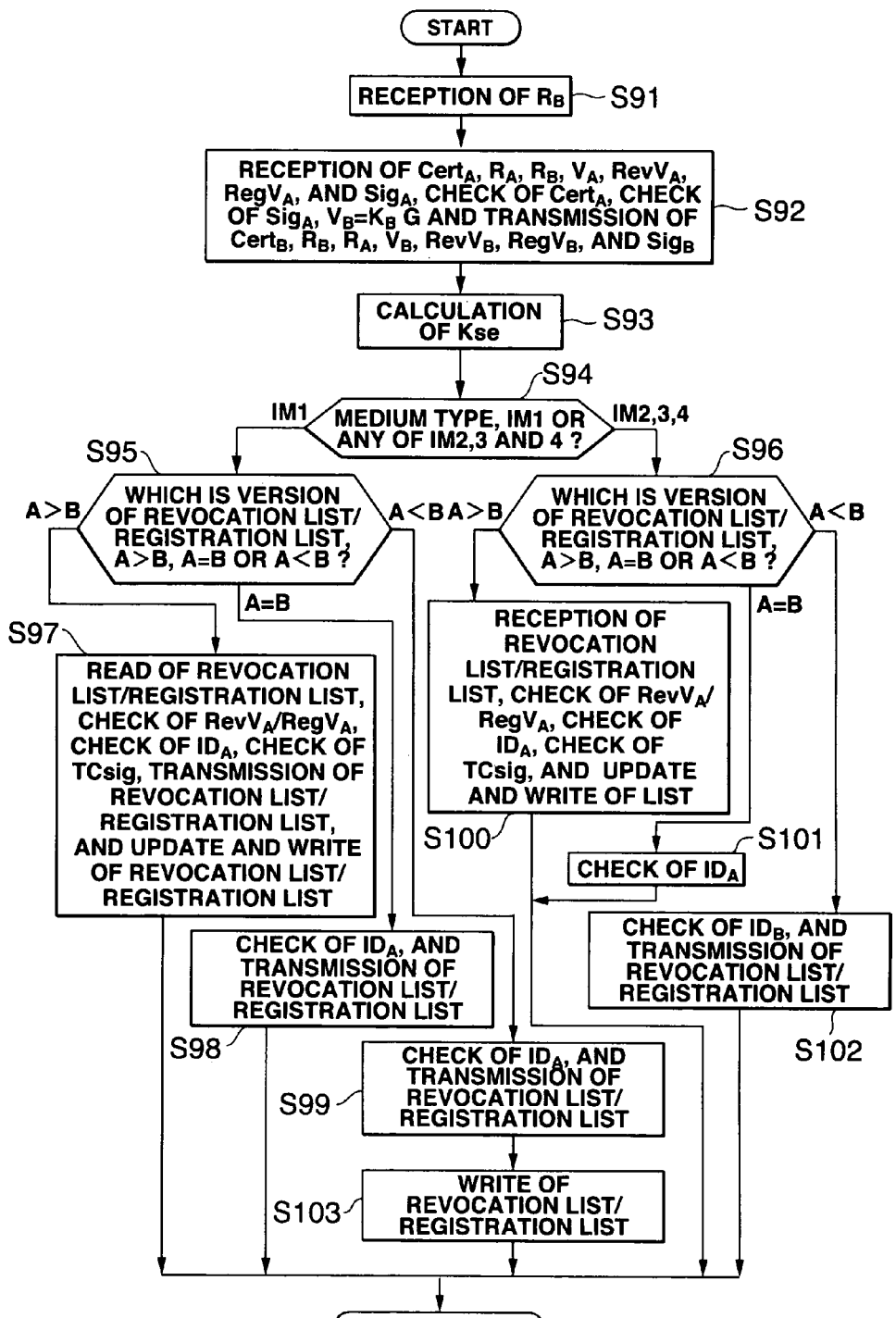
FIG. 86 shows a flow of the former half of the operations effected in a recorder/player of a device type Dev2 or Dev4.
Figure 87:
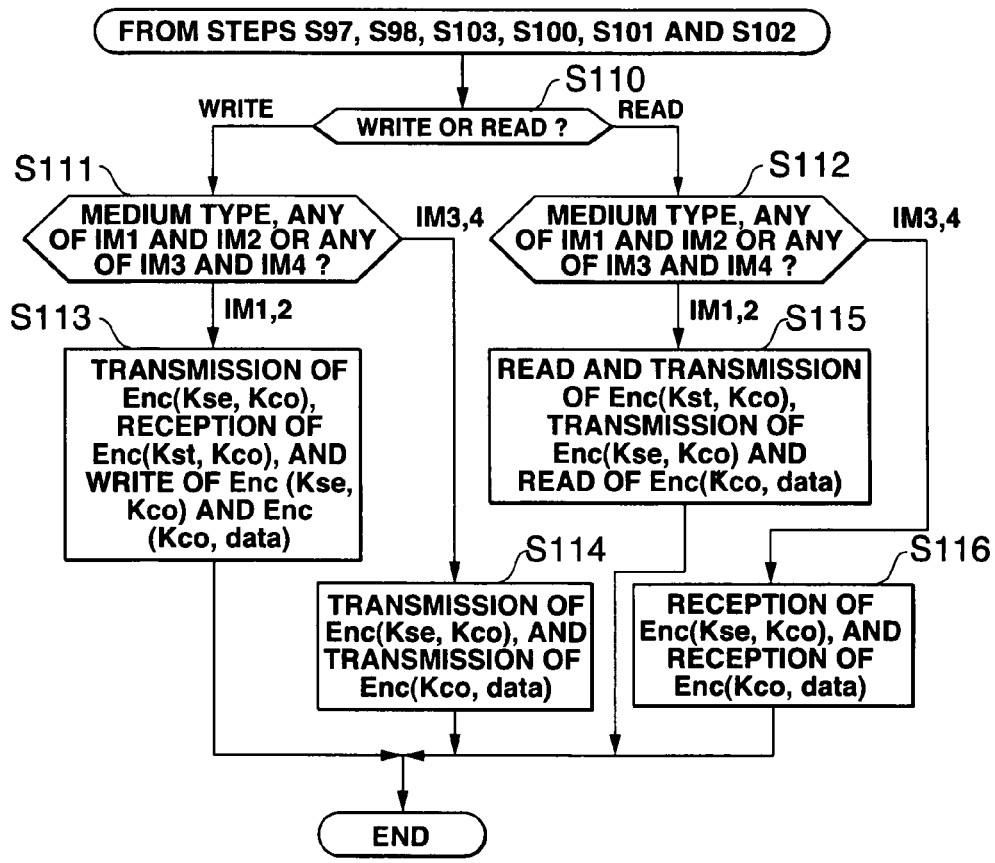
FIG. 87 shows a flow of the latter half of the operations effected in the recorder/player of the device type Dev2 or Dev4.

FIGS. 86 and 87 show together a flow of operations effected by the recorder/player of the device type Dev2/Dev4 although this flow should inherently be illustrated in one drawing.

As shown in FIG. 86, the recorder/player first generates a random number $R_B$ and sends it to the data recording medium, at step S91.

Next, at step S92, the recorder/player receives $Cert_A$, $R_A$, $R_B$, $V_A$, $RevV_A$, $RegV_A$ and $Sig_A$ from the data recording medium. After sending them to a media recorder/player and checking $Cert_A$ and $Sig_A$, and make a calculation of $V_B=K_B \cdot G$ as in the above, the recorder/player sends $Cert_B$, $R_B$, $R_A$, $V_B$, $RevV_B$, $RegV_B$ and $S_{igB}$ to the data recording medium.

Next, the recorder/player makes a calculation of a session key Kse at step S93.

Next, at step S94, the recorder/player judges if the media type of the data recording medium is IM1 or any other (IM2, IM3 or IM4). If it is judged at step S94 that the media type of the data recording medium is IM1, the recorder/player goes to step S95. If it is judged at step S94 that the media type of the data recording medium is other than IM1 (namely, it may be IM2, IM3 or IM4), the reorder/player goes to step S96.

At step S95, the recorder/player judges which are newer, the version numbers $RevV_A$ and $RegV_A$ or the version numbers $RevV_B$ and $RegV_B$. Namely, the recorder/player checks the version numbers of the lists held in the recording medium to be larger than (A>B), equal to (A=B) or smaller than (A<B) those of the lists held in the recorder/player. If it is judged at step S95 that A>B, the recorder/player goes to step S97. If it is judged that A=B, the recorder/player goes to step S98. If it is judged that A<B, the recorder/player goes to step S99.

At step S97, the recorder/player reads the revocation and registration lists from the optical disc 12 of the optical disc medium 50 of the media type IM1, checks the version numbers ($RevV_A$ and $RegV_A$) of the lists, checks, using the lists, $ID_A$ of the optical disc medium 50, check the digital signature TCSig made by the center CT, sends the lists to the security module 53 of the optical disc medium 50, updates its own lists using the read lists, and then goes to step S110 in FIG. 87.

Also, at step S98, the recorder/player checks, using its own lists, $ID_A$ of the data recording medium, and sends the lists to the data recording medium. Then, it goes to step S110 in FIG. 87.

At step S99, the recorder/player checks, using its own lists, $ID_A$ of the data recording medium, and the lists to the data recording medium. Then, it goes to step S103 where it will write (update) the lists to the data recording medium, and then goes to step S110 in FIG. 87.

On the other hand, at step S96, the recorder/player judges which are newer, the version numbers $RevV_A$ and $RegV_A$ or the version numbers $RevV_B$ and $RegV_B$. Namely, the recorder/player checks the version numbers of the lists held in the recording medium to be larger than (A>B), equal to (A=B) or smaller than (A<B) those of the lists held in the recorder/player. If it is judged at step S96 that A>B, the recorder/player goes to step S100. If it is judged that A=B, the recorder/player goes to step S101. If it is judged that A<B, the recorder/player goes to step S102.

At step S100, the recorder/player receives the revocation and registration lists from the security module of the data recording medium of any of the media types IM2 to IM4, checks the version numbers ($RevV_A$ and $RegV_A$) of the lists, checks, using the lists, $ID_A$ of the data recording medium, check the digital signature TCSig made by the center CT. If it is judged that they can pass the checking, the recorder/player updates its own lists with the received lists, and goes to step S110 in FIG. 87.

Also, at step S101, the recorder/player checks, using its own lists, the $ID_A$ of the data recording medium, and then goes to Step S110 in FIG. 87.

Also, at step S102, the recorder/player checks, using its own lists, $ID_A$ of the data recording medium, sends the lists to the security module of the data recording medium, and then goes to step S110 in FIG. 87.

At step S110 in FIG. 87, it is judged which operation the recorder/player has to do, data recording to the data recording medium or data reading from the data recording medium.

If it is judged at step S110 that the data recording is to be done, the recorder/player goes to step S111. At step S111, the recorder/player judges which the media type of the data recording medium is, IM1, IM2 (optical disc medium), IM3 or IM4 (memory medium). If it is judged at step S111 that the media type is IM1 or IM2, the recorder/player goes to step S113. If it is judged that the media type is IM3 or IM4, the recorder/player goes to step S114.

Also, if it is judged at step S110 that the data playback is to be done, the recorder/player goes to step S112. At step S112, the recorder/player judges which the media type of the data recording medium is, IM1, IM2 (optical disc medium), IM3 or IM4 (memory medium). If it is judged at step S112 that the media type is IM1 or IM2, the recorder/player goes to step S115. If it is judged that the media type is IM3 or IM4, the recorder/player goes to step S116.

At step S113, the recorder/player sends the value Enc(Kse, Kco) obtained by encrypting the content key Kco with the session key Kse, and correspondingly receives the value Enc (Kst, Kco) the security module of the data recording medium has obtained by encrypting the content key Kco with the storage key Kst. Then, the recorder/player writes into the data recording medium the value Enc(Kst, Kco) obtained by encrypting the content key Kco with the storage key Kst and data Enc(Kco, data) obtained by encrypting content data with the content key Kco.

Also, at step S114, the recorder/player sends to the security module the value Enc(Kse, Kco) obtained by encrypting the content key Kco with the session key Kse, sends to the security module the data Enc(Kco, data) obtained by encrypting the content data with the content key Kco and then writes it to the memory unit.

Also, at step S115, the recorder/player reads from the data recording medium the value Enc(Kst, Kco) obtained by encrypting the content key Kco with the storage key Kst and sends the value Enc(Kst, Kco) to the security module in the data recording medium, and the security module decrypts the value Enc(Kst, Kco) read from the data recording medium with the storage key Kst and receives the value Enc(Kse, Kco) obtained by encrypting the content key Kco with the session key Kse, and then the recorder/player reads from the data recording medium the content data Enc(Kco, data) encrypted with the content key Kco.

Also, at step S116, the recorder/player receives from the security module in the data recording medium the value Enc (Kse, Kco) obtained by encrypting the content key Kco with the session key Kse, and then receives from the security module in the data recording medium the content data Enc (Kco, data) encrypted with the content key Kco.

It should be noted that in the foregoing, the data recording media according to the present invention have been described concerning the optical disc media and memory media, but the present invention is not limited to these data recording media but they may be a magnetic disc, magnetic tape, magneto-optical disc, nonvolatile memory backed up by a battery etc.

[Recording Medium Producing Apparatus and Method]

For the data recording medium according to the present invention, having been described in the foregoing, the present invention provides a producing apparatus and method which will be described herebelow:

First, each of the data recording media of the media types IM1 to IM4 having been described in the foregoing will be outlined and a data recording medium producing unit for each of the data recording media of the media types IM1 to IM4 will de described.

<Production of Media Type IM1>

Figure 88:
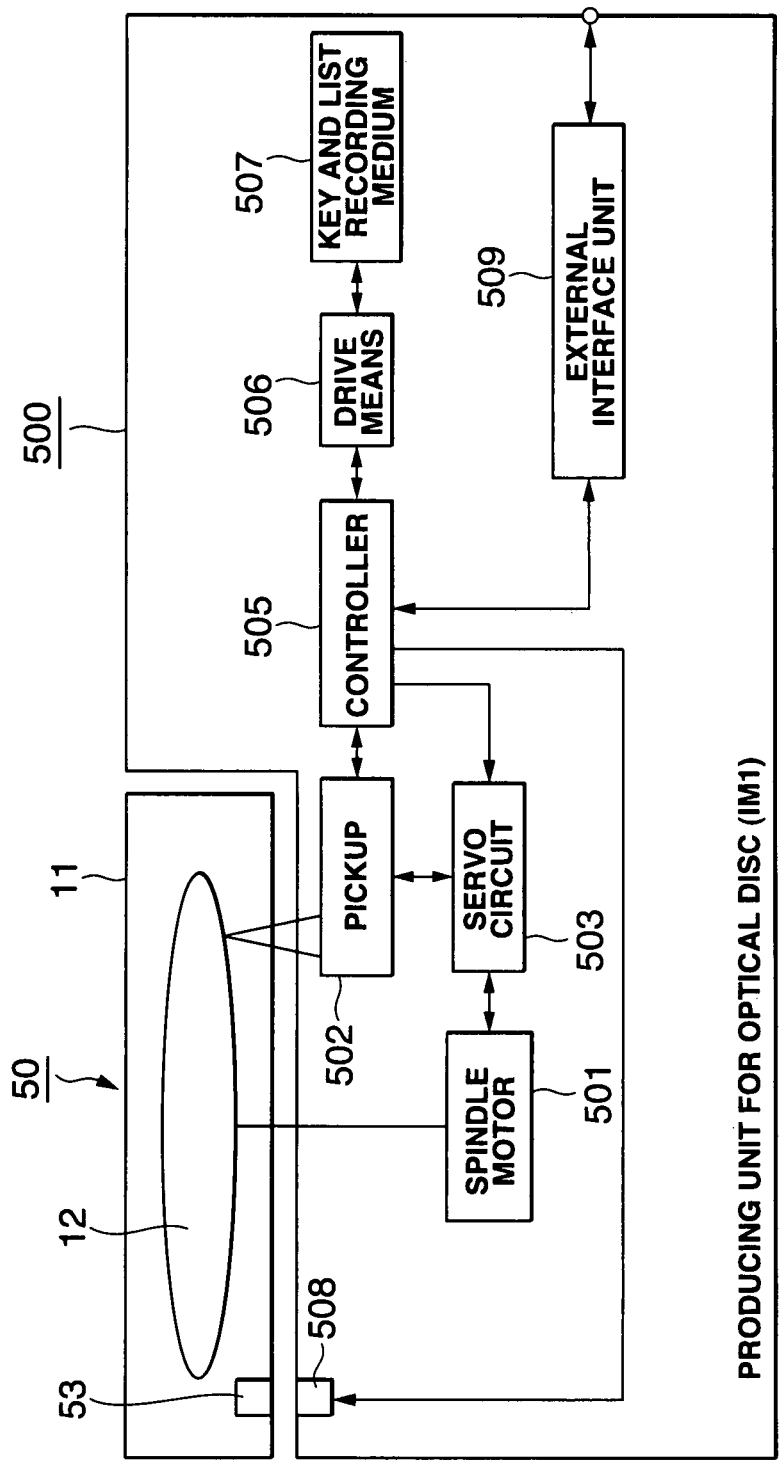
FIG. 88 is a schematic block diagram of a producing apparatus for an optical disc as the data recording medium of the media type IM1, adapted to write a latest list to the optical disc.
Figure 96:
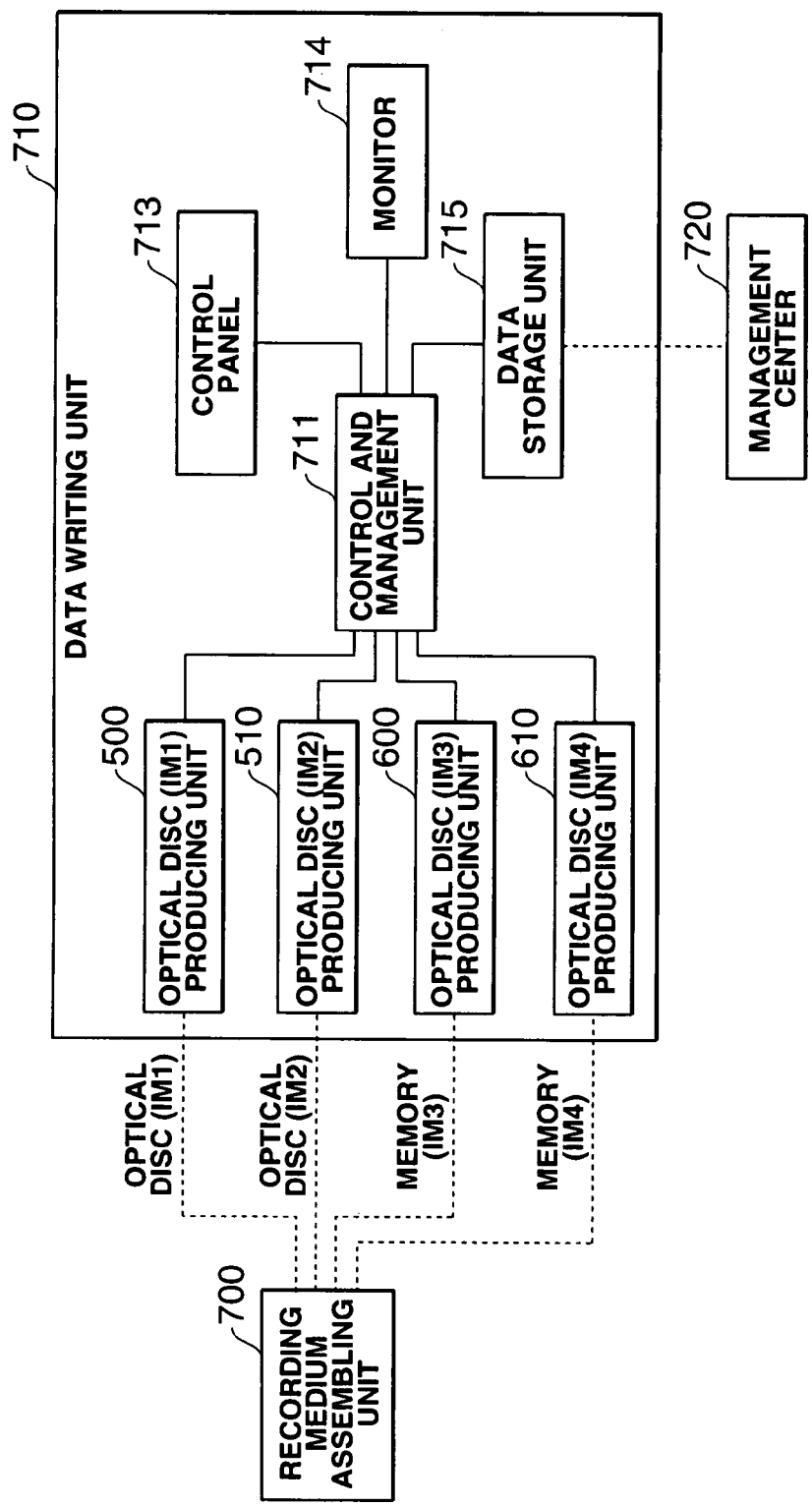
FIG. 96 is a schematic block diagram of a recording medium producing apparatus consisting of a medium assembling system and data writing unit.

FIG. 88 schematically illustrates an optical disc (IM1) producing unit 500 intended to record latest lists to an optical disc medium 50 of the media type IM1 previously assembled by a recording medium assembling system 700 (see FIG. 96). Note that the latest lists to be recorded may be either or both of revocation and registration lists.

The optical disc producing unit 500 shown in FIG. 88 records lists to the pre-assembled optical disc medium 50. However, the security module 53 in the optical disc medium 50 being of the media type IM1 has no nonvolatile memory to store lists or has a nonvolatile memory whose capacity is not sufficient to store the lists. Therefore, the optical disc producing unit 500 will record the lists in a content data recording area of the optical disc medium 50.

The optical disc producing unit 500 includes a spindle motor 501 to rotate the optical disc 12 in a cartridge 11 of the optical disc medium 50, an optical head 502 capable of writing data into at least the data recording area of the optical disc 12, a servo circuit 503 to control the spindle motor 501 and optical head 502, a controller 505 to control these components etc.

Further, the optical disc producing unit 500 includes a key/list recording medium 507 having stored therein an ID, private key, public key certificate, revocation and registration lists which are the latest when the medium 50 is produced, and version numbers of the lists of the optical disc medium 50, a drive unit 606 to drive the key/list recording medium 507, and an interface 508 to send and receive data to and from the security module 53 of the optical disc medium 50. Note that in the construction shown in FIG. 88, the key/list recording medium 507 and drive unit 506 are provided inside the optical disc producing unit 500 but they may be ones external to the optical disc producing unit 500. The ID, private key, public key certificate, latest lists and version numbers of the lists are issued by the key issue center (a management center which will further be described later) for example, and they are previously stored in a key/list recording medium internal or external to the optical disc producing unit 500.

Data stored in the key/list recording medium 507 is read by the drive unit 506 under the control of the controller 505. Of the data thus read, the ID, private key, public key certificate and version numbers are sent from the interface unit 508 to the security module 53 of the optical disc medium 50, while the latest lists are recorded by the optical head 502 into the data recording area of the optical disc 12.

Also, the ID, private key, public key certificate, latest lists and their version numbers can be acquired by reading ones previously stored in the internal or external key/list recording medium as well as by directly acquiring ones issued by the key issue center for example via an external interface unit 509. When the ID, private key, public key certificate, latest lists and their version numbers are to be acquired via the external interface unit 509 as in the latter case, the ID, private key, public key certificate and version numbers will be sent from the controller 505 directly to the interface unit 508 via the external interface unit 509 and stored into the security module 53 of the optical disc medium 50, while the latest lists will be sent from the controller 505 directly to the optical head 502 and recorded into the data recording area of the optical disc 12.

Figure 89:
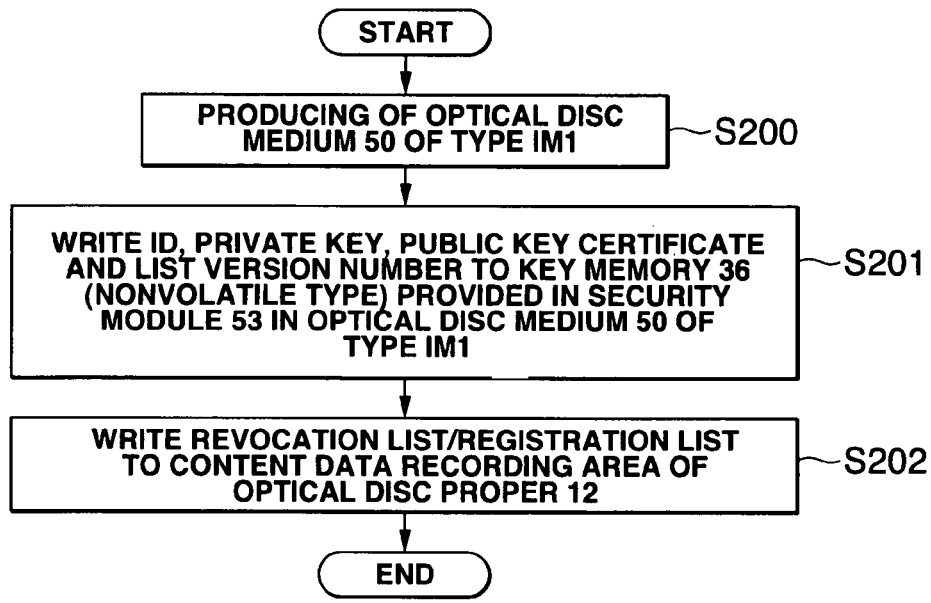
FIG. 89 shows a flow of operations effected in writing the latest list to the optical disc as the data recording medium of the media type IM1.

FIG. 89 is a flow chart of operations effected in the recording medium producing method according to the present invention, showing a flow of processing steps in the production of the optical disc medium 50 of the media type IM1 and recording of the latest lists to the optical disc medium 50 of the media type IM1.

In the optical disc producing method shown in FIG. 89, first at step S200, the optical disc medium 50 of the media type IM1 is assembled by a recording medium assembling system 700 which will further be described later.

Next, at step S201 in the optical disc producing method, the optical disc producing unit 500 shown in FIG. 88 writes the ID, private key, public key certificate and version numbers into a nonvolatile key memory 36 provided in the security module 53 of the optical disc medium 50 of the media type IM1.

Next at step S202, the optical disc producing unit 500 shown in FIG. 88 writes the latest lists into the content data recording area of the optical disc 12.

With the above process, the optical disc medium 50 will have the latest lists recorded in the data recording area and be shipped from factory.

<Production of Media Type IM2>

Figure 90:
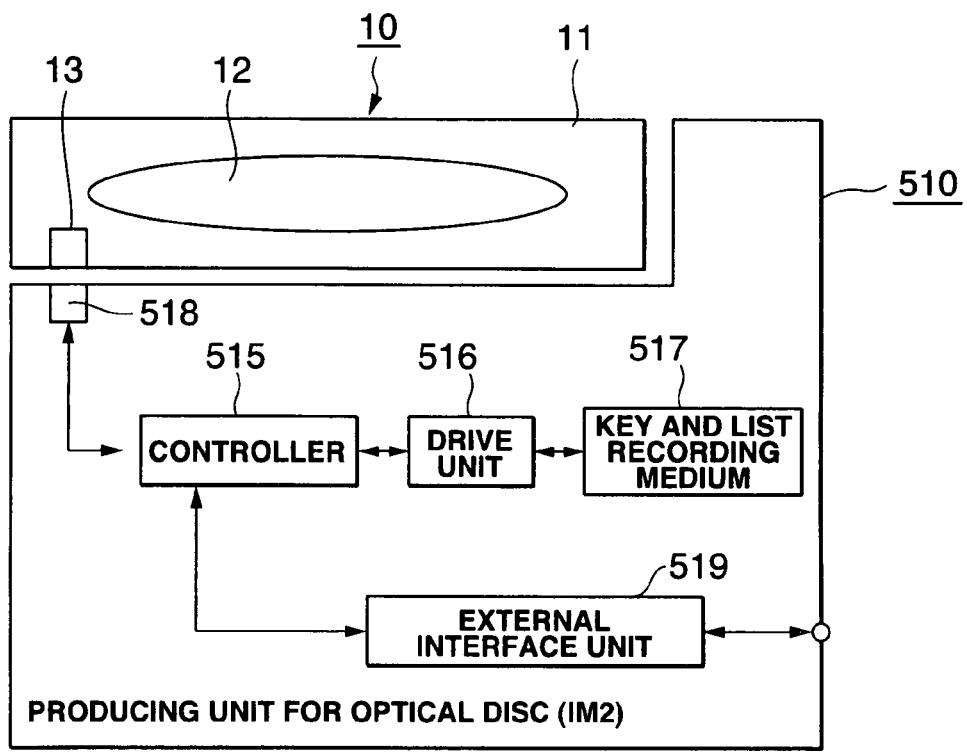
FIG. 90 is a schematic block diagram of a producing apparatus for an optical disc as the data recording medium of the media type IM2, adapted to write a latest list to the optical disc.

FIG. 90 schematically illustrates an optical disc (IM2) producing unit 510 intended to record latest lists to an optical disc medium 10 of the media type IM2 previously assembled by a recording medium assembling system 700. Note that the latest lists to be recorded may be either or both of revocation and registration lists.

The optical disc producing unit 510 shown in FIG. 90 records lists to the pre-assembled optical disc medium 10. The optical disc medium 10 being of the media type IM2 has a security module 13 including a nonvolatile memory (34) having a capacity to store the lists. Therefore, the optical disc producing unit 510 will record the lists into the nonvolatile memory of the security module 13 of the optical disc medium 10.

The optical disc producing unit 510 includes at least an interface unit 518 to transmit the lists to the security module 13 of the optical disc medium 10, and a controller 515 to control these components etc. Note that in the example shown in FIG. 90, the optical disc producing unit 510 does not include the spindle motor and optical head as in the example shown in FIG. 58 but the optical disc producing unit 510 may of course include them.

Further, the optical disc producing unit 510 includes a key/list recording medium 517 having stored therein an ID, private key, public key certificate, revocation and registration lists which are the latest when the medium 10 is produced, and version numbers of the lists of the optical disc medium 10, and a drive unit 516 to drive the key/list recording medium 517. In the construction shown in FIG. 90, the key/list recording medium 517 and drive unit 516 are built in the optical disc producing unit 510. However, the key/list recording medium 517 and drive unit 516 may be ones external to the optical disc producing unit 510. The ID, private key, public key certificate, latest lists and version numbers of the lists are issued by the key issue center (a management center which will further be described later) for example, and they are previously stored in a key/list recording medium internal or external to the optical disc producing unit 510.

Data stored in the key/list recording medium 517 is read by the drive unit 516 under the control of the controller 515. The data is sent from the interface unit 518 to the security module 13 of the optical disc medium 10 and stored in the nonvolatile memory (34).

Also in the example shown in FIG. 90, the ID, private key, public key certificate, latest lists and their version numbers can be acquired by reading ones previously stored in the internal or external key/list recording medium as well as by directly acquiring ones issued by the key issue center for example via an external interface unit 519, as in the example shown in FIG. 88. When the ID, private key, public key certificate, latest lists and their version numbers are to be acquired via the external interface unit 519 as in the latter case, the ID, private key, public key certificate and version numbers will be sent from the controller 515 directly to the interface unit 518 via the external interface unit 519 and stored into the nonvolatile memory 34 of the security module 13 of the optical disc medium 10.

Figure 91:
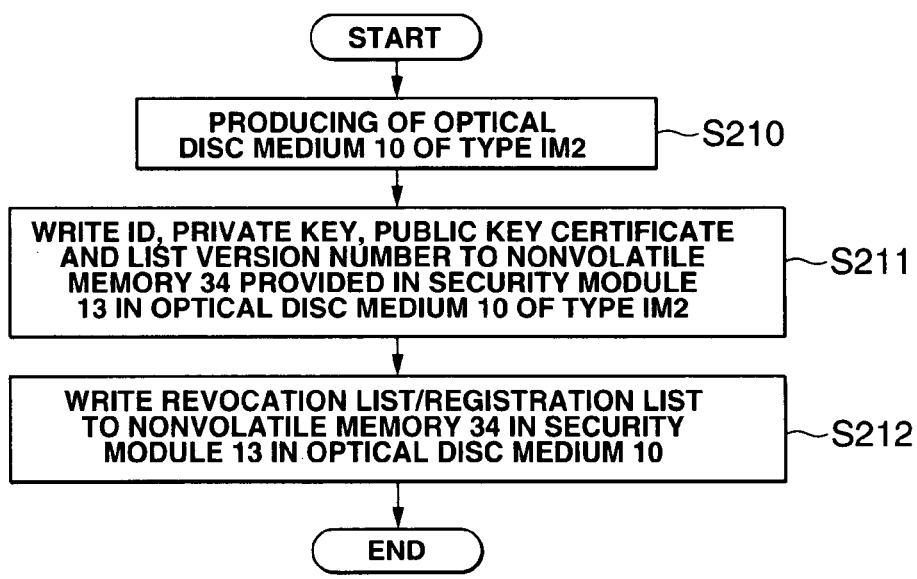
FIG. 91 shows a flow of operations effected in writing the latest list to the optical disc as the data recording medium of the media type IM2.

FIG. 91 is a flow chart of operations effected in the recording medium producing method according to the present invention, showing a flow of processing steps in the production of the optical disc medium 10 of the media type IM2 and recording of the latest lists to the optical disc medium 10 of the media type IM2.

In the optical disc producing method shown in FIG. 91, first at step S210, the optical disc medium 10 of the media type IM2 is assembled by a recording medium assembling system 700 which will further be described later.

Next, at step S211 in the optical disc producing method, the optical disc producing unit 510 shown in FIG. 90 writes the ID, private key, public key certificate and version numbers into a nonvolatile memory 34 provided in the security module 13 of the optical disc medium 10 of the media type IM2.

Next at step S212, the optical disc producing unit 510 shown in FIG. 90 writes the latest lists into the nonvolatile memory 34 provided in the security module 13 of the optical disc medium 10.

With the above process, the optical disc medium 10 will have the latest lists recorded in the security module 13 and be shipped from factory.

<Production of Media Type IM3>

Figure 92:
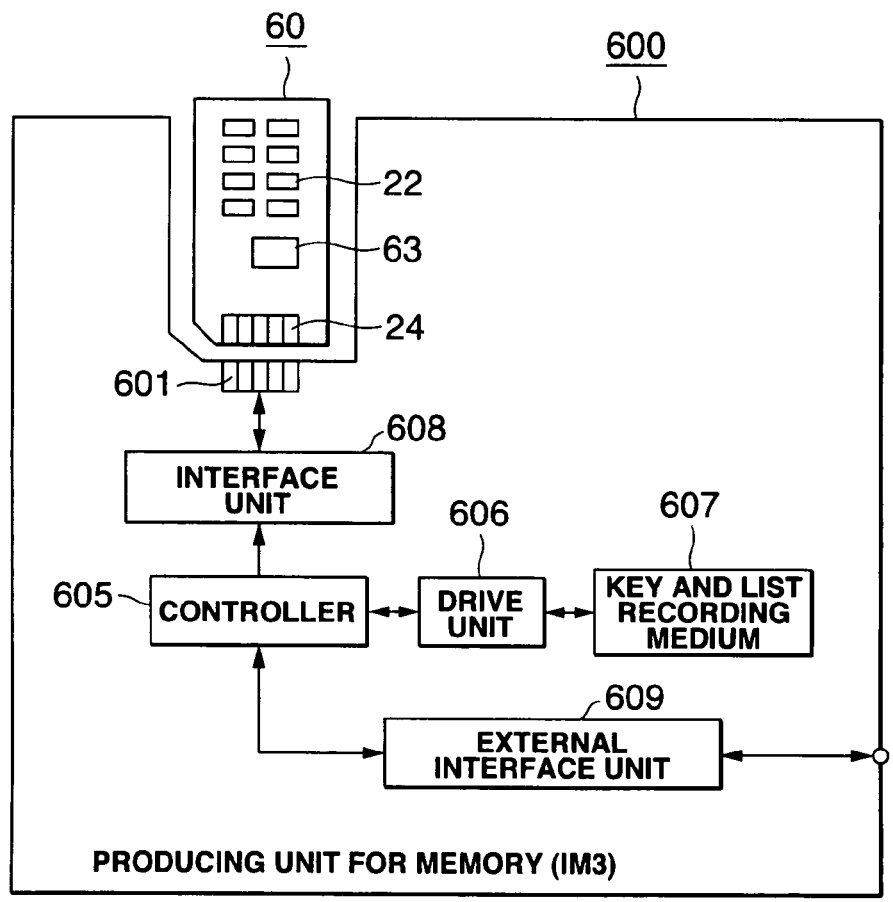
FIG. 92 is a schematic block diagram of a producing apparatus for a memory as the data recording medium of the media type IM3, adapted to write a latest list to the memory.

FIG. 92 schematically illustrates a memory (IM3) producing unit 600 intended to record latest lists to a memory medium 60 of the media type IM3 previously assembled by a recording medium assembling system 700 which will further be described later. Note that the latest lists to be recorded may be either or both of revocation and registration lists.

The memory producing unit 600 shown in FIG. 92 records lists to the pre-assembled memory medium 60. However, the security module 63 in the memory medium 60 being of the media type IM3 has no nonvolatile memory to store lists or has a nonvolatile memory whose capacity is not sufficient to store the lists. Therefore, the memory producing unit 600 will record the lists in a content data recording area of the memory unit 22 of the memory medium 60.

The memory producing unit 600 includes at least an interface unit 608 to transmit a signal to the memory medium 60, an input/output terminal 601 for connection to an input/output terminal 24 of the memory medium 60, a controller 605 to control these components etc.

Further, the memory producing unit 600 includes a key/list recording medium 607 having stored therein an ID, private key, public key certificate, revocation and registration lists which are the latest when the memory medium 60 is produced, and version numbers of the lists of the memory medium 60, and a drive unit 606 to drive the key/list recording medium 607. In the construction shown in FIG. 92, the key/list recording medium 607 and drive unit 606 are built in the optical disc producing unit 600. However, the key/list recording medium 607 and drive unit 606 may be ones external to the optical disc producing unit 600. The ID, private key, public key certificate, latest lists and version numbers of the lists are issued by the key issue center (a management center which will further be described later) for example, and they are previously stored in a key/list recording medium internal or external to the optical disc producing unit 600.

Data stored in the key/list recording medium 607 is read by the drive unit 606 under the control of the controller 605. The data is sent from the interface unit 608 and input/output terminal 601 to the memory medium 60. The memory medium 60 records the ID, private key, public key certificate, latest lists and their version number sent from the memory producing unit 600 into the data recording area of a memory unit 22.

Also, the ID, private key, public key certificate, latest lists and their version numbers can be acquired by reading ones previously stored in the internal or external key/list recording medium as in the above as well as by directly acquiring ones issued by the key issue center for example via an external interface unit 609. When the ID, private key, public key certificate, latest lists and their version numbers are to be acquired via the external interface unit 609 as in the latter case, the ID, private key, public key certificate, lists and their version numbers acquired via the external interface unit 609 will be sent from the controller 605 directly to the memory medium 60 via the interface unit 608 and input/output terminal 601, and recorded into the data recording area of the memory unit 22.

Figure 93:
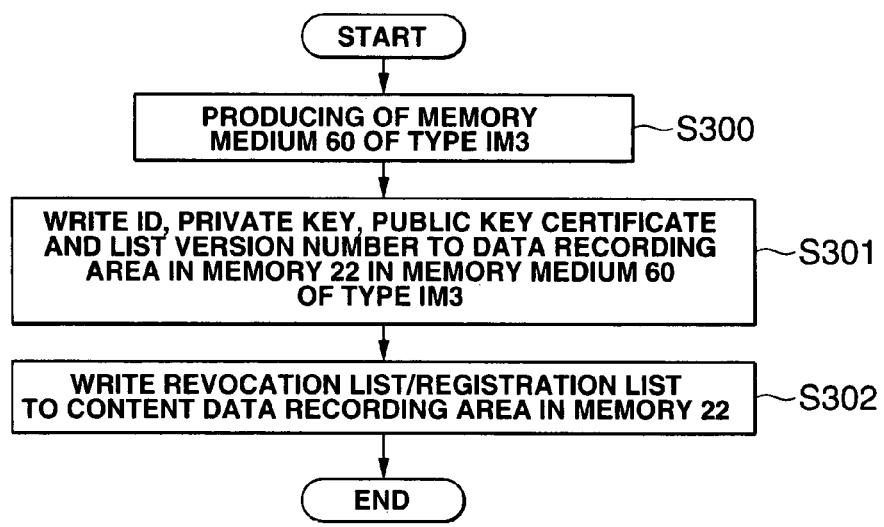
FIG. 93 shows a flow of operations effected in writing the latest list to the memory as the data recording medium of the media type IM3.

FIG. 93 is a flow chart of operations effected in the recording medium producing method according to the present invention, showing a flow of processing steps in the production of the memory medium 60 of the media type IM3 and recording of the latest lists to the memory medium 60 of the media type IM3.

In the memory producing method shown in FIG. 93, first at step S300, the memory medium 60 of the media type IM3 is assembled by a recording medium assembling system 700 which will further be described later.

Next, at step S301 in the memory producing method, the memory producing unit 600 shown in FIG. 92 writes the ID, private key, public key certificate and version numbers into the data recording area of the memory unit 22 in the memory medium 60 of the media type IM3.

Next at step S302, the memory producing unit 600 shown in FIG. 92 writes the latest lists into the content data recording area of the memory unit 22.

With the above process, the memory medium 60 will have the latest lists recorded in the data recording area and be shipped from factory.

<Production of Media Type IM4>

Figure 94:
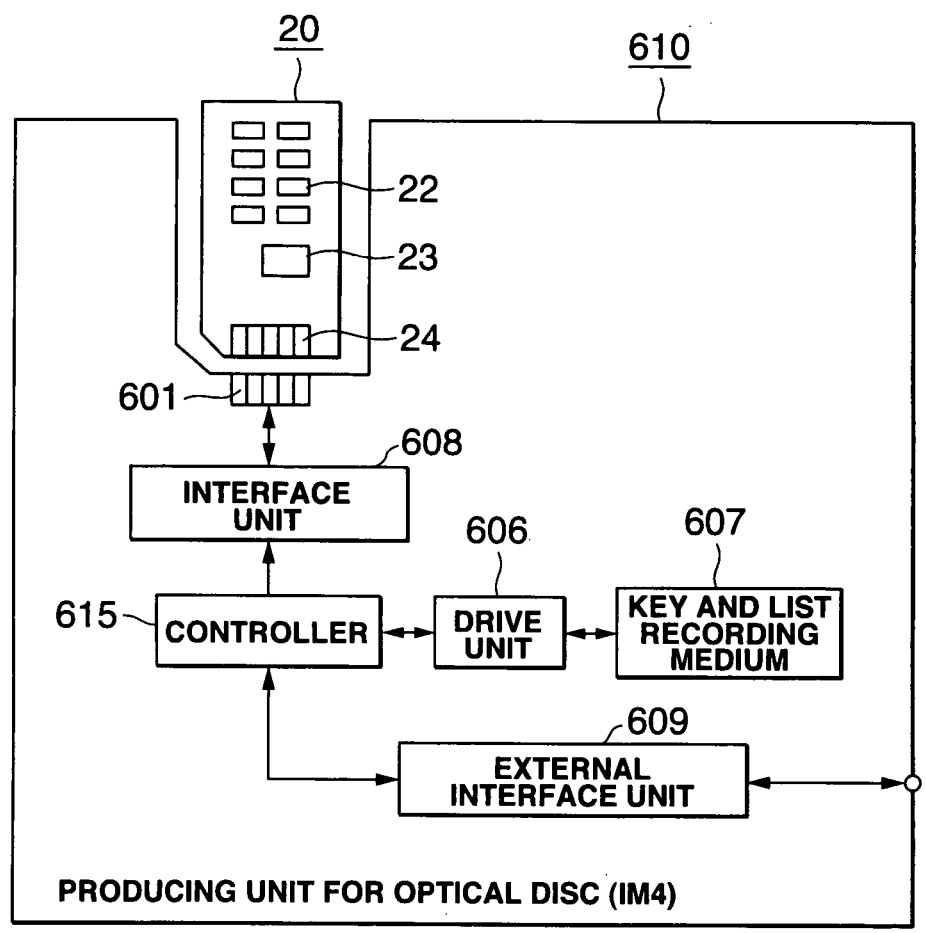
FIG. 94 is a schematic block diagram of a producing apparatus for a memory as the data recording medium of the media type IM4, adapted to write a latest list to the memory.

FIG. 94 schematically illustrates a memory (IM4) producing unit 610 intended to record latest lists to a memory medium 20 of the media type IM4 previously assembled by a recording medium assembling system 700 which will further be described later. Note that the latest lists to be recorded may be either or both of revocation and registration lists. In FIG. 94, the same or similar components as in FIG. 92 are indicated with same or similar references as in FIG. 94.

The memory producing unit 610 shown in FIG. 94 records lists to the pre-assembled memory medium 20. However, the memory medium 20 being of the media type IM4 has a security module 23 with a nonvolatile memory 44 having a sufficient capacity to store the lists. Therefore, the memory producing unit 610 records the lists in the nonvolatile memory of the security module 23 of the memory medium 20.

The memory producing unit 610 includes an interface unit 618 to transmit a signal to the memory medium 20, an input/output terminal 601 for connection to an input/output terminal 24 of the memory medium 20, a controller 605 to control these components etc., and in addition, a key/list recording medium 607 having previously stored therein lists which are the latest when the memory 20 is produced and their version numbers and a drive unit 606 for the medium 607. Note that also the construction shown in FIG. 94, the key/list recording medium 607 and drive unit 606 may be external to the memory producing unit 610, as in FIG. 92. The ID, private key, public key certificate, latest lists and their version numbers are issued from the key issue center (management center which will further be described later) and stored in advance in the key/list recording medium internal or external to the memory producing unit 610.

Data stored in the key/list recording medium 607 is read by the drive unit 606 under the control of the controller 605. The data is sent to the memory medium 20 via the interface unit 608 and input/output terminal 601. The memory medium 20 records, into the nonvolatile memory (44) of the security module 23, the ID, private key, public key certificate, latest lists and their version number sent from the memory producing unit 610

Also in the example shown in FIG. 94, the ID, private key, public key certificate, latest lists and their version numbers can be acquired by reading ones previously stored in the internal or external key/list recording medium as in the example shown in FIG. 92 as well as by directly acquiring ones issued by the key issue center (management center which will further be described later) for example via an external interface unit 609. When the ID, private key, public key certificate, latest lists and their version numbers are to be acquired via the external interface unit 609 as in the latter case, the ID, private key, public key certificate, lists and their version numbers will be sent from the controller 605 directly to the memory medium 20 via the interface unit 608 and input/output terminal 601, and recorded into the nonvolatile memory (44) of the security module 23.

Figure 95:
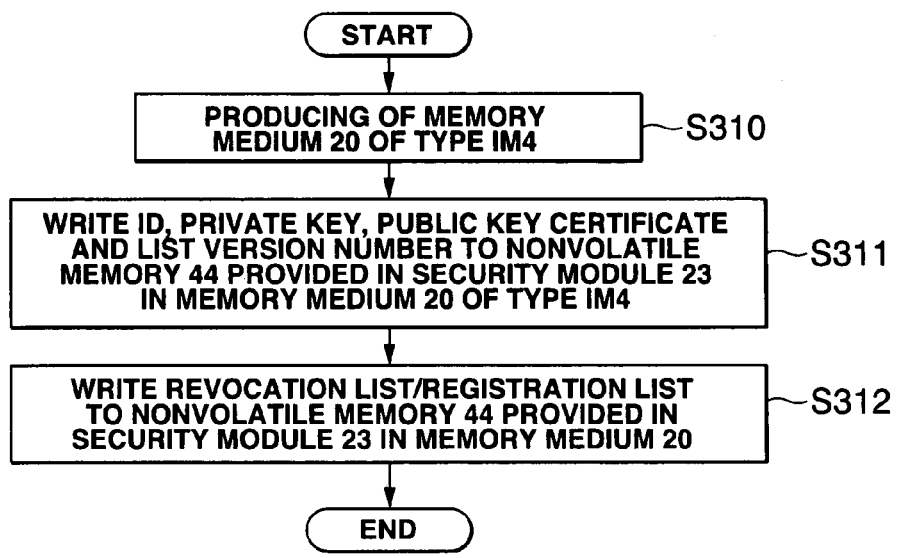
FIG. 95 shows a flow of operations effected in writing the latest list to the memory as the data recording medium of the media type IM4.

FIG. 95 is a flow chart of operations effected in the recording medium producing method according to the present invention, showing a flow of processing steps in the production of the memory medium 20 of the media type IM4 and recording of the latest lists to the memory medium 20 of the media type IM4.

In the memory producing method shown in FIG. 95, first at step S310, the memory medium 20 of the media type IM4 is assembled by a recording medium assembling system 700 which will further be described later.

Next, at step S311 in the memory producing method, the memory producing unit 610 shown in FIG. 94 writes the ID, private key, public key certificate and version numbers into the nonvolatile memory 44 in the security module 23 of the memory medium 20 of the media type IM4.

Next at step S312, the memory producing unit 610 shown in FIG. 94 writes the latest lists into the nonvolatile memory 44 in the security module 23 of the memory medium 20.

With the above process, the memory medium 20 will have the latest lists recorded in the nonvolatile memory 44 in the security module 23 and be shipped from factory.

<Construction of the Producing Unit>

Referring now to FIG. 96, there is schematically illustrated the construction of the optical disc medium producing unit for the media types IM1 and IM2 and that for the media types IM3 and IM4.

As shown in FIG. 96, the data recording medium producing unit generally consists of a recording medium assembling system 700 and data writing unit 710. The recording medium assembling system 700 is to assemble components of each of the data recording media of the media types IM1 to IM4 into such a data recording medium. The data writing unit 710 writes data such as the latest lists, keys etc. into each recording medium assembled by the recording medium assembling system 700, carried and loaded into place, correspondingly to the media type of the recording medium.

Note that the recording medium assembling system 700 may not be a one to produce data recording media of all media types but may be a one to assemble a data recording medium of a desired media type and similarly the data writing unit 710 may not be a one to write data into data recording media of all the media type but may be a one to write data into a data recording medium of a desired media type. However, examples of them which assemble data recoding media of all the media types and write data into the media of all the media types will be described herebelow. Further, in case the recording medium assembling process consists of a plurality of assembling posts, the data recording medium assembling system 700 includes all assembling units used at all the assembling posts.

The data writing unit 710 includes optical disc producing units 500 and 510, and memory producing units 600 and 610, control and managing unit 711, control panel 713, monitor 714, data storage unit 715, etc.

The optical disc producing unit 500 is a one shown in FIG. 88 and records latest lists etc. to the optical disc medium 50 of the media type IM1. The optical disc producing unit 510 is a one shown in FIG. 90 and records latest lists etc. to the optical disc medium 10 of the media type IM2. The memory producing unit 600 is a one shown in FIG. 92 and records latest lists etc. to the memory medium 60 of the media type IM3. The memory producing unit 610 is a one shown in FIG. 94 and records latest lists etc. to the memory medium 20 of the media type IM4.

Also, the control and management unit 711 controls, based on a predetermined program, the operation of each of the units 500, 510, 600 and 610 and operations for writing data such as latest lists and keys, and manages the IDs etc. of each of the data recording media 50, 10, 60 and 20 loaded in the producing units 500, 510, 600 and 610. The control panel 713 is operated by the user for example when setting control parameters etc. of the control and management unit 711, and the monitor 714 displays the operating condition of the data writing unit 710.

Further, the data storage unit 715 stores latest revocation and registration lists, public key certificate, etc. supplied from the center TC and management center 720 as a key issue center. Data such as lists, keys, etc. requested from the control and management unit 711 are read from the data storage unit 715, and sent to each of the producing units 500, 510, 600 and 610 via the control and management unit 711. Thus, the data such as latest lists, keys, etc. are written to each of the data recording media 50, 10, 60 and 20 loaded in each of the producing units 500, 510, 600 and 610.

Note that in the example shown in FIG. 96 is to write the latest lists are written to each of the data recording media 50, 10, 60 and 20, completely assembled but the data such as lists, keys, etc. (data corresponding to the media type of a data recording medium in consideration) may be written to the security module which is not yet assembled into each of the media and then the security module may be assembled into the medium.

INDUSTRIAL APPLICABILITY

As having been described in the foregoing, according to the present invention, each of the recording media is provided with a security module, and data to be recorded to the recording medium is encrypted with a content key different from one data to another and the content key can safely be stored in the security module.

Also, according to the present invention, the security module makes a mutual authentication using a public-key encryption technology with the recorder/player at the time of data recording or playback, the content key is given to a counterpart after the counterpart is judged to be a legally licensed unit, thereby allowing to prevent data from being leaked to any illegal unit.

Furthermore, according to the present invention, revocation and/or registration lists issued from the trustable or trusted center can effectively be utilized to prevent data from being given to a unit which is legal but has been attacked and thus has its own secret revealed or exposed to outside.

Therefore, according to the present invention, it is possible to prevent copyrighted data such as movie and music from illegally being copied.

The invention claimed is:

1. A storage apparatus for storing information retrieved by an information processing apparatus, the storage apparatus comprising:
    a first storage section that stores data for access by the information processing apparatus; and
    a security module distinct from the first storage section, the security module comprising:
        a second storage section that stores a first revoked unit list;
        a mutual authentication section that executes a mutual authentication protocol with the information processing apparatus;
        a receiving section that receives a second revoked unit list from the information processing apparatus; and
        a judging section that judges whether the information processing apparatus is revoked or not based on the first revoked unit list;
    wherein if the information processing apparatus is revoked, the first revoked unit list is maintained in the second storage section of the security module, and if the information processing apparatus is not revoked, the first revoked unit list is replaced with the second revoked unit list in the second storage section of the security module, and
    wherein the security module prevents the information processing apparatus from accessing the data stored by the first storage section when the mutual authentication protocol does not authenticate the information processing apparatus.

2. The storage apparatus as set forth in claim 1, further comprising a receiving section that receives ID information from the information processing apparatus.

3. The storage apparatus as set forth in claim 2, wherein the ID information includes a key for the information processing apparatus.

4. The storage apparatus as set forth in claim 3, wherein a digital certification includes the key.

5. The storage apparatus as set forth in claim 1, wherein the judging section judges whether the information processing apparatus is on the first revoked unit list.

6. The storage apparatus as set forth in claim 1, further comprising:
    a comparing section that compares the first revoked unit list with the second revoked unit list; and
    a second judging section that judges which revoked unit list is newer.

7. The storage apparatus as set forth in claim 6, further comprising:
    a transmitting section that transmits the first revoked unit list to the information processing apparatus.

8. The storage apparatus as set forth in claim 6, wherein the second judging section compares the respective version information attached with each revoked unit list.

9. The storage apparatus as set forth in claim 1, further comprising:
    a second receiving section that receives a private key from the information processing apparatus;
    a third storage section that stores a public key; and
    a judging section that judges whether the private key and the public key correspond.

10. The storage apparatus as set forth in claim 9, wherein if the information processing apparatus is revoked or the private key does not relate to the public key, the first revoked unit list is maintained, and if the information processing apparatus is not revoked and the private key relates to the public key, the first revoked unit list is replaced with the second revoked unit list.

11. The storage apparatus as set forth in claim 10, wherein if the first revoked unit list is maintained and the information processing apparatus is not revoked, the first revoked unit list is transmitted to the information processing apparatus.

12. The storage apparatus as set forth in claim 1, wherein the second storage section comprises:
    a revoked unit list storage section that stores the first revoked unit list; and
    a content storage section that stores content.

13. The storage apparatus as set forth in claim 12, wherein the revoked unit list storage section is more secure than the content storage section.

14. The storage apparatus according to claim 1, wherein the first revoked unit list indicates at least one information processing apparatus whose private key has been revealed.

15. The storage apparatus according to claim 1, wherein the storage apparatus and the information processing apparatus share a common private key.

16. An information processing apparatus for retrieving information from a storage apparatus, comprising:
    a storage section that stores a second revoked unit list;
    a mutual authentication section that executes a mutual authentication protocol with a security module on the storage apparatus;
    a receiving section that receives a first revoked unit list from the storage apparatus; and
    a judging section that judges whether the storage apparatus is revoked or not based on the second revoked unit list;
    wherein if the storage apparatus is revoked, the second revoked unit list is maintained, and if the storage apparatus is not revoked, the second revoked unit list is replaced with the first revoked unit list,
    wherein the storage apparatus comprises a first storage section that stores data for access by the information process and a security module distinct from the first storage section, and the security module comprises a second storage section that stores the first revoked unit list, and
    wherein the information processing apparatus does not replace the second revoked unit list with the first revoked unit list when the mutual authentication protocol does not authenticate the storage apparatus.

17. The information processing apparatus as set forth in claim 16, further comprising a receiving section that receives ID information from the storage apparatus.

18. The information processing apparatus as set forth in claim 17, wherein the ID information includes a key for the storage apparatus.

19. The information processing apparatus as set forth in claim 18, wherein a digital certification includes the key.

20. The information processing apparatus as set forth in claim 17, wherein the judging section judges whether the storage apparatus is on the second revoked unit list.

21. The information processing apparatus as set forth in claim 17, further comprising:
    a comparing section that compares the first revoked unit list with the second revoked unit list; and
    a second judging section that judges which revoked unit list is newer.

22. The information processing apparatus as set forth in claim 21, further comprising a transmitting section that transmits the second revoked unit list to the storage apparatus.

23. The information processing apparatus as set forth in claim 21, wherein the second judging section compares the respective version information attached with each revoked unit list.

24. The information processing apparatus as set forth in claim 16, further comprising:
a second receiving section that receives a private key from the storage apparatus;
a second storage section that stores a public key; and
a judging section that judges whether the private key and the public key correspond.

25. The information processing apparatus as set forth in claim 24, wherein if the storage apparatus is revoked or the private key does not relate to the public key, the second revoked unit list is maintained, and if the storage apparatus is not revoked and the private key relates to the public key, the second revoked unit list is replaced with the first revoked unit list.

26. The information processing apparatus as set forth in claim 25 wherein if the second revoked unit list is maintained and the storage apparatus is not revoked, the second revoked unit list is transmitted to the storage apparatus.

27. The information processing apparatus as set forth in claim 16, wherein the storage section comprises:
a revoked unit list storage section that stores the second revoked unit list; and
a content storage section that stores content.

28. The information processing apparatus as set forth in claim 27, wherein the revoked unit list storage section is more secure than the content storage section.

29. The information processing apparatus as set forth in claim 16, further comprising a playing back section that plays back information retrieved from the storage apparatus.

30. The information processing apparatus according to claim 16, wherein the second revoked unit list indicates at least one storage apparatus whose private key has been revealed.

31. The storage apparatus according to claim 16, wherein the storage apparatus and the information processing apparatus share a common private key.

32. A system comprising an information processing apparatus and a storage apparatus, the information processing apparatus comprising:
a storage section that stores a second revoked unit list;
a mutual authentication section that executes a mutual authentication protocol with a security module on the storage apparatus;
a receiving section that receives a first revoked unit list from the storage apparatus; and
a judging section that judges whether the storage apparatus is revoked or not based on the second revoked unit list;
wherein if the storage apparatus is revoked, the second revoked unit list is maintained in the information processing apparatus, and if the storage apparatus is not revoked, the second revoked unit list is replaced with the first revoked unit list in the information processing apparatus, and
wherein the information processing apparatus does not replace the second revoked unit list with the first revoked unit list when the mutual authentication protocol does not authenticate the storage apparatus; and
the storage apparatus comprising:
a first storage section that stores data for access by the information processing apparatus; and
the security module, the security module being distinct from the first storage section and comprising:
a second storage section that stores the first revoked unit list;
a mutual authentication section that executes the mutual authentication protocol with the information processing apparatus;
a receiving section that receives the second revoked unit list from the information processing apparatus; and
a judging section that judges whether the information processing apparatus is revoked or not based on the first revoked unit list;
wherein if the information processing apparatus is revoked, the first revoked unit list is maintained in the second storage section of the security module, and if the information processing apparatus is not revoked, the first revoked unit list is replaced with the second revoked unit list in the second storage section of the security module, and
wherein the security module prevents the information processing apparatus from accessing the data stored by the first storage section when the mutual authentication protocol does not authenticate the information processing apparatus.

33. The system as set forth in claim 32, the information processing apparatus further comprising a receiving section that receives ID information from the storage apparatus.

34. The system as set forth in claim 33, wherein the ID information is a key for the storage apparatus.

35. The system as set forth in claim 34, wherein a digital certification includes the key.

36. The system as set forth in claim 32, wherein the judging section that judges whether the storage apparatus is revoked judges whether the storage apparatus is on the second revoked unit list.

37. The system as set forth in claim 32, the information processing apparatus further comprising:
a comparing section that compares the first revoked unit list with the second revoked unit list; and
a second judging section that judges which revoked unit list is newer.

38. The system as set forth in claim 37, the information processing apparatus further comprising a transmitting section that transmits the second revoked unit list to the storage apparatus.

39. The system as set forth in claim 37, wherein the second judging section compares the respective version information attached with each revoked unit list.

40. The system as set forth in claim 32, the information processing apparatus further comprising:
a second receiving section that receives a private key from the storage apparatus;
a second storage section that stores a public key; and
a judging section that judges whether the private key and the public key correspond.

41. The system as set forth in claim 40, wherein if the storage apparatus is revoked or the private key does not relate to the public key, the second revoked unit list is maintained, and if the storage apparatus is not revoked and the private key relates to the public key, the second revoked unit list is replaced with the first revoked unit list.

42. The system as set forth in claim 41, wherein if the second revoked unit list is maintained and the storage apparatus is not revoked, the second revoked unit list is transmitted to the storage apparatus.

43. The system as set forth in claim 32, wherein the storage section that stores the second revoked unit list comprises:

a revoked unit list storage section that stores the second revoked unit list; and a content storage section that stores content.

44. The system as set forth in claim 43, wherein the revoked unit list storage section is more secure than the content storage section.

45. The system set forth in claim 32, the information processing apparatus further comprising a playing back section that plays back information retrieved from the storage apparatus.

46. The system according to claim 32, wherein the second revoked unit list indicates at least one storage apparatus whose private key has been revealed.

47. The system according to claim 32, wherein the storage apparatus and the information processing apparatus share a common private key.

48. A method for retrieving information from a storage apparatus, comprising:
    storing a second revoked unit list;
    executing a mutual authentication protocol with a security module on the storage apparatus;
    receiving a first revoked unit list from the storage apparatus; and
    judging whether the storage apparatus is revoked or not based on the second revoked unit list;
    wherein if the storage apparatus is revoked, the second revoked unit list is maintained, and if the storage apparatus is not revoked, the second revoked unit list is replaced with the first revoked unit list,
    wherein the storage apparatus comprises a first storage section that stores data for access by the information process and a security module distinct from the first storage section, and the security module comprises a second storage section that stores the first revoked unit list, and
    wherein the second revoked unit list is not replaced with the first revoked unit list when the mutual authentication protocol does not authenticate the storage apparatus.

49. The method as set forth in claim 48, further comprising receiving ID information from the storage apparatus.

50. The method as set forth in claim 49, wherein the ID information includes a key for the storage apparatus.

51. The method as set forth in claim 50, wherein a digital certification includes the key.

52. The method as set forth in claim 48, wherein judging whether the storage apparatus is revoked includes judging whether the storage apparatus is on the second revoked unit list.

53. The method as set forth in claim 48, further comprising:
    comparing the first revoked unit list with the second revoked unit list; and
    judging which revoked unit list is newer.

54. The method as set forth in claim 53, further comprising transmitting the second revoked unit list to the storage apparatus.

55. The method as set forth in claim 53, further comprising comparing the respective version information attached with each revoked unit list.

56. The method as set forth in claim 48, further comprising:
    receiving a private key from the storage apparatus;
    storing a public key; and
    judging whether the private key and the public key correspond.

57. The method as set forth in claim 56, wherein if the storage apparatus is revoked or the private key does not relate to the public key, the second revoked unit list is maintained, and if the storage apparatus is not revoked and the private key relates to the public key, the second revoked unit list is replaced with the first revoked unit list.

58. The method as set forth in claim 57, wherein if the second revoked unit list is maintained and the storage apparatus is not revoked, the second revoked unit list is transmitted to the storage apparatus.

59. The method as set forth in claim 48, further comprising storing content.

60. The method as set forth in claim 59, wherein the revoked unit list is stored more securely than the content.

61. The method set forth in claim 48, further comprising playing back information retrieved from the storage apparatus.

62. The method according to claim 48, wherein second revoked unit list indicates at least one storage apparatus whose private key has been revealed.

63. The method according to claim 48, wherein the storage apparatus and the information processing apparatus share a common private key.

* * * * *